United States Patent
Rathod

(10) Patent No.: US 11,103,773 B2
(45) Date of Patent: Aug. 31, 2021

(54) DISPLAYING VIRTUAL OBJECTS BASED ON RECOGNITION OF REAL WORLD OBJECT AND IDENTIFICATION OF REAL WORLD OBJECT ASSOCIATED LOCATION OR GEOFENCE

(71) Applicant: Yogesh Rathod, Mumbai (IN)

(72) Inventor: Yogesh Rathod, Mumbai (IN)

(*) Notice: Subject to any disclaimer, the term of this patent is extended or adjusted under 35 U.S.C. 154(b) by 31 days.

(21) Appl. No.: 16/104,973

(22) Filed: Aug. 20, 2018

(65) Prior Publication Data
US 2018/0349703 A1    Dec. 6, 2018

Related U.S. Application Data

(63) Continuation of application No. PCT/IB2018/056071, filed on Aug. 11, 2018, which
(Continued)

(51) Int. Cl.
*A63F 13/216* (2014.01)
*H04W 4/021* (2018.01)
(Continued)

(52) U.S. Cl.
CPC .......... *A63F 13/216* (2014.09); *A63F 13/213* (2014.09); *A63F 13/35* (2014.09); *A63F 13/65* (2014.09); *A63F 13/69* (2014.09); *G06K 9/00664* (2013.01); *G06Q 20/047* (2020.05); *G06Q 20/0655* (2013.01); *G06Q 20/3224* (2013.01); *G06Q 20/3276* (2013.01); *G06Q 30/0601* (2013.01); *G06T 13/40* (2013.01); *G06T 17/05* (2013.01); *G06T 19/003* (2013.01); *H04L 67/22* (2013.01); *H04L 67/26* (2013.01); *H04L 67/38* (2013.01); *H04W 4/021* (2013.01);
(Continued)

(58) Field of Classification Search
CPC ..... G06Q 30/00; G06Q 30/0239; G06F 17/00
See application file for complete search history.

(56) References Cited

U.S. PATENT DOCUMENTS 9,602,608 B2 * 3/2017 Brady, Jr. .............. G01C 21/32
9,669,296 B1    6/2017 Hibbert et al.
(Continued)

OTHER PUBLICATIONS https://support.pokemongo.nianticlabs.com/hc/en-us/articles/115013355788-Catching-Pok%C3%A9mon (Catching Pokémon video—0:20 to 0:45 seconds).

*Primary Examiner* — Reginald A Renwick

(57) ABSTRACT

Computer-implemented methods and systems for storing data specifying an association between the real world object associated virtual object, wherein the association utilizes geolocation or place or geofence information and the object criteria. In the event of conducting scanning or taking a photograph of a real world object, detecting that a client device of the server has conducted scanning or augmented reality (AR) scanning or taken a photograph or provided a raw photo or scanned data from particular real world object geolocation. Identifying or recognizing an object in the received photograph or scanned data and based on the identified object satisfying within a defined geographic area surrounding the identified geolocation or the identified geolocation associated place or geofence associated object criteria in the stored data, displaying or providing the associated virtual object including virtual money to the client device.

20 Claims, 47 Drawing Sheets

Related U.S. Application Data is a continuation of application No. PCT/IB2018/055821, filed on Aug. 2, 2018, which is a continuation of application No. PCT/IB2018/055631, filed on Jul. 27, 2018.

(51) Int. Cl.

| | |
|---|---|
| *H04L 29/08* | (2006.01) |
| *A63F 13/65* | (2014.01) |
| *A63F 13/35* | (2014.01) |
| *H04L 29/06* | (2006.01) |
| *A63F 13/213* | (2014.01) |
| *A63F 13/69* | (2014.01) |
| *G06Q 20/06* | (2012.01) |
| *G06Q 20/32* | (2012.01) |
| *G06Q 20/04* | (2012.01) |
| *G06Q 30/06* | (2012.01) |
| *H04W 4/029* | (2018.01) |
| *G06K 9/00* | (2006.01) |
| *G06T 13/40* | (2011.01) |
| *G06T 17/05* | (2011.01) |
| *G06T 19/00* | (2011.01) |
| *G06F 3/0488* | (2013.01) |
| *G06F 3/0481* | (2013.01) |
| *G06T 3/40* | (2006.01) |

(52) U.S. Cl.
CPC ..... *H04W 4/029* (2018.02); *A63F 2300/1087* (2013.01); *A63F 2300/205* (2013.01); *A63F 2300/5526* (2013.01); *A63F 2300/69* (2013.01); *G06F 3/0488* (2013.01); *G06F 3/04815* (2013.01); *G06F 3/04883* (2013.01); *G06K 9/00302* (2013.01); *G06K 9/00362* (2013.01); *G06K 9/00671* (2013.01); *G06K 2209/01* (2013.01); *G06T 3/4038* (2013.01); *G06T 2200/24* (2013.01)

(56) References Cited

U.S. PATENT DOCUMENTS

| | | | |
|---|---|---|---|
| 9,754,355 B2 | 9/2017 | Chang et al. | |
| 2009/0192891 A1* | 7/2009 | Titus | G06Q 30/02 |
| | | | 705/14.23 |
| 2012/0068980 A1* | 3/2012 | Kitahara | A63F 13/42 |
| | | | 345/207 |
| 2013/0044128 A1* | 2/2013 | Liu | G06T 19/006 |
| | | | 345/633 |
| 2014/0063054 A1 | 3/2014 | Osterhout et al. | |
| 2014/0237578 A1* | 8/2014 | Bryant | G06F 3/04845 |
| | | | 726/7 |
| 2015/0103097 A1* | 4/2015 | Li | G06K 9/46 |
| | | | 345/633 |
| 2018/0114250 A1 | 4/2018 | Phillips et al. | |
| 2018/0308287 A1* | 10/2018 | Daniels | G06T 19/20 |
| 2019/0058856 A1* | 2/2019 | Bostick | H04N 9/8715 |
| 2019/0114061 A1* | 4/2019 | Daniels | G06F 3/04815 |
| 2019/0300003 A1* | 10/2019 | Shiraishi | B60W 40/09 |
| 2019/0311341 A1* | 10/2019 | Rice | G06Q 30/0239 |

\* cited by examiner

Logged-In as (Damino Pizza - Jonney) Home Campaigns/Pubs. Analysis Billing Account Sign Out
Customer ID: 1234567890 ∽405   Privacy Help Structured Info. and Detail Profile ∽401

(+) Create Campaign/Publication ∽403

Campaign/Publication Name/Title: Damino's Pizza ∽404   Icon/Logo: (optional) ∽407
Details: ∽408

Damino's Pizza Lower Parel ∽411
Damino's Pizza ∽410
Photo(s) of Object(s) or Photo(s) contains object(s) ∽419
415 ∽ 413    418 ∽ 402
425
Select current location ∽512
Add New Object (+) ∽430

Object Name: Veg Extravaganza ∽432
Object Type/Category: Food Item, Pizza ∽435
Object Place/Location/Address: Unit NO. 6D, Block-17, Phoenix Mills Compound, 462, Lower Parel ∽436
GPS coordinates, longitude, latitude: 18.9949354,72.825022100000007 ∽438
Object Details: Black Olives, Onion, Crisp Capsicum, Mushroom, FreshTomato, Golden Corn, Jalapeno & Extra Cheese. ∽440
490∽  Price: USD 3.15   Select or Add New Field (+) ∽442
441
Object Keywords: Pizza ∽444

Object Criteria / Object Model / Scene Image(s) or Image(s) as Object Criteria: 446 448 445 447
Virtual Objects / Virtual Elements: 462 443 468 469
467 466  Points/Virtual ∽445
Money Value = 3.15

• User Need AR Scan to View Virtual Object(s) 474
Display Virtual Object(s) anywhere within Defined Geo-fence OR Defined Accurate Location Position OR Clue ∽476
475

Type of user action or play required to collect Virtual Objects:
☐ Automatically get ∽471
☐ Play Game [Select Game] ∽477
☐ Take Photo ∽472
☑ Submit Purchase Receipt ∽478
☐ Check In Place ∽479    481
☐ Submit Video ∽480
☐ Fill Form, Profile, Survey, Contact Details
☐ Refer, Share, Invite Friends 5 ∽492
☐ Register ∽493    496
☐ Install App ∽495
☐ Provide Comments (Feedback, Review)
☐ Like, Dislike, Emoticons ∽497
☐ View Presentation - Duration [15 Mins]
☐ Follow ∽421
☐ Add to Favorite / Contact List ∽422
☑ Define Rules e.g [500] Virtual objects ∽476
available within [24 Hours]
∽470

- Central Park Zoo!!!
  2H before - Server Admin (Editor's Choice) — 1501
- Written "RAHANA" on board
  50 Mins before - James - In Contact — 1502
- New Movie Poster at Time Square
  1H before - Sugegsted - In Contact — 1503
- Vintage car near Art Gallery NYC
  1H before - Nearby Places — 1504
- Classic Café at Time Square, NYC
  2H before - Auto Suggested — 1505
- Scan "StarCoffee" Logo and Get Coupon
  2H before - Sponsored — 1506
- Couple who are doing "Cha Cha" dance at Time Square
  2H before - Server Admin (Editor's Choice) — 1507
- My friends, AR Scan My Birthday Cake!!!
  50 Mins before - Amita - In Contact — 1508
- One of the Deer's Neck in Time Square
  1H before - Suggested - In Contact — 1509
- "Buffalo Soldier" song and music in Times Square
  2H before - Auto Suggested — 1511
- Woman who wear Fancy Hat at Times Square
  2H before - Sponsored — 1512
- "Wedding Bells" word in Times Square Electrified Advertisements
  2H before - Sponsored — 1513
- Scan "Super Cup"!!!
  2H before - Super College Group — 1514
- Somebody seen Bentley Car at near Times Square
  50 Mins before - Lily - In Contact — 1515
- AR Scan Jumping scene of Dwayne John in "Sky scraper" movie trailer advertisement in Times Square NYC!!!
  40 Mins before - Lily - In Contact — 1516
- Dancing with star Joanna
  12Mins before - Auto Suggested — 1517

Figure 15

July 2018 ~ 2020

Today ~ 2025                    Sort 2001   Filter 2002   Search 2003

Purchased - BrandTwo Shaving Cream - 1 - Rs. 1200          50
2005   2006              2007                    2008   2010  2011  2012  2013

Liked - Sky scraper Movie    5

Viewed - Trailer of Skyscraper Movie   5

Viewed - Sky scraper Movie   25

Listened - BillSuper Top 10 Songs   5

Commented on - BrandTwo Shaving Cream   5

Check In - MadameWax Museum Las Vegas   25

Shared - BrandOne T-shirt   5

Invited - 5 Friends to play WorldScan   50

Check In | AR Scan | Purchased - Damino's Pizza at Lower Parel   30

Captured Photo at StarCoffee, NYC   5

Submitted video of Dance   50

Viewed - Information about Real World Objects   5

Check In Safari Park | AR Scan - Elephant at Safari Park   50

Submitted - Purchase Receipt of StarCoffee   25

Scanned - Logo of StarCoffee   20

July 18 ~ 2022

Figure 20

Standardized Virtual Money or Currency

Money: 1000
Gold: 500
Diamond: 500
Others: 500
Total Worth (in Virtual Money): 2500

Standardized Types and Categories of Natural Objects (Fix / Movable) (Numbers * Per Item Value = Total)

Tree
Tree
5 * 20 = 100

Birds
Peacock
10 * 15 = 150

Animals

Sea Creatures

Figure 22

Medals (Based on Levels and other Rules & Factors)
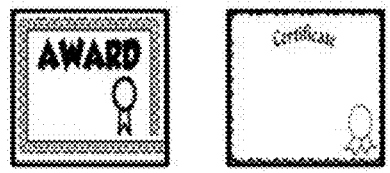
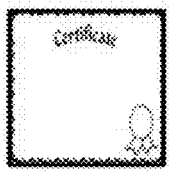
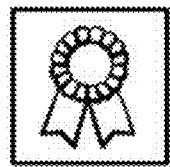
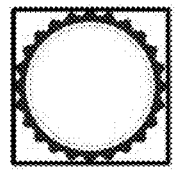
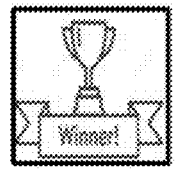
2505
Received, Captured, Evolved, Won or Purchased Virtual Objects, Characters, Powers
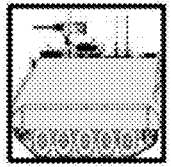
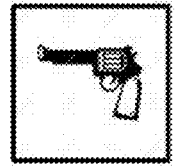
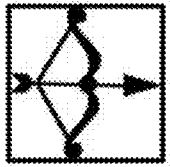
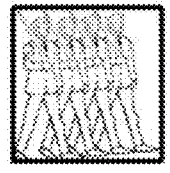
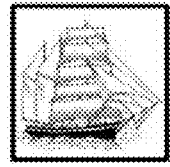
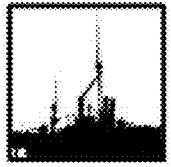
2535
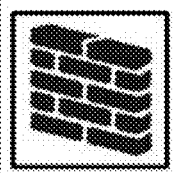
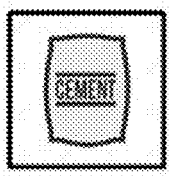
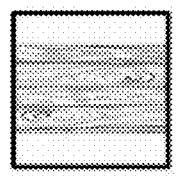
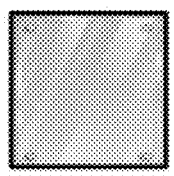
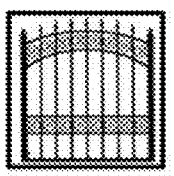
2585
Figure 25

Logged In User: Yogesh Rathod ~2701  OR Serve admin (Christi) ~2702

[photo placeholder] ~2705

Yogesh Rathod ~2707

2709

Hi Lily, AR Scan Jumping scene of Dwayne John in "Sky scraper" movie trailer advertisement in Times Square NYC!!!

71/250 Chars    (+) ~2703

🔍 Search 🎤

Past  Draft/Saved  Contacts
Suggested  Contacts of Contacts  ~2730
Bookmarked  Collaborative / Team
Directories  Level wise  Advertised
Purchase  Shared  Location / Place Specific 🔍 Select Contacts/Friends  ~2735

☐ Angelina
☐ Amita
☐ Candice
☑ Lily  ~2725
☑ Best Friends  ~2750
☐ College Group
☐ Public 📍 📷 🎥 📹 ☰ 💬  Send ✓
2711 2712 2713 2714 2715 2716  2720  Verified
                                    2717
Finish requested task within: [2 Days]  (+) ~2718

Provide Tips (e.g. How to Do, Reach, Prepare, Where..)  ~2719

Location or Place Info.:
○ Current Location or Place of ~2751 Receiving User
○ Define Location(s)/Place (e.g. SQL, Natural Query, Wizard, Types of Locations / Places) ~2752
○ Define Geo-fence boundaries ~2753
○ Set via Map or Search Location/Palce and set ~2755

Locations / Places    Remove All ~2756
2757~ New York, U.S.A. - City    Remove | Nearby ~2762
2759~ [Enter a location]    Advance Search ~2764
For example, a city, suburb, area, region or postal code Objects category: ☑ Electronic Board (+) ~2770
Must contains Objects/ Object Keywords/ Scene:
🔍 Search Objects ~2771
☐ Mountain
☑ Jump
☐ Rain
2772 (+) ~2773

Must contains Contacts / Groups / Named Persons:
☑ Dwayne
☐ Lily
☐ Amita
2775 (+) ~2776

Brands / Named Entity / Company / Shop Name:
☐ Sky scraper
☐ Universal
☐ Super
2777 (+) ~2778

Type(s) / category(ies): ☐ Movie (+) ~2780
Sub-Type(s) / Subcategories: ☐ Movie -> Trailer (+) ~2781

Related to Hashtag / Keywords:
☐ #Sky scraper
☐ #Stunt
☐ #DwayneJohn
2782 (+) ~2783

Attributes / Roles / Characteristics / Expressions / Style / Act Type or Characters / Background / Mood / Activities / Actions
☐ Big Smile
☐ Night
☐ Modern
☑ Stunt
☐ Adventure
☐ Running
2782 (+) ~2783

Send Share Save Cancel   Figure 27
2721    2722    2760    2765

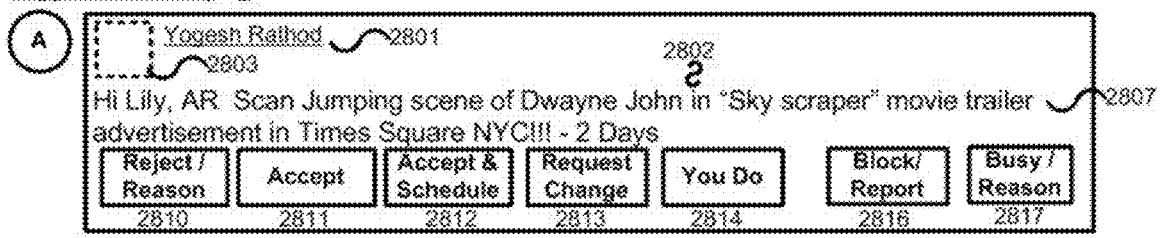
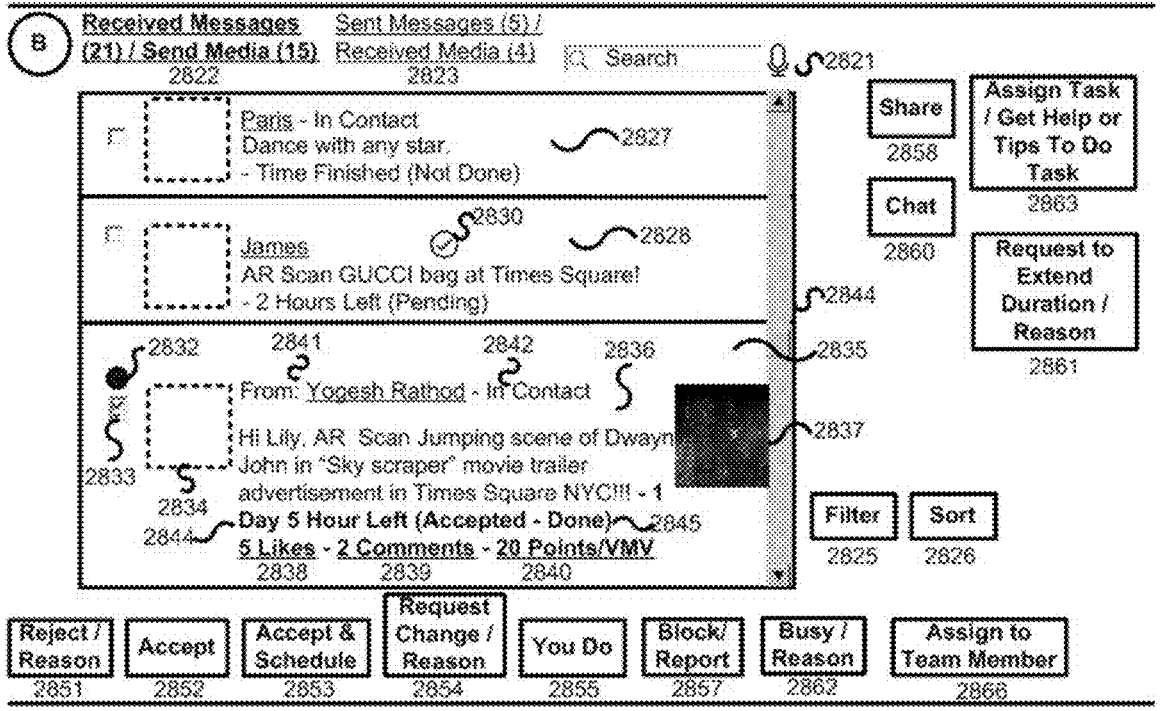
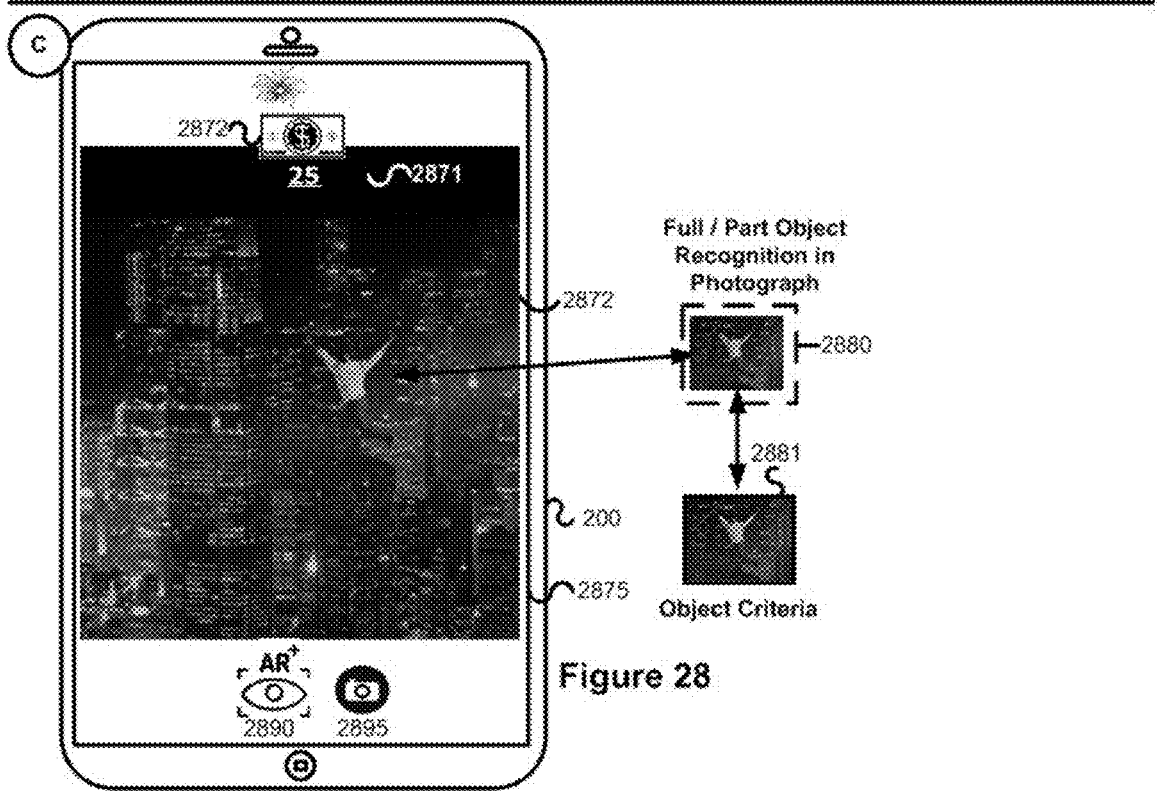
Figure 28

Figure 32

Logged-In as (BlueNot - Tom)   Home   Campaigns/Pubs.   Analysis   Billing Account   Sign Out
Customer ID: 1234567890 ⌇3305   Privacy Help   Structured Info. and Detail Profile ⌇3301

(+) Create Campaign/Publication ⌇3303

| Campaign/Publication Name/Title: | Domino's Pizza ⌇3304 | Icon/Logo: (optional) | [image] ⌇3307 |
| --- | --- | --- | --- |
| Details: | | | ⌇3306 |

Design/Select/Add/Upload Virtual Objects / Virtual Elements and No. of Points or Virtual Money Value (VMV):  ⌇3362  3366  3367 3343  3368 3389

Points / Virtual Money Value (VMV): 10  ⌇3364

Start Time: 19/07/2018    08.00 AM ⌇3310
End Time: 19/08/2018    09.00 AM ⌇3311
Schedules ⌇3331
Within 20 meters of current / set location ⌇3320
Budget: USD $100 per day    ⌇3315
Ad. Model Type: Pay Per User Receives Virtual Object    USD $1 ⌇3316
Languages:    (+) ⌇3318
Devices: Select Devices Types ⌇3319

Type of user action or play required to collect Virtual Objects: ⌇3370
- Automatically get ⌇3371
- Play Game  Select Game ⌇3377
- Take Photo ⌇3372
- Submit Purchase Receipt ⌇3378
- Check In Place ⌇3379   3391
- Submit Video ⌇3380
- Fill Form, Profile, Survey, Contact Details
- Refer, Share, Invite Friends 5 ⌇3392
- Register ⌇3393    3396
- Install App ⌇3395
- Provide Comments (Feedback, Review)
- Like, Dislike, Emoticons ⌇3397
- View Presentation - Duration  15 Mins
- Follow ⌇3321
- Add to Favorite / Contact List ⌇3322  3399
- Define Rules ⌇3376

Blue Note, NYC ⌇3342  Select current location ⌇3346
⌇3345
3351
3344

(+) ⌇3323

Select / Filter Type(s) Categories of Locations / Places
3324
Define SQL Query Specific Locations / Places
3325
Reset Fence
3326

Target User (Profile Criteria):
○ Any users of network   ● Target criteria specific users of network   All or selected
○ Only defined geo-fence specific users   ○ Contacts / Followers Target Criteria (Select Fields, conditions and provide one or more types of values):

| Gender | Female | AND |
| Age Range | 18 to 25 | AND |
| School | Super School, NYC | AND |
|  |  | AND (+) |

Order/ Make Payment 3389    Submit/ Verify 3388

3381  3382  3383  3384

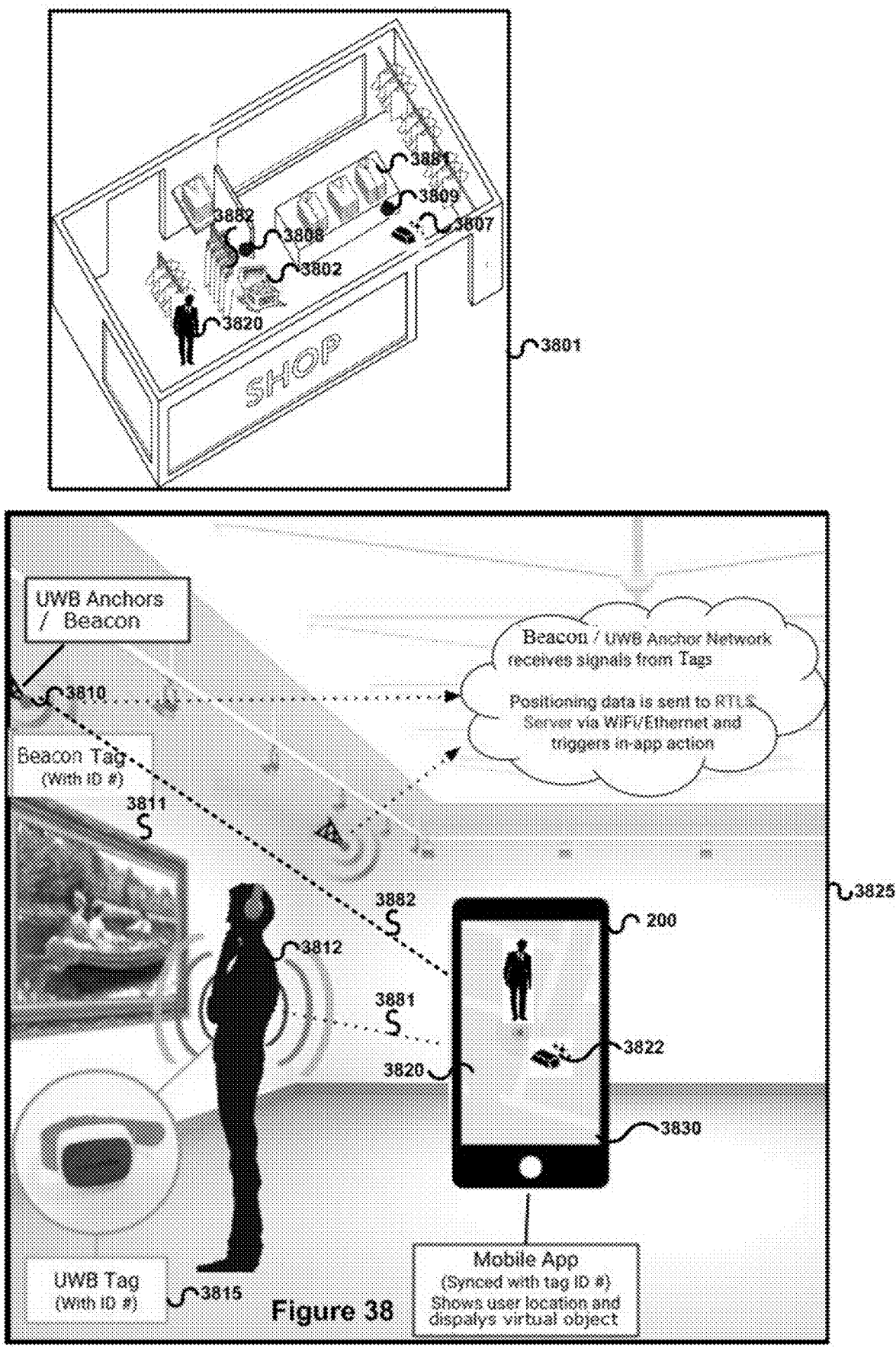

Home: ~3905
- Object Recognition and AR (Camera) ~3901
- Map ~3902
- Notifications ~3903
- Feeds - Timeline ~3904

Notification Settings: ~3920

| All or Selected Friends / Contacts 3910 | All or Selected Team 3911 | Automatically from Server 3912 | Server Administrator 3913 | Preferences specific users of network 3914 | Preferences specific sponsors 3915 |

- Near by places ~3921
- Suggested ~3922
- Instructed / Assigned Task ~3923
- Automated ~3924
- Particular selected locations or places / Ranges surround current location / geofence boundary ~3925
- Particular selected named or type of real world objects ~3926
- Event specific or Location or Geofence related to event ~3927
- Notify when receive all or selected type(s) of digital activities related virtual objects or receive virtual objects automatically ~3987
- Notify when displaying connections with real world interacted, transacted, related entities in virtual world or real world equivalent virtual world (in terms of geography) ~3990

- Notify when enter into any pre-defined geofence ~3928
- Notify day to day (as per schedules) 3929
- Notify when virtual objects not available surround user or selected places 3930
- Notify when receives new posts 3985
- Notify when receives new reactions on user's posts 3986
- Notify when advance to next level 3988

Do Not Disturb Settings (Schedules) ~3928

~3930

Map Settings: ~3950
- Automatically add and show interacted entity on map ~3951
- Show Real world Objects / Geofence Boundaries ~3952
- Show Map in 2D Mode  ○ Show Map in 3D Mode ~3953

Digital Spectacle Settings: ~3960
- Notify about Near by Real world Objects / Scenes 3961
- Auto Scan when user views real world objects 3962
- Notify when enter into pre- any defined geofence 3963
- Auto Scan when user views virtual objects within geofence 3964

AR Recognition Settings: ~3980
- Need to tap on AR Button ~3981
- View in camera to auto start augmented reality scanning ~3982
- Auto capture photo or record video while scanning real world objects and display to user for review and sharing ~3983
- Auto log scanning of real world objects and associated required actions, transactions, reactions related information and display to user for review and sharing ~3984

Figure 39

DISPLAYING VIRTUAL OBJECTS BASED ON RECOGNITION OF REAL WORLD OBJECT AND IDENTIFICATION OF REAL WORLD OBJECT ASSOCIATED LOCATION OR GEOFENCE

FIELD OF INVENTION

Systems and methods for accessing real world object associated virtual object data, location or geofence information and object criteria, generating a virtual object using the virtual object data; storing data specifying an association between the real world object associated virtual object, location or geofence information and the object criteria; detect that a client device of the server has conducting scanning or augmented reality (AR) scanning or taken a photograph or provide a raw photo or scanned data from particular real world object location; identifying or recognizing an object in the photograph or scanned data; and based on the identified object satisfying the object criteria associated with the virtual object in the stored data, display or provide the virtual object and associated data including virtual money to the client device. In another embodiment providing a game having a virtual world geography that correspondences the real world geography, as a result, as the player continuously moves about or navigates in a range of coordinates in the real world, the player also continuously moves about in a range of coordinates in the real world map or virtual world and responsive to the client device being within a predefined geofence boundary or a set distance of the location of the business in the real world; receiving, by the game server, augmented reality scanning or scanned data or raw photo or captured photograph, identifying or recognizing, by the game server, an object in the photograph or scanned data and based on the identified object satisfying the object criteria associated with the virtual object in the stored data, display or provide, by the game server, the virtual object and associated data including virtual money to the client device. In another embodiment hosting, at a game server, a game, the game having a virtual world geography that correspondences the real world geography, as a result, as the player continuously moves about or navigates in a range of coordinates in the real world based on monitoring and tracking current location of the client device, the player also continuously moves about in a range of coordinates in the real world map or virtual world; accessing pre-defined geo-fence in real world and associated virtual objects; and responsive to the client device being within a pre-defined boundary of geofence in the real world or enters in geofence, display or provide, one or more types of one or more virtual objects. In an embodiment display real world activities in 2D or 3D virtual world or real world map interface having corresponding real world geography.

BACKGROUND OF THE INVENTION

At present some of the games enables user to locate and collect various types of virtual objects based on reaching at particular location or place or pre-defined spots of physical world or real world and identifying spots based on provided photo of spot.

Pokémon Go™ enables user to identify and get particular type of Pokémon at particular location, pre-defined place or spot or location, gym and like.

All of the prior arts does not enable player to scan particular object or item or product or one or more types of elements in real world or physical world or scan particular object or item or product or one or more types of elements at particular location or place or point of location or pre-defined geofenced boundary in real world or physical world and in the event of augmented reality scanning or taking a photograph of particular object or item or product or one or more types of elements in real world or physical world or scan particular object or item or product or one or more types of elements at particular location or place or point of location or pre-defined geofenced boundary in real world or physical world, displaying one or more types of virtual object or virtual element for enabling user to select, collect, win, battel or play and win, claim, compete, capture from said displayed one or more virtual objects or virtual elements or automatically providing one or more types of virtual object or virtual element to user or associate with or add to user's account. Pokémon Go™ also does not enable player to visit pre-defined geofence boundary and view within said pre-defined geofence boundary, one or more types of virtual objects and select, collect, win, battel or play and win, claim, compete, capture from said displayed one or more virtual objects or virtual elements or automatically providing one or more types of virtual object or virtual element to user or associate with or add to user's account.

U.S. Pat. No. 9,669,296 of Hibbert; Chris et el (Title: Linking real world activities with a parallel reality game) discloses a computer-implemented method of providing a parallel reality game, comprising: hosting, at a game server, a parallel reality game, the parallel reality game having a virtual world with a geography that parallels at least a portion of the geography of the real world such that a player can navigate the virtual world by moving to different geographic locations in the real world; receiving, by the game server, a plurality of requests from a plurality of sponsors, each of the plurality of requests requesting that a virtual element associated with the request be included at a location in the virtual world corresponding to a location of a business in the real world, the business associated with a sponsor that provided the request to the game server from the plurality of sponsors; selecting, by the game server, at least one request from the plurality of requests; responsive to selecting the at least one request, modifying, by the game server, game data to include the virtual element associated with the at least one request in the parallel reality game at the location in the virtual world requested by the at least one request; providing, by the game server, the modified gate data to a client device of a player; and responsive to the client device being within a set distance of the location of the business in the real world of the at least one request, providing, by the game server, a reward to the player, wherein the virtual reward comprises a power up, virtual item, virtual energy, virtual currency or other suitable virtual reward and the reward is provided to the player in response to the client device being within a set distance of the location of the business and the player making a purchase of an object or service at the business and the reward is redeemable in the real world, wherein the reward is a coupon, discount, or voucher redeemable in the real world.

U.S. patent application Ser. No. 13/345,189 discloses managing, via the augmented reality application, a treasure or scavenger hunt in which multiple users are given clues to describe the locations associated with the one or more virtual objects in a predetermined sequence and subsequent virtual objects in the predetermined sequence only become visible to the multiple users upon collecting prior prerequisite virtual objects in the predetermined sequence. In one implementation, the create menu may further include a "Treasure Hunt" option to deploy virtual objects to various worldwide locations and define clues that users may decipher to locate the virtual objects and thereby participate in a virtual scavenger hunt to locate and/or collect virtual objects or content or other virtual items embedded therein. Furthermore, in one implementation, the Treasure Hunt option may make one or more virtual objects to be located and collected therein initially invisible, whereby the one or more initially invisible virtual objects may only become visible to any particular user participating in the Treasure Hunt in response to the user having suitably located and collected one or more previous virtual objects that are prerequisites to the initially invisible virtual objects.

All of the prior arts disclose locating and collecting of virtual objects limited to reaching at particular location or place or pre-defined spots of physical world or real world which is limited only to identified location or place of user or user device. Present invention discloses augmented reality (AR) game platform wherein user can plurality of ways can search, locate, identify, determine, view or show and accumulate, select and collect various types of virtual objects or virtual elements based on or detection or recognizing or identifying or determining of or monitoring, tracking, updating, storing and logging of or triggering of user's one or more types of activities and actions including viewing particular movie or video or particular movie's or video's particular type of scene at particular place at particular date & time or position, listening of particular music or song or video, participating in particular event, one or more types of pre-defined senses and behaviours, posting or updating of status or user's updates and associated keywords, communication, collaboration, connections, and interactions with one or more types of or named entities including persons, contacts, connections, groups, school, college, shop, object, tree, animal, items, and products, one or more types of user's expressions and reactions in physical world or real world or one or more types of objects or elements in physical world or real world including user' digital activities, actions and reactions including view or access websites and webpages or access or view features of websites and webpages, install, access and use applications or features of applications, post, publish, send, communicate, collaborate, share, like, comment one or more types of contents and multimedia and one or more type of or any combination of user data. So present invention discloses displaying of one or more types of virtual objects or virtual elements to user for enabling user to search, locate, guess, find, collect, select, claim, and capture said displayed one or more types of virtual objects or virtual elements in the event of triggering of or identifying or recognizing or detection or determination of one or more type of user's activities in physical world or real world based on plurality of ways, factors, aspects including scanning, capturing photo, recording video, scanning code including QR code, identifying particular location or place, recognizing or analyzing particular object or activity based on object recognition, sensors, devices, identifying keywords based on recognizing user's voice based on voice detection, identifying text or keywords in scanned objects associated text via Optical Character recognition (OCR), based on reaching at particular or identified location or place or point, user's past or current or surround locations, checked in places, current date & time and associated information, past or instructed or current activities, actions, triggers, participated or participating events, conducted actual or prospective transactions, current status, behaviours, human identified and scanned objects, scanning, particular named and/or type of object recognition or attributes of object recognition, face or body part recognition, voice recognition, Optical Characters Recognition (OCR), detecting senses via sensors of various types of user devices and associated various types of sensors, viewing, rules, functions, provided duration, policies, schemes, privacy settings, preferences, deciphering clues, doing as per provided instruction or task, associated connections or contacts or team members, solving puzzles, answering questions or queries, providing user data or keywords or survey data, payment, buying products, subscribing services, taking one or more types of reactions on one or more types of viewing contents, wherein reaction comprises like, comments, refer, add to list, bookmark, view, listen, provide or select emoticon, share, install application, and register, one or more types of monitored, tracked, logged, updated and stored user data and any combination thereof.

U.S. Pat. No. 9,754,355 Chang; Sheldon et el (Title: Object recognition based photo filters) discloses access filter data and object criteria, generate a photo filter using the filter data; store data specifying an association between the photo filter and the object criteria; detect that a client device of the server has taken a photograph; identify an object in the photograph; based on the identified object satisfying the object criteria associated with the photo filter in the stored data, provide the photo filter to the client device; store photo filters provided to the client device in a photo filter collection associated with the client device; determine that the photo filter collection includes more than a specified number of stored photo filters of a specified type, and provide a new photo filter to the client device in response to the determination.

U.S. Pat. No. 9,225,897 of Sehn; Timothy et el (Title: Apparatus and method for supplying content aware photo filters) discloses, identify when a client device captures a photograph; select photograph filters based upon attributes of the client device and attributes of the photograph, wherein the attributes of the client device include geolocation of the client device; supply the selected photograph filters to the client device.

U.S. Patent Application discloses a contextually intelligent communication system and processes acquire and processes data on the current context of a user who is using a connected mobile communication device such as a smart phone or tablet by using various sensors, image recognition or augmented reality residing in the connected device; providing additional data to define the user's current environment; combining the contextual data on the device with the additional data to define the user's complete, relevant context; gathering the user's current context data and updating the device by uploading the data via a wide area mobile network to a contextually intelligent server in the cloud, matching the user's current contextual data with the user's past and historical data and then downloading updated data back to the device, with the updated data including any of a variety of contextually relevant information such as feedback, experiences, recommendations, offers, coupons, advice, tactile feedback, content such as visual and audio representations, augmented reality, and other audio/visual displays to the device of the user that is predictably useful and relevant to the user's current context and future context as the user enters a new context.

Object of the Invention

The object of the present invention is to receiving, updating, and storing information or data about plurality types of one or more attributes, characteristics, features, qualities and structured fields of locations, places, point of interests, particular location point, pre-defined geo-fence boundaries and associated one or more types of objects, items, products, persons, articles, accessories and monitoring, tracking, updating, storing and logging user's one or more types of activities, actions, events, transactions automatically from user device or based on user provided data or information including monitored or tracked current location or place or position or accurate location point of user device and associated information or data, current date & time and associated information or data, sensor data from one or more types of sensors of one or more types of user devices including smart phone, smart watch, and game device(s), one or more types of scanned data including scanning by user particular location or place, code or QR code or image, logo, product, item, person, animal, tree, scene or anything in physical world, captured photo, recorded video, provided status, provided answer for particular question, solving of particular puzzle, rule or instruction specific fulfillment or any combinations thereof and based on said logged current or past user data or connected users of user's user data identifying and determining one or more types of virtual objects or virtual elements and displaying said identified or determined one or more types of virtual objects or virtual elements to user for enabling user to select, collect, win, battel or play and win, claim, compete, capture said displayed one or more virtual objects or virtual elements.

The other object of the present invention is to display real world activities in 2D or 3D virtual world or real world map interface having corresponding real world geography.

The other object of the present invention is to enabling server or user of network to providing instruction or task message or providing tips or puzzle or description about attributes or characteristics or features or qualities or details or values of fields or structured or unstructured data of or related to or associated with particular place or location or position or point of particular location or place or one or more objects at said identified particular place or location or position or point of particular location or place to other users of network including one or more contacts or collections or groups or teams or particular team members to enabling receiving user of message to solve said message associated puzzle to identify particular place or identify one or more objects at said identified particular place or location or position or point of location or based on tips or provided details identify particular place or location or identify one or more objects at said identified particular place or location or position or point of location to reach there and search, find, identify, determine, select from displayed one or more virtual objects or virtual elements, collect, capture, claim, win and accumulate one or more types of one or more virtual objects or virtual elements or after reaching there based on one or more other factors including one or more rules including duration to reach, successfully conducting of required rule specific one or more types of activities, actions, triggering of events, participating in events, conducting of transaction, displaying one or more virtual objects or virtual elements to enabling user to select, collect, win, battel or play and win, claim, capture said displayed one or more virtual objects or virtual elements.

The other object of the present invention is to gamification of human life during conducting of or providing of or determination or detection or identification of or participation of or generating associated data of or triggering of human's one or more types of activities, actions, events, transactions, status, behaviours, senses, communications, visited or current locations, places, point of interests, particular location point or ego-fence boundary, during interaction with one or more types of entities including people, persons, objects, places, infrastructure including school, college, shop, road, and club, sea, pond, tree, animal, bird by displaying identified or determined one or more types of virtual objects or virtual elements to user for enabling user to select, collect, win, battel or play and win, claim, compete, capture said displayed one or more virtual objects or virtual elements.

The other object of the present invention is to enabling brands or shops or local businesses or advertisers to define geo-fence surround there place of business or shop or office or infrastructure or establishments, optionally provide schedules or date & times or ranges of date & times (from-to date & times), provide or upload one or more virtual objects or virtual elements, provide associated rules including duration, offers limited to particular number of users only, to avail said virtual objects or virtual elements and associated offers user need to conduct one or more types of activities, actions, participate in particular event, conduct particular type of transaction, scan code including QR code, visit place or location or geo-fence boundary of business or shop, policies, privacy settings, one or more types of filters and target criteria for displaying said uploaded one or more virtual objects or virtual elements to only said target criteria or filter specific users and/or users who fulfill as per said rules, provide associated points, offers or schemes. In an embodiment server validates said information including place or location of business and publisher and associated virtual objects or virtual elements and offers and receiving of associated required payments before displaying to users of network.

DETAIL DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "receiving" posted or shared contents & communication and any types of multimedia contents from a device or component includes receiving the shared or posted contents & communication and any types of multimedia contents indirectly, such as when forwarded by one or more other devices or components. Similarly, "sending" shared contents & communication and any types of multimedia contents to a device or component includes sending the shared contents & communication and any types of multimedia contents indirectly, such as when forwarded by one or more other devices or components.

As used herein, the term "client application" refers to an application that runs on a client computing device. A client application may be written in one or more of a variety of languages, such as 'C', 'C++', 'C #', 'J2ME', Java, ASP.Net, VB.Net and the like. Browsers, email clients, text messaging clients, calendars, and games are examples of client applications. A mobile client application refers to a client application that runs on a mobile device.

As used herein, the term "network application" refers to a computer-based application that communicates, directly or indirectly, with at least one other component across a network. Web sites, email servers, messaging servers, and game servers are examples of network applications.

Embodiments described herein accessing real world object associated virtual object data, location or geofence information and object criteria, generating a virtual object using the virtual object data; storing data specifying an association between the real world object associated virtual object, location or geofence information and the object criteria; detect that a client device of the server has conducting scanning or augmented reality (AR) scanning or taken a photograph or provide a raw photo or scanned data from particular real world object location; identifying or recognizing an object in the photograph or scanned data; and based on the identified object satisfying the object criteria associated with the virtual object in the stored data, display or provide the virtual object and associated data including virtual money to the client device.

In an embodiment hosting, at a game server, a game, the game having a virtual world geography that correspondences the real world geography, as a result, as the player continuously moves about or navigates in a range of coordinates in the real world, the player also continuously moves about in a range of coordinates in the real world map or virtual world; receiving, by the game server, a plurality of requests from a plurality of sponsors, each of the plurality of requests requesting that a virtual element associated with the request be included at a location in the virtual world corresponding to a location of a business in the real world, the business associated with a sponsor that provided the request to the game server from the plurality of sponsors; selecting, by the game server, at least one request from the plurality of requests; responsive to selecting the at least one request, modifying, by the game server, game data to include the virtual element associated with the at least one request in the game at the location in the virtual world requested by the at least one request; providing, by the game server, the modified gate data to a client device of a player; and responsive to the client device being within a predefined geofence boundary or a set distance of the location of the business in the real world of the at least one request and receiving, by the game server, augmented reality scanning or scanned data or raw photo or captured photograph, identifying or recognizing, by the game server, an object in the photograph or scanned data and based on the identified object satisfying the object criteria associated with the virtual object in the stored data, display or provide, by the game server, the virtual object and associated data including virtual money to the client device.

In an embodiment accessing virtual object data and associated object criteria and required one or more types of actions, generating a virtual object using the virtual object data; storing data specifying an association between the virtual object and the object criteria; detect that a client device of the server has conducting scanning or augmented reality (AR) scanning or taken a photograph or provide a raw photo or scanned data; identifying or recognizing an object in the photograph or scanned data; based on the identified object satisfying the object criteria associated with the virtual object in the stored data, display or provide the virtual object to the client device or make eligible to client device claim, win, get virtual objects; and enable to take one or more actions to get, collect, catch, acquire, win, store or add to collection of virtual objects of user or user account and in the event of taking one or more required actions, storing virtual objects or adding to collection of virtual objects of user or user's account or storing virtual objects provided to the client device in a virtual object collection associated with the client device.

In an embodiment store virtual objects and associated data including virtual money provided to the client device in a virtual object and virtual money collection associated with the client device.

In an embodiment displaying or storing the virtual object and associated virtual money to the client device based on validating location of augmented reality scanning or taking a photograph of real world object by sufficiently matching location of augmented reality scanning or taking a photograph of real world object with pre-defined or stored location of real world object.

In an embodiment displaying or storing the virtual object and associated virtual money to the client device in the event of sufficiently matching of date and time of augmented reality scanning or taking a photograph of real world object with server's current date and time, wherein date and time retrieved from exchangeable image file format (EXIF) data associated with said scanned data or a photograph or a raw photo.

In an embodiment notifying or displaying the information about real world object to the user or player in response to the client device being within a set distance of the location of the real world object.

In an embodiment the virtual object is provided to the user or player in response to the user or the player making a purchase of an object or product or service at the business of the sponsor and submitting and validating digital receipt or scanned receipt to the server.

In an embodiment displaying or storing the virtual object and associated virtual money to the client device after conducting of one or more types of required activities, actions, call-to-actions, participation, playing of game, fulfillment of task In an embodiment one or more types of activities, actions, call-to-actions, participation comprise select virtual object, play displayed mini game, take instructed photo and provide photo, record instructed video and submit video, purchase one or more products or services and submit receipt of purchased one or more products or services of business of sponsor, check in place of business of sponsor, provide one or more types of requested or instructed details, refer or share products or services of business of sponsor, invite particular number of friends or contacts to join with business of sponsor, provide one or more types of requested or instructed reactions, view one or more types of details, presentation, demonstration, video of products or services of business of sponsor or business of sponsor, add to favorite or add to contact list or follow or connect with products or services of business of sponsor or business of sponsor.

In an embodiment the object criteria includes an association between an object and a product or service or brand or logo of a seller or a sponsor and the associated virtual object includes images associated with the product or service or brand or logo of the seller or sponsor.

In an embodiment virtual object use in virtual world.

In an embodiment virtual object comprises a one or more types of power in game, virtual item, virtual element, virtual reward, virtual money, virtual currency or other suitable virtual goods including geo-filter.

In an embodiment the virtual object is redeemable in the real world.

In an embodiment the virtual object is a coupon, a redeemable point, a gift, a sample, an offer, cash back, discount, or voucher redeemable in the real world.

In an embodiment the virtual object is provided to the user or the player in response to the player or the user making a purchase of an object or product or service at the business of the sponsor.

In an embodiment receiving from particular identified place or within particular range of location or within defined geo-fence boundaries related to particular object in real world, augmented reality scanning or a photograph or scanned data of said particular object in real world; checking or validating actual or original date and time of received scanned data or captured photograph or image based on sufficiently matching received scanned data or a photograph or image associated Exchangeable image file format (EXIF) data including date and time of capturing photo or scanning with current date and time of server and validate location of said scanned object of real world based on sufficiently matching pre-defined location of said scanned object of real world with monitored and tracked current location or place of user device who scanned or take a photograph of said object; identifying or recognizing an object in the photograph or scanned data; based on the identified object satisfying the object criteria including object model or image or object keywords associated with the virtual object in the stored data, display or provide the virtual object to the client device; storing virtual objects and associated data including virtual money provided to the client device in a virtual object collection associated with the client device. In an embodiment displaying or storing the virtual object and associated virtual money to the client device in the event of sufficiently matching of date and time of augmented reality scanning or taking a photograph of real world object with server's current date and time, wherein date and time retrieved from exchangeable image file format (EXIF) data associated with said scanned data or a photograph or a raw photo.

In an embodiment the virtual object is provided to the user or the player in response to the client device being within a pre-defined geofence boundary or within a pre-defined geofence boundary surrounds the location of the business of sponsor.

In an embodiment the virtual object is provided to the user or the player in response to the client device being within a pre-defined geofence boundary or within a pre-defined geofence boundary surround the location of the business of sponsor and the player or the user making a purchase of an object or product or service at the business of the sponsor.

In an embodiment accessing virtual object data and object criteria, generating a virtual object using the virtual object data; storing data specifying an association between the virtual object and the object criteria; detecting that a client device of the server has conducting scanning or augmented reality (AR) scanning or taken a photograph or provide a raw photo or scanned data; identifying or recognizing one or more objects in the photograph or scanned data; based on the identified one or more objects or each object satisfying the relevant object criteria associated with the virtual object in the stored data, displaying or providing the virtual object and associated data including virtual money to the client device; storing virtual objects and associated data including virtual money provided to the client device in a virtual object and virtual money collection associated with the client device.

In an embodiment access one or more types of contents associated data and metadata and object criteria including one or more object models, generate at least one virtual object or virtual element using the one or more types of contents associated data and metadata, and associate the at least one generated virtual object or virtual element with the object criteria; and a virtual object or virtual element engine comprising one or more processors and configured to: identify or determine that a client device of the server has scan particular object, product, item, code including QR code or taken a photograph or record a video in a real world, identify at least one object in the photograph or scanned data provided via camera application; and based on at least one of the identified objects satisfying the object criteria associated with the at least one generated virtual object or virtual element, provide at least one of the generated virtual object or virtual element to the client device.

In an embodiment identify location of augmented reality scanning or taking a photograph of said real world object based on sufficiently matching location or geo-fence associated with said real world object with monitored and tracked current location of second client device.

In an embodiment identify date and time of augmented reality scanning or taking a photograph of said real world object based on sufficiently matching received scanned data or raw photo or captured photo of real world object associated exchangeable image file format (EXIF) data associated date & time with server's current date and time.

In an embodiment before providing virtual object or virtual element check associated availability schedules.

In an embodiment before providing virtual object or virtual element inform user about associated rules and instructing user to conduct one or more activities In an embodiment the virtual object or virtual element engine further comprises an object recognition module configured to identify objects in the photograph or received scanned data and compare each object against the object criteria.

In an embodiment the object criteria includes recognizing an object as an particular food item and the at least one associated virtual object or virtual element includes images associated with a virtual medal or badge, one or more types of virtual characters or avatars, emoticons, virtual goods, brand information of the sponsor, logo, points, virtual reward including virtual item, virtual energy, virtual currency or other suitable virtual reward.

In an embodiment the reward is redeemable in the real world. In an embodiment the reward is a coupon, discount, or voucher redeemable in the real world.

In an embodiment the virtual object or virtual element publication module comprises a user-based virtual object or virtual element associated content, data and metadata upload module configured to receive the one or more types of contents associated data and metadata and object criteria including one or more object models for generating the virtual object or virtual element from a user and a user-based object criteria upload module configured to receive the object criteria from the user.

In an embodiment at least one generated virtual object or virtual element comprises a plurality of virtual objects or virtual elements; the virtual object or virtual element engine further comprises a virtual object or virtual element priority module configured to generate a ranking of the plurality of virtual objects or virtual elements associated with object criteria based on specified virtual object or virtual element priority criteria; and the virtual object or virtual element engine is configured provide a specified number of the plurality of virtual objects or virtual elements to the client device according to the ranking of the plurality of virtual objects or virtual elements.

In an embodiment the virtual object or virtual element priority criteria includes criteria based on a virtual object or virtual element creation date, a virtual object or virtual element type or a user ranking of the virtual object or virtual element.

In an embodiment the virtual objects or virtual elements include a brand associated with an establishment proximate to the geolocation of the client device.

In an embodiment receiving, a requests requesting that a one or more virtual objects or virtual elements associated with the request be included at a location or place or predefined particular geo-fence boundary or at a location or place or predefined particular geo-fence boundary as per pre-defined schedule or start and end date of publication or availability of said virtual objects or virtual elements in the virtual world corresponding to a location or place or pre-defined particular geo-fence boundary of a business in the real world; validate request associated business; adding or including one or more virtual objects or virtual elements in the virtual world or associating with said business location or place said one or more virtual objects or virtual elements; receiving from the user scanned or captured photo of receipt of the purchase; based on receipt, validate actual purchase of one or more product or service by user from said business including unique business name, place or location, date & time of purchase, amount of purchase, quantity and names and details of one or more products or services, wherein identifying Exchangeable image file format (EXIF) data in scanned or photo of receipt including original date & time of scanned or captured photo of receipt and sufficiently match said extracted or identified original date & time with server's current date & time to validate or check or verify originality of captured photo or recorded video; identifying monitored or tracked location or place of user device or identifying entered and stays in geo-fence boundary at the time of sending of scanned or photo of receipt, identifying or recognizing unique business name, place or location, date & time of purchase, amount of purchase, quantity names and details of one or more products or services from received scanned or photo of receipt based on object recognition and Optical Character Recognition (OCR) techniques; and responsive to the client device being within a set distance of the location of the particular business in the real world, providing, by the server, said location or place associated business associated one or more types of virtual objects or virtual elements or a reward to the user or player.

In an embodiment validate request associated business based on recognizing business name and location from received scanned or captured photo of receipt of purchase based on object recognition and Optical Character Recognition (OCR) techniques and sufficiently match said recognized business location or place with user device's current location who uploaded or submitted said scanned or photo of receipt.

In an embodiment validate request associated business based on user reporting.

In an embodiment in the event of receiving pre-set number of report that business at particular location or place is not valid, provide notifications or alerts for pre-set number of times or remove associated account and associated uploaded virtual objects or virtual elements and other details.

In an embodiment the reward is provided to the user or player in response to the client device being within a geo-fence boundary, set distance of the place or location of the business and validating the purchase made by player or user at the business by validating player or user uploaded or submitted scanned or captured photo of receipt of the purchase of a one or more products or services at the business.

In an embodiment hosting, at a game server, a game, the game having a virtual world geography that correspondences the real world geography, as a result, as the player continuously moves about or navigates in a range of coordinates in the real world based on monitoring and tracking current location of the client device, the player also continuously moves about in a range of coordinates in the real world map or virtual world; accessing pre-defined geo-fence in real world and associated virtual objects; and responsive to the client device being within a pre-defined boundary of geofence in the real world or enters in geofence or stay or dwell for pre-set or particular duration within geofence, display or provide, by the game server, one or more types of one or more virtual objects and associated data including virtual money to the client device or in the real world map or virtual world. In an embodiment storing, by the game server, one or more virtual objects and associated data including virtual money provided to the client device in a virtual object and virtual money collection associated with the client device. In an embodiment receiving, by the game server, a plurality of requests from a plurality of advertisers or sponsors, each of the plurality of requests requesting that a virtual object or virtual element associated with the request be included at a geofence boundary in the virtual world corresponding to a geofence boundary of a business in the real world, the business associated with an advertiser or sponsor that provided the request to the game server from the plurality of advertisers or sponsors; selecting, by the game server, at least one request from the plurality of requests; responsive to selecting the at least one request, modifying, by the game server, game data to include the virtual object or virtual element associated with the at least one request in the game at the geofence boundary in the virtual world requested by the at least one request; and providing, by the game server, the modified game data to a client device of a player.

In an embodiment enabling to defining a geofence boundary by drawing on map a geofence boundary and associating geofence boundary with one or more types of one or more virtual objects.

In an embodiment enabling to provide one or more schedules for availability of virtual objects within a pre-defined geofence boundary or within a pre-defined geofence boundary covers the location of the business of sponsor.

In an embodiment verifying geofenced boundary, associated payments, schedules and virtual objects and data before making them available to users of network.

In an embodiment the virtual object is provided to the user or the player in response to the client device being within a pre-defined geofence boundary or within a pre-defined geofence boundary covers the location of the business of sponsor.

In an embodiment the virtual object is provided to the user or the player in response to the client device being within a pre-defined geofence boundary or within a pre-defined geofence boundary covers the location of the business of sponsor and the player or the user making a purchase of an object or product or service at the business of the sponsor.

In an embodiment accessing real world object associated beacon identity and associated one or more types of one or more virtual objects; and responsive to the client device being within a range of beacon or receiving from the closest beacon, a unique push message contains unique code or identity via notification, display or provide, by the game server, said received unique code or identity associated or determined one or more types of one or more virtual objects and associated data including virtual money to the client device or in the real world map or virtual world. In an embodiment hosting, at a game server, a game, the game having a virtual world geography that correspondences the real world geography, as a result, as the player continuously moves about or navigates in a range of coordinates in the real world based on monitoring and tracking current location of the client device, the player also continuously moves about in a range of coordinates in the real world map or virtual world.

In an embodiment accessing pre-defined geo-fence in real world and associated virtual objects and responsive to the client device being within a pre-defined boundary of geofence in the real world and then within a range of beacon or receiving from the closest beacon, a unique push message contains unique code or identity via notification, display or provide, by the game server, said received unique code or identity associated one or more types of one or more virtual objects and associated data including virtual money to the client device or in the real world map or virtual world.

In an embodiment notifying user to turn on Bluetooth and/or displaying the information about real world object to the user or player in response to the client device being within a pre-defined geofence boundary or stay for particular or pre-set duration within a pre-defined geofence boundary or within a set distance of the location of the real world object.

In an embodiment storing, virtual objects and associated data including virtual money provided to the client device in a virtual object and virtual money collection associated with the client device.

In an embodiment receiving, a plurality of requests from a plurality of advertisers or sponsors, each of the plurality of requests requesting that a virtual object or virtual element associated with the request be included at a geofence boundary in the virtual world corresponding to a geofence boundary of a business in the real world, the business associated with an advertiser or sponsor that provided the request to the game server from the plurality of advertisers or sponsors; selecting, by the game server, at least one request from the plurality of requests; responsive to selecting the at least one request, modifying, by the game server, game data to include the virtual object or virtual element associated with the at least one request in the game at the geofence boundary in the virtual world requested by the at least one request; and providing, by the game server, the modified game data to a client device of a player.

In an embodiment hosting, a game, the game having a virtual world geography that correspondences the real world geography and having a virtual world environment that correspondences the real world environment, as a result, based on monitoring, tracking, identifying, recognizing, detecting, analyzing, processing, logging and storing as the player conducting of or providing of information about or automatically logging of user's or player's one or more types of activities, actions, participations in events, providing of status, visiting or interact with one or more types of locations or places, interacted with one or more types of entities, contacts, conducting one or more types of transactions with one or more types of entities, conducting one or more types of digital activities, actions, senses, behaviours, interactions, status, reactions, call-to-actions, transactions, sharing, communications, collaborations, connections in the real world and/or digital world including websites, applications, the player can also interacted and connected, followed, related, mapped, associated with said entities in virtual world as a relative, friend, class mate, colleague, partner, employer, employee, neighbor, society member, citizens, native, visitor, attendee including attendee of particular event, show, exhibition, and program, client, customer, prospective customer, viewer, member, guest, patient, traveler, commuter in the virtual world or virtual environment or with the virtual representation of entities of real world in virtual world, and relates or associates information related to or associated with or provided or updated or logged or shared with said related or visited or interacted or conducted or connected real world locations, places, people, activities, relationships, connections, status, participations, transactions, one or more types of entities and objects including products and services with virtual world and displaying or providing or associating or connecting or relating or adding or updating to user's account or user related visual map or virtual world interface said interacted or connected or related or associated or transacted or used or using real world objects equivalent virtual objects or one or more types of virtual objects, virtual elements, virtual money or currency, virtual power, virtual goods, virtual rewards, real world associated or equivalent or determined one or more types entities related virtual representation associated virtual connections, virtual followers and following, virtual fame, virtual role, real world associated user's profile equivalent or similar or determined virtual characteristics, attributes, skills, positions, qualifications, interests, virtual avatar's profile characteristics including age, gender, interest, qualifications, skills, looks, expressions in the virtual world.

In an embodiment virtual representation on entity can play with player in virtual world, provide virtual objects in virtual world that can be used in virtual world, provide virtual reward in virtual world that can redeem in real world, sell virtual goods in virtual world, sell, present, provide support, market, and advertise real products and services in virtual world.

In an embodiment virtual avatar of player can directly or virtually reach at any places related to said one or more types of entities.

In an embodiment virtual avatar of player can directly or virtually reach to any or related or connected one or more types of entities in virtual world In an embodiment virtual avatar of player associated real world user need to physically reach at particular place related to particular named or type of entity to virtual reach at virtual representation of said real world particular named or type of entity.

In an embodiment enabling user to scan particular television program or serial; in the event of augmented reality scanning or scanning via camera application of user device, said television program or serial, receiving photo or image or video or scanned data from user; validating actual or original date and time of received scanned data or captured photograph or image based on sufficiently matching received scanned data or a photograph or image associated Exchangeable image file format (EXIF) data including date and time of capturing photo or scanning with current date and time of server; identifying or recognizing television program or serial channel name and identity based on recognizing logo of television channel based on object recognition and Optical Characters Recognition (OCR) techniques; identifying or recognizing an object in the photograph or scanned data; based on the identified object satisfying the object criteria including object model or image or object keywords associated with the virtual object in the stored data, display or provide the virtual object to the client device; and storing virtual objects and associated data including virtual money provided to the client device in a virtual object collection associated with the client device.

In an embodiment object criteria including object model or image or object keywords comprises image related to particular named character or actors or actress, type or brand related cloths or jewelry or accessories, name or image of music composer or singer, image or name of product, service, location or place, logo, brand, company, advertiser or sponsor, person, shop, hotel, restaurant, tourist place or location, or any type of identified or named or type of entity or scene in real world.

In an embodiment receiving from user augmented reality scanning or a photograph or scanned data of movie or show or play or event; validating actual or original date and time of received scanned data or captured photograph or image based on sufficiently matching received scanned data or a photograph or image associated Exchangeable image file format (EXIF) data including date and time of capturing photo or scanning with current date and time of server and validate location of said scanned object of real world based on sufficiently matching pre-defined location of said scanned object of real world with monitored and tracked current location or place of user device who scanned or take a photograph of said object and based on said date & time and location or place information, identify movie or show or play or event details including name, show time, theater name; identifying or recognizing an object in the photograph or scanned data; based on the identified object satisfying the object criteria including object model or image or object keywords associated with the virtual object in the stored data, display or provide the virtual object to the client device; and storing virtual objects and associated data including virtual money provided to the client device in a virtual object collection associated with the client device.

In an embodiment object criteria including object model or image or object keywords comprises image related to particular named character or actors or actress, type or brand related cloths or jewelry or accessories, name or image of music composer or singer, image or name of product, service, location or place, logo, brand, company, advertiser or sponsor, person, shop, hotel, restaurant, tourist place or location, or any type of identified or named or type of entity or scene in real world.

In an embodiment monitoring, tracking, updating, logging and storing user's one or more types of data including user's one or more types of profile, related or added keywords, structured data including what type of or named products and services user used, using and interested to use, checked in places, interacted or connected or participated transacted or conducted one or more types of activities with one or more types of entities including contacts, schools, colleges, club, hotel, restaurants, shops, malls, movie theaters, classes, gardens, public places, tourist places or point of interests, professionals, businesses, companies, organizations, people, and groups, status, current or past visited locations or places and associated information, user's home, office, interacted or visited and current or past locations or places surround environment data including weather information based on monitored or tracked user device's locations and user provided detail, sensors data generated from one or more types of sensors of user's one or more devices, recognized keywords detected in user's voice or talk based on voice recognition technologies, recognized keywords or objects in user provided photos or videos or scanning of objects, items, logo, scene, elements, people, code including QR code or image in real world and associated data based on object recognition, face or body parts recognition or Optical Characters Recognition (OCR) technologies, logged data and metadata related to user's or connected users of user's one or more types of activities, actions, senses, participated events, behaviours, conducted transactions, communications, collaborations, connections, sharing, and associated date and time, location, accompanied contacts, metadata and any combination thereof; and determining or selecting and displaying one or more types of virtual objects and virtual elements based on said one or more types of user data.

In an embodiment displaying instruction or tasks message to provide instruction to capture photo or record video as per said displayed instruction or tasks message; receiving said instruction or tasks message specific captured photo or recorded video; identifying, recognizing, determining that said received captured photo or recorded video is/are as per said instruction or tasks message or not; and in the event of determining that said received captured photo or recorded video is/are as per said instruction or tasks message then determine and display one or more type of virtual objects or virtual elements.

In an embodiment identifying user's or user related one or more types of digital activities, actions, reactions, status, behaviours, communications, collaborations, sharing, interactions, connections, participations, schedules, events, transactions and one or more types of user data; and displaying determined or related or associated or identified virtual objects based on said identified or recognized user's or user related one or more types of digital activities, actions, reactions, status, behaviours, communications, collaborations, sharing, interactions, connections, participations, schedules, events, transactions and one or more types of user data.

In an embodiment monitoring, tracking, updating, logging and storing information or data and metadata related to or associated with user's or user related one or more types of digital activities, actions, reactions, status, behaviours, communications, collaborations, sharing, interactions, connections, participations, schedules, events, transactions and one or more types of user data.

In an embodiment monitoring, tracking, updating, logging and storing information or data and metadata related to or associated with user's or user related one or more types of digital activities, actions, reactions, status, behaviours, communications, collaborations, sharing, interactions, connections, participations, schedules, events, transactions and one or more types of user data from one or more websites, webpages, applications, social networks, e-commerce websites or applications, search engines, servers, devices.

In an embodiment access places and locations and associated real world objects and associated instructions or hints and associated virtual objects, rules, settings, data and metadata; providing or displaying one or more instructions or hints to users of network; in the event of identifying and reaching at instruction or hint specific location or place or associated real world objects, displaying virtual objects or in the event of scanning particular one or more objects at said instruction or hint specific one or more locations or places, receiving from particular identified place or within particular range of location or within defined geo-fence boundaries related to particular object in real world, augmented reality scanning or a photograph or scanned data of said particular object in real world; validating actual or original date and time of received scanned data or captured photograph or image based on sufficiently matching received scanned data or a photograph or image associated Exchangeable image file format (EXIF) data including date and time of capturing photo or scanning with current date and time of server and validate location of said scanned object of real world based on sufficiently matching pre-defined location of said scanned object of real world with monitored and tracked current location or place of user device who scanned or take a photograph of said object; identifying or recognizing an object in the photograph or scanned data; based on the identified object satisfying the object criteria including object model or image or object keywords associated with the virtual object in the stored data, display or provide the virtual object to the client device; and storing virtual objects and associated data including virtual money provided to the client device in a virtual object collection associated with the client device.

In an embodiment enabling user to search and select one or more locations or places or enabling user to search and select one or more locations or places or define or draw geo-fence boundary surround one or more locations or places on map and enabling user to associate instruction or hint with said one or more locations or places.

In an embodiment enabling user to define one or more real world objects and enabling user to associate instruction or hint with said real world object.

In an embodiment enabling user to associate one or more virtual objects with said defined real world object, provide schedules of availability of said virtual objects, provide or associate one or more virtual objects with said instruction or hint, provide or associate one or more rules with said instruction or hint or getting or capturing or winning of said virtual objects.

In an embodiment enabling user to provide one or more said pre-defined instructions or hints to one or more contacts, connections, groups, followers, users of network.

In an embodiment receiving from the user scanned or photo of receipt of the purchase; based on receipt, validate actual purchase of one or more product or service by user from said business including unique business name, place or location, date & time of purchase, amount of purchase, quantity and names and details of one or more products or services, wherein identifying Exchangeable image file format (EXIF) data in scanned or photo of receipt including original date & time of scanned or captured photo of receipt and sufficiently match said extracted or identified original date & time with server's current date & time to validate or check or verify originality of captured photo or recorded video; identifying monitored or tracked location or place of user device or identifying entered and stays in geo-fence boundary at the time of sending of scanned or photo of receipt, identifying or recognizing unique business name, place or location, date & time of purchase, amount of purchase, quantity names and details of one or more products or services from received scanned or photo of receipt based on object recognition and Optical Character Recognition (OCR) technologies; and responsive to the client device being within a set distance of the location of the particular business in the real world, providing, by the server, said location or place associated business associated one or more types of virtual objects or virtual elements or a reward to the user or player.

In an embodiment hosting, at a game server, a game, the game having a virtual world geography that correspondences the real world geography, as a result, as the player continuously moves about or navigates in a range of coordinates in the real world, the player also continuously moves about in a range of coordinates in the real world map or virtual world; accessing real world object associated virtual object data, location or geofence information and object criteria, generating a virtual object using the virtual object data; storing data specifying an association between the real world object associated virtual object, location or geofence information and the object criteria; responsive to the client device being within a predefined geofence boundary or a set distance of the location of the business in the real world, notifying or displaying the information about one or more types of one or more real world objects to the user or player; display information about one or more types of one or more real world objects; detect that a client device of the server has conducting scanning or augmented reality (AR) scanning or taken a photograph or provide a raw photo or scanned data from particular real world object location; identifying or recognizing an object in the photograph or scanned data; and based on the identified object satisfying the object criteria associated with the virtual object in the stored data, display or provide the one or more virtual objects to the client device.

In an embodiment receiving, by the game server, a plurality of requests from a plurality of sponsors, each of the plurality of requests requesting that a virtual element associated with the request be included at a location in the virtual world corresponding to a location of a business in the real world, the business associated with a sponsor that provided the request to the game server from the plurality of sponsors; selecting, by the game server, at least one request from the plurality of requests; responsive to selecting the at least one request, modifying, by the game server, game data to include the virtual element associated with the at least one request in the game at the location in the virtual world requested by the at least one request; providing, by the game server, the modified gate data to a client device of a player.

In an embodiment showing virtual objects or virtual elements based on scanning of particular types of named or identified objects, products, persons, trees, animals, birds, infrastructures at/in physical world, reaching at particular location or place or point of interest or object, product, person, tree, animal, bird, infrastructure at particular location or place based on provided instruction or hint or indication or tips or puzzle or map & direction and schedule or date & time, determining or identifying particular or particular type of or particular named location or place or geo-point or geo-fence boundaries or participated event based on monitored or tracked current location of user device and identifying and analyzing associated information, detecting or recognizing or determining or identifying person based on face or body part recognition technologies, detecting or recognizing or determining or identifying object or item or product of physical world based on object recognition and Optical Characters Recognition (OCR), detecting or recognizing or determining or identifying or sensing one or more types of user's senses based on user device's one or more types of sensors or identified or generated sensors data, recognizing or sensing or identifying user's one or more types of activities based on capturing photo or recording video and uploading to server for detecting or recognizing or determining or identifying associated one or more type of activities or actions, names, duration of conducting or participating or doing of one or more types of activities and actions, providing of indication of purchase of particular product(s) or subscribing of service(s) by scanning of invoice or payment bill to enabling server to recognizing or identifying or determining conducted transactions and associated information based on object recognition and Optical Characters Recognition (OCR), user provided status, updates, and checked in place, identified user's behaviours, user device associate triggers, user's contacts or connections and associated current location, distance from each other, user's one or more types of reactions and expressions including like particular product or service or person in physical world or digital world including like, share or comment on post, view or watch or listen particular type of or particular named movie, book, play, music, song, video, recognizing particular one or more keywords in voice or speech of user based on voice recognition, current date & time and associated information, rules and any combination thereof.

In an embodiment accessing virtual object data and associated object criteria, generating a virtual object using the virtual object data; storing data specifying an association between the virtual object and the object criteria; detecting that a first client device of the server from particular group has conducting scanning or augmented reality (AR) scanning or taken a photograph or provide a raw photo or scanned data; detecting that a second client device of the server from particular group has conducting scanning or augmented reality (AR) scanning or taken a photograph or provide a raw photo or scanned data; identifying or recognizing an object in the photograph or scanned data received from first or second or each client device of the server from particular group; and based on the identified object satisfying the object criteria associated with the virtual object in the stored data, displaying or providing the virtual object to the first or second or each client device of the group or make eligible to first or second or each client device of the group to claim, win, play game and win, play lottery or lucky draw contest or puzzle or provide answer of question to win, battle, capture, select, add to collection, and get one or more virtual objects.

In an embodiment enabling to create group by sending invitation to selected contacts or users of network and in the event of acceptance of invitation by invitee, adding said invitation accepted user to group or making said invitation accepted user as member of said created group.

In an embodiment make mandatory to receive group augmented reality scanning instruction from each group member within pre-set duration and in the event of receiving group augmented reality scanning instruction from each group member within pre-set duration, provide virtual object to first user or each group member who conducted augmented reality scanning or in the event of not receiving group augmented reality scanning instruction from at least one member or from pre-set numbers of members of group within pre-set duration, not providing virtual objects to each member of said group.

In an embodiment dynamically create group within particular session based on sufficiently matching monitored or tracked current location of user devices with pre-defined location of real world object or geofence surround pre-defined location of real world object or user devices within particular range of location or enter into or stay within or stay for pre-set duration particular pre-defined geofence and adding to dynamically created location or place or real world object specific group.

In an embodiment notifying or displaying the information about participating users in current session play or notifying or displaying the information about participant group members to the user or player in response to the client device being within a set distance of the location of the real world object or enters into or stay or dwell for particular duration within geofence.

In an embodiment hosting, at a server, a virtual world geography or real world map interface that correspondences the real world geography or real world map including locations, places, as a result, as the user continuously moves about or navigates in a range of coordinates in the real world based on monitoring and tracking current location of the client device, the user also continuously moves about in a range of coordinates in the real world map or virtual world. In an embodiment monitoring, tracking, recording, processing, logging and storing information about user visited places or currently visiting place in real-world based on monitoring and tracking current location of user device and said monitored or tracked current location or place associated information including location or place name and details, routes and directions. In an embodiment receiving from a user, selection or marking of particular location or place or current location or place as starting point or particular location or place as end point or automatically determining or selecting or marking particular location or place as starting point and end point. In an embodiment receiving from user one or more types of information including one or more photos, videos, voice, audio, images, text, web address or links, location or place information, multimedia, animations, emoticons or stickers, voice commentary, comments or notes and one or more types of structured data including dynamically displayed form or field specific data, contents and multimedia and receiving information about or monitoring, tracking and logging information related to user's one or more types of activities, actions, events, participations, senses, behaviours, communications, collaborations, sharing, status, transactions associated with particular place. In an embodiment generating, plotting and displaying on, using a processor, a map to client device of user and/or another client device based on said monitored and tracked visited places, associated routes between marked start and end place or location and received said data, wherein generated map comprise showing that user's avatar moving from starting point of location to the first visited place by particular means of transportation and displaying user's avatar at the location of the first visited place and displaying or auto playing associated one or more types of contents including photos, videos and posts in sequences or story format. In an embodiment displaying user's avatar moving from the first visited place to the second visited place via particular route as per speed of movement settings and displaying or auto playing the second visited place associated one or more types of contents including photos, videos and posts in sequences or story format, wherein present on a display indicia of a set of content items available for viewing. In an embodiment present on the display a first content item of the set of content items for a first view period of time defined by a timer, wherein the first content item is hide when the first view period of time expires; receive from a touch controller a haptic contact signal indicative of a gesture applied to the display during the first view period of time; wherein the content presentation controller hides the first content item in response to the haptic contact signal and proceeds to present on the display a second content item of the set of content items for a second view period of time defined by the timer, wherein the content item controller hides the second content item upon the expiration of the second view period of time; wherein the second content item is hides when the touch controller receives another haptic contact signal indicative of another gesture applied to the display during the second view period of time; and wherein the content presentation controller initiates the timer upon the display of the first content item and the display of the second content item.

In another embodiment hosting, at a server, a virtual world geography or real world map interface that correspondences the real world geography or real world map including locations, places, as a result, as the user continuously moves about or navigates in a range of coordinates in the real world based on monitoring and tracking current location of the client device, the user also continuously moves about in a range of coordinates in the real world map or virtual world; monitoring, tracking, recording, processing, logging and storing information about user visited places or currently visiting place in real-world based on monitoring and tracking current location of user device and said monitored or tracked current location or place associated information including location or place name and details, routes and directions; receiving from a user, selection or marking of particular location or place or current location or place as starting point or particular location or place as end point or automatically determining or selecting or marking particular location or place as starting point and end point; receiving from user one or more types of information or contents including one or more photos, videos, voice, audio, images, text, web address or links, location or place information, multimedia, animations, emoticons or stickers, voice commentary, comments or notes and one or more types of structured data including dynamically displayed form or field specific data, contents and multimedia and receiving information about or monitoring, tracking and logging information related to user's one or more types of activities, actions, events, participations, senses, behaviours, communications, collaborations, sharing, status, transactions associated with particular place; accessing monitored and tracked user device's locations or places, 360-degree imagery with 3D or multi-dimensional Street View technology and user's realistic 3D or multi-dimensional animated and movable avatar and information about user's one or more types of activities related to particular place; generating said real world conducted one or more types of activities at/in/within/inside said particular place specific or related 3D or multi-dimensional animations or 3D or multi-dimensional animated graphics or 3D or multi-dimensional simulation; and displaying said generated 3D or multi-dimensional animations or 3D or multi-dimensional animated graphics or 3D or multi-dimensional simulation inside said 3D or multi-dimensional place of activity in 3D or multi-dimensional virtual world geography or 3D or multi-dimensional real world map interface.

In an embodiment generating real world conducted one or more types of activities at/in/within/inside said particular place or Global Positioning System (GPS) location co-ordinates specific or related 3D or multi-dimensional animations or 3D or multi-dimensional animated graphics or 3D or multi-dimensional simulation and/or displaying said generated 3D or multi-dimensional animations and/or displaying one or more types of contents at said particular place or recorded Global Positioning System (GPS) location co-ordinates and/or displaying with said displayed 3D or multi-dimensional animated graphics or 3D or multi-dimensional simulation, place associated one or more types of contents associated or added or shared by user, other users of network, sever and one or more external sources based on said accessed plurality types of data.

In an embodiment in the event of receiving of user selection of staring of live map option, showing said monitored, tracked, and generated real-time and updated story to publishing user selected one or more contacts, followers, one or more types or target criteria or query specific users of network and in the event of receiving of user selection of ending of live map option, stop showing said monitored, tracked, and generated real-time and updated story to said publishing user selected one or more contacts, followers, one or more types or target criteria or query specific users of network.

In an embodiment change or update or select avatar of user based on type of activity including if user traveling via particular type of vehicle then change avatar or image depicting user is travelling, eating particular type of food then change avatar or image depicting user is eating particular type of food.

In an embodiment based on user selection and applied privacy settings, displaying shared story to one or more contacts, followers, one or more selected types or criteria specific users of network, save as private, and make as public.

In an embodiment enabling user to set auto play, play, play from start, pause, stop, replay, turn on or off voice, jump to or go-to particular place or duration to start, forward, rewind story.

In an embodiment accessing monitored and tracked location or Global Positioning System (GPS) location co-ordinates of user device from start point to first place route, each visited or identified places and sub-places and route up-to end point and associated one or more types of information including place or sub-places or route name, place or sub-places or route associated details and associated one or more photos, videos, voice, audio, images, text, web address or links, location or place information, multimedia, animations, emoticons or stickers, voice commentary, comments or notes and one or more types of structured data provided by one or more users of network, server and one or more external sources including websites, applications, developers, providers, advertisers or sponsors, menu items or products and associated details like pricing, description, photos, videos, virtual tour of place, show details, opening and closing hours or show or event timings, ticket prices, famous things to-do, user provided one or more types of reactions including likes, emoticons, comments, reviews and ratings, date and time and associated one or more types of information, received from user one or more types of information including one or more photos, videos, voice, audio, images, text, web address or links, location or place information, multimedia, animations, emoticons or stickers, voice commentary, comments or notes and one or more types of structured data including dynamically displayed form or field specific data, contents and multimedia and received information about or received monitored, tracked and logged information related to user's one or more types of activities, actions, events, participations, senses, behaviours, communications, collaborations, sharing, status, transactions associated with particular place, identified means of transportation user employed for travelling or visiting from current first place to next place, wherein means of transportation comprises cab, taxi, rickshaw, boat, cycle, flight, horse cab, train, and bus, identified user surround other one or more users of network and associated all details describe in this claim, identified user surround places and associated information, identified user surround weather information, sunrise, sunset, rain, sunshine, fog, cold, and snow based on current location associated weather information provided by one or more sources, current day time including morning, afternoon, evening, night, mid-night, based on object recognition, recognized objects inside photos or images of videos associated identified keywords and associated details from one or more sources, based on Optical Character Recognition (OCR), recognized texts inside photos or images of videos associated identified keywords and associated details from one or more sources, based on voice recognition, recognized or detected voice associated identified keywords and associated details from one or more sources, based on face or body parts recognition, identified user and user accompanied one or more users including identified friends, family members and users of network and identified associated or related one or more types of data including profile, logged one or more types of activities, actions, events, participations, senses, behaviours, communications, collaborations, sharing, status, transactions, identified or recorded duration of stay at particular place or location or pre-defined geofence boundary, identified or monitored, tracked and logged number of steps or miles or kilometers walking and running by user and one or more accompanied users, received various types of scanned data or photographs or video and conducted augmented reality scanning by user and identified or recognized associated objects or recognized associated one or more objects based on object criteria, object models and object keywords and said identified keywords or objects associated one or more types of data, contents, multimedia and metadata to identify user's one or more types of activities, actions, participations, reactions, expressions, voice and associated keywords based on voice recognition techniques, status, transactions, interactions and connections including identify type of food user eating, mood or emotions or expression of user, identify one or more accompanied users based on face recognition techniques, identify name and type of means of transportation of user and one or more accompanied users, identify particular person at particular place and associated details, identify particular real world object's details and associated one or more types of contents from one or more sources, based on scanning of purchase receipt identify purchasing of one or more products or services, identify activities including particular type of dance, singing, playing of sports, playing of music via particular instrument, interacting with or viewing of any type and/or name of physical or real world object, item, product, person, mall, shop, restaurant, hotel, means of transportation, scene, animal, bird, infrastructure, tree, flower, forest, mountain and interacting with or viewing of particular type and/or name of identified real world object, accessing real world object associated beacon identity and associated one or more types of one or more virtual objects and responsive to the client device being within a range of beacon or received from the closest beacon, a unique push message contains unique code or identity associated provided said received unique code or identity associated or determined one or more types of data, contents, multimedia and metadata.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic. One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines. Some embodiments described herein can generally require the use of computing devices, including processing and memory resources. For example, one or more embodiments described herein may be implemented, in whole or in part, on computing devices such as servers, desktop computers, cellular or smartphones, personal digital assistants (e.g., PDAs), laptop computers, printers, digital picture frames, network equipments (e.g., routers) and tablet devices. Memory, processing, and network resources may all be used in connection with the establishment, use, or performance of any embodiment described herein (including with the performance of any method or with the implementation of any system). Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program. The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 1 depicts an exemplary computer-based system for implementing a location-based game according to an exemplary embodiment of the present disclosure. In another embodiment implementing various embodiments of enabling to send message including instruction, assign or request or suggest task to one or more target recipients;

FIGS. 3-6 illustrates example Graphical User interface (GUI) for enabling user or administrator of sever to provide various types of details about real world objects or define real world objects and set or apply or select or provide various types of object criteria, target criteria, settings, preferences, customization, configuration, rules, and actions, upload associated virtual objects, order and make payment, conduct verification, system configuration, updates, moderation and validation.

FIG. 15 illustrates example Graphical User interface (GUI) for enabling user view various types of notifications.

FIGS. 19-21 illustrates example Graphical User interface (GUI) for enabling user to take one or more types of actions, call-to-actions, reactions, conduct transactions and in the event of taking one or more types of activities, actions, participations, call-to-actions, reactions, conducting of transactions, view or get or capture or win or acquire associated displayed one or more types of virtual objects.

FIGS. 22-26 illustrates example Graphical User interface (GUI) for enabling user to view, access, manage collections of plurality types of virtual objects got, won, caught, purchased by user, associated particular amount of virtual money or points.

FIG. 27 illustrates example Graphical User interface (GUI) for enabling user to prepare, draft, select message, wherein message comprises task description, requirement specification, instruction, request to identify, search and get instruction specific real world object or augmented reality scan instruction specific real world object and get, win, catch, capture associated one or more types of virtual objects.

FIG. 28 illustrates example Graphical User interface (GUI) enabling user to view received message, take one or more types of user actions or call-to-actions including accept or reject received message, identify, search and get instruction specific real world object or augmented reality scan instruction specific real world object and get, win, catch, capture associated one or more types of virtual objects and provide one or more types of status details to instruction sender.

FIGS. 32-34 illustrates example Graphical User interface (GUI) enabling user to define geofence and associated virtual objects, criteria, authorized users to view associated virtual objects and details, preferences, schedules, required actions, call-to-actions, rules and playing of one or more types of mini games.

FIG. 38 illustrate displaying particular location of real object specific virtual objects in virtual world.

FIG. 39 illustrates example Graphical User interface (GUI) enabling user to provide, set, apply and update on or more types of settings, preferences, privacy settings.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (e.g., meaning having the potential to), rather than the mandatory sense (e.g., meaning must). Similarly, the words "include", "including", and "includes" mean including, but not limited to.

DETAILED DESCRIPTION OF THE DRAWINGS

Figure 1:
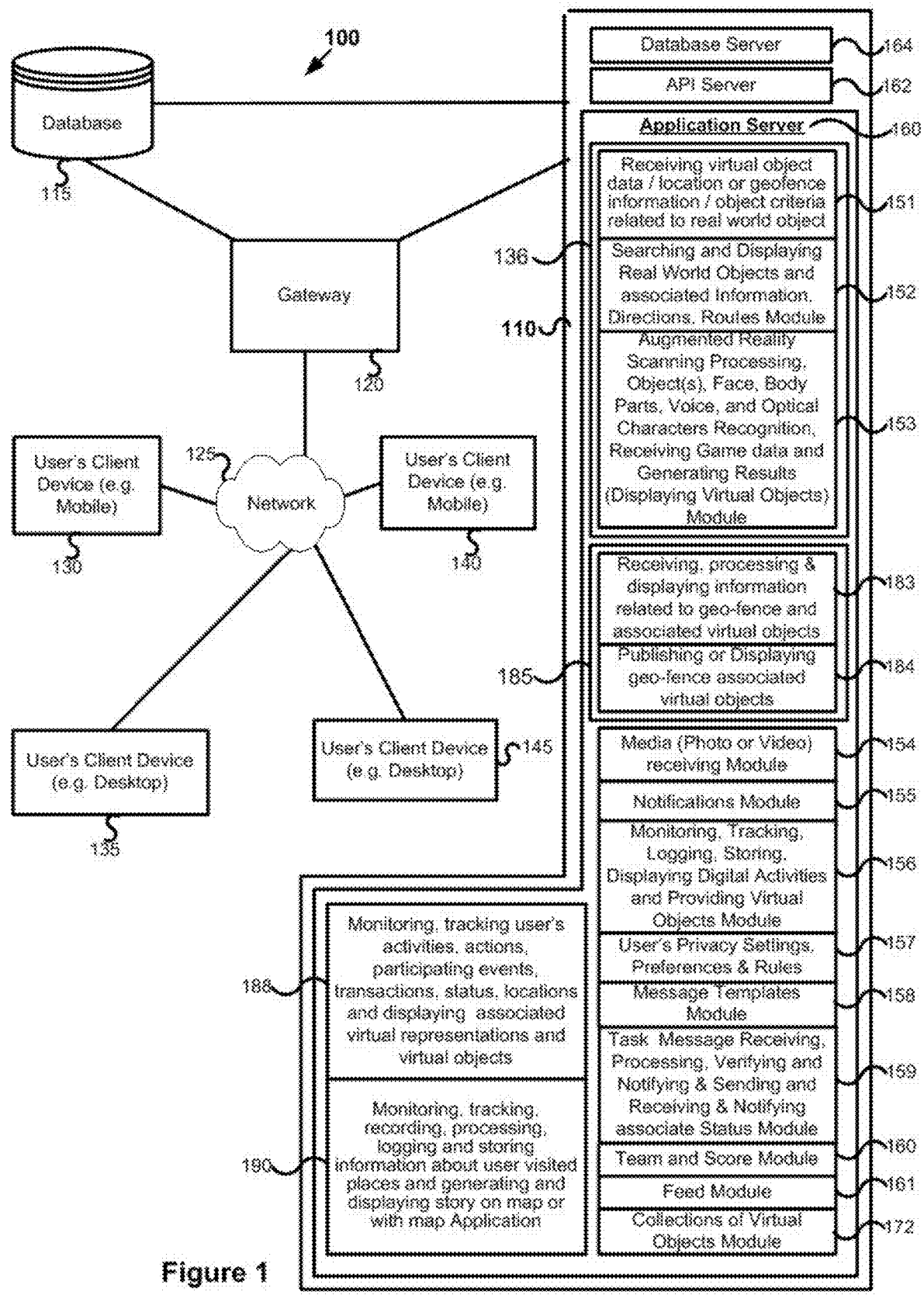
FIG. 1 is a network diagram depicting a network system having a client-server architecture configured for exchanging data over a network implementing various embodiments of enabling user or player to conduct augmented reality scanning of real world objects or capturing photo of real world objects and sending said scanned data or raw photo or captured photo or image to server which server identifies or recognizes and validates and displays and add or store associated one or more virtual objects to user' account related system. In another embodiment server receives from client device photos or videos for recognizing or identifying user's activities in real world and displaying or adding and storing associated one or more virtual objects to user's account related system. In another embodiment server monitors and tracks digital activities, actions, events, transactions of user related to interacted, participated, transacted external websites, applications and services and displaying or adding and storing associated one or more virtual objects to user's account related system.

FIG. 1 illustrates an example augmented reality scanning or taking photo of real world object and getting associated virtual object platform, under an embodiment. According to some embodiments, system 100 can be implemented through software that operates on a portable computing device, such as a mobile computing device 200. System 100 can be configured to communicate with one or more network services, databases, objects that coordinate, orchestrate or otherwise receiving, processing, storing information, data, preferences, settlings, location, target criteria, object criteria, virtual objects, collection rules and actions related to real world objects and searching, accessing and displaying real world objects and associated information and processing augmented reality scanning of object(s), face, body parts, voice, and Optical Characters Recognition, receiving one or more types of game data and generating results including displaying virtual objects. Additionally, the mobile computing device can integrate third-party services which enable further functionality through system 100.

The system for augmented reality scanning or taking photo of real world object and get associated virtual object platform. User is enabled to define one or more types of real world object including product, animal, bird, flower, art, sculpture, item, accessory, type of scene and provide associated information (discuss in detail in FIGS. 3-6). User is also enabled to do augmented reality scanning or taking photo of real world object and get associated virtual object (discuss in detail in FIGS. 7-14). While FIG. 1 illustrates a gateway 120, a database 115 and a server 110 as separate entities, the illustration is provided for example purposes only and is not meant to limit the configuration of the augmented reality scanning or taking photo of real world object and getting associated virtual object system. In some embodiments, gateway 120, database 115 and server 110 may be implemented in the augmented reality scanning or taking photo of real world object and getting associated virtual object system as separate systems, a single system, or any combination of systems.

As illustrated in FIG. 1, the augmented reality scanning or taking photo of real world object and getting associated virtual object system may include a real world object definer or information provider user device or mobile devices 130/140 and augmented reality scanning or taking photo of real world object and getting associated virtual object user device or mobile devices 135/145. Devices or Mobile devices 130/140/135/145 may be particular set number of or an arbitrary number of devices or mobile devices which may be capable of providing information, settings, criteria, actions related to one or more types of real world object including product, animal, bird, flower, art, sculpture, item, accessory, type of scene (discuss in detail in FIGS. 3-6) and conduct augmented reality scanning or taking photo of real world object and get associated virtual object (discuss in detail in FIGS. 7-14). Each device or mobile device in the set of a real world object definer or information provider user device or mobile devices 130/140 and augmented reality scanning or taking photo of real world object and getting associated virtual object user device or mobile devices 135/140 may be configured to communicate, via a wireless connection, with each one of the other mobile devices 130/140/135/145. Each one of the mobile devices 130/140/135/145 may also be configured to communicate, via a wireless connection, to a network 125, as illustrated in FIG. 1. The wireless connections of mobile devices 130/140/135/145 may be implemented within a wireless network such as a Bluetooth network or a wireless LAN.

As illustrated in FIG. 1, the augmented reality scanning or taking photo of real world object and getting associated virtual object system may include gateway 120. Gateway 120 may be a web gateway which may be configured to communicate with other entities including advertiser, sponsors, and service providers of the augmented reality scanning or taking photo of real world object and getting associated virtual object system via wired and/or wireless network connections. As illustrated in FIG. 1, gateway 120 may communicate with mobile devices 130/140/135/145 via network 125. In various embodiments, gateway 120 may be connected to network 125 via a wired and/or wireless network connection. As illustrated in FIG. 1, gateway 120 may be connected to database 115 and server 110 of user to user connection system. In various embodiments, gateway 120 may be connected to database 115 and/or server 110 via a wired or a wireless network connection.

Gateway 120 may be configured to receive information about real world object, associated settings, criteria, object criteria, and virtual object(s) and rules and required actions to get virtual object(s), send information about real world objects, receive the augmented reality scanned data or captured photo of real world object, send recognized object in received scanned data or captured photo of real world object associated virtual object(s), send and receive message or task or instruction or request and message or task or instruction or request specific one or more types of content including photo or video, search results, notifications, shared or published contents, user data, wherein user data comprises user requests, user profile, user connections or contacts, connected users' data, user shared data or contents, user's logs, monitored or tracked information about user's one or more types of activities, actions, events, senses, transactions, status, updates, presence information, locations, check-in places and like to/from mobile devices 130/140/135/145. For example, gateway 120 may be configured to store information related to real world objects and associated settings, criteria, object criteria, and virtual object(s) and rules and required actions to get virtual object(s) and augmented reality scanned data or captured photo of real world object to database 115 for storage.

As another example, gateway 120 may be configured to send or present request specific information about real world objects to requestor or target recipients from stored database 115 to mobile devices 130/140/135/145. Gateway 120 may be configured to receive requests from mobile devices 130/140/135/145 to process augmented reality scanned data or captured photo of real world object for identifying and displaying virtual objects.

For example, gateway 120 may receive a request from a mobile device and may query database 115 with the request for searching and matching request specific information about real world objects or one or more types of contents including photos, videos. For example, gateway 120 may receive a request from a mobile device to process scanned data or captured photo of real world object. Gateway 120 may be configured to inform server 110 of updated data. For example, gateway 120 may be configured to notify server 110 when new information about real world object or scanned data or captured photo of real world object has been received from a mobile device stored on database 115.

As illustrated in FIG. 1, the augmented reality scanning or taking photo of real world object and getting associated virtual object system may include a database, such as database 115. Database 115 may be connected to gateway 120 and server 110 via wired and/or wireless connections. Database 115 may be configured to store a database of registered user's profile, accounts, logged activities, indexes, information about real world object, associated settings, criteria, object criteria, and virtual object(s) and rules and required actions to get virtual object(s), the augmented reality scanned data or captured photo of real world object, one or more types of user related or associated data, payments information received from mobile devices 130/140/135/145 via network 125 and gateway 120.

Database 115 may also be configured to receive and service requests from gateway 120. For example, database 115 may receive, via gateway 120, a request from a mobile device and may service the request by providing, to gateway 120, user profile, user data, user account's related data, information about real world objects, recognized object in received scanned data or captured photo of real world object associated virtual object(s), notifications, messages, contents which meet the criteria specified in the request. Database 115 may be configured to communicate with server 110.

As illustrated in FIG. 1, the augmented reality scanning or taking photo of real world object and getting associated virtual object system may include a server, such as server 110. Server may be connected to database 115 and gateway 120 via wired and/or wireless connections. As described above, server 110 may be notified, by gateway 120, of new or updated information about real world objects, the augmented reality scanned data or captured photo of real world object, message, instruction, request, user requests including search request and invitations, connection request, user profile, user data, user posted or shared or send contents, user contacts and various types of status stored in database 115.

FIG. 1 illustrates a block diagram of the augmented reality scanning or taking photo of real world object and getting associated virtual object system configured to implement the platform where user(s) can provide information about real world object, associated settings, criteria, object criteria, and virtual object(s) and rules and required actions to get virtual object(s), access information about real world objects, receive the recognized augmented reality scanned data or captured photo of real world object associated virtual object(s). While FIG. 1 illustrates a gateway 120, a database 115 and a server 110 as separate entities, the illustration is provided for example purposes only and is not meant to limit the configuration of the augmented reality scanning or taking photo of real world object and getting associated virtual object system. In some embodiments, gateway 120, database 115 and server 110 may be implemented in the augmented reality scanning or taking photo of real world object and getting associated virtual object system as separate systems, a single system, or any combination of systems.

Figure 2:
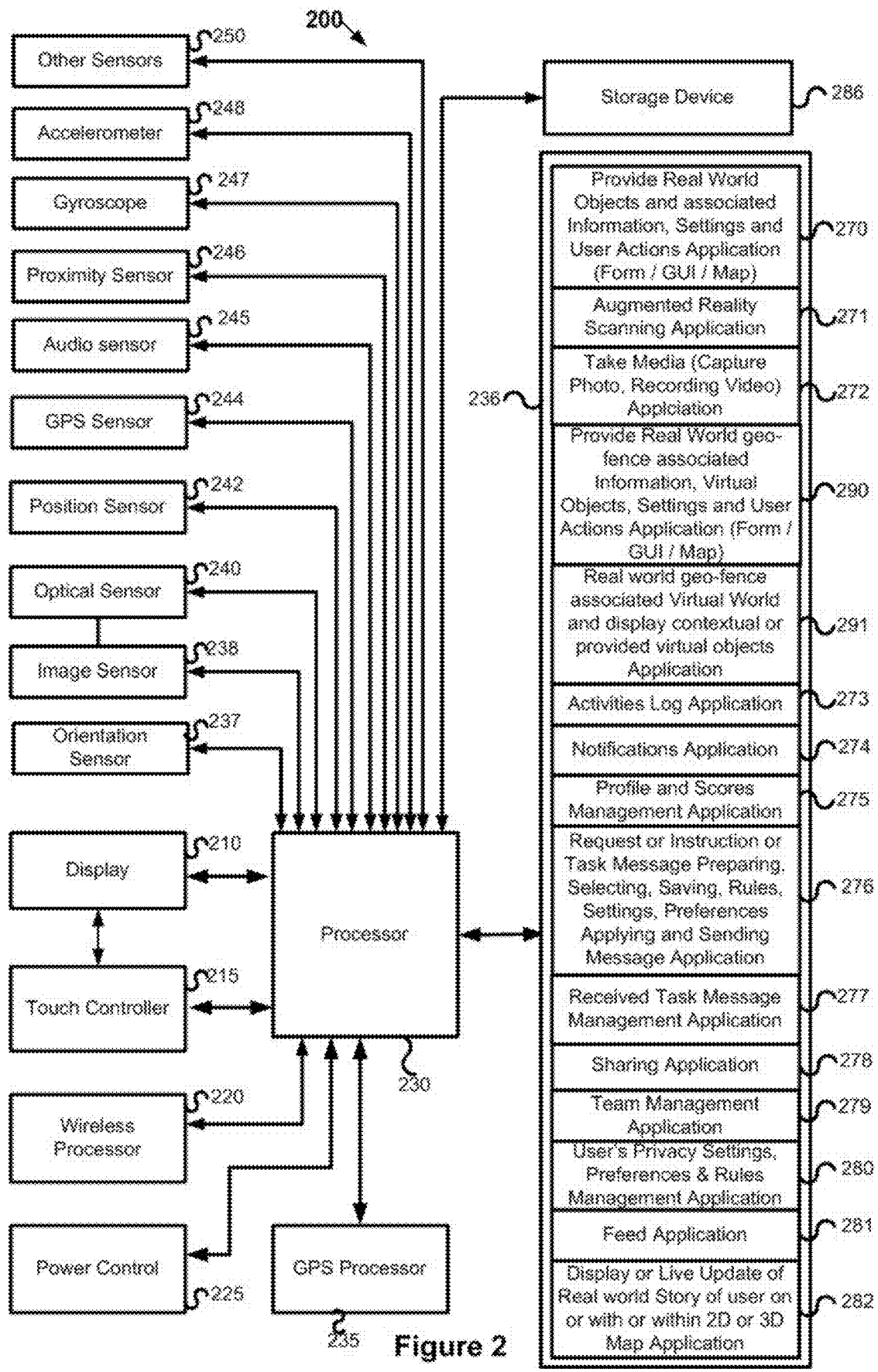
FIG. 2 illustrates components of an electronic device implementing various embodiments of enabling to scan real world objects and send to server for processing including identifying or recognizing and validating real world objects and displaying associated virtual objects and adding and storing associated one or more virtual objects to user's account related system. In another embodiment enabling to send message including instruction, assign or request or suggest task to one or more target recipients

FIG. 2 illustrates an electronic device 200 implementing operations of the invention. In one embodiment, the electronic device 200 is a smartphone with a processor 230 in communication with a memory 236. The processor 230 may be a central processing unit and/or a graphics processing unit. The memory 236 is a combination of flash memory and random access memory. The memory 236 stores Prepare and provide or submit information about real world objects and associated settings, object criteria, location information, schedules, virtual object(s) and required user actions Application (Form/GUI/Map) (Smart Client or Web based) 270 to implement operations of one of the embodiment of the invention. The Prepare and provide or submit information about real world objects and associated settings, object criteria, location information, schedules, virtual object(s) and required user actions Application (Form/GUI/Map) (Smart Client or Web based) 270 may include executable instructions to access a client device and/or a server which coordinates operations disclosed herein. Alternately, the Prepare and provide or submit information about real world objects and associated settings, object criteria, location information, schedules, virtual object(s) and required user actions Application (Form/GUI/Map) Application (Smart Client or Web based) 270 may include executable instructions to coordinate some of the operations disclosed herein, while the server implements other operations.

The memory 236 stores an Augmented Reality Scanning Application (Smart Client or Web based) 271 to implement operations of one of the embodiment of the invention. The Augmented Reality Scanning Application (Smart Client or Web based) 271 may include executable instructions to access a client device and/or a server which coordinates operations disclosed herein. Alternately, the Augmented Reality Scanning Application (Smart Client or Web based) 271 may include executable instructions to coordinate some of the operations disclosed herein, while the server implements other operations. The memory 236 stores a Media Taking (Capture Photo, Recording Video) Application (Smart Client or Web based) 272 to implement operations of one of the embodiment of the invention. The Media Taking (Capture Photo, Recording Video) Application (Smart Client or Web based) 272 may include executable instructions to access a client device and/or a server which coordinates operations disclosed herein. Alternately, the Media Taking (Capture Photo, Recording Video) Application (Smart Client or Web based) 272 may include executable instructions to coordinate some of the operations disclosed herein, while the server implements other operations. The memory 236 stores a Notifications Application (Smart Client or Web based) 274 to implement operations of one of the embodiment of the invention. The Notifications Application (Smart Client or Web based) 274 may include executable instructions to access a client device and/or a server which coordinates operations disclosed herein. Alternately, the Notifications Application (Smart Client or Web based) 274 may include executable instructions to coordinate some of the operations disclosed herein, while the server implements other operations.

A touch controller 215 is connected to the display 210 and the processor 230. The touch controller 215 is responsive to haptic signals applied to the display 210.

The electronic device 200 may also include other components commonly associated with a smartphone, such as a wireless signal processor 220 to provide connectivity to a wireless network. A power control circuit 225 and a global positioning system (Global Positioning System (GPS)) processor 235 may also be utilized. While many of the components of FIG. 2 are known in the art, new functionality is achieved through the providing information about real world object and associated settings, criteria, object criteria, and virtual object(s) and rules and required actions to get associated virtual object(s) 270, access information about real world objects 273, send augmented reality scanned data or captured photo of real world object and receive recognized augmented reality scanned data or captured photo of real world object associated virtual object(s) 271 operating in conjunction with a server.

FIG. 2 shows a block diagram illustrating one example embodiment of a mobile device 200. The mobile device 200 includes an optical sensor 240 or image sensor 238, a Global Positioning System (Global Positioning System (GPS)) sensor 244, a position sensor 242, a processor 230, storage 236, and a display 210.

The optical sensor 240 includes an image sensor 238, such as, a charge-coupled device. The optical sensor 240 captures visual media. The optical sensor 240 can be used to media items such as pictures and videos.

The Global Positioning System (GPS) sensor 244 determines the geolocation of the mobile device 200 and generates geolocation information (e.g., coordinates including latitude, longitude, aptitude). In another embodiment, other sensors may be used to detect a geolocation of the mobile device 200. For example, a WiFi sensor or Bluetooth sensor or Beacons including iBeacons or other accurate indoor or outdoor location determination and identification technologies can be used to determine the geolocation of the mobile device 200.

The position sensor 242 measures a physical position of the mobile device relative to a frame of reference. For example, the position sensor 242 may include a geomagnetic field sensor to determine the direction in which the optical sensor 240 or the image sensor 238 of the mobile device is pointed and an orientation sensor 237 to determine the orientation of the mobile device (e.g., horizontal, vertical etc.).

The processor 230 may be a central processing unit that includes a media capture application 271.

The media capture application 272 includes executable instructions to generate media items such as pictures and videos using the optical sensor 240 or image sensor 238. The media capture application 272 also associates a media item with the geolocation and the position of the mobile device 200 at the time the media item is generated using the Global Positioning System (GPS) sensor 244 and the position sensor 242.

The storage 236 includes a memory that may be or include flash memory, random access memory, any other type of memory accessible by the processor 230, or any suitable combination thereof. The storage 236 stores the prepared or provided or submitted information about real world object, associated settings, criteria, object criteria, and virtual object(s) and rules and required actions to get virtual object(s), conducted augmented reality scanned data or captured photo of real world objects, received recognized object in scanned data or captured photo of real world object associated virtual object(s), the media items generated or shared or received by user and also store the corresponding geolocation information, exchangeable image file format (EXIF) data in the case of image files from cameras, smartphones and scanners, auto identified system data including date & time, auto recognized objects in photo or image(s) of video associated keywords, metadata, user profile, one or more types of user data and game data, and user provided information. The storage 236 also stores executable instructions corresponding to Prepare and provide or submit information about real world objects and associated settings, object criteria, location information, schedules, virtual object(s) and required user actions Application (Form/GUI/Map Application) (Smart Client or Web based) 270, Augmented Reality Scanning and receive recognized augmented reality scanned data or captured photo of real world object associated virtual object(s) Application (Smart Client or Web based) 271, Media Taking (Capture Photo, Recording Video) Application (Smart Client or Web based) 272, Access Information about real world objects Application (Smart Client or Web based) 273, Notifications Application 274.

The display 210 includes, for example, a touch screen display. The display 210 displays the media items generated by the media capture application 271. A user can conduct augmented reality scanning of real world object(s) and can take picture of real world object(s) by touching the corresponding media items on the display 210. A touch controller monitors signals applied to the display 210 to coordinate the augmented reality scanning or scanning capturing, recording, and selection of the media items.

The mobile device 200 also includes a transceiver that interfaces with an antenna. The transceiver may be configured to both transmit and receive cellular network signals, wireless data signals, or other types of signals via the antenna, depending on the nature of the mobile device 200. Further, in some configurations, the Global Positioning System (GPS) sensor 238 may also make use of the antenna to receive Global Positioning System (GPS) signals.

In another embodiment, the electronic device 200 is a smartphone with a processor 230 in communication with a memory 236. The processor 230 may be a central processing unit and/or a graphics processing unit. The memory 276 is a combination of flash memory and random access memory. The memory 276 stores Message or Request or Instruction Preparing, Selecting, Saving, Applying Rules, Settings, Preferences and Sending Application (Smart Client or Web based) 277 to implement operations of one of the embodiment of the invention. The Message or Request or Instruction Preparing, Selecting, Saving, Applying Rules, Settings, Preferences and Sending Application (Smart Client or Web based) 276 may include executable instructions to access a client device and/or a server which coordinates operations disclosed herein. Alternately, the Message or Request or Instruction Preparing, Selecting, Saving, Applying Rules, Settings, Preferences and Sending Application (Smart Client or Web based) 276 may include executable instructions to coordinate some of the operations disclosed herein, while the server implements other operations.

The memory 236 stores a Received Message Management including Accept, Reject, Received Message Specific identifying, scanning or taking image of real world object(s) (Smart Client or Web based) 277 to implement operations of one of the embodiment of the invention. The Received Message Management including Accept, Reject, Received Message Specific identifying, scanning or taking image of real world object(s) Application (Smart Client or Web based) 277 may include executable instructions to access a client device and/or a server which coordinates operations disclosed herein. Alternately, the Received Message Management including Accept, Reject, Received Message Specific identifying, scanning or taking image of real world object(s) Application (Smart Client or Web based) 277 may include executable instructions to coordinate some of the operations disclosed herein, while the server implements other operations. The memory 236 stores a Team Management Application (Smart Client or Web based) 279 to implement operations of one of the embodiment of the invention. The Team Management Application (Smart Client or Web based) 274 may include executable instructions to access a client device and/or a server which coordinates operations disclosed herein. Alternately, the Team Management Application (Smart Client or Web based) 279 may include executable instructions to coordinate some of the operations disclosed herein, while the server implements other operations. The memory 236 stores a Settings, Preferences & Rules Management Application (Smart Client or Web based) 280 to implement operations of one of the embodiment of the invention. The Settings, Preferences & Rules Management Application (Smart Client or Web based) 280 may include executable instructions to access a client device and/or a server which coordinates operations disclosed herein. Alternately, the Settings, Preferences & Rules Management Application (Smart Client or Web based) 280 may include executable instructions to coordinate some of the operations disclosed herein, while the server implements other operations. The memory 236 stores a Feed Application 281 to implement operations of one of the embodiment of the invention. The Feed Application 281 may include executable instructions to access a client device and/or a server which coordinates operations disclosed herein. Alternately, the Feed Application 281 may include executable instructions to coordinate some of the operations disclosed herein, while the server implements other operations. The memory 236 stores a Display or Live Update of Real world Story of user on or with or within 2D or 3D Map Application 282 to implement operations of one of the embodiment of the invention. The Display or Live Update of Real world Story of user on or with or within 2D or 3D Map Application 282 may include executable instructions to access a client device and/or a server which coordinates operations disclosed herein. Alternately, the Display or Live Update of Real world Story of user on or with or within 2D or 3D Map Application 282 may include executable instructions to coordinate some of the operations disclosed herein, while the server implements other operations.

Figure 3:
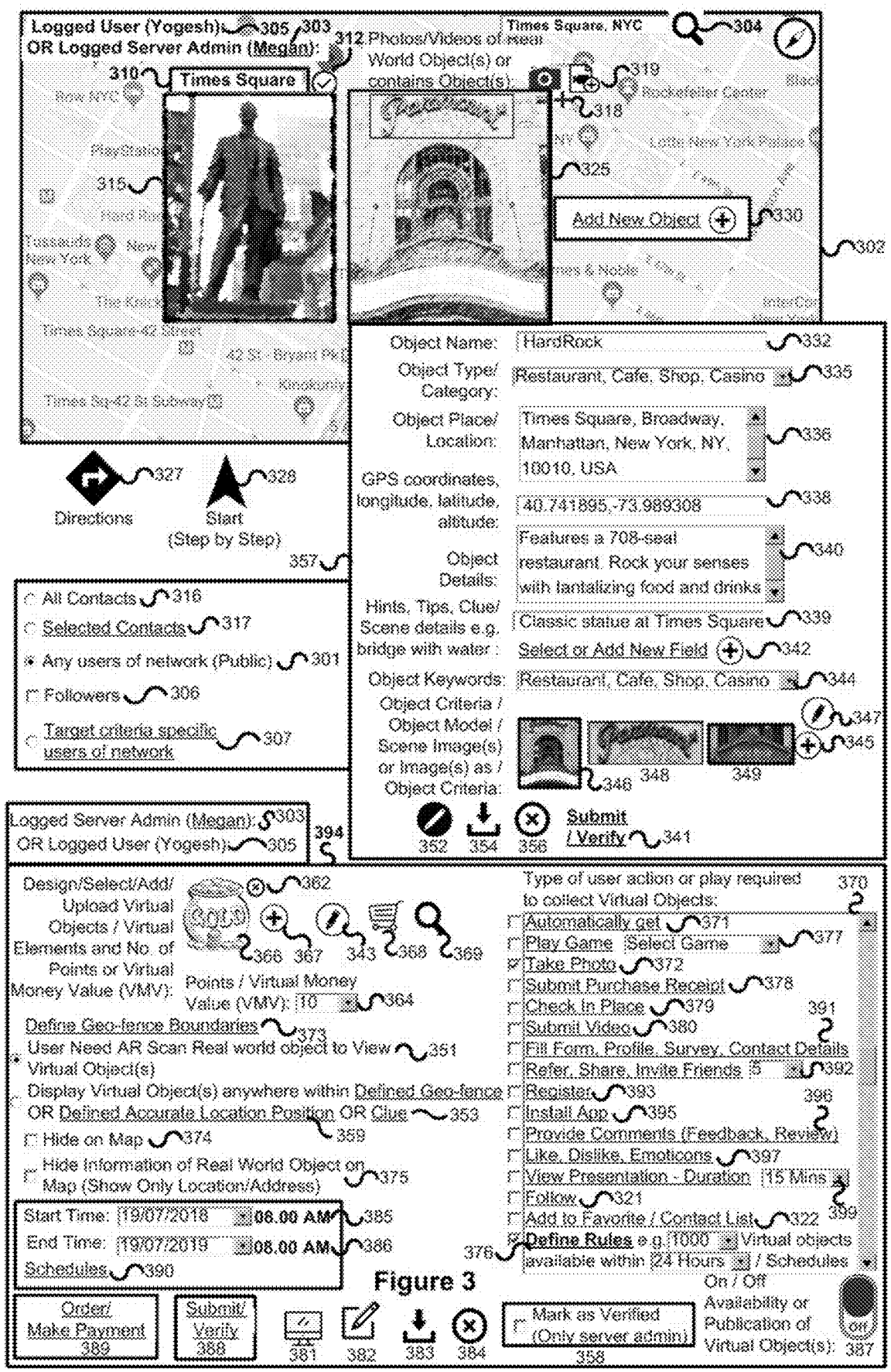

FIG. 3 illustrates example Graphical User Interface (GUI) 270 for enabling user 305 or server administrator 303 to select particular place or location 310 on map 302 or select accurate location or position of particular object 315/325 of real world or visit place 310 and get or identify Global Positioning System (GPS) coordinates, longitude, latitude, altitude 338 of particular object 315/325 of real world based on monitored or tracked current location of user device or manually identify and provide Global Positioning System (GPS) coordinates, longitude, latitude, altitude 338 of particular object 315/325 of real world, define or draw on map geo-fence boundaries 373 surround said identified and defined object 315/325 of real world, set distance of the location of the real world object 315/325 and the player or user, wherein the virtual object is displayed or provided to the player or user or add to user's collection or store to user's account in response to the client device being within said set distance of the location of the real world object. In another embodiment, other sensors may be used to detect a geolocation of the mobile device 200. For example, a WiFi sensor or Bluetooth sensor or Beacons including iBeacons or other accurate indoor or outdoor location determination and identification technologies can be used to determine the geolocation of the mobile device 200. User 305 or server 303 administrator can capture or record or select and provide one or more photos 318 or videos 319 of object 315/325 of real world, provide or select object name 332, object type or category or sub-category or taxonomy 335, physical address 336 of object 315/325 of real world so users or players of network can physically reach or visit said place of object or object of real world or use map directions & route 327 and step by step or guided directions 328 to physically reach at said real world object's 315 or 325 accurate location or place 310. User 305 or server 303 administrators is enabled to provide details or description or structured details 340 of said real world object 325, provide or associated with said object 325, one or more hints or tips or clue 339 (in an embodiment hit or tips or clue will not see by other users). User 305 or server 303 administrators is enabled to select or add one or more new fields 342 and provide each added field specific one or more types of values or data or one or more types of contents or media. User 305 or server 303 administrators is enabled to provide or select object related one or more object keywords 344, provide or upload or add 345 or design or draw or edit 347 and provide one or more object criteria including one or more object models or images 346/348. In an embodiment limit users of network or exemplary user 305 to provide one or more types of information. For example in case of limiting providing of information, after providing of information by exemplary user of network 305 in window or interface 357, exemplary user of network 305 is enable to save as draft for later editing or submission 354 or edit already drafted 352 or cancel or discard or remove 356 said provided or drafted information or submit to server module 151 of server 110 for verification, validation, moderation, editing, providing or applying other settings (discussed in detail in 394) and making available for all or authorized users of network. In an embodiment enable or authorize only server administrator 303 to provide said one or more types of information.

In an embodiment enabling or authorizing server administrator 303 or in another embodiment enabling user of network 305 to provide, select 367, import, search 369, purchase 368, design 343, edit, update, upgrade, add 367 and upload one or more types of one or more virtual objects or virtual elements or virtual characters 366 and provide or select and associate custom or user defined number of or particular amount of or value of virtual money or virtual currency or points or numbers 364 or use pre-set or pre-defined or pre-associated by server, number of or particular amount of or value of virtual money or virtual currency or points or numbers 364 for particular category or type 335 of real world object 315/325 or identified or recognized category or type of real world object 315/325 based on recognizing object in photo or video of real world object 315/325 and identify associated keywords or categories or types.

In an embodiment enabling or authorizing server administrator 303 or in another embodiment enabling user of network 305 to define or customize or configure geo-fence boundary 373 or draw on map (e.g. 512) geo-fence boundary (e.g. 515) surround real world object 315/325.

In an embodiment enabling or authorizing server administrator 303 or in another embodiment enabling user of network 305 to define or set whether user needs to Augmented Reality Scanning of real world object 315/325 or capture photo real world object 315/325 and send or use camera display to view or scan real world object 315/325 and provide raw photo real world object 315/325 to server module 151 of server 110 for processing, recognizing, validating, identifying and displaying associated one or more virtual objects 366 and associated virtual money 364 and other one or more types of data and metadata or in an embodiment enable or authorizing server administrator 303 or in another embodiment enabling user of network 305 to define or set whether display virtual object(s) and associated virtual money anywhere within predefined geo-fence boundary 373 (e.g. 515), so when user or player enters in to said defines geo-fence boundary (e.g. 515), then without scanning said real world object 315 or 325, displaying or presenting virtual objects 366 and/or associated virtual money 364 to said entered user or player and enable said user or player to get said displayed virtual objects 366 and/or associated virtual money 364 or get said virtual objects 366 and/or associated virtual money 364 by conducting one or more pre-set activities, actions or call-to actions 370 or at defined accurate location position 359 or based on deciphering of pre-defined clue 353. In an embodiment enabling or authorizing server administrator 303 or in another embodiment enabling user of network 305 to hide information about real world object 325 and show only location or place or address of place information (so player need to search, locate real world object and guess or try scanning of objects to identify object which is associated with virtual object(s)) 375 or to hide 374 said details and location about said object of real world 315/325 for users of network for enabling them to identify or view and collect or get said real world object 315/325 associated virtual object 366 based on guess, or display based on luck or random or lottery or based on deciphering clue or tips or hints.

In an embodiment enabling or authorizing server administrator 303 or in another embodiment enabling user of network 305 to define or set or apply one or more schedules 390 of availability of said real world object 315/325 associated virtual objects 366 and/or associated virtual currency 364 including start date and time 385 and end date and time 386 in the event of user scanning (discuss in detail in FIG. 8-14) said real world object 315/325.

In an embodiment enabling or authorizing server administrator 303 or in another embodiment enabling user of network 305 to apply or select or define one or more types of user actions, activities, fulfill rules, play games or mini games, call-to-actions to make requirement or necessary or mandatory for users of network to conduct or do said defined one or more types of activities, actions, call to actions or fulfill associated rules or play mini game to collect or get displayed virtual objects and associated virtual money in the event of user of network scanned or do augmented reality scanning said real world object 315/325 or captured phot of said real world object 315/325, wherein one or more types of user actions and activities comprise need to play pre-set game 377, need to take one or more photos 372 or videos 380 of real world object e.g. particular food item or real world object e.g. food item with displayed virtual object, submit purchase receipt 378, need to check in place 379 related to sponsor's business place, fill form 391 including feedback, comments, user's one or more types of profile or details, survey form, need to provide contact details, need to refer 392 product or service of sponsor's business to particular number of friends or contacts of user, need to share 392 details or photo or video of product or service of sponsor's business, invite friends 392 to visit place of sponsor's business, register 393 with web site of sponsor's business, install application 395 of sponsor's business, provide comments or feedback or reviews 396 of products or services of sponsor's business, need to take one or more types of reactions including like, dislike, provide one or more types of emoticons 397, need to view particular duration of presentation of products and services or business of sponsor 399, follow 321 business of sponsor including shop, company, product, service, need to add to favorite or contact list 322 or conduct one or more types of actions as per defined rules 376 or to-do as per defined one or more types of rules 376.

In an embodiment in the event of selection of automatically get option 371, user of network who scanned said real world object 315/325 will automatically get associated virtual object 366 and/or associated virtual money 364. In an embodiment in the event of selection of play mini games option and selection of type of game 377, user of network who scanned said real world object 315/325 will need to play said set or selected mini game to get or collect or capture said real world object 315/325 associated virtual object 366 and/or associated virtual money 364. In an embodiment enabling or authorizing server administrator 303 or in another embodiment enabling user of network 305 to take photo of user with real world object 315 or 325 or real world object 315 or 325 and submit to sever module 151 of server 110 and in the event of matching submitted photo associated Exchangeable image file format (EXIF) data associated captured photo date and time plus additional duration for submitting photo (which must be within provided or pre-set maximum duration to submit captured photo) with server's current date and time, provided or add or store real world object 315 or 325 associated virtual object 366 and/or associated virtual money 364 to user's collection of virtual objects and virtual money or virtual currency or user's account.

Figure 8:
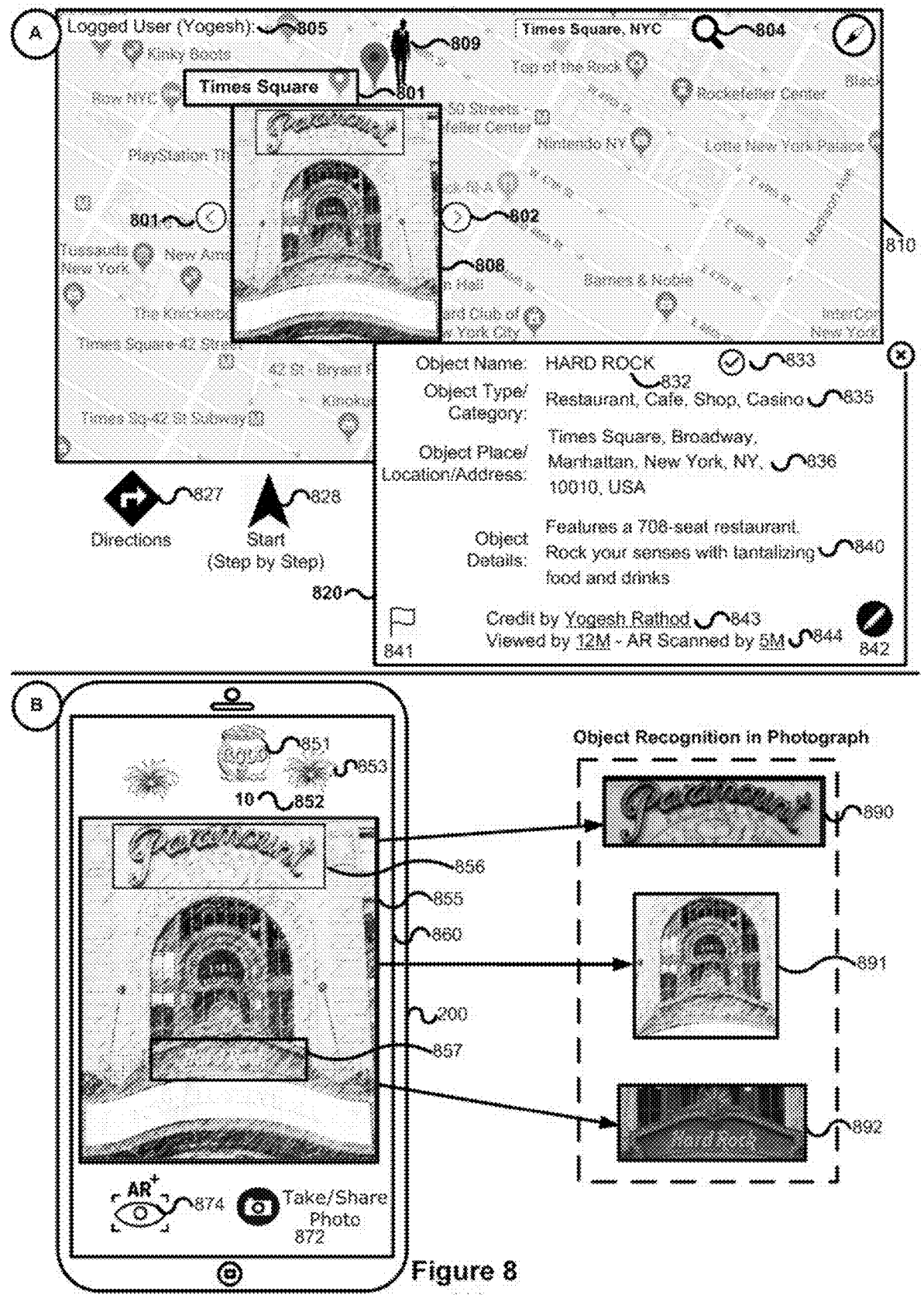
FIGS. 8-14 illustrates various examples of various embodiments of the present disclosure.
Figure 9:
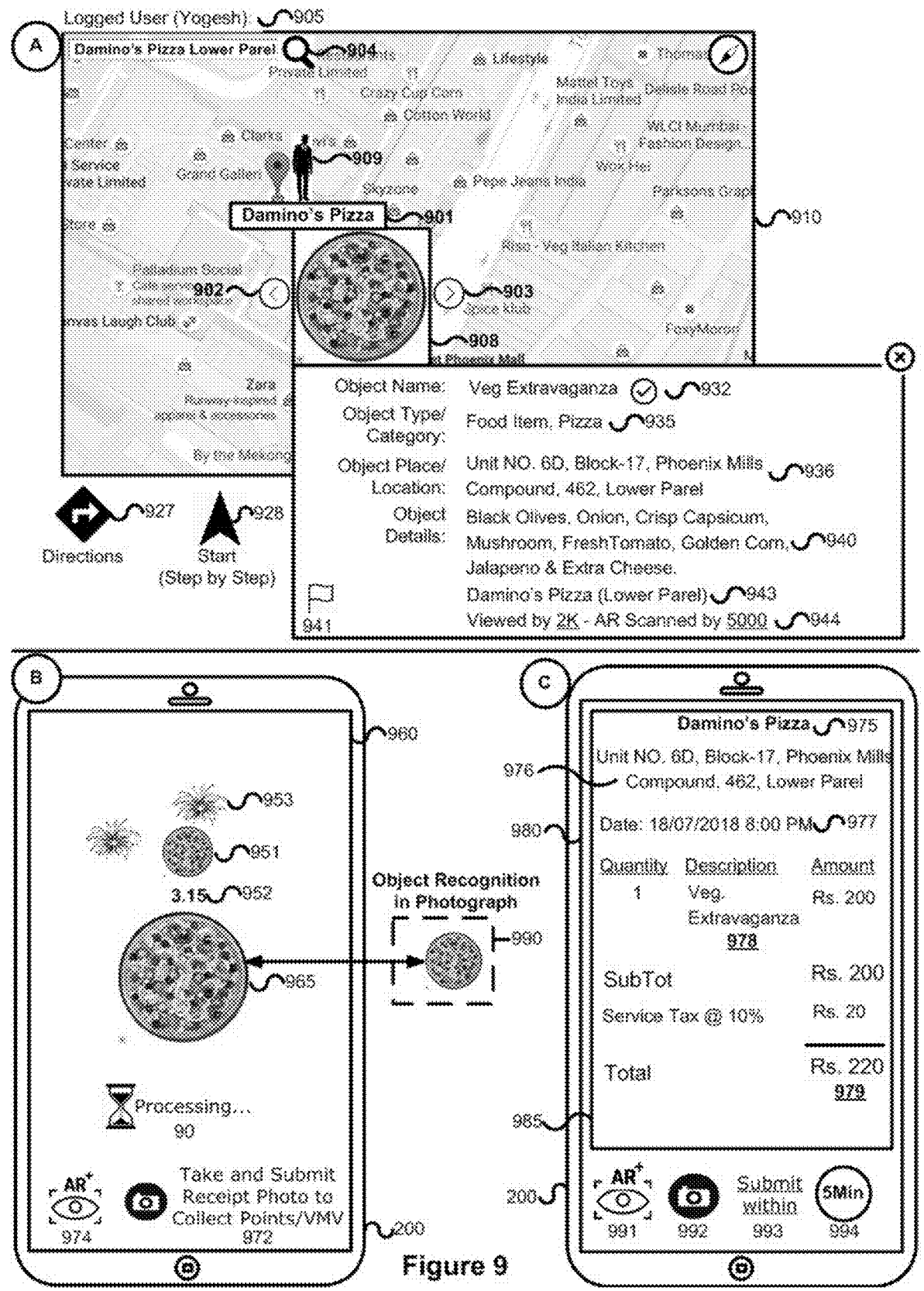

In an embodiment user suggests real world objects and provides associated details (as discussed in FIG. 3) which server module 151 receives and verifies and makes available for other users of network (discuss in detail in FIGS. 8-9). In an embodiment in the event of commercial real world object or if advertiser or sponsor wants to publish real world object including product, place of business, board name, showcase display item or product, art, sculpture, design, food item, product, person in-shop and logo or brand or name, user can make payment 389 and in an embodiment in the event of user of network, user need to submit said provided information to server module 151 for processing, moderation, verification, validation, applying needed settings and after successfully validation and verification making them available for other users of network.

In an embodiment in the event of submitting 388 said information by user to sever for processing, moderation, verification, validation, applying needed settings, server module 151 received said information from user and enables sever administrator 303 to review said information and after successfully reviewing, moderation, verification, validation, applying needed settings, server administrator mark said information as verified information 358 (displaying verified icon or badge e.g. 312).

In an embodiment enabling server administrator 303 or in another embodiment enabling user of network 305 to preview said information, test applied settings, virtual objects, geo-fence boundary, schedule, and actions 381, enabling to save as draft or edit already exists or saved information 382, save current information 383 or cancel or discard or remove provided information 384.

In an embodiment enabling server module 151 or server administrator to suggest or provide or display number of points or amount of virtual money for user selection based on object type, location or place, associated type of actions, paid or sponsored or free, type of user who provided information, schedules or duration of publication, geo-fence boundary.

In an embodiment server admin can apply or set one or more types of required actions to collect or get one or more virtual objects when user scans real world object e.g. 315/325.

In an embodiment real world object may comprises but not limited to item, product, showpiece, art, board, design, plate, sculpture, building, home, watch, fountain, neon sign or electric board, flower, tree, furniture, interior, instrument, image or drawing frame and type of scene in real world.

In an embodiment enabling or authorizing server administrator 330 or in another embodiment enabling user of network 305 to adds 330 information about one or more objects of real world, provide one or more types of settings, preferences, object criteria, virtual objects, schedules, required actions for users or players of network to collect said virtual objects when user scans said real world object or capture photo of said real world object.

In an embodiment in the event of submitting information 341/388, server module 151 receives said information and stores to server database 115 and verifies object photos, videos, object name, object address, object details, object location including place, geo-fence boundary, object keywords, object criteria including object models and images, virtual objects, associated virtual money, text, data and metadata, applied settings, schedules, one or more required actions. After successfully verification, server administrator makes available said information on map or other one or more types of Graphical User Interface (GUIs) for users of network (Discuss in detail in FIG. 8-9 and FIG. 8-14 discuss about how user scans pre-defined or identified real world objects and selects, captures, wins, take one or more types of actions and gets scanned real world object associated one or more virtual objects and associated virtual money).

In an embodiment $3^{rd}$ parties developers can design virtual objects and upload to server with details for verification and in the event of successful verification, server makes said virtual objects available for users of network as free or payment based or sponsored, define real world objects and associate virtual objects including virtual characters, virtual powers, virtual money, virtual rewards, develop one or more types of mini game and register, uploads to server 110 with details for verification and making said one or more types of one or more mini games available, searchable for other users of network's selection 377 or use by developer for associated with developer defined real world objects (e.g. 315/325). In an embodiment some types of or location or place specific or named real world objects available for scan for premium subscription users of network.

Figure 5:
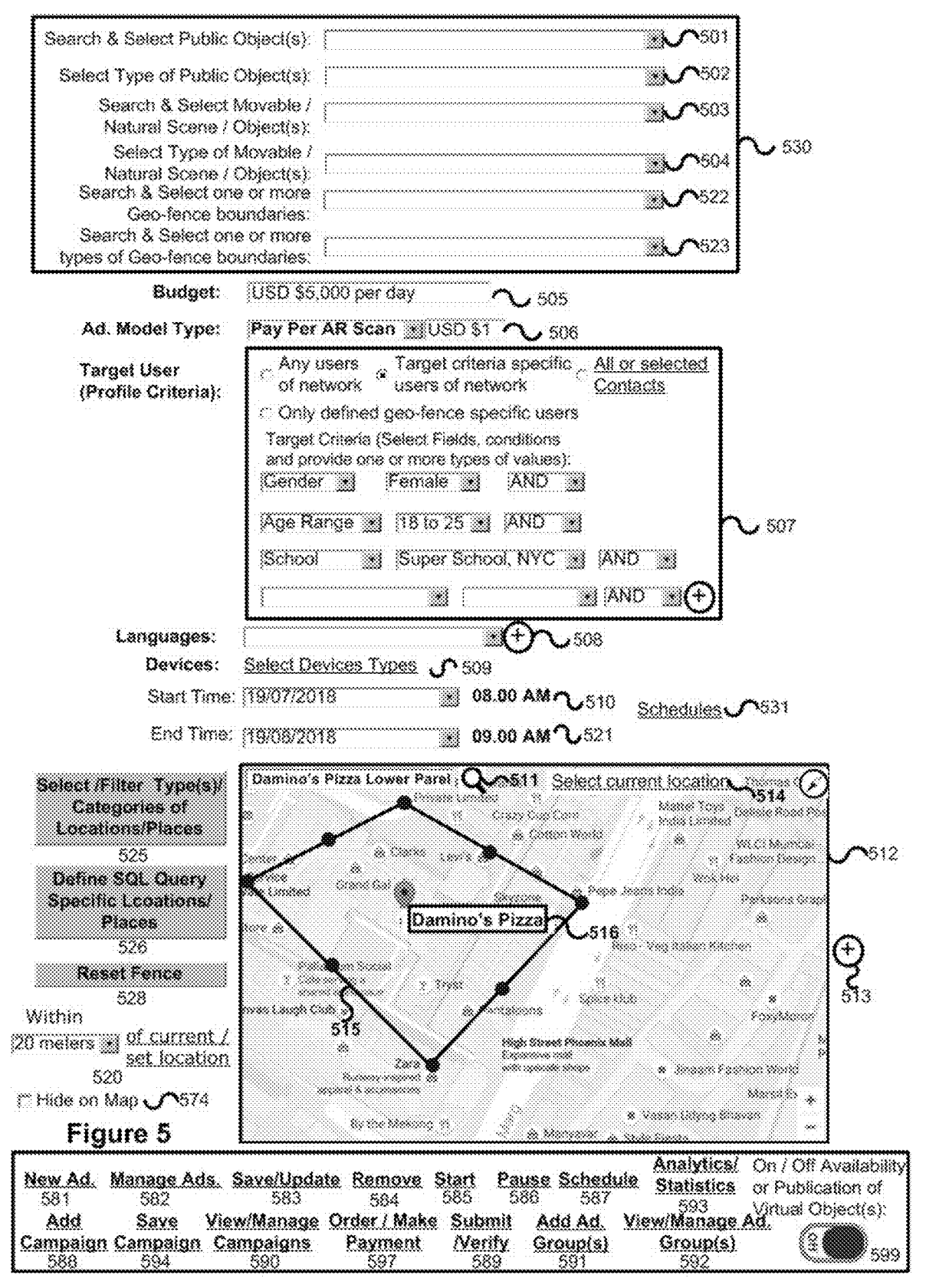

FIGS. 4-5 illustrates user interface(s) for in an embodiment enabling sponsor or advertiser or publisher user to create account including provide user and entity details 401 (name, age, gender & other profile information, entity name & address, email, contact information), login information (e.g. user identity or email address, password), billing information & payment information (if paid) or free for general user, authorized publisher and server admin. In an embodiment after creating account, server or system verifies sponsor or advertiser or publisher or user or account(s) or type of account and associated roles, rules, privacy, rights & privileges and policies and active user account to enable account holder to create and manage one or more advertisement campaigns, advertisement groups, advertisements and associate virtual objects, object criteria, object details including object photos or videos, target criteria, geo-fence and other settings. In an embodiment enabling sponsor or advertiser to create one or more advertisement campaigns 403 or enabling user to create one or more publications 404, campaign or publication comprises a set of advertisement groups (virtual objects, object details, advertisements, object criteria) that share a budget, advertisement model type, location targeting, type of user profile or defined characteristics of user targeting, schedules of targeting, languages targeting, device(s) type(s) targeting, campaign types (discussed in detail in FIG. 5) and other settings, campaign settings let advertiser control where and when their advertisements (virtual objects) appear and how much they want to spend and campaigns are often used to organize categories of products or services that advertiser offer, Advertiser enable to provide campaign or publication name 404, provide icon or logo or image 407, provide details 406, search 411 or select 512 location or place of business on map or directly provide or input or select location or place of business 438 including Global Positioning System (GPS) coordinates, longitude, latitude, add photo of object or product or service or brand (for example capture or record or select 418/419 and add photo or video 415/425 of food item or menu item), provide object name 432, provide object type or category 435, provide address of place of business or object or place where object(s) is/are physically available for purchase or view 436, Global Positioning System (GPS) coordinates, longitude, latitude describing accurate or exact location of place of business 438, price of object 441, one or more types of additional structured details 442 by creating, selecting and adding one or more fields and providing each added field specific details or one or more types of data or media or content, object details 440, provide or select object related one or more object keywords 444, provide or upload or add 445 or design or draw or edit 447 and provide one or more object criteria including one or more object models or images 446/448, provide, select 467, import, search 469, purchase 468, design 443, edit, update, upgrade, add 467 and upload one or more types of one or more virtual objects or virtual elements or virtual characters 466 and provide or select and associate custom or user defined number of or particular amount of or value of virtual money or virtual currency or points or numbers 445 or use pre-set or pre-defined or pre-associated by server, number of or particular amount of or value of virtual money or virtual currency or points or numbers 445 for particular category or type 435 of real world object 415/425 or identified or recognized category or type of real world object 415/425 based on recognizing object in photo or video of real world object 415/425 and identify associated keywords or categories or types.

In an embodiment enabling sponsor or advertiser or user 405 to define or set whether users or players of network needs to Augmented Reality Scanning of real world object 415/425 or capture photo real world object 415/425 and send or use camera display to view or scan real world object 415/425 and provide raw photo real world object 415/425 to server module 151 of server 110 for processing, recognizing, validating, identifying and displaying associated one or more virtual objects 466 and associated virtual money 445 and other one or more types of data and metadata or enabling to define or set whether display virtual object(s) and associated virtual money anywhere within predefined geo-fence boundary 515, so when user or player enters in to said defines geo-fence boundary 515, then without scanning said real world object 415 or 425, displaying or presenting virtual objects 466 and/or associated virtual money 445 to said entered user or player and enable said user or player to get said displayed virtual objects 466 and/or associated virtual money 445 or get said virtual objects 466 and/or associated virtual money 445 by conducting one or more pre-set activities, actions or call-to actions 470 or at defined accurate location position 475 or based on deciphering of pre-defined clue 476. In an embodiment enabling user 405 to hide 474 said details and location about said object of real world 415/425 for users of network for enabling them to identify or view and collect or get said real world object 415/425 associated virtual object 466 based on guess, or display based on luck or random or lottery or based on deciphering clue or tips or hints.

In an embodiment enabling or authorizing server administrator 303 or in another embodiment enabling user of network 305 to apply or select or define one or more types of user actions, activities, fulfill rules, play games or mini games, call-to-actions to make requirement or necessary or mandatory for users of network to conduct or do said defined one or more types of activities, actions, call to actions or fulfill associated rules or play mini game to collect or get displayed virtual objects and associated virtual money in the event of user of network scanned or do augmented reality scanning said real world object 315/325 or captured phot of said real world object 315/325, wherein one or more types of user actions and activities comprise need to play pre-set game 377, need to take one or more photos 372 or videos 380 of real world object e.g. particular food item or real world object e.g. food item with displayed virtual object, submit purchase receipt 378, need to check in place 379 related to sponsor's business place, fill form 391 including feedback, comments, user's one or more types of profile or details, survey form, need to provide contact details, need to refer 392 product or service of sponsor's business to particular number of friends or contacts of user, need to share 392 details or photo or video of product or service of sponsor's business, invite friends 392 to visit place of sponsor's business, register 393 with web site of sponsor's business, install application 395 of sponsor's business, provide comments or feedback or reviews 396 of products or services of sponsor's business, need to take one or more types of reactions including like, dislike, provide one or more types of emoticons 397, need to view particular duration of presentation of products and services or business of sponsor 399, follow 321 business of sponsor including shop, company, product, service, need to add to favorite or contact list 322 or conduct one or more types of actions as per defined rules 376 or to-do as per defined one or more types of rules 376.

In an embodiment in the event of selection of automatically get option 471, user of network who scanned said real world object 415/425 will automatically get associated virtual object 466 and/or associated virtual money 464. In an embodiment in the event of selection of play mini games option and selection of type of game 477, user of network who scanned said real world object 415/425 will need to play said set or selected mini game to get or collect or capture said real world object 415/425 associated virtual object 466 and/or associated virtual money 445. In an embodiment enabling user or customer or prospective customer, who visits place of business of sponsor, to take photo of user with real world object 415 or 425 or real world object 415 or 425 and submit to sever module 151 of server 110 and in the event of matching submitted photo associated Exchangeable image file format (EXIF) data associated captured photo date and time plus additional duration for submitting photo (which must be within provided or pre-set maximum duration to submit captured photo) with server's current date and time, provided or add or store real world object 415 or 425 associated virtual object 466 and/or associated virtual money 445 to user's collection of virtual objects and virtual money or virtual currency or user's account.

In an embodiment enabling sponsor or advertiser or user 405 to search 511 one or more locations or places of business on a map 512, select current location 514, define or customize or configure geo-fence boundary 515 or draw on map 512 geo-fence boundary 515 surround real world object e.g. 415/425 or place of business 516.

In an embodiment enabling user 305 to define or set or apply one or more schedules 531 of availability of said real world object 415/425 associated virtual objects 466 and/or associated virtual currency 445 including start date and time 510 and end date and time 521 in the event of user scanning (discuss in detail in FIG. 8-14) said real world object 315/325.

Advertiser or sponsor user 405 select locations or places 516, provide address 436, provide geolocation information (e.g., coordinates including latitude, longitude, aptitude) 438 or search or select location(s) or place(s) from/on map 511 or select or define geo-fence boundaries 515 or define types and characteristics of location or query specific locations or places based on structured query language (SQL), natural query and wizard interface 525/526, enable to enter (input, auto-fill up, suggested list) location to target or include or exclude location(s), for example user adds locations, remove all added, remove selected or find nearby and add, use advance search to provide location criteria, conditions, rules, boundaries, query specific locations or places (For example SQL query: "Select Places where Place Type='GUCCI' or Natural Query" "all GUCCI shops of world"). Advertiser can create separate advertisement campaigns to run advertisements in different locations or using different budgets. Advertiser can provide budget for particular duration including daily maximum spending budget of advertisement 505, daily budget is the amount that advertiser set for each campaign to indicate how much, on average, advertiser's willing to spend per day, advertisement model including pay per augmented reality scanning 506 or capturing of photo of real world objects by users or customers or visitors of business place for getting associated virtual objects, wherein virtual objects associated with real world objects defined and provided by provided by sponsor or advertiser or user 405.

In an embodiment advertiser or sponsor or user 405 can search and select one or more target real world objects 501 each associated with particular location or place or one or more types of target real world objects 502 scattered at different locations or search and select one or more movable target real world objects 503 (e.g. elephant at Yellowstone national park) or natural scene each associated with particular location or one or more types of movable target real world objects 504 (e.g. animal) or natural scene scattered at different locations or search and select one or more geo-fence boundaries 522 or search and select one or more types of geo-fence boundaries 523 for displaying virtual objects (e.g. 466) related to advertisement when users scans or takes picture of said selected real world objects.

Advertiser can provides associated target criteria including add, include or exclude or filter one or more languages 509, schedule of showing of advertisement including start date 510, end date 521 and showing advertisements all the time or particular time, time range at particular date or day 531, select targeted device type(s) 509 including mobile devices, personal computer, wearable device, tablets, android device and/or iOS devices etc., define target user's profile type or characteristics or modeling of target users including any users of network or target criteria specific users of network including one or more types of one or more profile fields including gender, age or age range, education, qualification, home or work locations, related entities including organization or school or college or company name(s) and Boolean operators and any combination thereof 507. After creating and providing information and settings related to created campaign, user or publisher or advertiser can save campaign 595 at server database 115 of server 100 via server module 151 and/or local storage medium of user device 200, so user can access, update, start 585, pause 586, stop or remove or cancel 584, view and manage 590 one or more created campaigns and associate information and settings including one or more advertisement groups 592, and advertisements 582 and can access started one or more campaigns, advertisement groups and advertisement associated or generated analytics and statistics 593.

One or more object criteria including object model 446/448/444 that can trigger or displays virtual objects 466 when someone i.e. any users of network scans or view (via eye glass or spectacles equipped with video camera and connected with user device) similar to said supplied image 9250 (e.g. user [A] visits shop of New York City "Domino's Pizza" shop 410/516 and scans or view "Pizza" 415/425 via user device camera or via eyeglass or digital spectacles which contains said object criteria (system matched and recognizes said scanned or viewed image with object criteria or object models associated with advertisements and identifies advertisements i.e. keywords presented to said scanner or viewer user).

In an embodiment user 405 can make order and payment 597 and submit said provided information to server module 151 for processing, moderation, verification, validation, applying needed settings and after successfully validation and verification making them available for other users of network.

In an embodiment in the event of submitting 589 said information by user to sever for processing, moderation, verification, validation, applying needed settings, server module 151 received said information from user and enables sever administrator to review said information and after successfully reviewing, moderation, verification, validation, applying needed settings, server administrator mark said information as verified information (displaying verified icon or badge e.g. 413).

In an embodiment in the event of submitting information 589, server module 151 receives said information and stores to server database 115 and verifies object photos, videos, object name, object address, object details, object location including place, geo-fence boundary, object keywords, object criteria including object models and images, virtual objects, associated virtual money, text, data and metadata, applied settings, schedules, one or more required actions. After successfully verification, server administrator makes available said information on map or other one or more types of Graphical User Interface (GUIs) for users of network (Discuss in detail in FIG. 8-9 and FIG. 8-14 discuss about how user scans pre-defined or identified real world objects and selects, captures, wins, take one or more types of actions and gets scanned real world object associated one or more virtual objects and associated virtual money).

In an embodiment advertiser or sponsor or user 405 can create new 588 or save 594 or manage 590 one or more advertisement campaigns and can add new advertisement group 591 or manage existing advertisement groups 592. In an embodiment advertiser or sponsor or user 405 can create new advertisement (publish or displaying virtual object to users when user or player or customer or prospective customer visits place of advertiser and conduct augmented reality scanning of advertiser defined of real world object or take photo of real world object provided or defined by advertiser e.g. particular food item or enter into advertiser defined one or more geo-fence boundaries. In an embodiment advertiser or sponsor or user 405 can save or update 583 or remove 584 or manage 582 created or drafted or published or started advertisement(s). In an embodiment advertiser or sponsor or user 405 can starts 585 or pause 586 already verified advertisements. In an embodiment advertiser or sponsor or user 405 can schedule publishing of advertisement 587. In an embodiment advertiser or sponsor or user 405 can view advertisement campaign, advertisement groups and advertisements related statistics and analytics including number of user viewed details about said real world object e.g. 425, number of users scanned and try to capture photo or conduct augmented reality scan of said real world object 425, number of users scanned or capture photo or conduct augmented reality scan of said real world object 425.

Figure 6:

FIG. 6 illustrates user interface(s) for server admin 605 to define generalized named or type of objects in real world which tied or not tied to particular location including named or type of animals like elephant, and horse, birds like peacock, sea creatures like fish, flowers like rose, mountains including any mountain or mountain at particular location or place or geo-fence boundary, tree including palm, building, temple, museum, library, art gallery, patrol pump, road, river, pond, wall, pool, island, water or any type of infrastructure including any building or building at particular location or place or geo-fence boundary, generalized or unbranded or objects or object types in real world that not yet defined by server or users of network including other than defined objects (e.g. watch at times square is defined but watch at particular shop not yet defined) like watch, mobile, moving objects including birds, animals, natural scene including sunrise, sunset, rainbow, rain, particular brand car moving on any road, flying airplane, bus, train, particular scene or image in video or movie, particular song or line of song, particular type of music, music played by particular instrument, generalized type of activity or action including particular type of dance, music, singing, sports (cricket, carom, soccer, badminton), running, walking, talking, viewing, expressions (smile, acting, swag), style (hair, face, cloth, make ups), attending event, conducting activity with one or more contacts and conducting one or more types of digital activities or conducting one or more types of digital activities at particular website or application or at particular website or application associated with particular brand, company, named person, shop or entity including online view or visit web sites, view products and services, online purchase, add to cart, take one or more reactions including like, dislike, provide emoticons, comment, refer, share, on one or more types of contents from one or more websites and applications, view video, view movie, listen song, register with website or application, install application, subscribe service, check in place, invite, follow, invite to connect, accept invitation, take photo, record video, share or send or publish one or more types of content including posts, photo, video, message, augmented reality scan of particular type or named product, item, logo, shop, person, scene, code including QRcode, view details on map, purchase products or services, fill form, make call and like.

In an embodiment enabling server admin 605 to capture one or more photos or record one or more videos or select and provide one or more photos 618 or videos 619 of object e.g. elephant 615 of real world, provide or select object name 632, object type or category or sub-category or taxonomy 635, define or draw geo-fence boundary 685 (e.g. area of zoo, park, garden, museum, forest, mountain, area), surround normal availability of object e.g. elephant 615 of real world, so users or players of network can physically reach or visit said place of object or object of real world or use map directions & route and step by step or guided directions to physically reach at said real world object's 615 location or place. In an embodiment enabling server admin 605 to provide details or description or structured details 640 of said real world object 625. In an embodiment enabling server admin 605 to select or add one or more new fields 642 and provide each added field specific one or more types of values or data or one or more types of contents or media. In an embodiment enabling server admin 605 to provide or select object related one or more object keywords 644, provide or upload or add 645 or design or draw or edit 649 and provide one or more object criteria including one or more object models or images 646/648.

In an embodiment enabling server admin 605 to provide, select 667, import, search, purchase, design, edit, update, upgrade, add upload one or more types of one or more virtual objects or virtual elements or virtual characters 666 and provide or select and associate custom or user defined number of or particular amount of or value of virtual money or virtual currency or points or numbers 664 or use pre-set or pre-defined or pre-associated by server, number of or particular amount of or value of virtual money or virtual currency or points or numbers 664 for particular category or type 635 of real world object 615 or identified or recognized category or type of real world object 615 based on recognizing object in photo or video of real world object 615 and identify associated keywords or categories or types.

In an embodiment enabling server admin 605 to define or customize or configure one or more geo-fence boundaries 685 or draw on map (e.g. 512) geo-fence boundaries (e.g. 515) surround real world object 615.

In an embodiment enabling server admin 605 to define or set whether user needs to conduct Augmented Reality Scanning of real world object e.g. "elephant" 615 or capture photo of real world object 615 and send or use camera display to view or scan real world object 615 and provide raw photo of real world object 615 to server module 151 of server 110 for processing, recognizing, validating, identifying and displaying associated one or more virtual objects 666 and associated virtual money 664 and other one or more types of data and metadata or in an embodiment enable or authorizing server administrator 605 to define or set whether display virtual object(s) and associated virtual money anywhere 686 or anywhere within predefined geo-fence boundary 685 (e.g. 515), so when user or player enters in to said defines geo-fence boundary (e.g. 515), then without scanning said real world object 615, displaying or presenting virtual objects 666 and/or associated virtual money 664 to said entered user or player and enable said user or player to get said displayed virtual objects 666 and/or associated virtual money 664 or get said virtual objects 666 and/or associated virtual money 664 by conducting one or more pre-set activities, actions or call-to actions 670 or at defined accurate location position 641 or based on deciphering of pre-defined clue 689. In an embodiment enabling or authorizing server administrator 605 to hide said details and location about said object of real world 615 for users of network for enabling them to identify or view and collect or get said real world object 615 associated virtual object 666 based on guess, or display based on luck or random or lottery or based on deciphering clue or tips or hints.

In an embodiment enabling or authorizing server administrator 605 to define or set or apply one or more schedules 601 of availability of said real world object 615 associated virtual objects 666 and/or associated virtual currency 664 including start date and time 685 and end date and time 686 in the event of user scanning (discuss in detail in FIG. 8-14) said real world object 615.

In an embodiment enabling or authorizing server administrator 605 to apply or select or define one or more types of user actions, activities, fulfill rules, play games or mini games, call-to-actions to make requirement or necessary or mandatory for users of network to conduct or do said defined one or more types of activities, actions, call to actions or fulfill associated rules or play mini game to collect or get displayed virtual objects and associated virtual money in the event of user of network scanned or do augmented reality scanning said real world object 615 or captured phot of said real world object 615, wherein one or more types of user actions and activities comprise need to play pre-set game 677, need to take one or more photos 672 or videos 380 of real world object e.g. particular food item or real world object e.g. food item with displayed virtual object, submit purchase receipt 678, need to check in place 679 related to sponsor's business place, fill form 691 including feedback, comments, user's one or more types of profile or details, survey form, need to provide contact details, need to refer 692 product or service of sponsor's business to particular number of friends or contacts of user, need to share 692 details or photo or video of product or service of sponsor's business, invite friends 692 to visit place of sponsor's business, register 693 with web site of sponsor's business, install application 695 of sponsor's business, provide comments or feedback or reviews 696 of products or services of sponsor's business, need to take one or more types of reactions including like, dislike, provide one or more types of emoticons 697, need to view particular duration of presentation of products and services or business of sponsor 699, follow 621 business of sponsor including shop, company, product, service, need to add to favorite or contact list 622 or conduct one or more types of actions as per defined rules 376 or to-do as per defined one or more types of rules 676.

In an embodiment in the event of selection of automatically get option 671, user of network who scanned said real world object 615 will automatically get associated virtual object 666 and/or associated virtual money 664. In an embodiment in the event of selection of play mini games option and selection of type of game 677, user of network who scanned said real world object 615 will need to play said set or selected mini game to get or collect or capture said real world object 615 associated virtual object 666 and/or associated virtual money 664. In an embodiment enabling or authorizing server administrator 605 to take photo of user with real world object 615 or real world object 615 and submit to sever module 151 of server 110 and in the event of matching submitted photo associated Exchangeable image file format (EXIF) data associated captured photo date and time plus additional duration for submitting photo (which must be within provided or pre-set maximum duration to submit captured photo) with server's current date and time, provided or add or store real world object 615 associated virtual object 666 and/or associated virtual money 664 to user's collection of virtual objects and virtual money or virtual currency or user's account.

In an embodiment sever administrator 605 review said information and after successfully reviewing, moderation, verification, validation, applying needed settings, server administrator mark said information as verified information 658 (displaying verified icon or badge e.g. 312) and make available for users of network.

In an embodiment enabling server administrator 605 to preview said information, test applied settings, virtual objects, geo-fence boundary, schedule, and actions 681, enabling to save as draft or edit already exists or saved information 682, save current information 683 or cancel or discard or remove provided information 684.

In an embodiment enabling server module 151 or server administrator 605 to suggest or provide or display number of points or amount of virtual money for user selection based on object type, location or place, associated type of actions, paid or sponsored or free, type of user who provided information, schedules or duration of publication, geo-fence boundary.

After successfully verification, server administrator makes available said information on map or other one or more types of Graphical User Interface (GUIs) for users of network (Discuss in detail in FIG. 8-9 and FIG. 8-14 discuss about how user scans pre-defined or identified real world objects and selects, captures, wins, take one or more types of actions and gets scanned real world object associated one or more virtual objects and associated virtual money).

In an embodiment enabling server administrator 605 to adds or defines 630 another object of real world.

In an embodiment enabling server administrator 605 to provide or define or configure one or more types of attributes 643 of virtual object 666 including add type of attributes 690 for using in playing of one or more types of games, wherein attributes may comprise Attack Power (AP) (Physical Strength) 629, Mind Power (MP) 631, life 633, Virtual Money Value (VMV) 627, get maximum number of said virtual objects 666 per day or within particular duration 628, set how to increase power of said particular virtual object by conducting one or more tasks, activities, actions, using of one or more types of virtual objects and number of or amount of virtual money or virtual currency or points 636. For example elephant" virtual object 666 needs daily 5 trees to maintain and each additional tree increases particular number of physical power and/or mind power. After defining or configuring one or more types of attributes, enabling server administrator 605 to save 639 or edit 638 or remove or cancel or discard 642 defined or configured attributes and settings.

Figure 7:
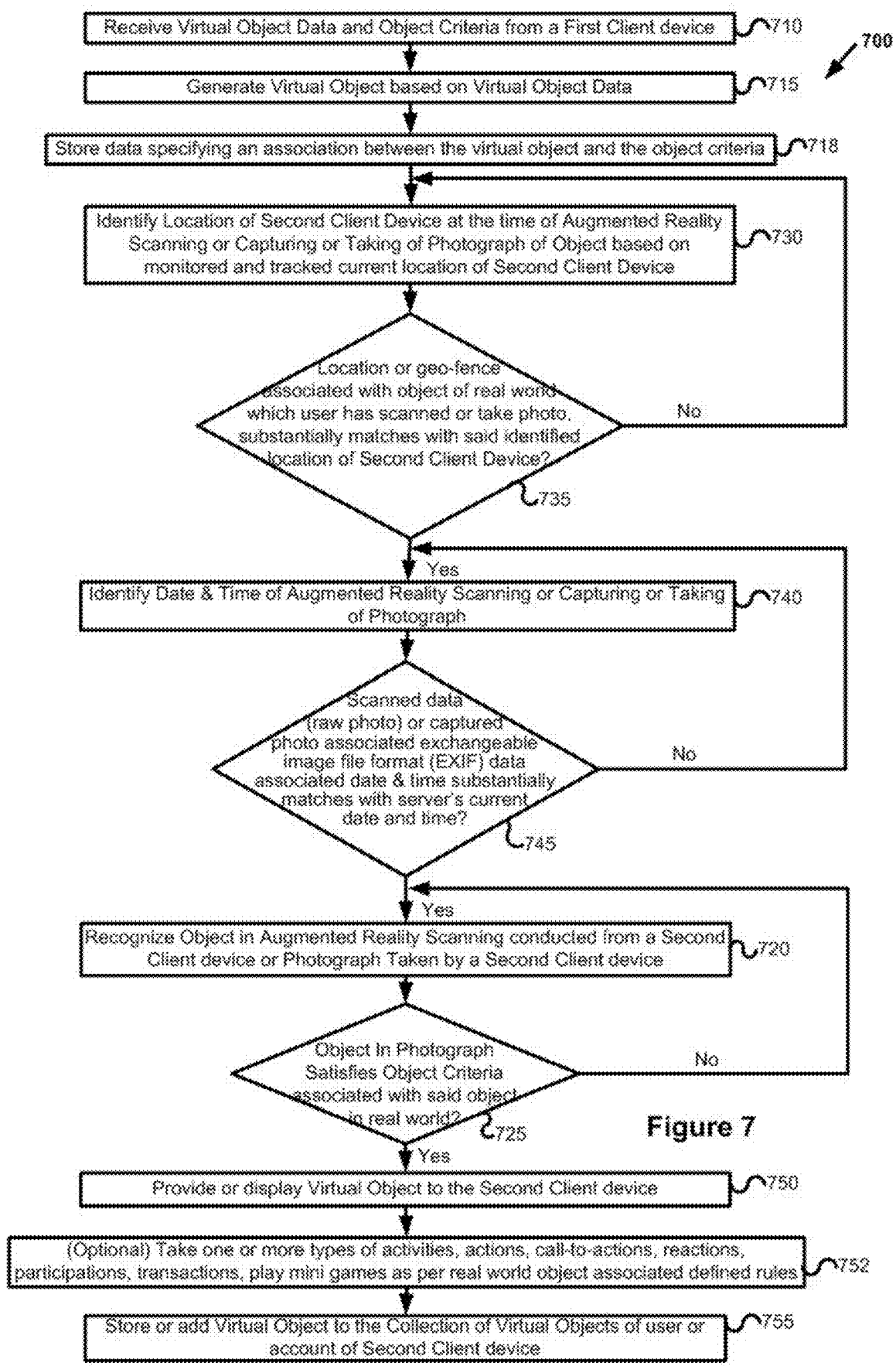
FIG. 7 shows a flow diagram illustrating one example embodiment of an operation of the virtual object publication module.

FIG. 7 shows a flow diagram illustrating one example embodiment of a method 700 of the virtual object publication module 151. At operation 710, the virtual object publication module 151 receives uploaded virtual object data and uploaded object criteria from a first client device. In one example embodiment, operation 710 may be implemented with the virtual object data upload module, the object criteria upload module.

At operation 715, the virtual object engine 153 generates a virtual object based on the uploaded virtual object data, and at operation 718, is associated with the uploaded object criteria.

At operation 730, identify the location of second client device at the time of augmented reality scanning or capturing or taking of photograph of object based on monitored and tracked current location of second client device.

At operation 735, check is made whether scanned or captured photo of object in real world associated location sufficiently matches with said identified location of second client device at the time of augmented reality scanning or capturing or taking of photograph of object or not. If location associated with object of real world which user scanned or take photo sufficiently matches with said identified location of second client device then at operation 740 identify the date & time of augmented reality scanning or capturing or taking of photograph.

At operation 745 check is made whether scanned data (raw photo) or captured photo associated exchangeable image file format (EXIF) Data associated date & time sufficiently or as per rule or settings matches with server's current date and time or not. If scanned data (raw photo) or captured photo associated exchangeable image file format (EXIF) Data associated date & time sufficiently or as per rule or settings matches with server's current date and time then at operation 720, the virtual object engine 153 determines that a photograph has been taken by a second client device and visually searches the photograph in order to perform object recognition on the photograph.

At operation 725, the virtual object engine 153 determines whether a recognized object in the photograph satisfies the uploaded object criteria associated with particular location or place or Global Positioning System (GPS) coordinates, longitude, latitude or address or geo-fence boundary or range of location from the first client device. If not, then the method 700 returns to operation 720 in order to search for more objects in the photograph. If the recognized object does satisfy the uploaded object criteria from the first client device then, at operation 750, displaying, by the server module 153, recognized real world object at particular identified location associated virtual object to the second client device.

FIG. 8 (A) illustrates Graphical User Interface (GUI) of digital interactive map 810 or virtual world user interface 810, wherein user or player 805 can view avatar of player 809 at current location 801 of user device 200 based on monitored and tracked current location of user device 200 by server 110. User can search 804 locations, places, pre-defined objects of real world (discussed in detail in FIGS. 3-6) and can search 804 location or place or pre-defined geo-fence associated pre-defined objects (discussed in detail in FIGS. 3-6) in real world based on one or more search keywords, boolean operators, criteria, filters and advance search options and any combination thereof. User can view search query specific 804 or user's current location 801/809 specific or user's current location 801/809 surround pre-defined real world objects e.g. 808 (discussed in detail in FIGS. 3-6) on real world map 810 or virtual world user interface 810. User can view details 820 about pre-defined real world objects (discussed in detail in FIGS. 3-6) related to particular place 801 on map 810 or virtual world user interface 810, wherein details 820 about said real world object may comprises object name 832, object details verification badge or certification 833, object type or category 835, object place or location or physical address 836, object details 840, and user name 843 who provide details about or defined object and associated statistics and analytics including number of user viewed details about said real world object 808, number of users scanned or capture photo or conduct augmented reality scan of said real world object 808. In an embodiment enabling user or player 805 to report 841 details of real world object 808 as spam or inappropriate or full or partially incorrect. In an embodiment enabling user or player 805 to edit details of real world object 808 and submit to server module 151 for verification and for updating details. In an embodiment enabling user or player 805 to search, select, navigate on map and view one or more real world objects related to one or more locations or places or geo-fence boundaries from map interface or virtual world interface. In an embodiment enabling user or player 805 to find directions and route 827, use step by step guided direction 828 to reach at particular real world object or particular place related to one or more real world objects and view distance from current location, estimated or approximate duration or time to reach there.

In an embodiment after reaching at particular location or place or enter into pre-defined geo-fence related to pre-defined one or more real world objects, FIG. 8 (B) illustrates Graphical User Interface (GUI) 271 for enabling user to augmented reality scanning 874 or scanning the real world object 855 with the camera on the mobile phone 200 using the mobile phone application 271 or illustrates Graphical User Interface (GUI) 272 for taking photograph 872 of the real world object 855 with the camera on the mobile phone 200 using the mobile phone application 271.

FIG. 8 (B) illustrates an example of a publication of a virtual object. The server module 153 of the virtual object application 136 detects that a mobile device 200 has conduct an augmented reality scanning 874 or taken a photograph 855 at particular location 338/336/310 at particular date & time (discuss in detail in FIG. 7) that includes the recognized object 890 or 891 or 892 that corresponds sufficiently to specified object 346 or 348 or 349 and therefore satisfies the object criteria. The server module 153 of the virtual object application 136 retrieves the associated virtual object 366 corresponding to the satisfied object criteria 346 or 348 or 349 associated with pre-defined real world object 325 at particular location or place 338/336/310 and displays the virtual object 851 and associated virtual money 852 to the mobile device 200. The virtual object 851 and associated virtual money 852 may then be stored to user's collection of virtual objects or added to user's account (discuss in detail in FIGS. 22-25). In an embodiment as per defined required user actions 372 associated with real world object 325, user or player 805 need to conduct one or more required activities or actions or call-to-actions or participations or transactions or play mini games to get, collect, acquire, store, win or select said displayed virtual object 851 and associated virtual money 852.

In an embodiment as per defined required rules 376 associated with real world object 325, due to limited number of availability of virtual objects within particular duration associated with particular place, user or player 805 needs to visit virtual object associated place as quickly as possible before other players reach there and get or collect virtual object 851 and associated virtual money 852. Rules may comprise limited number of virtual objects within particular period, need particular level to collect particular type of virtual objects, need particular number of contacts to get virtual objects, need particular number of (e.g. at least 2 team) to compete and then get, decipher clue to unlock, scan particular number of objects (e.g. 5) in particular place or pre-defined geofence boundary within particular period to get virtual objects (e.g. User [Y] conducts augmented reality scanning of particular food item then server identifies said scanned particular food item and if available displays associated virtual object(s) to User [Y] and User [Y] may as per rules plays particular type of disabled mini game or selects or automatically gets one or more displayed virtual object(s). In an embodiment user need to walk and reach at place of real world object associated said virtual object 851 and associated virtual money 852, user must accompanied with at least two contacts or friends, user need to purchase real world object including product or service of said place associated business or sponsor or advertiser or seller and submit digital or scanned receipt to server module 153.

FIG. 9 (A) illustrates Graphical User Interface (GUI) of digital interactive map 910 or virtual world user interface 910, wherein user or player 905 can view avatar of player 909 at current location 901 of user device 200 based on monitored and tracked current location of user device 200 by server 110. User can search 904 locations, places, pre-defined objects of real world (discussed in detail in FIGS. 3-6) and can search 904 location or place or pre-defined geo-fence associated pre-defined objects (discussed in detail in FIGS. 3-6) in real world based on one or more search keywords, boolean operators, criteria, filters and advance search options and any combination thereof. User can view search query specific 904 or user's current location 901/909 specific or user's current location 901/909 surround pre-defined real world objects e.g. 908 (discussed in detail in FIGS. 3-6) on real world map 910 or virtual world user interface 910. User can view details 920 about pre-defined real world objects (discussed in detail in FIGS. 3-6) related to particular place 901 on map 910 or virtual world user interface 910, wherein details 920 about said real world object may comprises object name 932, object details verification badge or certification 933, object type or category 935, object place or location or physical address 936, object details 940, and user name 943 who provide details about or defined object and associated statistics and analytics 944 including number of user viewed details about said real world object 908, number of users scanned or capture photo or conduct augmented reality scan of said real world object 908. In an embodiment enabling user or player 905 to report 941 details of real world object 908 as spam or inappropriate or full or partially incorrect. In an embodiment enabling user or player 905 to search, select, navigate on map and view one or more real world objects related to one or more locations or places or geo-fence boundaries from map interface or virtual world interface. In an embodiment enabling user or player 905 to find directions and route 927, use step by step guided direction 928 to reach at particular real world object or particular place related to one or more real world objects and view distance from current location, estimated or approximate duration or time to reach there.

In an embodiment after reaching at particular location or place or enter into pre-defined geo-fence related to pre-defined one or more real world objects, FIG. 8 (B) illustrates Graphical User Interface (GUI) 271 for enabling user to scanning the real world object 965 with the camera on the mobile phone 200 using the mobile phone application 271 or illustrates Graphical User Interface (GUI) 272 for taking photograph of the real world object 965 with the camera on the mobile phone 200 using the mobile phone application 271.

FIG. 9 (B) illustrates an example of a publication of a virtual object. The server module 153 of the virtual object application 136 detects that a mobile device 200 has taken a photograph 965 at particular location at particular date & time (discuss in detail in FIG. 7) that includes the recognized object 990 that corresponds sufficiently to specified object 446 or 448 or 449 and therefore satisfies the object criteria. The server module 153 of the virtual object application 136 retrieves the associated virtual object 466 corresponding to the satisfied object criteria 446 or 448 or 449 and displays 951 the virtual object 466 to the mobile device 200. The virtual object 951 may then be stored to user's collection of virtual objects or added to user's account (discuss in detail in FIGS. 22-25).

In an embodiment FIG. 9 (C) illustrates an example of a publication of a virtual object. As per defined required user actions 478 associated with real world object 425, user or player 905 need to conduct one or more required activities or actions or call-to-actions or participations or transactions or play mini games to get, collect, acquire, store, win or select said displayed virtual object 951 and associated virtual money 952. In this case, as per defined required user actions 478 user needs to submit digital or scanned receipt to server for getting or collecting or acquiring or storing or adding to user's collection of virtual objects or wining or selecting said displayed virtual object 951 and associated virtual money 952. For example user scans receipt 985 of purchased product 425 or 908 or 965 by tapping or clicking on augmented reality scanning icon or button 991 or view receipt 985 of purchased product 425 or 908 by employing camera application 272/992 or takes or captures 992 photo of receipt 985 of purchased of product 425 or 908 or 965 and submits within pre-set duration of purchase of product or submits within pre-set duration 994 of capture of photo of receipt 985 of purchased of product 425 or 908 or 965 by tapping or clicking on submit icon or button 993. Server module 153 receiving from the user 905/909 scanned or photo of receipt 985 of the purchased product 425 or 908 or 965 and based on received receipt 985, validates the actual purchase of one or more product or service 425 or 908 or 965 by user 905/909 from said business or place of business of sponsor or advertiser 405 including unique business name 975, place or location 976, date & time of purchase 977, amount of purchase 979, quantity and names and details 978 of one or more products or services 425 or 908 or 965, wherein identifying Exchangeable image file format (EXIF) data in scanned or photo of receipt 985 including original date & time of scanned or captured photo of receipt 985 and match said extracted or identified original date & time with server's current date & time to validate or check or verify originality of captured photo 985. Server module 153 also identifies monitored or tracked current location or place of user's device 200 or identifies entered and stays in geo-fence boundary at the time of sending of scanned or photo of receipt 985, identifying or recognizing unique business name 975, place or location 976, date & time of purchase 977, amount of purchase, quantity names and details 978 of one or more products or services 425 or 908 or 965 from received scanned or photo of receipt 985 based on object recognition and Optical Character Recognition (OCR) technologies. Server module 153 validates business based on recognizing business name and location from received scanned or photo of receipt 985 based on object recognition and Optical Character Recognition (OCR) technologies and match said recognized business location or place 515/516/410/436/438 with user device's 200 current location who uploaded or submitted said scanned or photo of receipt 985. After successfully validating originality and details of purchased products, server module 153 displays purchased or scanned product 965 associated virtual objects 951 and associated virtual money 952. In an another embodiment responsive to the client device 200 being within a set distance 520 of the location 515/516/410/436/438 of the particular business in the real world, providing, by the server module 153, said location or place 515/516/410/436/438 associated business 410 associated one or more types of virtual objects or virtual elements or a reward 466/445 or 951/952 to the user or player 905/909.

In an embodiment systems and methods for generating and distributing virtual objects are described. A virtual object publication application 151 receives virtual object data including virtual object image, photo, video, 2D or 3D image, animation, one or more types of multimedia file, brand name, logo 366/466, associated particular number or amount of virtual money or virtual currency or points 364/445, and object criteria 346/348 or 446/448 and location information 336/338/373 or 436/438/515 of associated real world object 315/325/415/425 and generates a virtual object 861/951 based on the said received virtual object data 357 & 394/490. The virtual object 366/466 is associated with satisfaction of the object criteria 346/348 or 446/448. A virtual object engine 153 then identifies that a client device has conducted augmented reality scanning 855/965 or has taken a photograph 855/965 from particular location 801/901 of real world object 808/908 or within pre-set range of location 373/515/520 surround real world object 808/908 or within defined geo-fence boundary 373/515/520 of real world object 808/908. The virtual object engine 153 then provides the virtual object 851/951 to the client device 200 based on the photograph or scanned data or raw photo 855/965 including an object 855/965 that satisfies the object criteria 346/348 or 446/448 and matching location 809/909 of conducted augmented reality scanning or taking or capturing of a photograph with location 801/901 of real world object 808/908 or within pre-set range of location 373/515/520 surround real world object 808/908 or within defined geo-fence boundary 373/515/520 of real world object 808/908. The virtual object 851/951 may then be displayed on a Graphical User Interface (GUI) of the client device 200. The object criteria 346/348 or 446/448 may include associations between an object 808/908 and a source of image data 855/965, for example, a name or a logo or a brand in which case the associated virtual object may include images associated with the product, service, brand, logo, and company of the sponsor.

For example, if the user scans real world object 855 or takes a photograph of real world object 855 and an object in the photograph 855 or scanned data 855 or augmented reality scan associated raw photo 855 is recognized as the pre-defined or pre-configured real world object 325 i.e. Hard Rock Building, virtual objects 366 associated with the said real world object 325 i.e. Hard Rock Building may be provided or displayed 851 to the user on or with the photograph 855.

Third party or external entities including advertisers, sellers, sponsors, vendors, shops, users may, in one example embodiment, create virtual objects 466/445 for displaying for user when user scans or augmented reality scanning real world object 425 then based on recognition of an object 965 satisfying criteria 446/448 specified by the creator or provider 405 of the virtual object(s) 466/445. For example, a photograph 965 including an object 425 recognized as a pizza may result in the user being presented with virtual object 466/445 that overly on or over to the photograph 965 or a photograph 965 including an object recognized as a food type may result in the user being presented with generalized virtual object provided or defined by server administrator (discuss in detail in FIG. 6). Third party entities may also bid (or otherwise purchase opportunities) to have a virtual object(s) included in a set presented to a user for augmentation of a particular photograph. In this example, the virtual object 466/951 may also be constrained by a geo-fence (e.g., geographic boundary) 515 around the availability of real world object 516.

The virtual object application 151 connected or communicated with a virtual object engine 153 that determines that a mobile device 200 has taken a photograph 855/965 and, based on the photograph 855/965 including an object that satisfies the object criteria 346/348 or 446/448, provides the virtual object 366/466 to the client device 200. To this end, the virtual object engine 153 includes an object recognition module configured to find and identify objects in the photograph 855/965; and compare each object against the object criteria 346/348 or 446/448. The object criteria 346/348 or 446/448 may include associations between an object (e.g. 856/857) and a source of image data 855/965.

Using the virtual object publication module 151, the virtual object publication application provides a Graphical User Interface (GUI) 270 (FIG. 3-5) for a user 303/305/405 to upload virtual object data 332/335/336/338/340/366/364 or 432/435/436/438/440/466/445 for generating a virtual object 851 and object criteria 346/348/344 or 446/448/444 for comparing to recognized objects in a photograph 855 or 965. For example, the user may upload an image 366 or 466 for the creation of a virtual object and specify criteria 346/348/344 or 446/448/444 that must be satisfied by an object recognized in the photograph 855 or 965 in order for the virtual object 366 or 366 to be made available to a mobile device 200. Once the user submits the image 366 or 366 and specifies the object criteria 346/348/344 or 446/448/444, the virtual object publication module 151 generates a virtual object 851/951 that includes the image 366/466 and is associated with satisfaction of the specified object criteria 346/348/344 or 446/448/444. As such, mobile devices that have taken a photograph 855/965 including a recognized object that satisfies the specified object criteria 346/348/344 or 446/448/444 may have access to the virtual object 366/466.

The virtual object may include audio and visual content and visual effects. Examples of audio and visual content include pictures, texts, logos, animations, multimedia and sound effects.

FIG. 1 shows a block diagram illustrating one example embodiment of the virtual object application 136. The virtual object application 136 includes a virtual object publication module 151, virtual object information presentation module 152 and a virtual object engine 153.

The virtual object publication module 151 provides a platform for publication of virtual objects. The virtual object publication module 151 enables users of client devices (either mobile or web clients) 200 to upload virtual object data for generating a virtual object and object criteria for comparing against recognized objects in a photograph.

The virtual object engine 153 identifies that a client device (e.g., 200) via client application 270 (FIGS. 8 (B) and 9 (B)) has augmented reality scanning 271 or has taken a photograph 272 and visually searches the photograph in order to recognize objects in the photograph or scanned data or raw photo 855/965. In one example embodiment, the virtual object engine 153 includes an object recognition, face or body recognition, voice recognition and optical character recognition module. The virtual object(s) provided to a client device 200 by the virtual object engine 153 may be based on object criteria 346/348/344 or 446/448/444 determined to be satisfied, via object recognition, face or body recognition, voice recognition and optical character recognition module, by a recognized object in the photograph 855/965 and identifying location of user who scanned real world object or capture a photo of real world object based on monitored or tracked current location of client device 200 (FIG. 8(B) or 9(B)) of user 805 or 905 and matching said identified location with said captured or scanned real world object associated location 338/336 or 438/436.

The object recognition module of the virtual object engine 153 first visually searches the photograph in order to find and identify objects in the photograph 855/965. This may be accomplished via employing already exists object recognition technologies such as SentiSight SDK™, Viola Jones Object Detection Framework™, YOLO™, Clarifai™, Edge matching, Divide-and-Conquer search, Greyscale matching, Histograms of receptive field responses, Large modelbases, gradient matching, etc. The object recognition module of the virtual object engine 153 then compares each recognized object against the specified object criteria to determine if object criteria associated with a particular virtual object have been satisfied and, if so, providing said virtual object to the client device 200. The object criteria may include associations between an object and a source of image data.

FIGS. 3-6 illustrates an example of a GUI for uploading virtual object data and for uploading object criteria with respect to recognized objects in a photograph. The GUI displays an upload object models 346/348/or 446/448, an upload image files 366/466, an object criteria 344 or 444, a virtual object data e.g. 364, and a submit button 388. The upload image files 366/466 enables a user to upload image files, (e.g., a photograph, a graphic, an animation, a multimedia or a video or 2D or 3D image or a music or voice any combination thereof) to the virtual object data upload module of server module 151. The object criteria 346/348/344 or 446/448 or 444 enables the user to upload object criteria by inputting specific requirements that must be satisfied by a recognized object in the photograph. The user can upload a specific object model to be used by the virtual object engine 153 to compare to objects recognized in a photograph. The object criteria are submitted to server module 151. The virtual object data enables the user to submit one or more types of data and metadata, for example a virtual object associated virtual money or virtual currency or text for the virtual object. The user may submit the image files, virtual object data and object criteria by clicking on the submit/verify button 388/589. Once the image files, virtual object data and object criteria are submitted to the server module 151, the publication engine 153 generates and displays a virtual object based on the image files, virtual object data and object criteria.

In an embodiment the positions of players can be monitored or tracked using, for instance, a positioning system (e.g. a Global Positioning System (GPS) system) associated with a player's mobile device. Player position information can be provided to a game server and can be used by the game server to update player locations in the real world map or virtual world. As a result, as the player continuously moves about in a range of coordinates in the real world, the player also continuously moves about in a range of coordinates in the real world map or virtual world. So it enables virtual world geography that correspondences the real world geography. In an embodiment players can view on real world map pre-defined real world objects and associated information (discussed in details in FIGS. 3-6) and can reach there physically or use map's directions, step by step guided direction and route to reach there and conduct augmented reality scanning of real world object or take photo of real world object and in the event of receiving, processing, recognizing, identifying location and date & time of scanning or taking of photo, validating scanned data or raw photo or captured photo of real world object, server application 136 displays virtual objects. In another embodiment players can view on real world map pre-defined real world geofence) and can reach there physically or use map's directions, step by step guided direction and route to reach there and server module 136 randomly displays virtual objects based on one or more types of factors, rules, settings, preferences and user's data, which user can view on real world map within defined geo-fence boundary and can get, win, battel to get, capture, select, play mini game and get, conduct one or more types of rule specific tasks, activities, actions, call-to-actions, participations, transactions and get. After getting or collecting or acquiring or wining or capturing or selecting of one or more virtual objects from said pre-defined geo-fence boundary server module 136 stores or adds said virtual objects to user's collections of virtual objects or associate with user's account.

The real world objects or elements or items or scene can associate with virtual objects or elements or items or money or currencies by defining real world object (discussed in detail in FIG. 3-6), so player can reach said defined real world object associate place in real world and can scan or collect associated virtual objects. Linking real world objects or elements with virtual elements in the virtual environment, creates interests among players to conduct one or more types of physical world activities, actions, participations, transactions and communications. For instance, as players navigate geographic coordinates in the real world, the players can discover and interact with or decipher real world objects and in the event of augmented reality scanning or taking of photo, player is presented with virtual objects or virtual elements or virtual money or player is presented with virtual objects or virtual elements or virtual money surprisingly or anywhere within pre-defined geo-fence boundary.

In some embodiments, one or more types of computing device including smart mobile phone may obtain an image of the object. The image may be obtained by scanning the object, taking one or more pictures of the object, etc. For example, the user may use a camera to augmented reality scan or scan or take a picture, a photograph of the object and may send the image of the object to the server and/or may store the image of the object locally (e.g., in a local database).

FIGS. 10-14 illustrates various examples according to an exemplary embodiment of the present disclosure.

Figure 10:
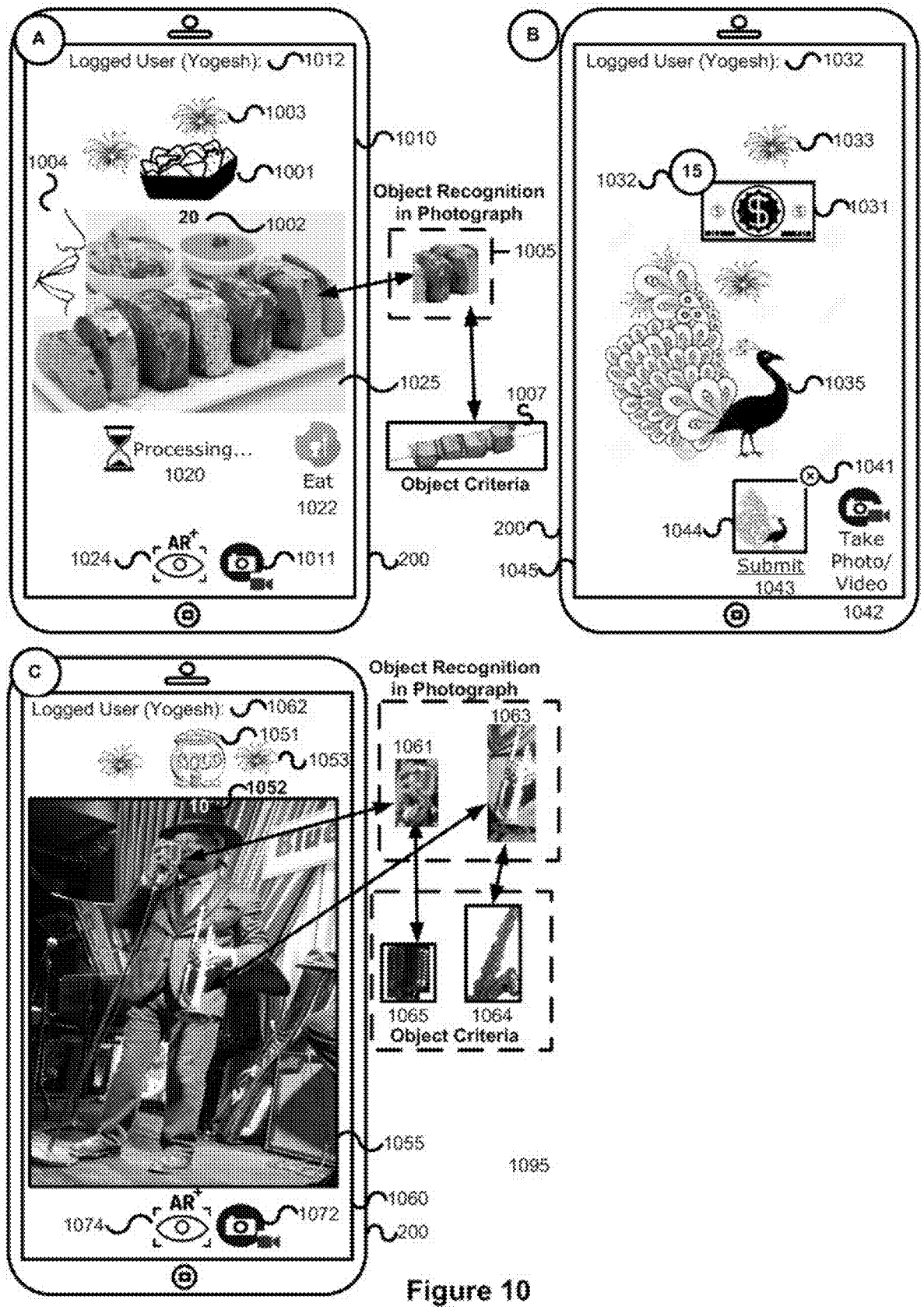

FIG. 10 (A) illustrates an example of a publication of a virtual object. The server module 153 of the virtual object application 136 detects that a mobile device 200 has conduct an augmented reality scanning 1024 or taken a photograph 1025 originally at particular date & time that includes the recognized object 1005 that corresponds sufficiently to specified object 1007 and therefore satisfies the object criteria. The server module 153 of the virtual object application 136 retrieves the associated virtual object 1001 corresponding to the satisfied object criteria 1007 (i.e. related to particular general food item or menu item which may available in many restaurants and not tied or related with or defined by particular advertiser or brand or place or seller or restaurant) and displays the virtual object 1001 and associated virtual money 1002 to the mobile device 200. The virtual object 1001 and associated virtual money 1002 may then be stored to user's collection of virtual objects or added to user's account (discuss in detail in FIGS. 22-25). In an embodiment as per defined required user actions associated with virtual object 1001 or object criteria 1007, user or player 1012 needs to conduct one or more required activities or actions or call-to-actions or participations or transactions or play mini games to get, collect, acquire, store, win or select said displayed virtual object 851 and associated virtual money 852. For instance in this example user require to play mini game 1022 which pre-define or pre-associated with said the virtual object 1001 and associated virtual money 1002. In the event of clicking or tapping on mini game icon 1022, user is presented with movable mouth with character 1004. User can drag, move said displayed movable mouth with character 1004 anywhere on photo and in the event of move on photo 1025, part of photo removed creates illusion like user eating food item depicted in captured photo of real world food item and in the event of completely or sufficiently removing food item depicted in captured photo of real world food item, user may get the virtual object 1001 and associated virtual money 1002 and the virtual object 1001 and associated virtual money 1002 may then be stored to user's collection of virtual objects or added to user's account (discuss in detail in FIGS. 22-25).

In an embodiment while augmented reality scanning, server module 153 may automatically capture, receives, processes, automatically associate one or more types of data and metadata including user identity, recognized object associated identified keywords, categories and said identified keywords, categories associated information, associated virtual object(s) and/or particular amount or number of virtual money, digital receipt if submitted by user and associated recognized information based on object or optical character recognition, date & time of capturing and receiving photo, identified location or place while capturing of photo based on monitored and tracked current location of user device while capturing of photo and stores said photo and associated details for alter retrieval and presentation.

FIG. 10 (B) illustrates an example of a publication of a virtual object. The server module 153 of the virtual object application 136 detects that a mobile device 200 has taken a photograph 1035 at particular location at particular date & time (discuss in detail in FIG. 7) that includes the recognized object 1035 that corresponds sufficiently to specified object 1035 and therefore satisfies the object criteria. The server module 153 of the virtual object application 136 retrieves the associated virtual object 10331 corresponding to the satisfied object criteria 1035 and displays the virtual object 1031 to the mobile device 200. The virtual object 1031 may then be stored to user's collection of virtual objects or added to user's account (discuss in detail in FIGS. 22-25).

FIG. 10 (C) illustrates an example of a publication of a virtual object. The server module 153 of the virtual object application 136 detects that a mobile device 200 has conduct an augmented reality scanning 1074 on object 1055 or taken a photograph 1055 originally at particular date & time that includes the one or more recognized objects 1061/1062, wherein recognized object 1061 that corresponds sufficiently to specified object 1065 and recognized object 1063 that corresponds sufficiently to specified object 1064 and therefore satisfies the object criteria. The server module 153 of the virtual object application 136 retrieves the associated virtual object 1051 corresponding to the satisfied object criteria 1065/1064 and displays the virtual object 1051 and associated virtual money 1052 to the mobile device 200. The virtual object 1051 and associated virtual money 1052 may then be stored to user's collection of virtual objects or added to user's account (discuss in detail in FIGS. 22-25). In an embodiment based on recognition of face of artist, detection of song and/or music based on voice recognition, recognition of music instruments based on object recognition and identification of type of place where user originally captured photo or conducted augmented reality scanning and any combination thereof, system identifies that user is conducting particular type of physical world activity including viewing of orchestra or music or music or singing show at particular identified or relevant place (e.g. hotel, club, restaurant, event, show, drama, orchestra, play, party) and providing said recognized or identified or guessed or determined activity type associated one or more types of virtual objects and/or virtual money. In an embodiment as per defined required user actions associated with virtual object 1051 or object criteria 1064/1065, user or player 1062 needs to conduct one or more required activities or actions or call-to-actions or participations or transactions or play mini games to get, collect, acquire, store, win or select said displayed virtual object 1051 and associated virtual money 1052.

In an embodiment server module 153 monitors and tracks and recognizes one or more types of user's activities and actions including monitoring and tracking walking of particular number of steps or miles or kilometers by user based on user device associated sensors, plying sports, singing song, playing music by using music instruments at particular type of location or place (class, club, event, show, theatre) for particular duration, identify that user check in at particular named or type of place (movie or drama theater, event, restaurant, hotel, club, class, mall, shop) or detect traveling via cruise, cab, bus, train, flight based on speed change of user's location within particular duration and stay for particular duration based on monitored and tracked current location or place of user device and accessing place associated information, identify user's participations at particular named or type of event based on monitored and tracked current location or place of user device and accessing event associated information, detecting of conducting of transactions by user based on linking with seller's system or database, identifying user provided status, identification of festival, user's birthday, anniversary, party, event at particular date and displays activity type and/or user data specific one or more types of virtual objects and/or virtual money.

Figure 11:
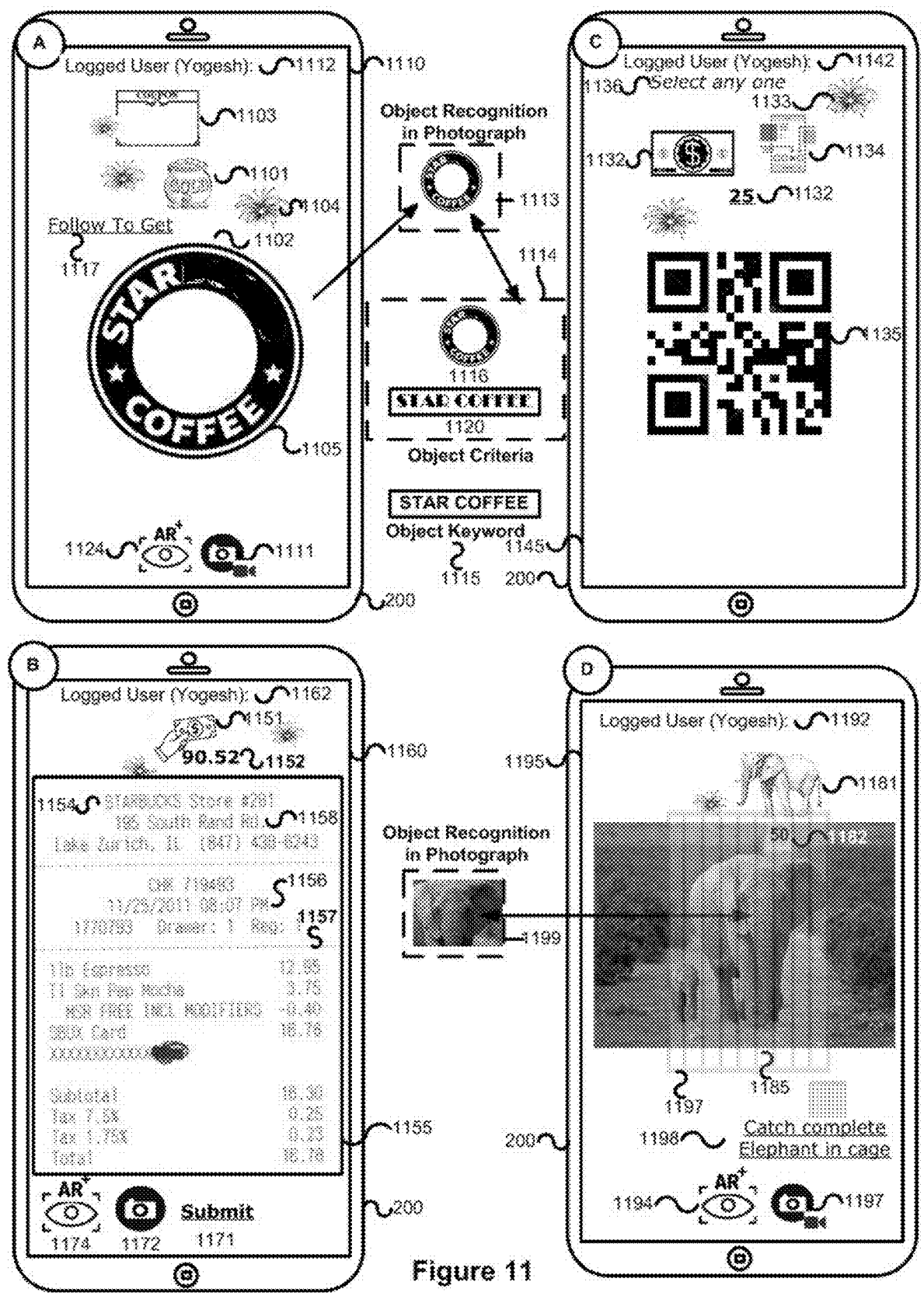

FIG. 11 (A) illustrates an example of a publication of a virtual object. The server module 153 of the virtual object application 136 detects that a mobile device 200 has conduct an augmented reality scanning 1124 of the real world object e.g. logo of particular brand 1105 or taken a photograph 1111 of the real world object e.g. logo of particular brand 1105 originally at particular date & time that includes the recognized object 1113 that corresponds sufficiently to any specified object 1114 within set of object criteria and therefore satisfies the object criteria. The server module 153 of the virtual object application 136 retrieves the associated virtual object 1101 corresponding to the satisfied object criteria 1116 and displays the virtual object 1101 and associated virtual money 1102 and associated one or more types of offer e.g. coupon 1103 to the mobile device 200. The virtual object 1101 and associated virtual money 1102 and associated one or more types of offer e.g. coupon 1103 may then be stored to user's collection of virtual objects or added to user's account (discuss in detail in FIGS. 22-25). In an embodiment as per defined required user actions associated with virtual object 1101 or object criteria 1114, user or player 1112 needs to conduct one or more required activities or actions or call-to-actions or participations or transactions or play mini games to get, collect, acquire, store, win or select said displayed virtual object 1101 and associated virtual money 1102 and associated one or more types of offer e.g. coupon 1103. For instance in this example user require to follow particular brand or place of business product or service or company or person 1117 which pre-define or pre-associated with said the virtual object 1101, associated virtual money 1102, associated one or more types of offer e.g. coupon 1103 and object criteria 1114. In the event of following by clicking or tapping on follow button or icon 1117, user get the virtual object 1101 and associated virtual money 1102 and associated one or more types of offer e.g. coupon 1103 and may then be stored to user's collection of virtual objects or added to user's account (discuss in detail in FIGS. 22-25). In an embodiment user can redeem said coupon 1103 in real world. In an embodiment user need to scan at particular place of business to get particular type of virtual object and/or offers. In an embodiment user can scan brand name, brand logo from any real world object including item, product, electrified board, board, receipt to get particular type of virtual object and/or offers, wherein based on object keyword 1115 system recognizes name of brand based on Optical Character Recognition (OCR) to identify object keyword 1115 and identify associated particular type of virtual object(s) 1102/1103 and/or offers 1103. In an embodiment server 110 stores user specific virtual objects or enable particular identified sponsor or advertiser or user to provide specific or different virtual objects including virtual money, virtual reward including coupon, offer, discount, redeemable points, voucher, cashback offer for different set of users of network or to selected or provided particular one or more identified users of network or types of users of network.

In an embodiment FIG. 11 (B) illustrates an example of a publication of a virtual object. In the event of submitting digital or scanned receipt to server module 153 for getting or collecting or acquiring or storing or adding to user's collection of virtual objects 1151 or wining or selecting said displayed virtual object 1151 and associated virtual money 1152. For example user scans receipt 1155 of particular purchased product by tapping or clicking on augmented reality scanning icon or button 1174 or view receipt 1155 of purchased product by employing camera application 272/1172 or takes or captures 1172 photo of receipt 1155 purchased of particular product and submits within pre-set duration of purchase of particular product by tapping or clicking on submit icon or button 1171. Server module 153 receiving from the user 1162 scanned or photo of receipt 1155 of the purchased particular product and based on received receipt 1155, server module 153 validates the actual purchase of one or more product or service by user 1162 from said receipt associated identified business or place of business of sponsor or advertiser including unique business name 1154, place or location of business 1158, date & time of purchase 1156, amount of purchase, quantity and names and details 1157 of one or more products or services, wherein identifying Exchangeable image file format (EXIF) data in scanned or photo of receipt 1155 including original date & time of scanned or captured photo of receipt 1155 and match said extracted or identified original date & time with server's current date & time to validate or check or verify originality of captured photo 1155. Server module 153 also identifies monitored or tracked current and visited locations or places of user's device 200 or identifies entered and stays in geo-fence boundary, identifying or recognizing unique business name 1154, place or location 1158, last four digit of debit or credit card, date & time of purchase 1156, amount of purchase, quantity names and details 1157 of one or more products or services from received scanned or photo of receipt 1155 based on object recognition and Optical Character Recognition (OCR) technologies. Server module 153 validates business based on recognizing business name and location from received scanned or photo of receipt 1155 based on object recognition and Optical Character Recognition (OCR) technologies and match said recognized business location or place with logged user visited locations or places or user device's 200 current location who uploaded or submitted said scanned or photo of receipt 1155. Server module 153 matches scanned receipt associated identified last four digit of debit or credit card based on Optical Character Recognition (OCR) with last four digit of debit or credit card associated with user profile. After successfully validating originality and details of purchased products, server module 153 displays purchased product associated virtual objects including one or more types of offers, voucher, coupon, discount, redeemable points, cash back offer, deal 1151 and associated virtual money 1152.

FIG. 11 (C) illustrates an example of a publication of a virtual object. The server module 153 of the virtual object application 136 detects that a mobile device 200 has conducted augmented reality scanning or taken a photograph 1135 at particular location at particular date & time (discuss in detail in FIG. 7) that includes the recognized or interpreted object including one or more types of code including barcode or QRcode (Quick Response Code). The server module 153 of the virtual object application 136 interprets associated code and identifies and retrieves associated virtual object 1132/1134 and displays said virtual objects 1132/1134 to the mobile device 200. In an embodiment user need to select any one of or particular number of virtual objects from displayed virtual objects 1132/1134. The virtual object or selected virtual object 1132/1134 may then be stored to user's collection of virtual objects or added to user's account (discuss in detail in FIGS. 22-25). In an embodiment a barcode is a machine-readable optical label that contains information about the item to which it is attached. A QR code consists of black squares arranged in a square grid on a white background, which can be read by an imaging device such as a camera, and processed using Reed-Solomon error correction until the image can be appropriately interpreted. The required data is then extracted from patterns that are present in both horizontal and vertical components of the image. A smartphone is used as a QR code scanner, displaying the code and converting it to some useful form (such as identify associated virtual objects). QR codes also may be linked to a location to track where a code has been scanned. Either the application that scans the QR code retrieves the geo information by using Global Positioning System (GPS) and cell tower triangulation (aGPS) or the URL encoded in the QR code itself is associated with a location. In an embodiment server module 153 matches location of scanned code with monitored or tracked user device's current location to authentic or verify code scanning.

FIG. 11 (D) illustrates an example of a publication of a virtual object. The server module 153 of the virtual object application 136 detects that a mobile device 200 has conduct an augmented reality scanning 1194 of real world object (e.g. elephant) 1185 or taken a photograph 1185 originally at particular date & time anywhere or within particular pre-defined geo-fence boundary 685 that includes the recognized object 1199 that corresponds sufficiently to specified object 646/648 and therefore satisfies the object criteria 646/648. The server module 153 of the virtual object application 136 retrieves the associated virtual object 666/1181 corresponding to the satisfied object criteria 646/648 and displays the virtual object 666/1181 and associated virtual money 664 to the mobile device 200. The virtual object 666/1181 and associated virtual money 664/1182 may then be stored to user's collection of virtual objects or added to user's account (discuss in detail in FIGS. 22-25). In an embodiment as per defined required user actions associated with virtual object 666/664 or object criteria 646/648, user or player 1192 needs to conduct one or more required activities or actions or call-to-actions or participations or transactions or play mini games to get, collect, acquire, store, win or select said displayed virtual object 666/1181 and associated virtual money 664/1182. For instance in this example user require to play mini game 677 which pre-define or pre-associated with said the virtual object 666 and associated virtual money 664. In the event of clicking or tapping on mini game icon 1198, user is presented with cage or auto movable or changing of position on camera screen 1197. User need to completely capture elephant, since elephant is sometimes running, user need to quickly augmented reality scanning of or capture photo of complete elephant and in the event of augmented reality scanning of or capturing photo of complete elephant or recognizing that complete elephant caught in cage or seen within cage, then user gets the virtual object 1181 and associated virtual money 1182 and the virtual object 1181 and associated virtual money 1182 may then be stored to user's collection of virtual objects or added to user's account (discuss in detail in FIGS. 22-25).

In an embodiment due to defining of real world object and associating location or place information with real world object and associating virtual objects with real world object at particular defined location or place, server module 153 recognizes objects in submitted scanned data or raw photo or capture photo of said defined real world object and matches only with said real world object associated object criteria and does not need to matches with all object criteria in database, so it will saves server resources substantially. In an embodiment server monitors and tracks location of user device only after user scans or conducted augmented reality scanning or capture photo and submits to server module 153 and after receiving submitted scanned data or capture photo of real world object, server module 153 request user to starts location service of user device 200 if location service not started or if location service already started then use location service of user device 200 only after receiving of scanned data or capture photo of real world object, so it will saves server resources substantially.

Figure 12:
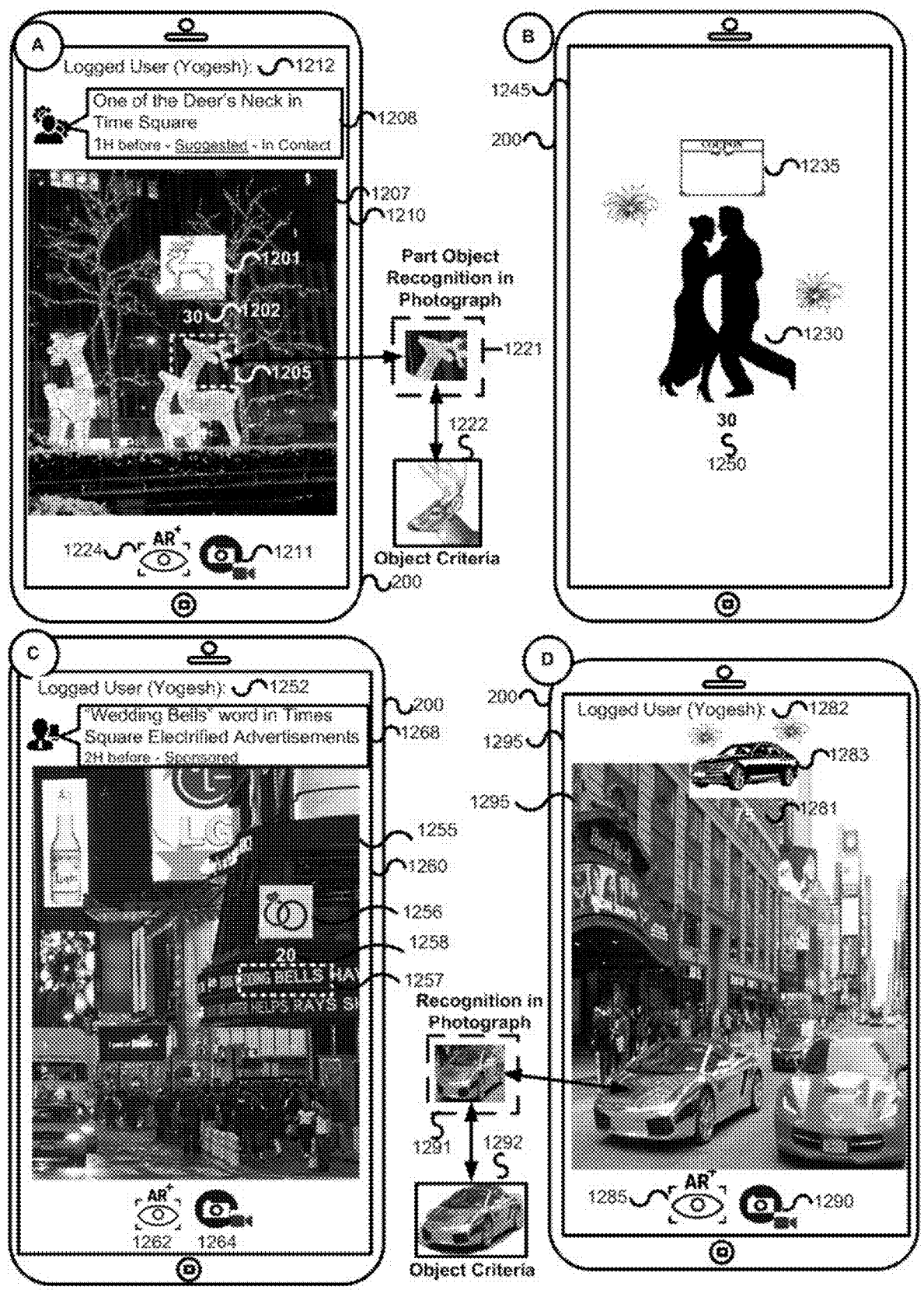

In an embodiment user can define real world object, can make available for scan said object only for contacts, provide associate object criteria and can hide said location of said defined object on map (discuss in FIG. 3) and send message to one or more contacts, wherein message comprises description, tips or clue to find said particular object. For example user 1212 received message "One of the Deer's Neck in Time Square" from one of the contacts of user. Based on that, user 1212 find out and reach to displayed "Deer" in Times Square and starts augmented scanning 1224 of each deer's neck until user or player 1212 popups or show particular deer's neck e.g. 1205 associated virtual object 1201. FIG. 12 (A) illustrates an example of a publication of a virtual object. The server module 153 of the virtual object application 136 detects that a mobile device 200 has conduct an augmented reality scanning 1205 or taken a photograph 1205 of part of scene or object in real world originally at particular date & time that includes the recognized object 1221 that corresponds sufficiently to specified object 1222 and therefore satisfies the object criteria. The server module 153 of the virtual object application 136 retrieves the associated virtual object 1201 corresponding to the satisfied object criteria 1222 and displays the virtual object 1201 and associated virtual money 1202 to the mobile device 200. The virtual object 1201 and associated virtual money 1202 may then be stored to user's collection of virtual objects or added to user's account (discuss in detail in FIGS. 22-25). In an embodiment as per defined required user actions associated with virtual object 1201 or object criteria 1222, user or player 1212 needs to conduct one or more required activities or actions or call-to-actions or participations or transactions or play mini games to get, collect, acquire, store, win or select said displayed virtual object 1201 and associated virtual money 1202.

In an embodiment sponsor or advertiser user can define real world object or scene e.g. movable characters found in electrified board, can make available for scan said object only for invitees, provide associate object criteria and can hide said location of said defined object on map (discuss in FIG. 4) and send message to one or more contextual users of network including customers or prospective customers at present visiting particular location, wherein message comprises description, tips or clue to find said particular object. For example user 1252, received a message "Wedding Bells" words in Times Square Electrified Advertisements" from sponsor. Based on that, user 152 find out and reach electrified board at Times Square which displays "Weeding Bells" and augmented scanning 1262 said word 1257 with intention to get associated virtual object 1256. FIG. 12 (C) illustrates an example of a publication of a virtual object. The server module 153 of the virtual object application 136 detects that a mobile device 200 has conduct an augmented reality scanning part of scene or object in real world 1257/1255 or augmented reality scanning scene which contains said word "Weeding Bell" or taken a photograph 1255 of part of scene or object or scene which contains said word "Weeding Bell" in real world originally at particular date & time that includes the recognized word "Weeding Bell" based on Optical Character Recognition (OCR) and therefore satisfies the object criteria. The server module 153 of the virtual object application 136 retrieves the associated virtual object 1256 corresponding to the satisfied object criteria i.e. word "Weeding Bell" and displays the virtual object 1256 and associated virtual money 1258 to the mobile device 200. The virtual object 1256 and associated virtual money 1258 may then be stored to user's collection of virtual objects or added to user's account (discuss in detail in FIGS. 22-25). In an embodiment as per defined required user actions associated with virtual object 1256, user or player 1252 needs to conduct one or more required activities or actions or call-to-actions or participations or transactions or play mini games to get, collect, acquire, store, win or select said displayed virtual object 1256 and associated virtual money 1258.

In an another embodiment FIG. 12 (B) illustrates user interface wherein based on monitoring and tracking of one or more types of user's physical world and digital activities, actions, participations, check in place, transactions, status, reactions, communications, and sharing, notifying to user about receiving of one or more types of virtual objects 1230, virtual money 1250, virtual elements, virtual power, virtual goods, virtual rewards including redeemable points, voucher or coupon 1235.

In an another example user [Lily] defines real world object (e.g. "Bentley Car") by using user interface discussed in FIG. 3 or 5), wherein can provide photo of car, car details, In this instance user does not provide location information of car, provide schedules, required one or more types of actions, call-to-actions, rules and play particular type of mini game provides object criteria, and associated virtual objects. After defining, submitting, making of payment to server module 151 and after successfully verification by server module 151, server module 151 makes them available for users as per preferences and settings of definer. FIG. 12 (D) illustrates an example of a publication of a virtual object. The server module 153 of the virtual object application 136 detects that a mobile device 200 has conduct an augmented reality scanning of real world object 1295 (e.g. "Bentley Car" moving or stopped during signal on road) or taken a photograph 1295 by tapping on photo capture icon 1290 that includes the recognized object 1291 that corresponds sufficiently to specified object 1292 and therefore satisfies the object criteria 1292. The server module 153 of the virtual object application 136 retrieves the associated virtual object 1283 corresponding to the satisfied object criteria 1292 and displays the virtual object 1282 and associated virtual money 1281 to the mobile device 200. The virtual object 1282 and associated virtual money 1181 may then be stored to user's collection of virtual objects or added to user's account (discuss in detail in FIGS. 22-25). In an embodiment as per defined required user actions associated with virtual object 1283 or object criteria 1292, user or player 1182 needs to conduct one or more required activities or actions or call-to-actions or participations or transactions or play mini games to get, collect, acquire, store, win or select said displayed virtual object 1283 and associated virtual money 1281. In an embodiment server module 153, validates scanning of actual car based on recognition of car number (provided at the time of diffing real world object (said car), monitored or tracked current location of device of scanner and monitored or tracked current location of device of driver or passenger(s) who seated inside car.

Figure 13:
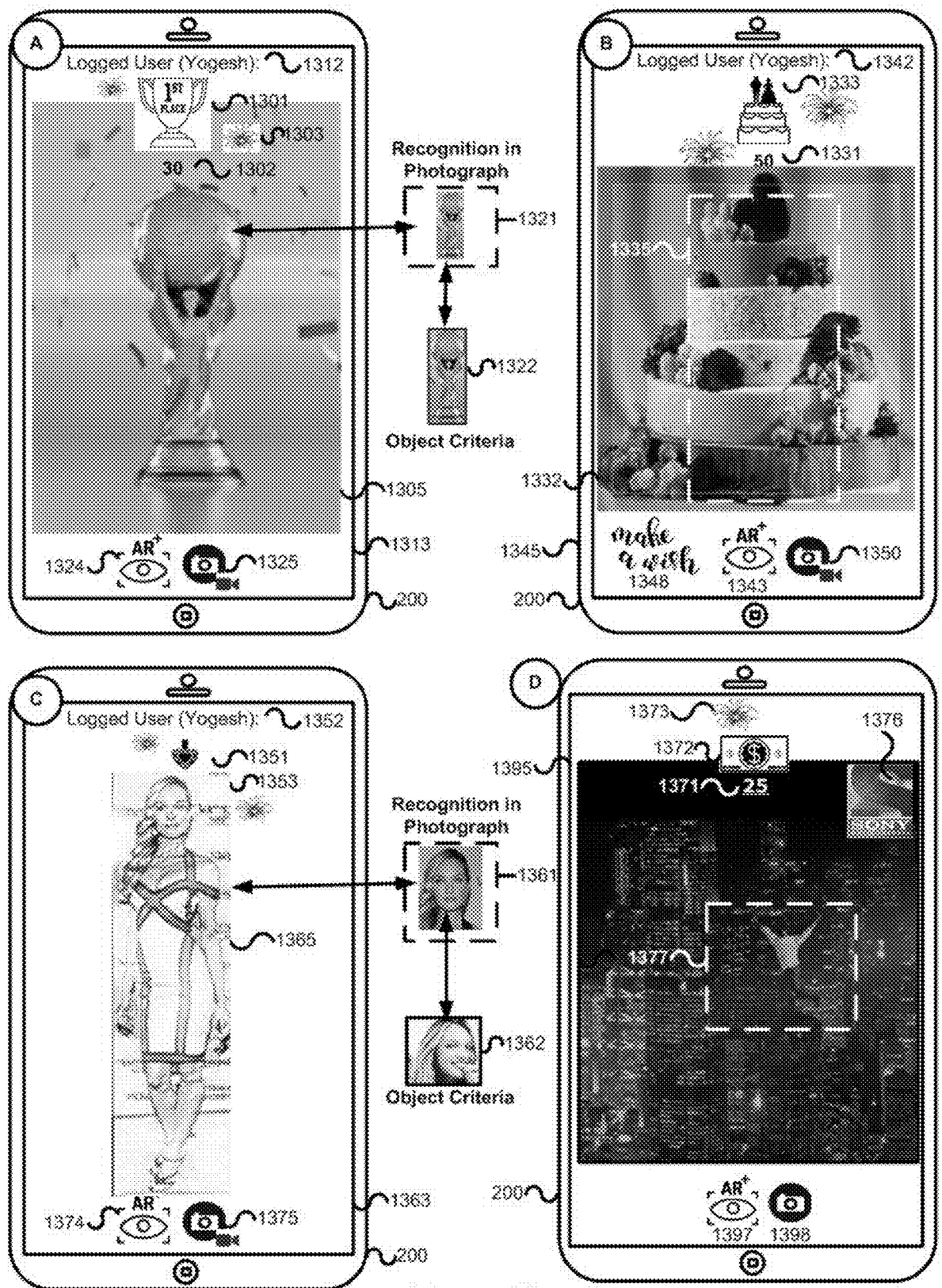

FIG. 13 (A) illustrates an example of a publication of a virtual object. The server module 153 of the virtual object application 136 detects that a mobile device 200 has conduct an augmented reality scanning 1324 of particular real world object e.g. Trophy 1305 or taken a photograph 1325 of particular real world object e.g. Trophy 1305 at particular location or at particular location at particular date & time by authorized users including contacts, invited users or team members or their family members or fans or visitors or viewers pre-defined by object definer or object provider or authorized administrator (discuss in detail in FIGS. 3 and 7) that includes the recognized object 1321 that corresponds sufficiently to specified object 1322 and therefore satisfies the object criteria. The server module 153 of the virtual object application 136 retrieves the associated virtual object 1301 corresponding to the satisfied object criteria 1322 associated with pre-defined real world object at particular location or place and displays the virtual object 1301 and associated virtual money 1302 to the mobile device 200. The virtual object 1301 and associated virtual money 1302 may then be stored to user's collection of virtual objects or added to user's account (discuss in detail in FIGS. 22-25). In an embodiment as per defined required user actions associated with real world object, user or player 1312 need to conduct one or more required activities or actions or call-to-actions or participations or transactions or play mini games to get, collect, acquire, store, win or select said displayed virtual object 1301 and associated virtual money 1302.

In an embodiment in the event of entering at particular location or place or geofence boundary, a notification is send to user about said place or geofence associated real world objects for enabling user to scan or conduct augmented reality said place or geofence associated real world objects to get associated virtual objects.

FIG. 13 (B) illustrates an example of a publication of a virtual object. The server module 153 of the virtual object application 136 detects that a mobile device 200 has conduct an augmented reality scanning 1332 of particular real world object e.g. Cake 1332 or taken a photograph 1332 of particular real world object e.g. Cake 1332 within pre-defined said real world object (e.g. Cake) associated geofence boundary (so birthday party attendee can scan cake and write birthday wishes and gets associated virtual object) at particular date & time by authorized users including contacts, invited users, relative and their family members pre-defined by object definer or object provider or authorized administrator (discuss in detail in FIGS. 3 and 7) that includes the recognized object 1335 that corresponds sufficiently to specified object 1332 and therefore satisfies the object criteria. The server module 153 of the virtual object application 136 retrieves the associated virtual object 1333 corresponding to the satisfied object criteria 1332 associated with pre-defined real world object (e.g. Cake) within pre-defined said real world object (e.g. Cake) associated geofence boundary at particular date & time and displays the virtual object 1333 and associated virtual money 1331 to the mobile device 200. The virtual object 1333 and associated virtual money 1331 may then be stored to user's collection of virtual objects 1333/1331 or added to user's account (discuss in detail in FIGS. 22-25). In an embodiment as per defined required user actions associated with real world object, user or player 1314 needs or require to conduct one or more required activities or actions or call-to-actions or participations or transactions or play mini games to get, collect, acquire, store, win or select said displayed virtual object 1333 and associated virtual money 1331. For example after scanning of cake 1332 by birthday party attendee 1342, instructing said attendee 1342 to write birthday wishes 1348 which will send to birthday user [e.g. Amita] to get said displayed virtual objects 1333/1331.

FIG. 13 (C) illustrates an example of a publication of a virtual object. The server module 153 of the virtual object application 136 detects that a mobile device 200 has conduct an augmented reality scanning 1324 of particular real world person e.g. celebrity 1365 or taken a photograph 1365 of particular real world person e.g. celebrity 1365 at particular location or at particular location of identified event at particular date & time by authorized users including attendee, visitors, guests, members, ticket holders, invited users, wherein said real world person pre-defined by object definer or object provider or authorized administrator (discuss in detail in FIGS. 3 and 7) that includes the recognized object or person 1361 that corresponds sufficiently to specified object 1362 and therefore satisfies the object criteria. The server module 153 of the virtual object application 136 retrieves the associated virtual object 1351 corresponding to the satisfied object criteria 1362 associated with pre-defined real world object or person at particular location of pre-defined or identified event or place and displays the virtual object 1351 and associated virtual money 1352 to the mobile device 200. The virtual object 1351 and associated virtual money 1352 may then be stored to user's collection of virtual objects or added to user's account (discuss in detail in FIGS. 22-25). In an embodiment as per defined required user actions associated with virtual objects associated with real world object or person, user or player 1352 need to conduct one or more required activities or actions or call-to-actions or participations or transactions or play mini games to get, collect, acquire, store, win or select said displayed virtual object 1351 and associated virtual money 1353. Server module 153 identifies place of event, date & time of event, place and date and time of augmented reality scanning of human face or body 1365 based on associated EXIF data, identify celebrity based on face or body parts recognition techniques and based on identification of face identify associated name of celebrity and after that server module 151 displays or provided associated one or more types of virtual objects and virtual money. In an another embodiment user can define person and associated virtual objects, criteria, schedules, geofence boundary or location, required actions to get said displayed virtual objects in the event of conducting of augmented reality scans or taking of picture of said person and allow invitee and attendee of said particular place or event or geofence boundary to scan said pre-defined person and get associated virtual objects, virtual money virtual rewards and virtual gifts or virtual lucky gifts different for different user or limited gifts available based on first scan first get gift basis, wherein virtual rewards and virtual gifts may redeemable in real world and event may comprises birthday, marriage, anniversary, party and one or more types of events.

In an embodiment AR scanning 1374/1365 overlays digital imagery 1351 into the results of a mobile device scan 1374/1365. This means that system can superimpose graphics, animation, and other virtual content 1351 on the screen 1363 of a smartphone 200, tablet or wearable device when a user scanned 1374/1365.

FIG. 13 (D) illustrates an example of a publication of a virtual object. The server module 153 of the virtual object application 136 detects that a mobile device 200 has conduct an augmented reality scanning 1385 or record a video or taken a photograph 1385 while watching of particular television program or serial 1385. In the event of augmented reality scanning 1397 or scanning via camera application 1398 of user device, said television program or serial 1385, receiving photo or image or video or scanned data 1385 from the user device. The server module 153 of the virtual object application 136 validates actual or original date and time of received scanned data or captured photograph or image 1385 based on sufficiently matching received scanned data or a photograph or image 1385 associated Exchangeable image file format (EXIF) data including date and time of capturing photo or scanning 1385 with current date and time of server. The server module 153 of the virtual object application 136 identifies or recognizes television program or serial channel name and identity 1376 based on recognizing logo 1376 of television channel 1376 based on object recognition and Optical Characters Recognition (OCR) techniques. The server module 153 of the virtual object application 136 identifies or recognizes an object in the photograph or scanned data that corresponds sufficiently to specified object 1377 and therefore satisfies the object criteria 1377. Based on the identified object satisfying the object criteria 1377 including object model or image or object keywords associated with the virtual object in the stored data, display or provide the virtual object 1372 and associated virtual money 1371 to the client device. Storing virtual objects 1372 and associated virtual money 1371 provided to the client device in a virtual object collection associated with the client device 200. In an embodiment as per defined required user actions associated with virtual object 1371 or object criteria 1377, user or player needs to conduct one or more required activities or actions or call-to-actions or participations or transactions or play mini games to get, collect, acquire, store, win or select said displayed virtual object 1371 and associated virtual money 1372.

Figure 14:
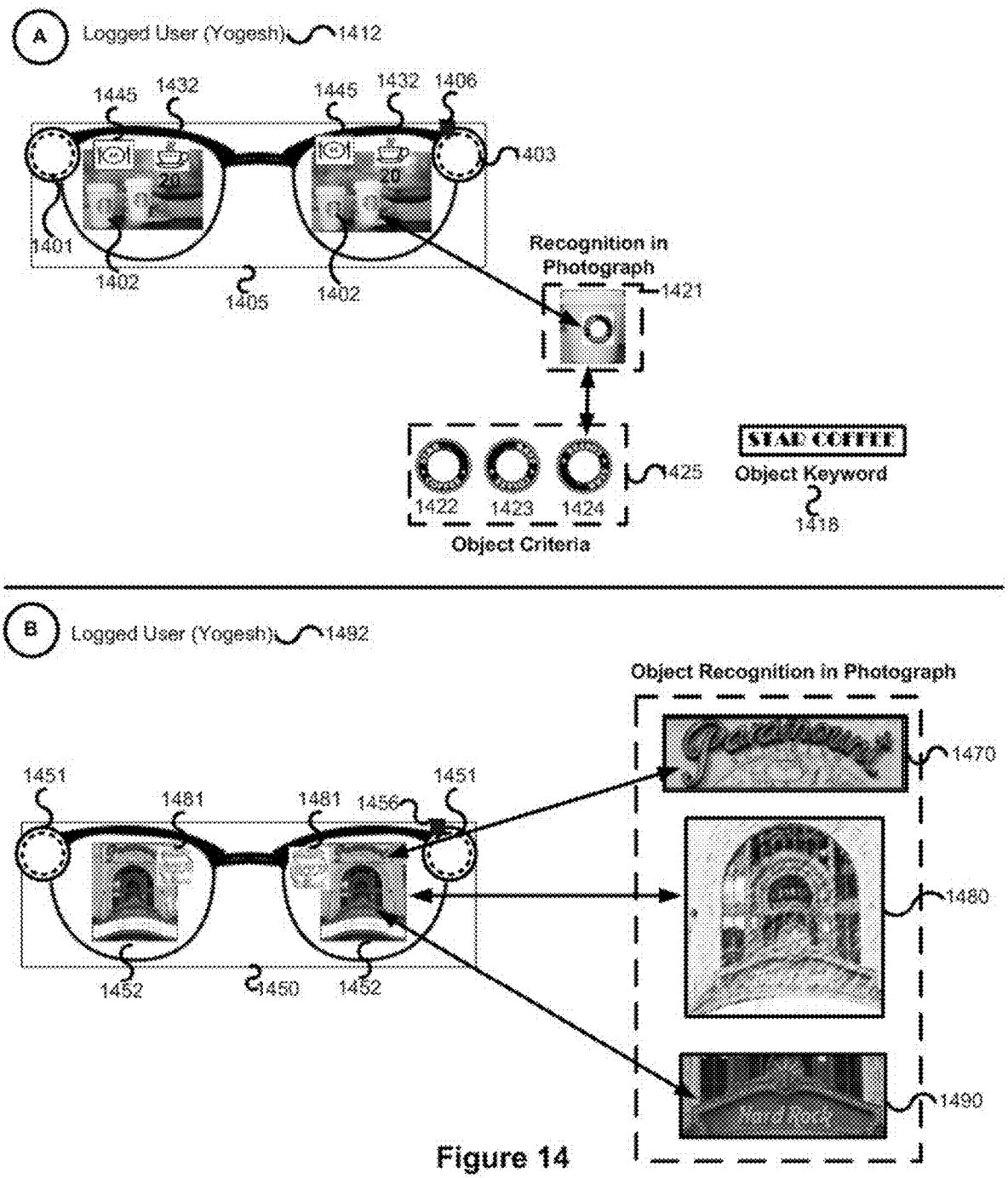

In an embodiment user can view, select, capture, record, or scan particular scene, object, item, thing, product, logo, name, person or group(s) of persons and scene via user device camera display screen or wearable device(s) e.g. eye glasses or digital spectacles which is/are equipped or integrated with video cameras, Wi-Fi connection, memory and connected with user's smart device(s) e.g. mobile device or smart phone. FIG. 14 (A) illustrates user interface for enabling user to manually scan or conduct augmented reality or take photo or scan or auto scan real world object(s) based on recognition of object from received real world object's related scanned data or raw photo or captured photo via one or more types of wearable device including eye glasses or digital spectacles equipped with video camera and connected with user device(s) including smart phone.

In an embodiment user is enabled to set automated augmented reality scanning, wherein automated augmented reality scanning enabling when user enters to particular pre-defined place or geofence boundary where pre-defined real world objects available for user scanning then in the event of arriving near to pre-defined real world object's place or stay in or inside place (e.g. restaurant), automated augmented reality scanning happens via digital spectacles wear by user and in the event of viewing particular pre-defined real world object by using video camera of digital spectacles then server module 153 receives said scanned data or captured photo of said viewed real world object and recognizes object(s) in received said scanned data or captured photo(s) and in the event of recognizing real world object the server module 153 of the virtual object application 136 retrieves the associated virtual object(s) corresponding to the satisfied object criteria associated with pre-defined real world object at particular location or place and displays the virtual object and associated virtual money to the mobile device 200 or enable user to get said real world object's associated virtual object(s) or add to said user's account or collections said real world object's associated virtual object(s).

In an embodiment user is enabled to view and scan or capture photo or conduct augmented reality scanning of particular real world object via tapping button 1406 via spectacles 1405 associated or integrated video cameras 1401 and/or 1403 which is connected with device 200 and enabling user to view or scan or capture or record photo or video via spectacles 1405 which have an integrated wireless video camera 1401 and/or 1403 that enable user to view or scan or capture photo or record video clips and save them in spectacles 1405 and/or to user device 200 connected with spectacles 1405 via one or more communication interface or save to database or storage medium 115 of server 110. The glasses 1402 or 1404 enables user to view or augmented reality scanning or begin to capture photo or record video after user 510 taps a small button 1406 near the left or right camera. The camera can scan or capture photo or record videos for particular period of time or up-to user stops it. The snaps will live on user's Spectacles until user transfer them to smartphone 200 and upload to server 110 database 115 or storage medium 115 via Bluetooth or Wi-Fi or any communication interface, channel, medium, application or service. Based on identified object inside real-time viewed 1402/1404 or scanned by tapping on button 1406 or captured photo or recorded video (i.e. particular image inside video) e.g. 14705, system matches said identified or recognized object 1421 with object criteria 1422/1423/1424 and presents or displays associated virtual objects to user device 200.

FIG. 14 (A) illustrates an example of a publication of a virtual object. The server module 153 of the virtual object application 136 detects that a digital spectacles device 1405 has conduct an augmented reality scanning 1402 of the real world object e.g. logo of particular brand or taken a photograph 1402/1404 of the real world object e.g. logo of particular brand originally at particular date & time that includes the recognized object 1421 that corresponds sufficiently to any specified object 1422/1423/1424 within set of object criteria and therefore satisfies the object criteria. The server module 153 of the virtual object application 136 retrieves the associated virtual object 1445/1432 corresponding to the satisfied object criteria 1424 and displays the virtual object 1445/1432 and associated virtual money and associated one or more types of offer e.g. coupon or voucher or free gift or redeemable points 1445 to the digital spectacles device 1405. The virtual object 1445 associated virtual money and associated one or more types of offer e.g. coupon 1432 may then be stored to user's collection of virtual objects or added to user's account (discuss in detail in FIGS. 22-25). In an embodiment as per defined required user actions associated with virtual object 1445/1432 or object criteria 1425, user or player 1412 needs to conduct one or more required activities or actions or call-to-actions or participations or transactions or play mini games to get, collect, acquire, store, win or select said displayed virtual object 1445 and associated virtual money and associated one or more types of offer e.g. coupon 1432. For instance in this example user require to share photo or video with particular number of contacts of user. In the event of sharing of photo or video with particular number of contacts of user by clicking or tapping on share with friends or contacts button or icon 1406, user get the virtual object 1432 and associated virtual money and associated one or more types of offer e.g. coupon 1432 and may then be stored to user's collection of virtual objects or added to user's account (discuss in detail in FIGS. 22-25). In an embodiment user can redeem said coupon 1445 in real world. In an embodiment user need to scan at particular place of business to get particular type of virtual object and/or offers. In an embodiment user can scan brand name, brand logo from any real world object including item, product, electrified board, board, receipt to get particular type of virtual object and/or offers, wherein based on object keyword 1115 system recognizes name of brand based on Optical Character Recognition (OCR) to identify object keyword 1418 and identify associated particular type of virtual object(s) 1432 and/or offers 1445. In an embodiment server 110 stores user specific virtual objects or enable particular identified sponsor or advertiser or user to provide specific or different virtual objects including virtual money, virtual reward including coupon, offer, discount, redeemable points, voucher, cashback offer for different set of users of network or to selected or provided particular one or more identified users of network or types of users of network.

FIG. 14 (B) illustrates an example of a publication of a virtual object. The server module 153 of the virtual object application 136 detects that a digital spectacles device 1405 has conduct an augmented reality scanning 1402 or taken a photograph 1402 automatic lay or by pressing button 1451 at particular location 338/336/310 at particular date & time (discuss in detail in FIG. 7) that includes the recognized object 1470 or 1480 or 1490 that corresponds sufficiently to specified object 346 or 348 or 349 and therefore satisfies the object criteria. The server module 153 of the virtual object application 136 retrieves the associated virtual object 1481 corresponding to the satisfied object criteria 346 or 348 or 349 associated with pre-defined real world object 325 at particular location or place 338/336/310 and displays the virtual object 1481 and associated virtual money to the digital spectacles device 1405. The virtual object 1481 and associated virtual money may then be stored to user's collection of virtual objects or added to user's account (discuss in detail in FIGS. 22-25). In an embodiment as per defined required user actions 372 associated with real world object 325, user or player 1492 need to conduct one or more required activities or actions or call-to-actions or participations or transactions or play mini games to get, collect, acquire, store, win or select said displayed virtual object 1481 and associated virtual money.

FIG. 15 illustrates various types of examples of notifications user or player may receive from server 110 administrators or automatically from server module 155, authorized advertisers, sponsors and users of network, contacts of user. In an embodiment based on monitored or tracked user device's 200 current location, server administrator or server module 155 suggests and notifies user or player about nearest place(s) related to pre-defined real world object(s) or one or more pre-defined geofence boundaries related to pre-defined real world objects associated location(s). For example server administrator suggests nearest and most popular or most scanned "Central Park Zoo!!! 1501 to nearest user [e.g. Yoegsh], so user can visit park, conduct augmented reality scanning of one or more animals and gets associated virtual objects (if available—depends upon plurality of factors like based on pre-defined objects (e.g. animal at Central Park Zoo) by user or sever or as per schedules, availability for user or all users of network settings). In the event of receiving and validating information about new object or scene of real world from users of network, server administrator suggests new and contextual real world object or scene to contextual users of network. For example in the event of user or player 1599 visiting Times Square, then server administrator or staff or editor picks or suggests and notifies nearest and user preferences or logged user data specific contextual real world objects to user or player 1599, for instance "Couple who are doing "Cha Cha dance at Time Square" 1507, so user or player 1599 can search and find said scene in real world (Times Square) and can conduct augmented reality scanning or take picture of said scene and gets associated virtual objects. In another embodiment based on monitored or tracked current location of user device, server module 155 automatically suggests all or criteria specific users of network who currently located in particular location, said location specific real world objects or scene. For instance server suggests and notifies to users located in Times Square, "New Movie Poster at Time Square" 1503. So user searches and tries to scanning movie posters at Times Square with intention to get virtual objects. In an another embodiment contacts of user can define new real world object or scene (based on permission, payment model including free, paid, sponsored, validation, authorization, subscription, allow to contacts only, allow to suggest said newly defined or user defined or suggested real world object(s) or scene to server or server administrator and server or server administrator reviews, verifies, validates and makes available to access or use said newly defined or user defined or suggested real world object(s) or scene for users of network or selected contacts or criteria specific users of network). For example user [James] define real world object i.e. identify word "RIHANNA" on electrified board at Times Square, get photo as information and object criteria, select current location as location of object or scene or hide location of object or place, make payment to buy virtual objects (based on type of virtual object, associate amount of virtual money with virtual object) or select free virtual objects and associate with said real world object or scene, provide minimum or related one or more types of information, provide settings including access for all or selected contacts or all users of network, make payment to purchase mini games to associate with said real world object or select type of actions require from list to get said real world object associated virtual object by finding and scanning said real world object from associated location. After defining said new real world object and submit to server or make payment and submit to server for verification and make available for others as per provided or associated settings, server receives, verifies and in the event of mark as verified or make available for others as per settings or decided by server administrator, in this example user [James] send message to user in contact [Yogesh] "Written "RIHANNA" on board" 1502 clue, so user [Yoegsh] needs to find out electrified board in Times Square and in the event of finding electrified board which contains word "RIHANNA", conducts augmented reality scanning of said word "RIHANNA" and server module 153 recognizes it based on associated object criteria and display or provide to user associated virtual object. In an another embodiment advertiser or sponsor can provide suggested message(s) to contextual users of network based on user's profile, current location, current status (busy, playing game, online, available), preferences, past logged purchases, interacted or visited or scanned real world objects or types of real world objects, date & time, accompanied users or contacts, types of activity liked, conducted, interests, and scanned. Some off the examples discussed in detail in FIGS. 10-14. For example regarding notification [Scan "Starbucks" Logo and Get Coupon] 1506 from advertiser or sponsor, discussed in detail in FIG. 11 (A), regarding notification [One of the Deer's Neck in Time Square] 1509 from contact [Candice], discussed in detail in FIG. 12 (A), regarding notification ["Wedding Bells" word in Times Square Electrified Advertisements] 1513 from advertiser or sponsor, discussed in detail in FIG. 12 (C), regarding notification [Scan "Super Cup"!!!] 1514 from contact (or administrator or team member) discussed in detail in FIG. 13 (A).

In an embodiment user can define and submit object and associate virtual objects with intention to after validation make available said defined object and associated virtual object(s) for particular event (e.g. birthday, anniversary, party, festival etc.) and during event date & time and only for all or selected or invited contacts or attendee of event (based on defined geo-fence boundary). For example user [Amita] sends message to user [Yogesh] "My friends, AR Scan My Birthday Cake!!!" 1508, so user [Yogesh] attends birthday of user [Amita] at particular location and can conduct augmented reality scanning of [Birth day Cake] pre-defined object and in the event of recognition of said object by server module 153 based on associated object criteria, displaying to user [Yoegsh] associated virtual object(s).

In an embodiment user can define and submit object and associate virtual objects with intention to after validation make available said defined object and associated virtual object(s) to users at particular public place(s) or pre-defined geo-fence boundary and during particular date & time and only for all or selected or criteria specific users (e.g. female, age range specific users, invited contacts or attendee of event (based on defined geo-fence boundary)). For example sponsor or advertiser send message to user [Yogesh] "Woman who wear Fancy Hat at Times Square" 1512, so user [Yogesh] searches woman who wear fancy hat at Times Square and in the event of finding or guessing such type of woman who wear fancy hat can conducts augmented reality scanning of said woman body (i.e. pre-defined object) and in the event of face and object recognition of said object by server module 153 based on associated object criteria, displaying to user [Yoegsh] associated virtual object(s).

In an embodiment server module 188 identifies user's one or more types of activities in real world. In an embodiment server module 188 display associated or determined or contextual one or more types of virtual objects based on said identified one or more types of activities in real world.

In an embodiment server module 188 monitors, tracks, identifies, determines, analyze, processes, recognize, logs and stores user's one or more types of physical and digital activities, actions, call-to-actions, participated events, transactions, senses, behaviours, status, updates, communications, reactions, sharing, collaborations, current, related and visited locations and places, check in places, interacted entities related to user and interacted, related, connected real world objects including products and services.

In an embodiment server module 188 identifying real world objects related to user based on monitoring, tracking, analyzing, processing, determining user's or user related or interacted or connected or associated activities, senses and actions in real world including one or more types of performing of dance, doing of yoga and exercise like gym, composing music or playing music instruments like guitar, piano, drums and flute, providing performance, doing drama, acting, singing and painting or drawing, playing one or more types of sports based on provided and validated video, photo, scanned real world's one or more objects, part of real world or scene and associated data, one or more types of content, data and media and system data including identified valid current date and time of video based on matching Exchangeable image file format (EXIF) data of said video or photo with server date and time, identified location or place of recording of video based on monitored and tracked current location or place of user device and identify said identified location or place associated information including place name and details, recognized one or more types of activity or activities base on object recognition technologies, recognize face or body or one or more types of body parts of user depicted in video or photo or media based on face or body recognition technologies, identified content or text in video or photo based on Optical Characters Recognition (OCR), identified voice and converted voice to text based on voice recognition technologies, identified environment surround user including weather, day or night and user senses and activities including number of steps while walking, heartbeats based on monitored and tracked user device associated sensors and associated data and logging and storing related information, structured data, metadata and system data.

In an embodiment server module 188 monitoring, tracking, analyzing, processing, determining user's or user related or interacted or connected or collaborated or associated accompanied users or contacts and interacted entities in real world based on monitored and tracked current location or place of user device and connected one or more users' devices, identify nearby user related or connected users or uses user phone's Global Positioning System (GPS) to find the people around user, user can see everybody user's connected or related users or all users within a certain radius of user based on user device's or phone's Global Positioning System (GPS) and enabling user to select one or more users who are not connected with user and who user feel related to user and logging and storing related information, structured data, metadata and system data.

In an embodiment server module 188 monitoring, tracking, analyzing, processing, determining user's or user related or interacted or connected or associated participated events in real world based on monitored and tracked current location or place of user device and connected one or more users' devices and associated event information, and calendar information and logging and storing related information, structured data, metadata and system data.

In an embodiment server module 188 monitoring, tracking, analyzing, processing, determining user's or user related or interacted or connected or associated transactions in real world based on linking with seller's system or accessing related sells data of seller's database or receiving from the user, a scanned or photo of receipt of the purchase and based on receipt, validate actual purchase of one or more product or service by user from said business including unique business name, place or location, date & time of purchase, amount of purchase, quantity and names and details of one or more products or services, wherein identifying Exchangeable image file format (EXIF) data in scanned or photo of receipt including original date & time of scanned or captured photo of receipt video and match said extracted or identified original date & time with server date & time to validate or check or verify originality of captured photo or recorded video, identifying user device monitored or tracked location or place or enter and stay in geo-fence boundary at the time of sending of scanned or photo of receipt, identifying or recognizing unique business name, place or location, date & time of purchase, amount of purchase, quantity names and details of one or more products or services from received scanned or photo of receipt based on object recognition and Optical Character Recognition (OCR) technologies, identifying duration spend at that business place based on monitoring, tracking and logging user device's entered location or check in place, duration of stay at that business place and exit from that business place and logging and storing related information, structured data, metadata and system data.

In an embodiment server module 188 monitoring, tracking, analyzing, processing, determining user's or user related or interacted or connected or associated status in real world including busy, free, studying, playing, walking, talking, singing, viewing, reading, eating, listening based on monitored or tracked user device's current location, place, sensor data including voice recognition, object or face or body parts recognition, date & time, duration, and any combination thereof and user selected or provided status and logging and storing related information, structured data, metadata and system data.

In an embodiment server module 188 monitoring, tracking, analyzing, processing, determining user's or user related or interacted or connected or associated communications with one or more users or contacts in real world based on voice recognition technologies including identifying length or duration of talk, identify keywords based on voice to text converter technologies, identifying anonymous users or related users or connected users or contacts surround user who are talking with user and logging and storing related information, structured data, metadata and system data.

In an embodiment server module 188 monitoring, tracking, analyzing, processing, determining user's or user related or interacted or connected or associated reactions, expressions, moods, styles, behaviours, emotions in real world based on recognizing one or more types of user reactions, expressions, moods, styles, behaviours, emotions based on provided or recorded photos or videos based on voice recognition, object or face or body parts recognition technologies and storing related information, structured data, metadata and system data.

In an embodiment server module 188 monitoring, tracking, analyzing, processing, determining user's or user related or interacted or connected or associated or visited or past or current locations and places, check in places based on monitored or tracked user device's current location or place and associated information and storing related information, structured data, metadata and system data.

In an embodiment server module 188 identifies user's one or more types of activities in real world. In an embodiment server module 188 display associated or determined or contextual one or more types of said monitored activity equivalent virtual objects or one or more types of virtual objects, virtual elements, virtual money, or virtual power in virtual world based on said identified one or more types of activities in real world.

In an embodiment server module 188 identifies user's one or more types of activities in real world and add or store said monitored type of activities specific identified or determined virtual objects or virtual elements or objects in virtual world to user's portfolio of virtual objects or virtual elements or objects in virtual world In an embodiment generating real world conducted one or more types of activities at/in/within/inside said particular place or Global Positioning System (GPS) location co-ordinates specific or related 3D or multi-dimensional animations or 3D or multi-dimensional animated graphics or 3D or multi-dimensional simulation and/or displaying said generated 3D or multi-dimensional animations and/or displaying one or more types of contents at said particular place or recorded Global Positioning System (GPS) location co-ordinates and/or displaying with said displayed 3D or multi-dimensional animated graphics or 3D or multi-dimensional simulation, place associated one or more types of contents associated or added or shared by user, other users of network, sever and one or more external sources based on said above discussed plurality of ways identified plurality types of data.

Figure 16:
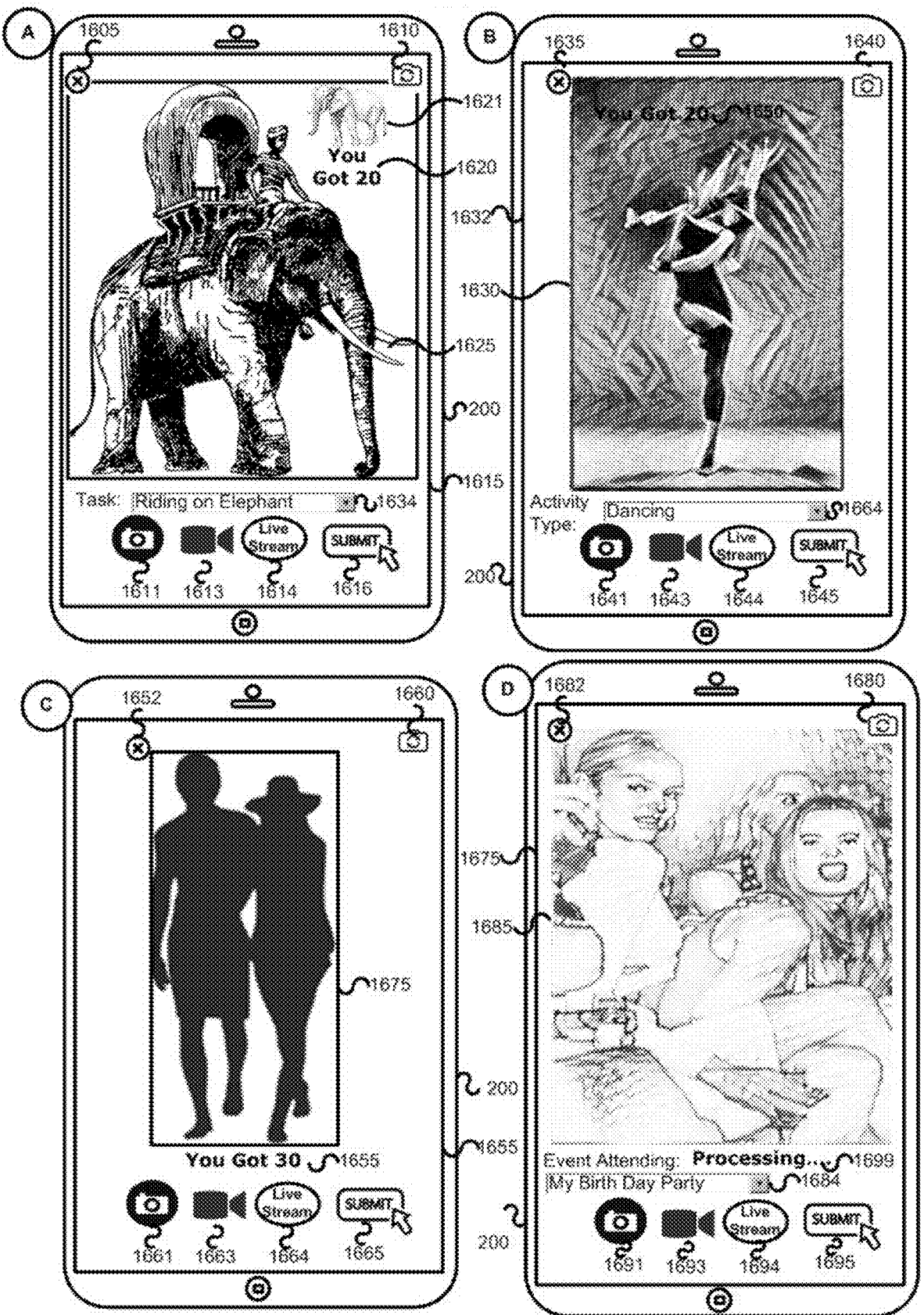
FIG. 16 illustrates example Graphical User interface (GUI) for enabling user to submit activity specific one or more photos or videos to server for verification and with intention to receive associated virtual objects.

FIG. 16 illustrates user interface for enabling user to upload or submit one or more types of media including one or more photos and videos related to user's one or more types of current activities including traveling (foreign, national, local point of interests, tourist places, activities), visiting point of interests or places like restaurants, gardens, museums, art gallery, boating, walking, running, flying, beach, lake, temple, riding on elephant or horse or camel, tracking and mountaineering, itinerary with contacts (friends and family, relatives, class mates or others), eating food at particular restaurants, conducting transactions, shopping, playing sports, doing yoga or exercise, reading book, listing music, visiting salon or beauty parlor, one or more types of fashion, beauty and lifestyle including hair, face, expression, cloths and accessories, one or more types of qualification user possess, one or more types of arts or skills user possess including music or playing particular type of instrument, acting, singing, comedy, painting, dancing, participating with one or more types of events including birthday party, work or marriage anniversary party, gathering, friend meeting, attending any type of party at particular location, viewing movie, viewing television serial, drama, shows, festival, In an embodiment server module 188 receives uploaded or submitted or shared or provided one or more types of media including one or more photos, videos, receives monitored or tracked user device's current location or place and associated one or more types of information, sensor data from user device's one or more types of sensors, current date & time and associated information, scanned or photo of receipt of purchase, transaction data from linked database of sellers, one or more $3^{rd}$ parties or external sources data related to user, access one or more types of user or connected users of user's related or associated data including user profile, connections or contacts, checked in places, updates, status and like. After receiving or accessing said one or more types of data, contents, media and metadata server module 188 processes said data by employing one or more types of technologies including object recognition, voice recognition, face and body parts recognition, Optical Character Recognition (OCR), recognize, processes, measure, analyze, calculate sensor data.

For example FIG. 16 (A) illustrates example, wherein user capture photo 1611 or records video 1613 or live streaming video 1614 and uploads and submits 1616 said particular type of activity related one or more photos or videos to sever module 188. Sever module 188 receives said submitted media or photo or video 1625 and user provided or selected type or name or details 1634 of activity or action or task or transaction or status or participating event and recognizes recorded and uploaded video associated location or place based on monitored or tracked or logged user device's location at the time of recording or uploading of video, recognizes date & time of recorded or uploaded video based on monitored or tracked or logged user device's date & time and matched said date & time with server's date & time, recognizes or detects face based on face or body part recognition techniques, recognizes or detects objects in received photo or images of video based on object recognition techniques and matches with selected or provided activity types or object criteria including object model, images to identify activity type claimed by user. For example identify whether user who uploaded said photo or video matches with activity type (e.g. riding on elephant by user who uploaded said photo or video). In the event of identification of originality of conducting of said claimed particular type of activity by user, sever module 188, displays or stores associated or contextual or relevant one or more types of virtual objects 1621 and associated points or virtual money 1620 or instruct user to conduct one or more types of activities, actions, participations, transactions, follow rules or play displayed mini game to get, win, acquire, catch, store, add to collection of user's portfolio of virtual objects said displayed one or more types of virtual objects 1621/1620.

In an another example FIG. 16 (B) illustrates example, wherein user capture photo 1641 or records video 1643 or live streaming video 1644 and uploads and submits 1645 said particular type of activity related one or more photos or videos to sever module 188. Sever module 188 receives said submitted media or photo or video 1630 and user provided or selected type or name or details 1664 of activity or action or task or transaction or status or participating event and recognizes recorded and uploaded video associated location or place based on monitored or tracked or logged user device's location at the time of recording or uploading of video, recognizes date & time of recorded or uploaded video based on monitored or tracked or logged user device's date & time and matched said date & time with server's date & time, recognizes or detects face of user based on face or body part recognition techniques and matching user profile photo (wherein said profile photo or live image received by server at the time of registration via verified mobile device associated camera) with said recognized face to identify that both are sufficiently similar, recognizes or detects objects in received photo or images of video based on object recognition techniques and matches with selected or provided activity types or object criteria including object model, images to identify activity type claimed by user. In the event of identification of originality of conducting of said claimed particular type of activity by user, sever module 188, displays or stores associated or contextual or relevant one or more types of virtual objects and associated points or virtual money 1650 or instruct user to conduct one or more types of activities, actions, participations, transactions, follow rules or play displayed mini game to get, win, acquire, catch, store, add to collection of user's portfolio of virtual objects said displayed one or more types of virtual objects 1650. In an embodiment in the event server module 188 linking with dance class database information, server module identifies membership of user who uploaded photo or video and identifies location of dance class and match with location or place of recording or uploading of one or more photos or videos. In an embodiment server module 188, verifies membership with class from connected or related or verified other users of network (e.g. dance instructor, other students, viewers, references).

Likewise server module 188 identifies and verifies other one or more types of activities conducted by or related to user including playing of one or more types of music by using one or more types identified or recognized instruments, painting of art or design, singing of one or more types song recognizes based on matching voice of user with voice detect in uploaded music file based on voice detection technique, one or more types of acting, visiting of particular place or point of interests including garden, art gallery, museum, boating, beach based on location or recognized object in photo or video, doing of yoga or exercise at particular gym by recognizing place, face, and identify membership with gym based on linking with the gym, playing of particular type of sports like cricket, soccer, golf, badminton. In an embodiment user needs to upload minimum or maximum duration of video.

In various example user can submit certificates, mark sheets, achievements, awards, current or past works and positions, experiences with different organizations, companies to verify education qualifications or skills or experience. Server module 188 can verify said information with information published on professional network account of user, instruct to submit related documents, certificates, mark sheets and verifies based on employing one or more verification techniques. User can submit photo or video demonstrating user's health, beauty, fashion, lifestyle, style of hair, face, dress, expressions. User can submit photo or video demonstrating user's number of followers, comments, shares, likes on posts or publications shared by users in one or more social networks, web sites and applications. Server module 188 can verify said information with information published on social network account of user. User can submit photo or video of food eat, liked, eat daily by user demonstrating user's health and daily activities. Server module 188 recognizes objects in food based on object recognition, identifies home place, originality of photo or video, actual eating of food by user based on recognize face in particular duration of video and identifies health related food. In an embodiment server module 188 monitors, tracks and logs user's daily physical activities including number of steps of walking by user throughout the day based on user device sensors. User can submit photo or video of one or more types of health reports of user demonstrating user's health, fitness. User can submit information (photo, video of products from place of home or receipts of purchased products or subscribed services) about various types of brands used or using or liked by user, services used, using or subscribed or liked by user, membership (submit membership cards or information) of various classes, training centers, clubs, hotels, resorts, airlines, shops, names, contact information, identities and number of users or one or more types of entities connected, related, interacted with users (user as customer, viewer, member, guest, attendee, social worker, client, patient, tourist, commuter, member in group, member of applications, websites and services).

In an embodiment one or more types of entities of real world including product, service, brand, shop, company, school, college, class, professionals, organizations, place of business, service providers, sellers, online website or application, group, network, person, have representation (Like Facebook Page or Twitter Account or any social account) in virtual world and enable them to provide one or more types of information about products, services, brands, shops, company, organizations and one or more types of profiles. In an embodiment server module 188 monitors, tracks, identifies, determines, analyze, processes, recognize, logs and stores user's one or more types of physical (in real world) and digital activities, actions, call-to-actions, participated events, transactions, senses, behaviours, status, updates, communications, reactions, sharing, collaborations, current, related and visited locations and places, check in places, interacted entities related to user and interacted, related, connected real world objects including products and services and based on that automatically relating or connecting user or virtual avatar or account or profile or virtual representation of user with said interacted or connected or related one or more types of entities or with virtual representation or account or profile of said one or more types of entities in virtual world. For example if user is customer of particular shop in real world then user is also connected with said particular virtual shop in virtual world.

In an embodiment server module 188, In an embodiment server module 188 monitors, tracks, identifies, determines, analyze, processes, recognize, logs and stores user's one or more types of physical and digital activities, actions, call-to-actions, participated events, transactions, senses, behaviours, status, updates, communications, reactions, sharing, collaborations, current, related and visited locations and places, check in places, interacted entities related to user and interacted, related, connected real world objects including products and services and based on that provides one or more types of virtual goods, virtual elements, virtual power, virtual money including displays or provides virtual objects based on identified products, services, brands, food items used by or using by or like by user in real world, virtual qualifications and virtual skills based on identified and verified related documents submitted by user and verified by server module 188, virtual fame based on identified physical and digital world activities including number of followers, fans, connections in social networks, number of websites or applications users, number of customers or clients or members, number of contacts and interactions with number and types of entities in physical or real world, virtual money based on money spend by user in real world based on submitted receipt of online or offline purchases, provide virtual power or virtual rank or virtual position based on said identified, verified and measurement or ranking of various types of current or past activities, actions, interactions, visited places, participations in events, usage, conducted transactions, status in real world and/or digital world by user.

FIG. 16 (C) illustrates example, wherein user can provide or submit 1665 one or more types of media including photo or video or live stream 1675 via clicking or tapping on photo icon 1661 or video icon 1663 or live video streaming icon 1664 demonstrating user's visiting place, identities of user who submits said one or more photos or videos, one or more accompanied persons including one or more friends, family members, contacts, wherein server module 188 receives said information and recognizes recorded and uploaded video associated location or place based on monitored or tracked or logged user device's location at the time of recording or uploading of video, recognizes date & time of recorded or uploaded video based on monitored or tracked or logged user device's date & time and matched said date & time with server's date & time, recognizes or detects face of user and accompanied users (contacts, connections) based on face or body part recognition techniques and matching user profile photo (wherein said profile photo or live image received by server at the time of registration via verified mobile device associated camera) with said recognized face to identify that both are sufficiently similar In the event of identification of conducting of group activities by user, sever module 188, displays or stores associated or contextual or relevant one or more types of virtual objects and associated points or virtual money 1650 or instruct user to conduct one or more types of activities, actions, participations, transactions, follow rules or play displayed mini game to get, win, acquire, catch, store, add to collection of user's portfolio of virtual objects said displayed one or more types of virtual objects 1655.

FIG. 16 (D) illustrates example, wherein user can provide or submit 1695 one or more photo 1685 (1691) or videos 1693 or live video streaming 1694 demonstrating or proving user's attending of particular named or type of event 1684 including user's own or others' birth day party, wherein server module 188 receives said information and recognizes recorded and uploaded video associated location or place (restaurant, hotel, banquet hall, party place, club, home of user or connected user) based on monitored or tracked or logged user device's location at the time of recording or uploading of video, recognizes date & time of recorded or uploaded video based on monitored or tracked or logged user device's date & time and matched said date & time with server's date & time, recognizes or detects face of user and accompanied users or attendee of party (contacts, connections) based on face or body part recognition techniques and matching user profile photo (wherein said profile photo or live image received by server at the time of registration via verified mobile device associated camera) with said recognized face to identify that both are sufficiently similar In the event of identification of attending of event by user, sever module 188, displays or stores associated or contextual or relevant one or more types of virtual objects and associated points or virtual money or instruct user to conduct one or more types of activities, actions, participations, transactions, follow rules or play displayed mini game to get, win, acquire, catch, store, add to collection of user's portfolio of virtual objects said displayed one or more types of virtual objects.

Figure 17:
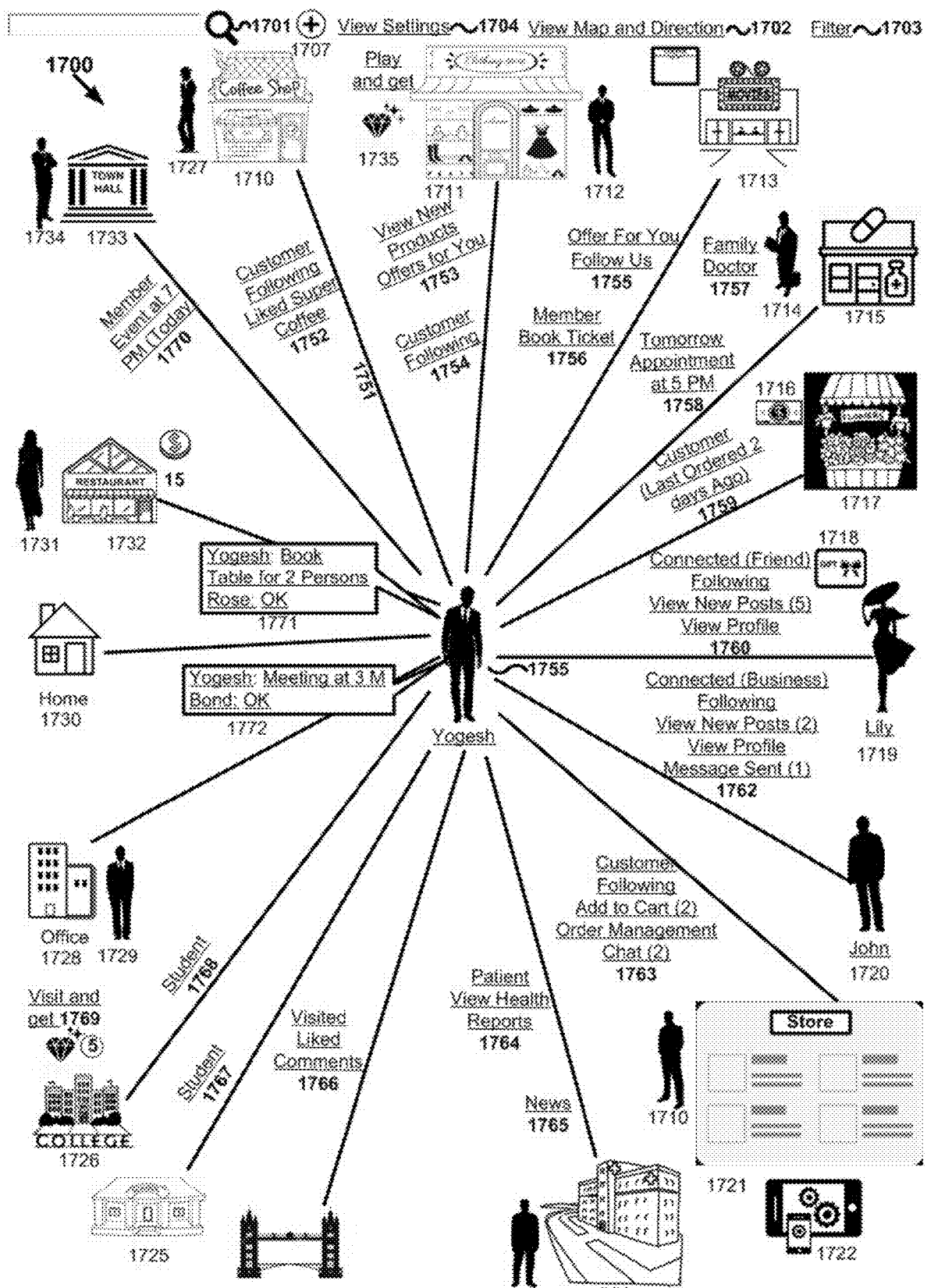
FIG. 17 illustrates example Graphical User interface (GUI) for enabling user to access, view, connect, communicate, follow, play, share with, view information or posts or messages, receive one or more types of virtual objects from real world related or interacted or connected or transacted or participated one or more types of entities in virtual world.

FIG. 17 illustrates graphical user interface (GUI) of exemplary virtual world 1700 which shows effect of real world activities, actions, events, participations, purchases, usage, status, behaviours, and real world user's life related anything, digital activities including actions, call-to-actions, reactions, transactions, sharing, communications, collaborations in virtual world. Based on monitoring, tracking, identifying, recognizing, detecting, analyzing, processing, logging and storing, by the server module 188, as the player conducting of or providing of information about or automatically logging of user's or player's one or more types of activities, actions, participations in particular events at particular place, providing of status, visiting or interact with one or more types of locations or places, interacted with one or more types of entities, contacts, conducting one or more types of transactions with one or more types of entities, conducting one or more types of digital activities, actions, senses, behaviours, interactions, status, reactions, call-to-actions, transactions, sharing, communications, collaborations, connections in the real world and/or digital world including websites, applications, the player or user can also interacted and connected, followed, related, mapped, associated with said entities in virtual world as a relative, friend, class mate, colleague, partner, employer, employee, neighbor, society member, citizens, native, visitor, attendee including attendee of particular event, show, exhibition, and program, client, customer, prospective customer, viewer, member, guest, patient, traveler, commuter in the virtual world or virtual environment or with the virtual representation or avatars of entities of real world in virtual world, and relates or associates information related to or associated with or provided or updated or logged or shared with said related or visited or interacted or conducted or connected real world locations, places, people, activities, relationships, connections, status, participations, transactions, one or more types of entities and objects including products and services with virtual world and displaying or providing or associating or connecting or relating or adding or updating to user's account or user related visual map or virtual world interface said interacted or connected or related or associated or transacted or used or using real world objects equivalent virtual objects or one or more types of virtual objects, virtual elements, virtual avatars, virtual money or currency, virtual power, virtual goods, virtual rewards, real world associated or equivalent or determined one or more types entities related virtual representation associated virtual connections, virtual followers and following, virtual fame, virtual role, real world associated user's profile equivalent or similar or determined virtual characteristics, attributes, skills, positions, qualifications, interests, virtual avatar's profile characteristics including age, gender, interest, qualifications, skills, looks, expressions in the virtual world.

For example in the event of monitoring, tracking and logging of user's 1755 visits or submitting purchase receipt at particular coffee shop 1710 in real world, user or player 1755 can also connect 1751 with said real world interacted or connected or transacted or visited or associated virtual world virtual representation 1710 and/or associate one or more avatars (e.g. seller or staff) 1727 of said particular coffee shop 1710. If virtual representation 1710 of said particular coffee shop of real world and/or associate avatar 1727 not available then generating, creating, and adding, by the server module 188, said virtual representation 1710 and/or associate avatar of seller or staff 1727 of said particular coffee shop of real world in the virtual world 1700. In the event of linking with one or more social networks by user or said social network via Application Programming interface (API), server module 188, identifies and retrieves mutual connections, following, followers, contacts, customers, purchases or transactions details, posts, shared contents and associated one or more types of reactions and display in virtual worlds (For example displaying customer, following, liked super coffee 1752 with connection line 1751 showing visual connection link between user or player 1755 and virtual representation (icon, photo, video, animation, 3D design or image or animation, virtual object, virtual character, virtual infrastructure equivalent to real world) 1710 of real world "Super Coffee" at particular unique place in virtual world. If user not provides details about linking with server module 188 or said social network not linked with server module 188, then user can follow in virtual world by clicking or tapping on follow button or send connection request by clicking or tapping on connect button and in the event of acceptance of connection request by invitee both are mutually connected and able to communicate, collaborate, provide reactions, transact and share one or more types of contents with each other, join group, visit shop, view products and make purchase one or more selected products in 2D or 3D or multi-dimensional virtual world.

In an embodiment user can search 1701 and view virtual representation of particular named entity. In an embodiment user can search 1701 and add 1707 to user's virtual world or connect in virtual world with virtual representation of particular named entity. In an embodiment user can filter 1703 displayed virtual representations of connected or related or visited or transacted one or more types of or plurality of entities of real world, wherein filter comprise one or more types or names of entities (shop, restaurant, tourist places, movie theater, beach, garden) and any combination thereof, type of relationships (customer, friend, family type of relationship, college or school friend, business connection, professional connection, class mate, college, partner, employer, employee, guest, viewer, member, attendee, visitor, speaker, subscriber, prospective customer, patient, client, student, particular type of position, following, follower, in contacts, in social contacts and like), date and time of adding or creating or relating or displaying, nearby, transacted within particular date and time range, conversed within particular date and time range, visited within particular date and time range, new posts or contents or news or details about new products and services, one or more types and categories of products or services offers, low cost, currently representative or support service provider available for communication, today's schedules specific virtual representations of said filtered entities in virtual world. In an embodiment enable user to removing or disconnecting with one or more entities in virtual world which represents real world entity. In an embodiment enable user to hide or show one or more entities in virtual world which represents real world entity. In an embodiment enable user to select, update and apply one or more visual settings related to viewing of virtual world, wherein visual settings comprises view virtual world in 2D or 3D map, provide purpose including play game, conduct real world activities and based on that update visual display of virtual world.

In an embodiment graphical user interface (GUI) may comprise 2D or 3D or multi-dimensional graphical user interface (GUI).

In an embodiment user can create virtual representation 1755 of them, called avatar 1755, and is able to interact with related, connected, associated, transacted and interacted places and objects of real world and other avatars (users of network can create virtual representations of themselves, called avatars, and are able to interact with other avatars of virtual world) in virtual world. They can explore the virtual world, meet other users or avatars of real world player or user, and can virtually visit places, shops, restaurants, home, office, hospital, online shop, participate in event, view one or more types of contents, information, posts, photos, videos, messages and multimedia, follow or unfollow them, connect or disconnect with them, communicate, collaborate and sharing with them, ask query, view answers, visit shop, view products, talk with staff or representative (via voice or phone or video call, message), purchase products, subscribe services, use one or more types of call-to-actions to send and receive message, fill form, share or refer, make call, view products or services, play game, get, win, claim, purchase, acquire, receives as gift one or more virtual objects, virtual money and virtual rewards including coupons, vouchers, discount, offer which may redeemable or use in real world, add one or more virtual objects to collections of one or more types of virtual objects socialize, participate in both individual and group activities, build, create, shop and trade virtual property and services with one another.

In an embodiment show avatar 1727 of staff or assistant or support service provider related to business place 1710 when available (enable to direct talk or chat with real world available avatar 1727 of staff or assistant or support service provider related to business place 1710) and hide avatar 1727 when not available. In an embodiment if place is close then show closed place in virtual world.

In various examples user can view provided or displayed real world object 1735 and can play and win or get said displayed virtual object 1735, view new products information 1753 and custom offers trailered for user 1753, view type of relationship and status 1754 with said real world entity associated virtual representation 1711, conduct one or more types of actions, call-to-actions, transactions with said displayed real world entity associated virtual representation 1713, wherein actions, call-to-actions, transactions may comprises book particular movie ticket 1756, follow said movie theatre or brand by clicking or tapping on "Follow Us" button 1755, view and claim presented offer 1755, view and get appointment with doctor 1758, converse with doctor 1714 of real world entity (dispensary of doctor) 1715, view order history 1759, view various types of bouquet of flowers 1717, view avatars of other users of network including friends (e.g. 1719), family, contacts, connections in one or more social networks, professional networks (e.g. 1720), another networks, view associated new posts, profile, reactions by them on user's 1755 posts, view provided or gifted virtual gifts 1718 which may redeemable in real world, view message sent 1762, view new products online 1721, view, select and add to cart one or more products, manage orders, chat with representative 1763, view health reports 1764, view news associated with related hospital 1723 or talk with staff 1724 to make enquiry, view details about visited place and associated logged details of user's activities, transactions, participations in events, relationships, and status, reactions 1766, view school 1725 and college 1726 and associated available virtual objects 1769, view real world entity (office or company or organization or work place) 1728 and associated virtual representation 1729 and messaging 1772 with them, book table via messaging 1771 with real world entity (restaurant) 1732 associated virtual representation 1731, view past and current or upcoming events, associated schedules and detail information 1770 at particular place 1733 and communicate with currently available staff 1734.

Figure 18:
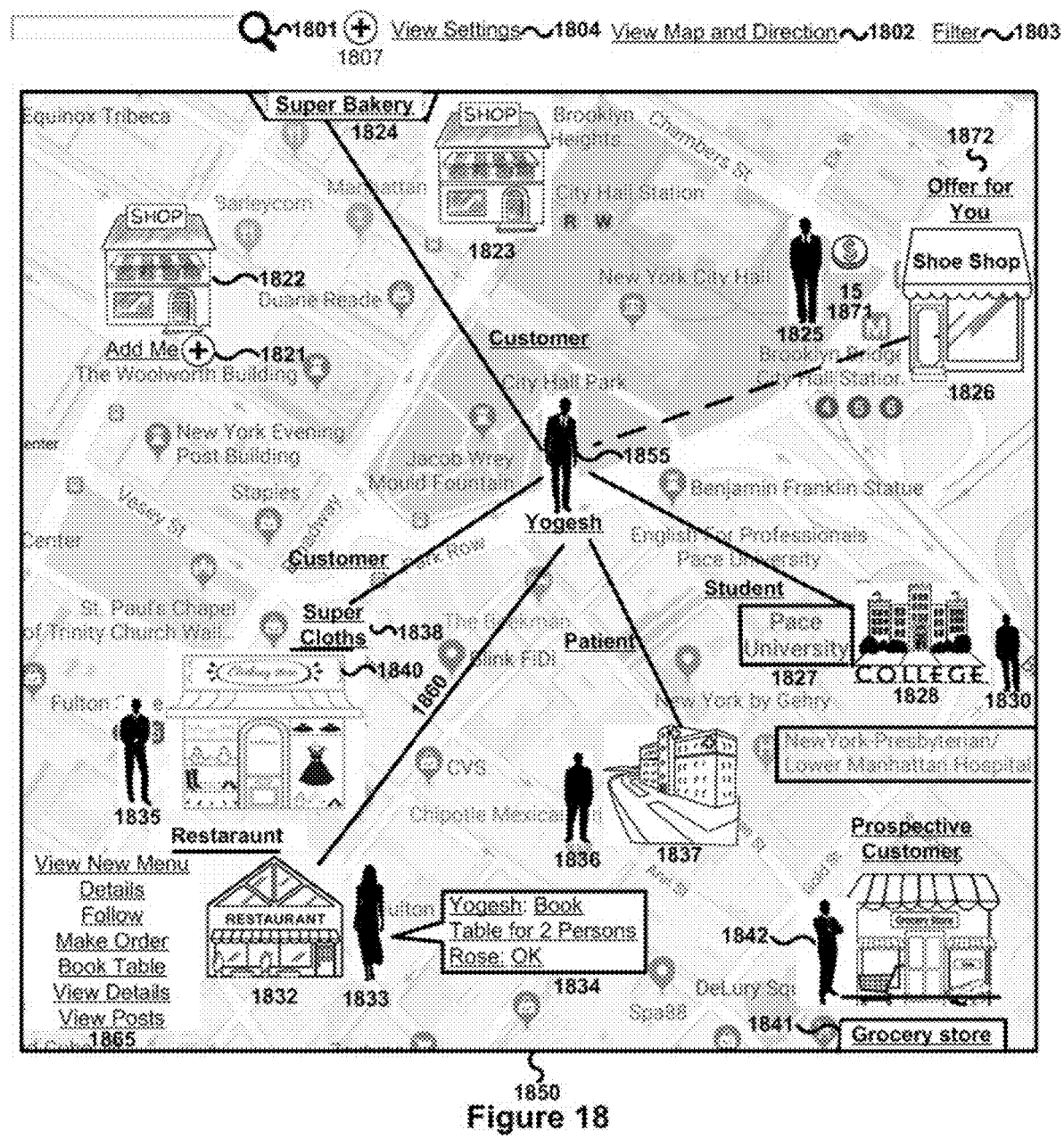
FIG. 18 illustrates example 3D or 2D Map Graphical User interface (GUI) for enabling user to access, view, connect, communicate, follow, play, share with, view information or posts or messages, receive one or more types of virtual objects from real world related or interacted or connected or transacted or participated one or more types of entities in real world map or virtual world corresponding to geography of real world.

FIG. 18 illustrates graphical user interface (GUI) of exemplary virtual world (2D or 3D or Multi-dimensional) having a virtual world geography 1850 that correspondences the real world geography and having a virtual world environment that correspondences the real world environment, as a result, based on monitoring, tracking, identifying, recognizing, detecting, analyzing, processing, logging and storing as the player or user 1855 conducting of or providing of information about or automatically logging of user's or player's one or more types of activities, actions, participations in events, providing of status, visiting or interact with one or more types of locations or places, interacted with one or more types of entities, contacts, conducting one or more types of transactions with one or more types of entities, conducting one or more types of digital activities, actions, senses, behaviours, interactions, status, reactions, call-to-actions, transactions, sharing, communications, collaborations, connections in the real world and/or digital world including websites, applications (discussed various related embodiments in details throughout the specification), the player 1855 or user 1855 can also interacted and connected, followed, related, mapped (1850), associated with said entities (e.g. 1840/1832/1837/1828/1823) in virtual world as a relative, friend, class mate, colleague, partner, employer, employee, neighbor, society member, citizens, native, visitor, attendee including attendee of particular event, show, exhibition, and program, client, customer, prospective customer, viewer, member, guest, patient, traveler, commuter in the virtual world 1850 or virtual environment or with the virtual representation (e.g. 1840/1832/1837/1828/1823) of entities of real world in virtual world, and relates or associates information related to or associated with or provided or updated or logged or shared with said related or visited or interacted or conducted or connected real world locations, places, people, activities, relationships, connections, status, participations, transactions, one or more types of entities and objects including products and services with virtual world 1850 and displaying or providing or associating or connecting or relating or adding or updating to user's account or user related visual map or virtual world interface said interacted or connected or related or associated or transacted or used or using real world objects equivalent virtual objects or one or more types of virtual objects 1871, virtual elements, virtual money or currency, virtual power, virtual goods, virtual rewards, real world associated or equivalent or determined one or more types entities related virtual representation associated virtual connections, virtual followers and following, virtual fame, virtual role, real world associated user's profile equivalent or similar or determined virtual characteristics, attributes, skills, positions, qualifications, interests, virtual avatar's profile characteristics including age, gender, interest, qualifications, skills, looks, expressions in the virtual world.

In an embodiment virtual representation on entity can play with player in virtual world, provide virtual objects in virtual world that can be used in virtual world, provide virtual reward in virtual world that can redeem in real world, sell virtual goods in virtual world, sell, present, provide support, market, and advertise real products and services in virtual world.

In an embodiment virtual avatar of player can directly or virtually reach at any places related to one or more types of entities.

In an embodiment virtual avatar of player can directly or virtually reach to any or related or connected one or more types of entities in virtual world In an embodiment virtual avatar of player associated real world user need to physically reach at particular place related to particular named or type of entity to virtual reach at virtual representation of said real world particular named or type of entity.

For example in the event of monitoring, tracking and logging of user's 1855 visits or submitting purchase receipt at particular restaurant 1832 in real world, user or player 1855 can also connect 1832 with said real world interacted or connected or transacted or visited or associated virtual world virtual representation 1833 and/or associate one or more avatars (e.g. seller or staff) 1833 of said particular restraint 1832. If virtual representation 1833 of said particular restaurant of real world and/or associate avatar 1833 not available then generating, creating, and adding, by the server module 188, said virtual representation 1832 and/or associate avatar of seller or staff 1833 of said particular restaurant of real world in the virtual world 1850. In the event of linking with one or more social networks by user or said social network via Application Programming interface (API), server module 188, identifies and retrieves mutual connections, following, followers, contacts, customers, purchases or transactions details, posts, shared contents and associated one or more types of reactions and display in virtual worlds (For example displaying customer, following, liked restaurant 1832 with connection line 1860 showing visual connection link between user or player 1855 and virtual representation (icon, photo, video, animation, 3D design or image or animation, virtual object, virtual character, virtual infrastructure equivalent to real world) 1832 of real world restaurant at particular unique place in virtual world. If user not provides details about linking with server module 188 or said social network not linked with server module 188, then user can follow in virtual world by clicking or tapping on follow button or send connection request by clicking or tapping on connect button and in the event of acceptance of connection request by invitee both are mutually connected and able to communicate, collaborate, provide reactions, transact and share one or more types of contents with each other, join group, visit shop, view products and make purchase one or more selected products in 2D or 3D or multi-dimensional virtual world. In an embodiment user can view one or more types of user actions and call-to actions controls 1865 with virtual representation e.g. 1832 of particular restaurant of real world, wherein one or more types of user actions and call-to actions controls 1865 comprises view new menu details, follow said virtual representation e.g. 1832 associated real world entity (e.g. restaurant), make order, talk with currently available representative, book table, view details and view posts including photos, videos, offers, messages. In an embodiment use can select from map 1850 and add 1821 particular real world related entity 1822 in virtual world map 1850 and connect with them to view associated virtual objects, play mini games or conduct required actions to select, get, collect, win and capture associated virtual objects, virtual money and virtual rewards, view products, view offers, view posts, view profile or business place details including opening and closing hours, reviews and ratings, and take one or more actions and call-to-actions including make call, send and receive messages, fill form.

Figure 19:
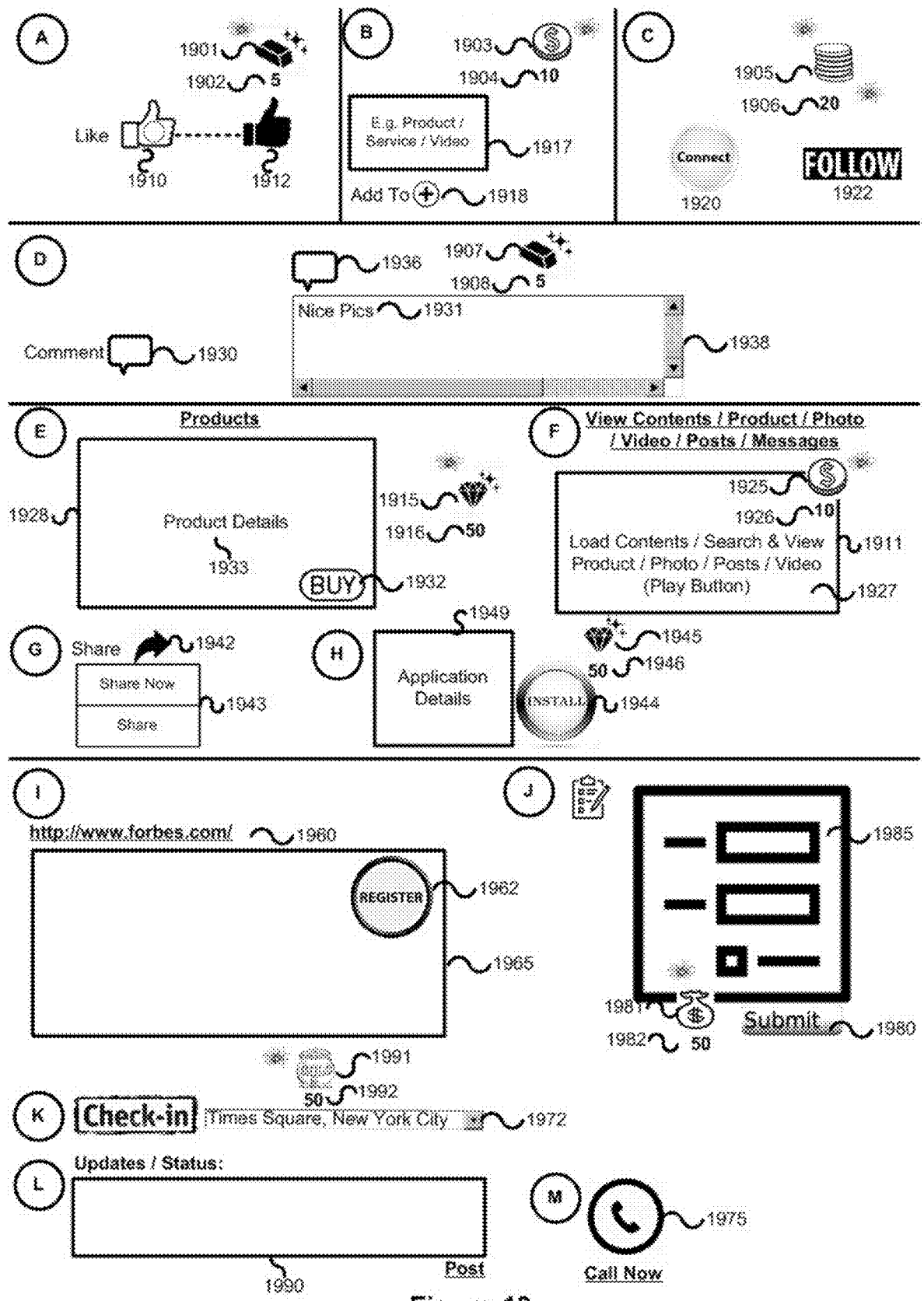

FIG. 19 illustrates various examples associated with an embodiment of the invention. Server module 188 of server 110 monitors and tracks user's one or more types of digital activities, actions, triggering of events, transactions, status, communications, sharing, collaborations, check in places, reactions, call-to-actions including interaction with one or more types of controls including action controls and reaction controls may comprise like button, comment button, share button, rating interface, follow button, buy button, order button, book button, access web address or Uniform Resource Locator (URL) or link, play button, search button, visit website, web page by entering web address from one or more 3$^{rd}$ parties or external websites, webpages and applications, wherein server module 188 monitors and tracks associated triggering of events including click, tap, double click, double taps, sensestart, senseend, mouseover, mouseout, mousedown, mouseup, senseenter, senseleave, scroll, haptic contact engagement, persist and release, playing of video, downloading, uploading, click on link, viewing or taking of photo or video. In the event of identification of triggering of one or more types of pre-defined event on one or more pre-configured controls (integrate with server module 188 via Application Programming Interface (APIs), Objects, Web services and Software Development Kit (SDKs)), applications, browsers, websites, objects and interfaces, external domains, websites, services, applications, devices, networks, interfaces and servers, server module 188 of server 110 identifies, notifies, displays or stores to user's account contextual or associated one or more types of virtual object(s) including virtual money. In an embodiment user will need to or require to play one or more mini games to select, get, win, add to user's account, capture, acquire and collect said one or more types of virtual object(s) including virtual money.

FIG. 19 (A) shows example of clicking on particular type of button wherein in the event of triggering of mousedown or touchstart or pre-defined voice command or haptic contact engagement and persist event on or receiving from a touch controller a haptic contact signal indicative of a gesture applied on "Like" button or icon or link or control 1910, server module 188 of server 110 identifies, notifies, stores to user's account or displays contextual or associated one or more types of virtual object(s) 1901 including virtual money 1902 beside/over/on/surround/at prominent place/overlay on said liked button 1912.

FIG. 19 (B) shows example of clicking on particular type of button wherein in the event of triggering of mousedown or touchstart or pre-defined voice command or haptic contact engagement and persist event on or receiving from a touch controller a haptic contact signal indicative of a gesture applied on "Add To" button or icon or link or control 2518 with intention to add particular or selected video or item or product 1917, server module 188 of server 110 identifies, notifies, stores to user's account or displays contextual or associated one or more types of virtual object(s) 1903 including virtual money 1904 beside/over/on/surround/at prominent place/overlay on said "Add To" button 1918.

FIG. 19 (C) shows that in the event of triggering of mousedown or touchstart or pre-defined voice command or haptic contact engagement and persist event on or receiving from a touch controller a haptic contact signal indicative of a gesture applied on "Follow" 1922 or "Connect" 1920 button or icon or link or control, server module 188 of server 110 identifies, notifies, stores to user's account or displays contextual or associated one or more types of virtual object(s) 1905 including virtual money 1906 beside/over/on/surround/at prominent place/overlay on said "Connect" 1920 or "Follow" 1922 button.

FIG. 19 (D) shows that in the event of triggering of mousedown or touchstart or pre-defined voice command or haptic contact engagement and persist event on or receiving from a touch controller a haptic contact signal indicative of a gesture applied on "Comment" button or icon or link or control 1930, server module 188 of server 110 identifies, notifies, stores to user's account or displays contextual or associated one or more types of virtual object(s) 1907 including virtual money 1908 beside/over/on/surround/at prominent place/overlay on said "Comment" button 1930 or "Comment" box 1938 or content of comment 1931.

FIG. 19 (E) shows that in the event of triggering of mousedown or touchstart or pre-defined voice command or haptic contact engagement and persist event on or receiving from a touch controller a haptic contact signal indicative of a gesture applied on "Buy" button or icon or link or control 1932, server module 188 of server 110 identifies, notifies, stores to user's account or displays contextual or associated one or more types of virtual object(s) 1915 including virtual money 1916 beside/over/on/surround/at prominent place/overlay on said "Buy" button 1932 or details of product 1933.

FIG. 19 (F) shows that in the event of triggering of mousedown or touchstart or pre-defined voice command or haptic contact engagement and persist event on or receiving from a touch controller a haptic contact signal indicative of a gesture applied on "Play" button or icon or link or control 1927 or in the event of monitoring of loading and displaying of one or more types of contents to user or searching and viewing of product(s) details, photo(s), and post(s), server module 188 of server 110 identifies, notifies, stores to user's account or displays contextual or associated one or more types of virtual object(s) 1925 including virtual money 1926 beside/over/on/surround/at prominent place/overlay on said viewing one or more types of contents 1927.

FIG. 19 (G) shows that in the event of triggering of mousedown or touchstart or pre-defined voice command or haptic contact engagement and persist event on or receiving from a touch controller a haptic contact signal indicative of a gesture applied on "Share" button or icon or link or control 1942, server module 188 of server 110 identifies, notifies, stores to user's account or displays contextual or associated one or more types of virtual object(s) including virtual money beside/over/on/surround/at prominent place/overlay on said "Share" button 1942.

FIG. 19 (H) shows that in the event of starting of downloading or uploading or installing of application, server module 188 of server 110 identifies, notifies, stores to user's account or displays contextual or associated one or more types of virtual object(s) 1945 including virtual money 1946 beside/over/on/surround/at prominent place/overlay on said viewing one or more types of contents 1949 e.g. application details).

Likewise in the event of triggering of or conducting of or taking of one or more types of pre-defined digital actions, call-to-actions, events, transactions and reactions like visiting and viewing website or webpage 1965, clicking link or URL or web address 1960, registering 1962 website or application, providing one or more types of details including contact details, fill forms or survey forms, providing profile details 1985 or submitting of said one or more type of user details 1980, check in place 1972 or visiting place, providing status or updates 1990 and making call 1975, server module 188 of server 110 identifies, notifies, stores to user's account or displays contextual or associated one or more types of virtual object(s) including virtual money at prominent place of user interface. In an embodiment user will need to or require to play one or more mini games to select, get, win, add to user's account, capture, acquire and collect said one or more types of virtual object(s) including virtual money.

Figure 21:
Figure 23:
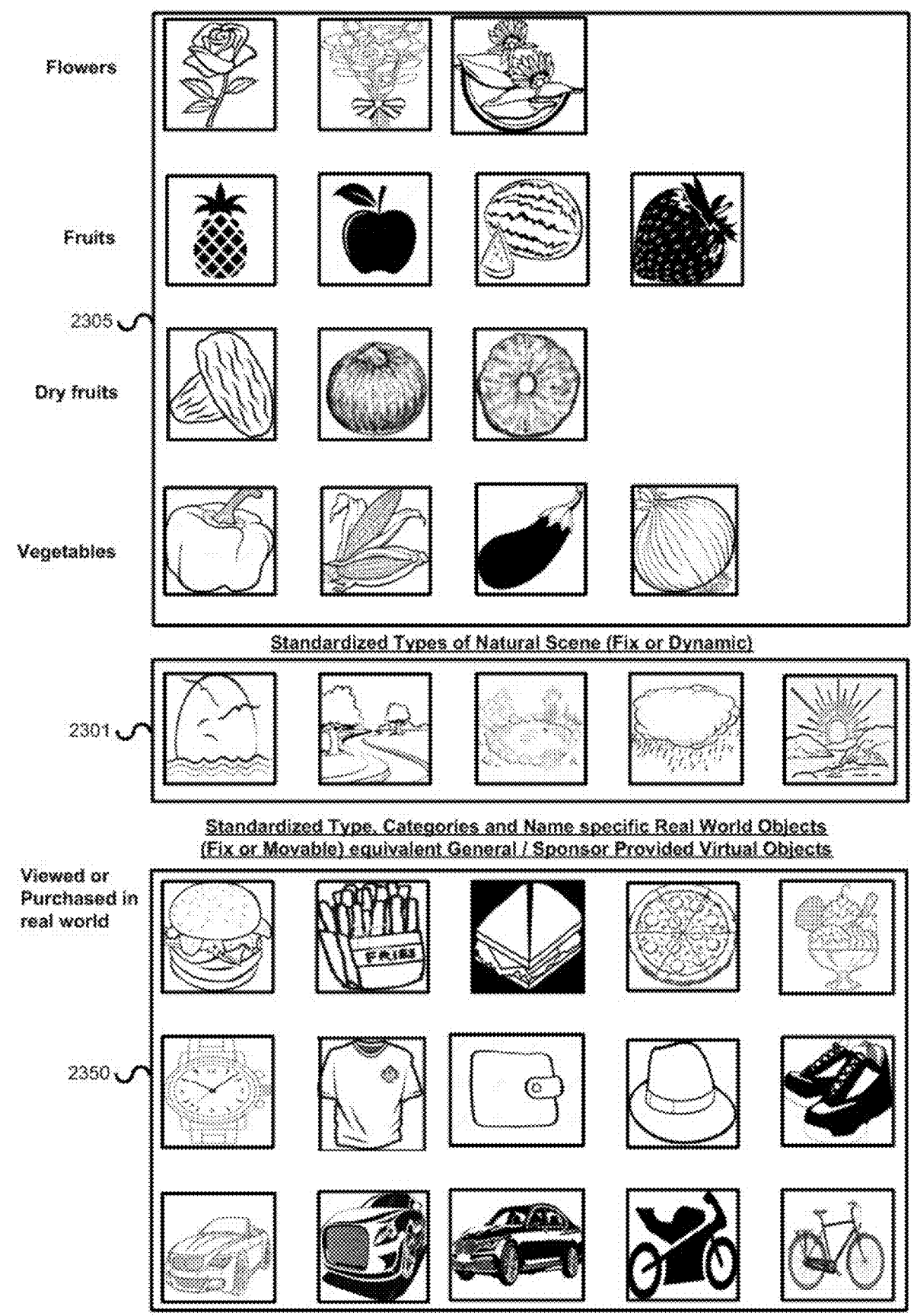
Figure 24:
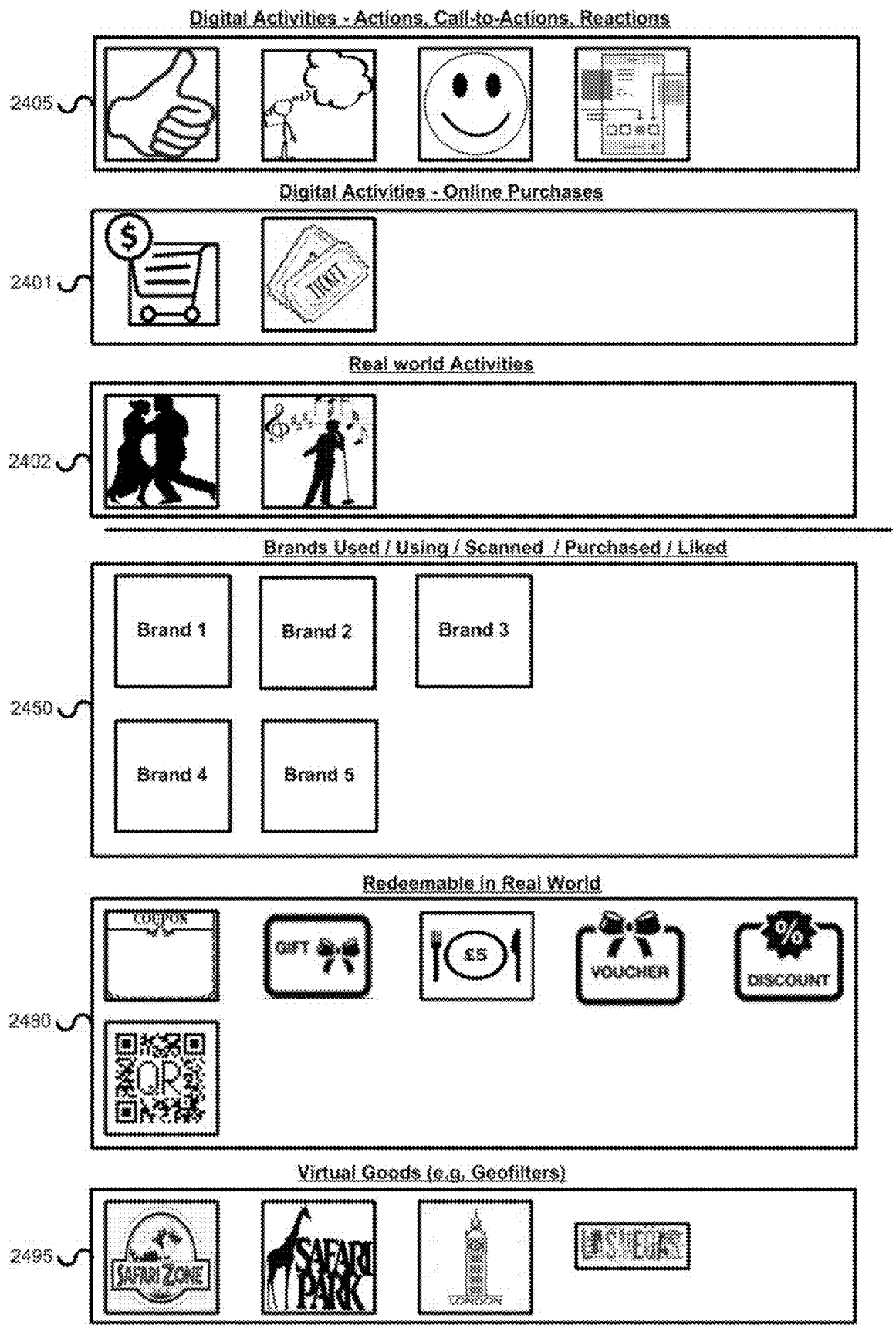

FIGS. 20-21 illustrates user interface, displaying description about said monitored, tracked and logged various types of physical or real world or digital activities, wherein description may comprises type of activity or call-to-action 2006, image of type of activity 2005, interacted type and named entity including name and image of location, place, product, brand, service, person, object in real world 2007 and application, website, one or more type of content in digital world, name of connected or accompanied person(s) or contact(s), related link or web address or Uniform Resource Locator (URL) 2007, related or associated or determined structured, data, metadata, statistics, date & time, source of activity, received one or more types of virtual objects 2012, virtual money 2013, virtual rewards including coupon, voucher, redeemable points 2010/2011. User can filter or sort displayed information about real world and digital activities based on type of activity, brand name, entity name, product or service or website or application name, date and time, number of or amount of virtual money, type of virtual object. In an embodiment user can share select one or more activity items from displayed list of logged activity items with all 2191 or one or more selected contacts 2192, all users of network 2193, followers of user 2194, set view duration 2196 to enable viewing user to view shared activity items for said pre-set duration only. In an embodiment user can search 2003 information related to user's logged activities.

FIGS. 22-25 illustrates example Graphical User Interface (GUI) 276 for enabling user to view, manage and access various types of virtual objects 2250/2305 (in an embodiment virtual objects may have virtual value in terms of virtual money or virtual currency) which user got, caught, gathered, won, captured from various places by conducting augmented reality scanning various real world objects or from visiting pre-defined geofence boundary associated places or various other ways discuss in detail throughout the specification, wherein in an embodiment virtual objects 2250/2305 are equivalent or sufficiently identical to real world objects in virtual world in terms of appearance or looks and feels, attributes, characteristics and have some additional virtual looks, attributes, characteristics which may use for various types of game differently including may use for battel, use for trade, use as vehicle to carry goods or transport, use a worker for doing one or more types of work. In an embodiment certain types of virtual objects 2250/2305 including animals, trees, birds may grow and multiply but require one or more types of virtual resources including food, water, seeds, or eggs (which user may acquire via playing game or may purchase) as well as physical activities, actions, participations, transactions or spending of particular amount of money, or playing one or more types of mini game by real world player or user. In an embodiment certain types of game, there is need of one or more types of said virtual objects including vegetables, fruits, dry fruits, animals, birds, trees, flowers, food items, accessories.

In an embodiment user can also view, manage and access virtual power, virtual elements, virtual rewards 2480 including redeemable points, vouchers, coupons, offers (which are spend, used and redeemable in real world) which user got, caught, gathered, won, captured from various places by conducting augmented reality scanning various real world objects or from visiting pre-defined geofence boundary associated places or various other ways discuss in detail throughout the specification.

In an embodiment user can use some types of the virtual objects as Geofilters 2495. In an embodiment some types of the virtual objects used for describing activities of user including brands used, liked, scanned, and purchased 2450. In an embodiment some types of the virtual objects 2301 describe the type of real world object scanned by user. In an embodiment some types of the virtual objects 2250 may convert to or grow to or upgrade to different type of virtual characters based on change of level, playing of particular type of game or quest or mission in game. In an embodiment user or player can purchase various types of virtual characters, virtual power, virtual arms, virtual vehicle, and virtual resources 2585 for different types of game by using or spending or in exchange of virtual money 2205 and real world money. In an embodiment user can use virtual objects 2350 equivalent to real world objects purchased or used or using or viewed in various types of game. In an embodiment as per change of level user may get different type of awards, certificates, medals, cups 2505.

In an embodiment user can also view, manage and access virtual money or virtual currency 2205 (including virtual gold, virtual diamond, virtual treasure which have virtual value in terms of virtual money or virtual currency) which user got, caught, gathered, won, captured from various places by conducting augmented reality scanning various real world objects or from visiting pre-defined geofence boundary associated places or various other ways discuss in detail throughout the specification, wherein in an embodiment virtual money or virtual currency may have virtual value which user can use in virtual world to spend for various purposes including buy one or more virtual characters including soldiers, arms or weapons, vehicles, battel resources for game, virtual resources including land, bricks, cements, materials, woods, glass and like for constructing building or infrastructure in virtual world which may or may not have corresponding real world geography or have modified geography (name of area, looks and feels, appearance) corresponding to real world in game, virtual jewelry, virtual shares, virtual bonds, virtual lottery, virtual power, virtual elements, virtual skills, increases various types of powers including mind power or attack power, or in another embodiment may redeemable in real world.

In an embodiment value of getting of virtual money determined based on or in an embodiment user may get additional amount of virtual money based on actual value of scanned real world object, submitting of receipt of purchase of actual product or service in real world, amount of purchase of actual product or service in real world, distance travel by player by walking, distance travel by player by vehicle, duration spend at particular place, accompanied one or more contacts and associated rank, how fast reach at particular real world object compare to others, level of user, scanned by particular number of users (group scanned), date and time and associated information including details of type of event, reach at particular or real world object by deciphering message, type of action or call-to action conducted or type of mini game played, real world object defined by type of user including user of network or sever administrator or sponsor, and any combination thereof.

Game may comprises action games including battel, shooting, sports games, story games, Artistic/Creative, Exploration, virtual world geography and activities corresponding to real world geography and activities including real world competition effects on virtual world (e.g. user may win or loss virtual objects based on real world sport's outcome, wherein sports may comprises Soccer/football, Badminton, Field Hockey, Volleyball, Basketball, Tennis, Cricket, Table Tennis), casino in real world (user may win or loss virtual objects based on real world casino game outcomes, wherein casino game may comprises Table game. Baccarat. Mini-Baccarat. Blackjack. Craps. Pai gow. Pai gow poker. Roulette, Bank, Big Six wheel, Bingo, Bola tangkas, Dice games, Faro, Keno), augmented reality based games, user may win or loss or adds or deducts from user's account particular amount or number of virtual objects based on various types of real world activities including promotion in positions, qualifying college degrees, get highest score in particular exam (locally, all over school or college, predefine real world area, interstate or statewide, national-wide, international), spending of real money in real world for particular types of real world activities, conducting of one or more types of real world activities including health related like yoga, gym, walking of particular number of steps within particular duration, better health reports, education related including passing or getting score in particular type of exams, and associated awards, medals, certificates, work related including particular type of promotion, particular type of skills, particular type of or number of years of experience, real world salary range, granted patents in real world, numbers of followers, contacts, connections, interacted entities in real world, numbers of sharing, publishing, posts and associated one or more types of and number of reactions including number of likes, number of comments, number of shares, earning of money within particular duration, sports related like duration spends on particular types of sports, associate awards, medals, certificates, food related including eating of particular types of foods within particular duration or getting particular types of nutrition within particular duration, travel related including visiting of particular types and number of places, point of interests within particular duration and/or associated money spending, number of miles walking during travel, conducted type of activities including elephant or camel or horse riding, balloon, water sports, visiting of museum, gardens, zoo, beaches, rivers, sanctuary, forts, forests, mountains, tracking, art gallery, amusement park, water park, entertainment related including viewing particular movie, television serials or types of programs for particular duration, participating or attending one or more types of events including drama, shows, plays, parties, and like, art related having one or more types of arts including singing, acting, playing particular music instrument, dancing, painting, social related including travel or visit places or attending events or festival events with one or more contacts, relatives, friends and families, using, buying, subscribing particular names or types or number of brands, products, services, accessories, digital activities including number of posts, sharing, publications, types of or number of reactions, online transactions.

In an embodiment user needs particular amount of total value of virtual objects and virtual money to reach at particular level.

In an embodiment a character progression system, in which players earn points or amount of virtual money for their actions and use those points to reach character "levels", which makes them better at whatever they do. In an embodiment game may comprises persistent game environment, some form of level progression, social interaction within the game, in-game culture, system architecture, membership in a group, and character customization.

In an embodiment user or player can battel or combat with monsters and completing quests or missions for non-player characters, either alone or in groups, are the primary ways to earn points or virtual objects and virtual money. The accumulation of wealth (including combat-useful items) is also a way to progress in Massively multiplayer online role-playing game (MMORPG) and glorify top ranked players by displaying their avatars on the game's website or posting their stats on a high score screen. Another common practice is to enforce a maximum reachable level for all players, often referred to as a level cap. Once reached, the definition of a player's progression changes.

In an embodiment user or player can sell an item to each other for in-game (virtual) currency, bartering for items between players for items of similar value, purchase of in-game items for real-world currency, exchanges of real-world currencies for virtual currencies to attaching real-world value to "virtual" items has had a profound effect on players.

In an embodiment user or player can get virtual money or equivalent value of virtual gold or virtual diamond or virtual power or valuable things. In an embodiment user or player can get virtual money or equivalent value of virtual gold or virtual diamond or virtual power or valuable things only when user made equivalent actual purchase of products or services in real world.

In an embodiment user or player can get virtual money as well as virtual objects to remember what user did (e.g. viewed movie then provide virtual object related to said movie poster). In an embodiment user or player can get only virtual money in certain type of real world object scanning. In an embodiment user or player can get only virtual objects equivalent to particular amount of virtual money value) in certain type of real world object scanning.

In an embodiment user or player can play one to one, in team, with users of network, join with other groups and teams.

In an embodiment providing of virtual objects, determining value of virtual objects in terms of virtual money value and deciding of providing of particular amount of virtual money by server algorithm, wherein server decides or use standardized method (e.g. based on verified scanned receipt price convert to USD (e.g. 100 USD) divided by particular number (e.g. 10) equal to virtual money 10.

In an embodiment server algorithm standardized real world types, categories, names and provide associated particular amount of virtual money value. For example Type (Pizza)—Categories (Food)—Name (Domino's Pizza) or (Super Pizza) then standardized virtual money value is as per pre-defined virtual money value (e.g. 15).

In an embodiment server can access places and associated information (e.g. places associated information comprise photo, location information, name) database of external providers. Based on said place related photos and associated information, server identifies real world photo, use identified real world photo as object criteria and convert said photo to virtual objects for providing to user who conducted augmented reality scanning or take photo of said real world object. Server module displays said photo of real world object with associated place on real world map, so user can view information, get directions and route information and reach at said place, search and identify object and can conduct augmented reality scanning or take photo of said real world object and in the event of identification of said real world object based on aid object criteria, server provides said virtual object to user or player and provide associated particular amount of virtual money.

In an embodiment based on reaching at particular level within particular duration range then user may get particular type of medals which may add or increases (N %) of bonus in getting of virtual money amount value for each or particular type of Augmented Reality Scan.

In an embodiment generates or log real world conducted activities, actions, participated events, transactions, status associated photos, videos, notes or details or auto details (location or place or check-in place name, accompanied contacts names, number of contacts or profile photo and link, date & time, based on scan product details (name, logo, price), scores, levels etc.) and enable user to view, share or publish said details.

In an embodiment provide ranks to user within users of network based on highest total amount of virtual money value possess by player or user and compare or provide rank within building or societies, address, area, pin code, road, east/west, suburb, city, state, country in real world.

In an embodiment compare virtual objects associated points (based on standard point system) with contacts, other types and categories of users of network (local (home, office) location, school, college, class, club, society, in combination with age or age range, gender, etc.)

In an embodiment real world object associated virtual objects may available in/at/within or virtual objects may available within pre-defined geofence boundary in real world places comprises on-demand cabs or vehicles (moveable), ATM, Banks, Shops, Malls, Hospitals, Dispensary, Medical shops, Hotels, Restaurants, Patrol Pumps, Gardens, Professional Service Provider Offices, Manufacturing establishments, Open land, Forest, Trees, flowers, grass, birds, animals, creatures, Sea, Mountains, Ponds, Buildings, Commercial Complex, Roads, Sports Establishments, Railway station, Bus stop, Airport, Boats or luxury Cruises, library, monuments, museums, art gallery, police stations, fire brigade, government offices, beaches, islands, agriculture lands, snow.

In an embodiment enables platform for external or $3^{rd}$ party's' developers to access or import user's one or more types of game data including all or set of or required or determined or selected typos of virtual objects and all or particular amount of virtual money with user's permission and can provided one or more types of games which usage said one or more types of game data including virtual objects, virtual power, virtual elements, virtual resources, virtual fame, virtual skills, virtual education, and virtual money which may convert to other types of virtual objects, virtual characters, virtual resources. User can view details, search, select, make payment, download, and install and configure one or more types of games uploaded by and provided by external developers and then user may provide game data with permission to said installed game, invite other users or contacts and start playing said game. One or more games can use said one or more types of virtual objects, virtual power, virtual elements, virtual resources, virtual fame, virtual skills, virtual education, and virtual money related to user.

Figure 26:
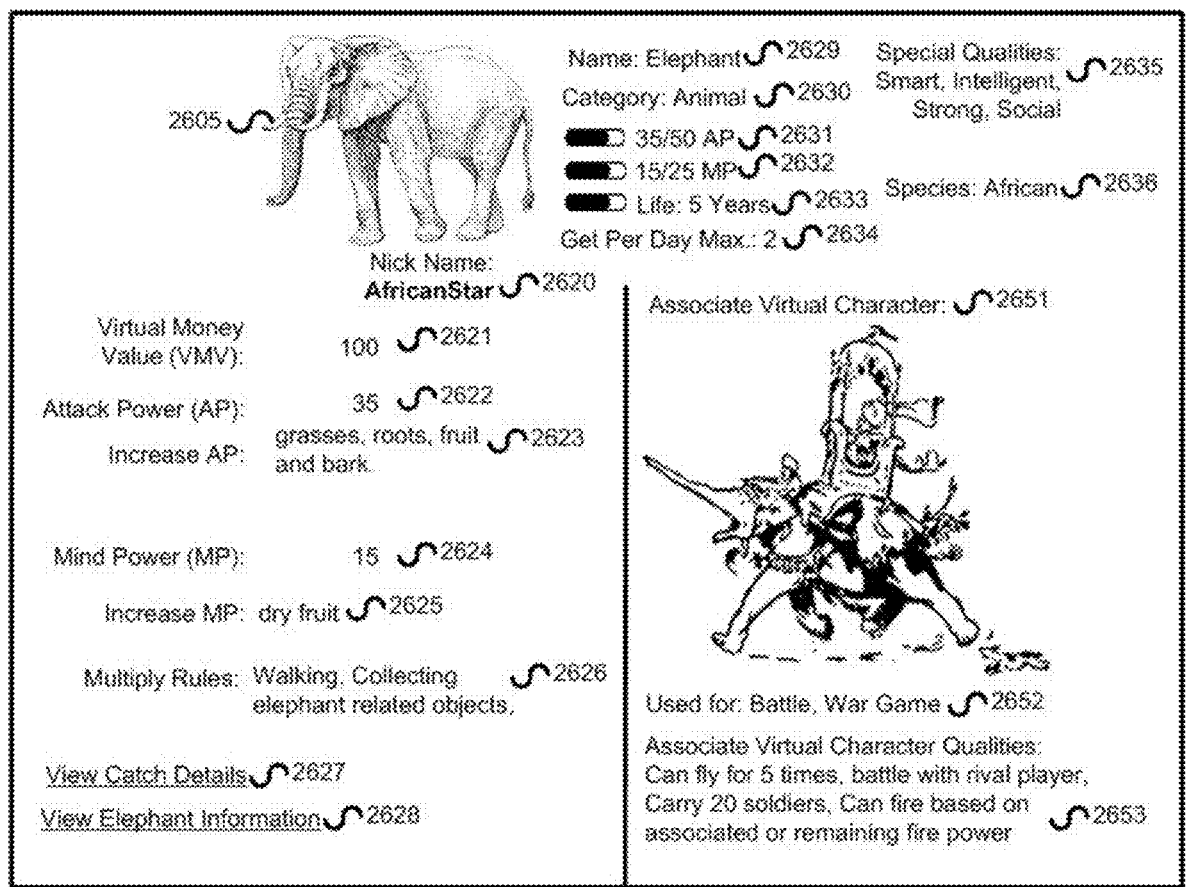

FIG. 26 illustrates user interface showing exemplary various types of virtual attributes 2650 of virtual object or virtual character (e.g. Elephant) 2605/2651 including virtual money value 2621, virtual attack power 2622 and indicator 2631, information about increasing of attack power 2623, mind power 2624 and indicator 2632, information about increasing of mind power 2625, associated grow or multiplying rules 2626, life of virtual character 2633, details about how to catch elephant including playing of one or more types of associated mini games, conducting of one or more types of activities including walking number of miles in real world, visiting zoo, view virtual character's 2605 details 2628, associated special qualities 2635, type or category 2636.

FIG. 27 illustrates example Graphical User Interface (GUI) 276 for enabling user to prepare and draft message or request or suggestion or defining task 2709 for assigning task or instructing task to fulfil or requesting or suggesting to do particular task wherein task comprise ask or instruct or challenge to augmented reality scanning or take photo of real world object or scene as per said message or request or suggestion or defined or described task and associated one or more rules and settings including finish said message or request or suggestion associated described task within pre-set duration 2718. In an embodiment message may in the form of text, location, web address or link, keywords, categories, hashtags, metadata, photo, video, structured data, and any combination thereof, wherein user can select one or more photos or videos voice files 2712, location 2711 or capture or record one or more photos 2713 or videos 2714, search, match, import, select from one or more types of list of messages or templates 2715/2730 including past sent list of messages, select message from locally saved or draft messages, select messages sent by contacts or contacts of contacts of user, search and select messages or templates of messages from directories and sent or prepared by other users of network or providers, select from bookmarked, advertised messages or templates of messages, select from displayed suggested list of messages or templates of messages, wherein suggested messages or templates of messages displayed based on users or selected contacts 2725 associated one or more types of user data including one or more types of user profile including job profile, business profile, professional profile, general profile, game profile, past or current locations, places, one or more types of logged activities, actions, events, transactions, status, behaviours, communications, sharing, sent or received messages and associated one or more types of received virtual type of objects and virtual money. In an embodiment user can ask or take help of one or more other users of network or contacts of user or team members of particular team to prepare message or instruction or request or define task via chat or instant messenger or collaborative application or dedicated Graphical User Interface (GUI) 2716. In an embodiment user can ask or hire service provider to prepare message or instruction or task as per user's requirements or enabling user to purchase one or more hidden pre-defined real world objects from $3^{rd}$ parties' providers. After preparing message or instruction or suggestion or task user can select one or more contacts, connections, followers, groups, networks, team from list of contacts, contacts of contacts, connections of one or more social networks, followers, networks, team as target recipients of said prepared message 2709 or make said message or instruction or defined task 2709 available or searchable for public or ask in public to finish or fulfill or do said message or instruction 2709 associated defined or described task 2709. In an embodiment enable user to define and configure target recipients based on query, types, SQL (structured query language), selected one or more keywords and categories, locations, profile fields including age or age range, type of gender, education, skills, locations, income range, interest or hobby types, related type of or named entities including school, college, company, organization, club, division, class, and position, associated one or more types of one or more conditions, criteria, rules, filters, metadata and boolean operators and any combination thereof. In an embodiment message may comprises a text, a location information, a photo, a video, a voice, a link or web address, a keyword or hashtag and associated metadata including date & time of creation and sent, message sender photo, identity and link of profile, identities of one or more selected contacts as target recipients of message, keywords, hashtags, tags, rules including pre-set duration within which message receiver has to finish task defined in message, preferences and settings and any combination thereof. For example User [Yogesh Rathod] 2707 prepares message "Hi Lily, AR Scan Jumping scene of Dwayne Johnson in "Skyscraper" movie trailer advertisement in Times Square NYC!!!" 2709 and selects contact [Lily] 2725 and group [Best Friends] 2750 as target recipients of said message 2709 to send said prepared message 2709 to said selected contact 2725 and each group members 2750 via server module 159 of server 110 to assign or instruct or suggest or request to fulfill or finish or complete or to-do said message or instruction or suggestion or request associated defined or described task including augmented reality scanning or take one or more photos or record one or more videos of real world object as per said message or instruction or suggestion or request associated defined or described task within said pre-set duration 2718. In an embodiment user can prepare or create or define structured message or instruction or task or request or suggestion by using or employing or filling structured form or fields, wherein structured fields may comprise one or more types or categories of real world object 2770 (user can search real world objects 2770 and selected real world object), current locations of each target recipients 2751, defined locations and places 2752, selected or set one or more types of locations or places 2752, defined radius or geofenced around particular or surround current location or place of each target recipients 2753, selected or searched or set location(s) or place(s) on map 2755, included and excluded or nearby 2762 one or more locations or places (location may comprise address, country, state, city, area, pin, suburb, point of interest, place name), type and named one or more contacts or groups 2775 or entities 2777 including school, college, restaurant, shop, mall, club, product, brand, and company name, one or more types or categories or sub-categories 2780/2781 or hashtags or keywords or tags 2782 of photo or video and any combination thereof. For example user selects object category [Electronic Board] 2770 and selects objects or scene [Jump] 2772 and selects named person or entity or contact name [Dwayne Johnson] 2775 and send 2720/2721 said structured message to selected contact [Lily] 2725 and [Best Friends] 2750. So as per structured message user [Lily] need to augmented reality scanning or take photo or record video of real world object which must or should or may contains said objects or scene [Jump] 2772, person [Dwayne Johnson] 2775 in said conducted augmented reality scanning or captured photo or recorded video. In an embodiment user can prepare message in editor or free form 2709 or structured or in combination of both freeform and structured. In an embodiment user can save message 2709 locally or save remotely 2760, In an embodiment user can share 2722 message with one or more contacts, connections of one or more social networks, groups, networks or in public or make them searchable or accessible for other users of network. In an embodiment user can cancel 2765 prepared or drafted message 2709. In an embodiment user can provide one or more tips 2719 with message to facilitating message recipients in fulfilling message associated task or instruction, wherein tips may include details of location or place name and address, one or more associated real world objects, related persons names, map, route & directions, costs or prices and like.

In an embodiment server module 159 receives message from user and processes the message, wherein process may include grammar verification, spell check, detect language as per defined rules and policies, duplicate content, junk characters, length of message, automatically recognizing and reporting spam, inappropriate, and abusive messages system and human mediated recognizing and reporting spam, inappropriate, and abusive messages as per rules, keywords and policies, verify image or images of video to identify spam or inappropriate message, associate metadata and system data. In an embodiment server module 159 may employ a moderation system to sort messages that are irrelevant, obscene, illegal, or insulting and may also employ content moderators to manually inspect or remove content flagged for hate speech or other objectionable content. These moderators are given special privileges to delete or edit others' messages and/or remove, block, suspend user account or warning user to ensure that the messages or shared content complies with legal and regulatory exigencies, site/community guidelines, and user agreements. In an embodiment spontaneous moderation may employ wherein users will spontaneously moderate their peers through viewing, assessing and alerting message sender. Common privileges of moderators include deleting, merging, moving, and splitting of messages, locking, renaming, banning, suspending, unsuspending, unbanning, warning the members, or adding, editing, removing the messages. In an embodiment server module 159 may employ a wordfilter or Content-control software or filter or censor system which contains a script that automatically scans users' messages and shared or send or published contents as they are submitted and automatically changes or censors particular words or phrases.

The most basic wordfilters search only for specific strings of letters, and remove or overwrite them regardless of their context. More advanced wordfilters make some exceptions for context (such as filtering "butt" but not "butter"), and the most advanced wordfilters may use regular expressions. In an embodiment server module 159 receives message from user and checks, verifies, and validates received message by employing message verification, reviewing, analyzing technologies and human mediated review, verification, checking and validation to identify whether message is spam, inappropriate, inappropriate as per pre-defined rules, policies and take one or more actions and reactions on it, wherein reactions comprises mark as spam and inappropriate and actions comprises instruct system or server module 159 to do not send said message to message associated target recipients defined and selected by sender of said message, remove or block or delete or suspend account of said message sender user. In an embodiment user can prepare message 2709 and first verify 2717 the message 2709 and then can send 2720 message 2709 to one or more selected target recipients 2735, so in the event of unintentionally inappropriate message found then user can able to edit and again verify and then send the message to avoid mark as spam or inappropriate or abuse or avoid blocking of sending of message to target recipients or avoid removing or suspending or blocking of user's account temporarily or permanently.

After successfully processing and verifying of message, server module 159 prepares and generates message notification for each target recipient of message and sends notification and message, associated metadata, rules and call-to-action or action controls to each target recipient via one or more types of notification system and channels including push notification. FIG. 28 (A) illustrates example Graphical User Interface (GUI) 277 for enabling each target recipient to view said received notification including message 2802 and associated metadata including sender photo, name and profile link 2801 and rules including purchase particular product, take one or more types of actions, play one or more type of mini game, duration 2807 within which user need to finish message associated task to get points and take associated one or more user actions or call-to-actions including accept 2811 message 2802 or message associated task or instruction or suggestion or request 2802 including as per message augmented reality scan or capture instructed or suggested or challenged or requested particular type of task specific photo or record video 2802 of real world object or scene, reject message associated task 2810 or reject message associated task with selected or provided one or more reasons 2810, accept message associated task and provide start and end schedule 2812 of task as per pre-set duration to finish task associated with message, request sender to change or update message 2813 or chat with message sender to converse regarding change or update of message, instead of accept message, ask or instruct message sender to do message associated task 2814, in the event of message sender is anonymous and receiving user found message as spam or inappropriate or abusive then receiving user can report as spam or inappropriate or abusive 2816 to server module 159 and block or remove user 2816. In an embodiment user can provide user's status including busy, not available for particular days with one or more types of selected or provided and reasons 2817.

FIG. 28 (B) illustrates example Graphical User Interface (GUI) 277 shows received 2822 and send 2823 lists of messages or instructions or suggestions or requests to do particular or defined or described one or more tasks including augmented reality scan or capture one or more photos or record videos of real world objet(s) or scene based on received message or instruction or suggestion or request. In the event of click or tap on "Received" tab 2822, user can view received messages or instructions or suggestions or requests. In an embodiment user can select particular received messages or instructions or suggestions or requests 2835 from list of messages or instructions or suggestions or requests 2844 and can accept 2852 message 2835 or message associated task or instruction or suggestion or request 2835 including as per message augmented reality scanning or capture instructed or suggested or challenged or requested particular type of photo or record video 2835, reject message associated task 2851 or reject message associated task with selected or provided one or more reasons 2851, accept message associated task and provide start and end schedule 2853 of task as per pre-set duration to finish task associated with message, request sender to change or update message 2854 or chat with message sender to converse regarding change or update of message, instead of accept message, ask or instruct message sender to do message associated task 2855, in the event of message sender is anonymous and receiving user found message as spam or inappropriate or abusive then receiving user can report as spam or inappropriate or abusive 2857 to server module 159 and block or remove user 2857. In an embodiment user can provide user's status including busy, not available for particular days with one or more types of selected or provided and reasons 2862.

The server module 153 of the virtual object application 136 detects that a mobile device 200 has conduct an augmented reality scanning 2872 or record a video or taken a photograph 1872. In the event of augmented reality scanning 2872 or scanning 2890 or taking photo 2895 via camera application 2895 of user device 200, said movie 2372, receiving photo or image or video or scanned data 2872 from the user device 200. The server module 153 of the virtual object application 136 validates actual or original date and time of received scanned data or captured photograph or image 2872 based on sufficiently matching received scanned data or a photograph or image 2872 associated Exchangeable image file format (EXIF) data including date and time of capturing photo or scanning 2872 with current date and time of server. The server module 153 of the virtual object application 136 identifies or recognizes an object 2880 in the photograph or scanned data 2872 that corresponds sufficiently to specified object 2881 and therefore satisfies the object criteria 2881. Based on the identified object 2880 satisfying the object criteria 2881 including object model or image or object keywords associated with the virtual object in the stored data, display or provide the virtual object 2872 and associated virtual money 2871 to the client device 200. Storing virtual objects 2872 and associated virtual money 2871 provided to the client device 200 in a virtual object collection associated with the user account. In an embodiment as per defined required user actions associated with virtual object 2871 or object criteria 2881, user or player needs to conduct one or more required activities or actions or call-to-actions or participations or transactions or play mini games to get, collect, acquire, store, win or select said displayed virtual object 2871 and associated virtual money 2872.

In an embodiment sever module 153 receives from user augmented reality scanning or a photograph or scanned data 2872 of movie or show or play or event and validates actual or original date and time of received scanned data or captured photograph or image 2872 based on sufficiently matching received scanned data or a photograph or image 2872 associated Exchangeable image file format (EXIF) data including date and time of capturing photo or scanning 2872 with current date and time of server and validate location of said scanned object or scene of real world 2872 based on sufficiently matching pre-defined location of said scanned object or scene of real world with monitored and tracked current location or place of user device 200 who scanned or take a photograph 2872 of said object or scene (e.g. movie scene image) and based on said date & time and location or place information, identify movie or show or play or event details including name, show time, theater name. Server module 153 identifies or recognizes an object 2880 in the photograph or scanned data 2872 and based on the identified object 2880 satisfying the object criteria 2881 including object model or image or object keywords associated with the virtual object 2872 in the stored data, display or provide the virtual object 2872/2871 to the client device. Server module 153 stores said virtual objects 2872 and associated virtual money 2871 provided to the client device in a virtual object collection associated with the user account or client device.

In an embodiment in the event of selection of particular received and accepted message 2835, FIG. 28 (C) illustrates example Graphical User Interface (GUI) 271 shows automatically displaying camera application 2875 to enabling receiving user's (e.g. "Lily") computing device 200 to augmented reality scanning or scan via by clicking or trapping on button or icon or control 2890 or capture photo by clicking or trapping on "Photo" button or icon or control 2895 or record video by clicking or trapping on "Video" button or icon or control. In an embodiment in the event of augmented reality scanning or capturing of photo, automatically associating or relating information about said virtual object 2872 and associated virtual money 2871 with said accepted or selected message 2835.

In an embodiment generating a message, by the server module 159, a message for sending to message sender (e.g. "Yogesh Rathod"), wherein message comprise said information about virtual objects 2872 and associated metadata including message identity, instruction or request or suggestion or task message sender identity (e.g. "Yogesh Rathod"), exchangeable image file format (EXIF) data, location information, date & time of virtual object, associated captured photo or recorded video, message sender identity (e.g. "Lily") and receiver identity (e.g. "Yogesh Rathod") and system data. In an embodiment based on said message associated metadata identifying, by the server module 159, the sender of message as recipient of the message.

In an embodiment enabling user to search 2821 messages based on one or more keywords, conditions, rules, Boolean operators and filters. In an embodiment user can filter 2825 or sort 2826 received messages based on user name or identities, status including received, accepted, not accepted, scheduled, instructed to sender of message to do message associated task, task pending, task done (scanned task specific message and received associated virtual objects) and accepted by task provider or instructor, task not done, duration left to finish task, date & time of receiving of messages, highest reactions received, new reactions received, ranks, contacts type, contact rank, online or offline status, one or more members of particular named team or team name, ascending or descending order and any combination thereof.

In an embodiment enabling user to select one or more messages and share 2858 messages or one or more selected messages associated one or more photos or videos or media or one or more types of contents 2837 to one or more selected contacts, groups, one or more types of destinations including one or more types of one or more social networks, applications, services, websites, web pages, albums, stories, timelines and feeds.

In an embodiment enabling user to chat or instant messenger or email or conduct one or more types of communication 2860 with task or instruction message sender.

In an embodiment enabling user to assign received message associated instruction or task 2863 to one or more contacts or other users of network or paid service providers. In an embodiment enabling user to assign received message associated instruction or task 2863 to one or more contacts or other users of network or paid service providers with permission or authorization from instruction or task message sender or preset settings of instruction or task message sender and/or server 110 administrator or based on default or user specific settings of server 110.

In an embodiment enabling user to request instruction or task message sender to extend or provide additional duration 2861 to finish said message associated task and provide one or more reasons to need of extension of time to finish message associated task.

Figure 29:
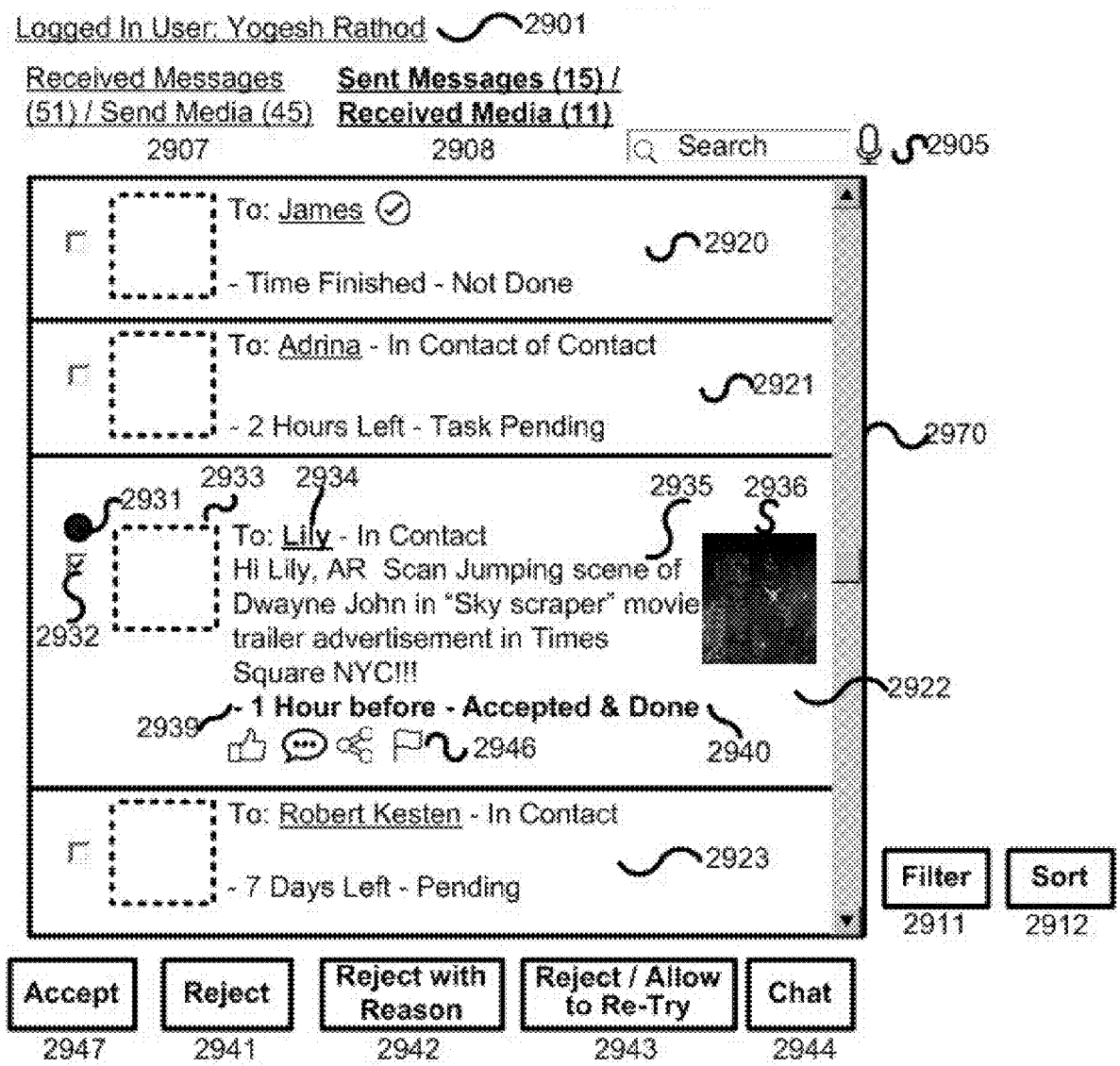
FIG. 29 illustrates example Graphical User interface (GUI) enabling user to view one or more types of status details related to send message, take one or more types of user actions or call-to-actions, providing one or more types of reactions.

In an embodiment sending and notifying 2822, by the server module 159, said information about received virtual objects 2871/2872 to the instruction or task or suggestion or request message sender (e.g. "Yogesh Rathod"). FIG. 29 illustrates example Graphical User Interface (GUI) showing status 2940, reactions controls 2946 and reactions and metadata to the instruction or task or suggestion or request message sender (e.g. "Yogesh Rathod"). In the event of clicking or tapping on message (e.g. message 2922) from list of received message 2970 by receiving or viewing user (e.g. "Yogesh Rathod"), displaying message associated one or more photos or videos or media or any combination thereof, wherein message may comprises message sender photo 2933, name and profile link 2934, status and type of message send 2937, instruction or task or request or suggestion message sender name and associated instruction or task or request or suggestion message 2935, date & time 2930, status 2940 associated with instruction or task or request or suggestion message sent by user (e.g. "Yogesh Rathod"), thumbnail of received photo or video or media 2936 send by instruction or task doer user (e.g. "Lily"), one or more type of reaction controls 2946 for enabling receiving or viewing user to take one or more actions and reactions including like, dislike, comment, share, report.

Figure 30:
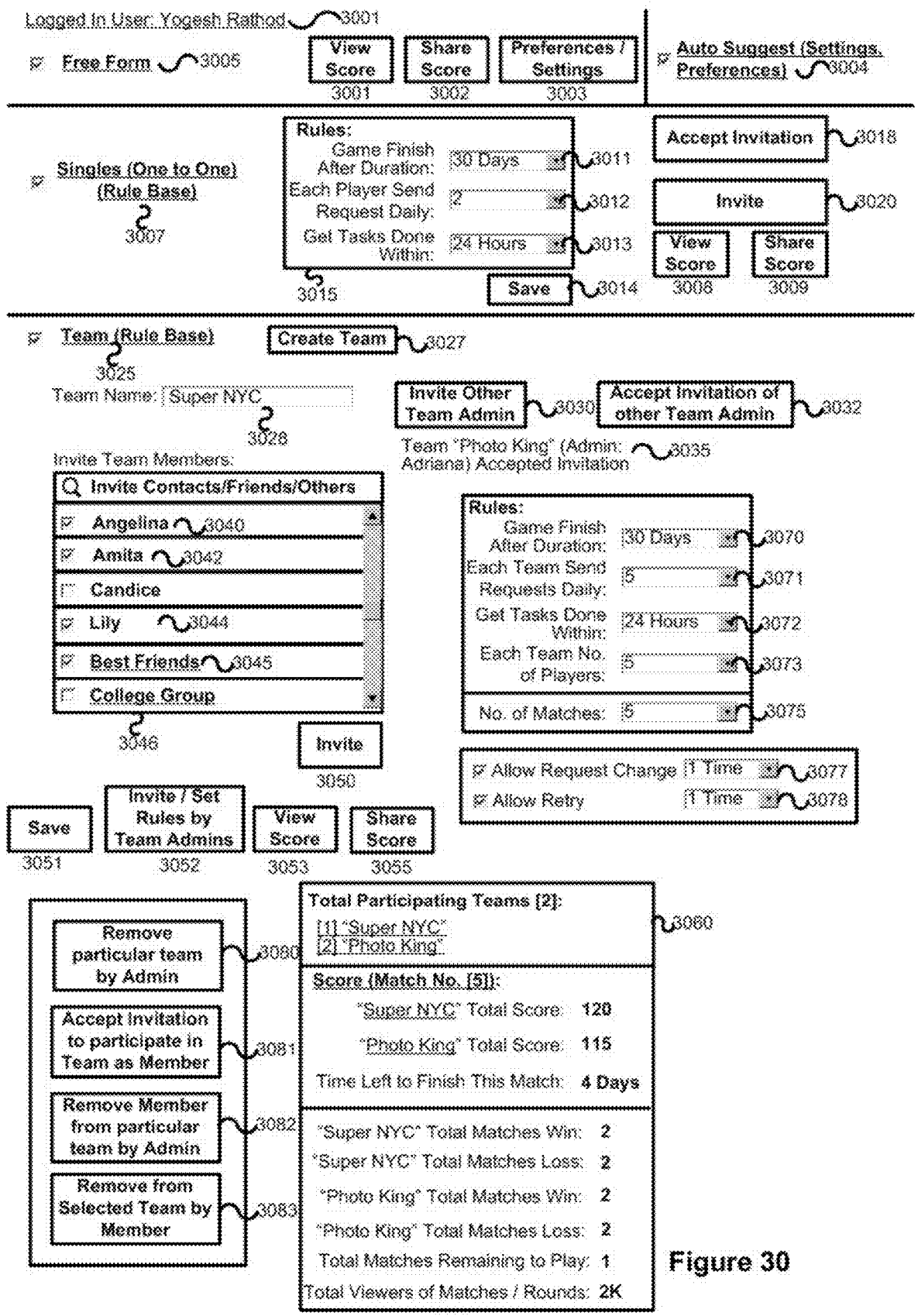
FIG. 30 illustrates example Graphical User interface (GUI) enabling user to select one or more types of playing mode, send or accept invitations, define or update rules, create, participate in and manage one or more teams and view scores, statistics, status and various types of logs.

FIG. 30 illustrates example Graphical User Interface (GUI) 279 wherein user can select "Free Form" option 3005 to get instruction or task message from one or more contacts, contacts of contacts, advertisers, users of network based on preferences, rules and settings 3003, wherein preferences, rules and settings comprises selected one or more contacts, connections of one or more social networks and applications, groups, networks, any users of network or public, keywords and categories specific users including users from particular location(s), named school or college or type or named interacted or related one or more entities, all or preferences specific verified users, all or preferences specific advertisers including advertisers who provides offers including cash, gifts, redeemable points, vouchers, cashbacks, discount, samples, digital goods, virtual objects, virtual money or points, pre-set scheduled date and time or pre-set duration for receiving instruction or task message, receiving instruction or task message from mutually connected users or invitation accepted users only. User can view score 3001 and share score 3002. User can accumulate or collect or aggregate score as much as possible for ranking, showcase in ladder.

In an embodiment automatically get instruction or task messages (e.g. 1501, 1504, 1505, 1507, 1509) from server based on preferences including interests types, categories, keywords, hashtags, named or type of or pre-set locations and places, defined geofenced boundaries, defined radius surround user's current location or particular locations or places, date & times and one or more types of filters, conditions, SQL (Structured Query Language) and criteria, rules including receiving instruction or task message as per pre-set scheduled date and time or pre-set duration and settings 3004 of user and/or advertisements or suggested by server or picked by server administrators and/or one or more types of user data, wherein user data comprises current or past locations, checked-in places, current date and time and associated events, schedules, place associated information, date associated events or festivals, accompanied contacts and associated user data, logged various types of information about current and past activities, actions, events, transactions, interacted entities, calendar entries, user contacts and connection and associated user data, one or more types of profile including general profile comprises age, gender, income range, interests or hobbies, current and past work and office addresses, related one or more types of entities, related keywords, tags, hashtags, related reactions, liked products, services, people and entities, job profile, social profile, interests profile, professional profile, business profile and like.

In an embodiment enabling user to select "Singles" option 3007 wherein user can accept invitation 3018 of contacts or other users of network and send invitation 3020 to contacts or other users of network and in the event of acceptance of invitation enable both mutually connected users to send each other instruction or task messages based on one or more types of mutually decided rules and settings and receive associated or related status notification regarding searching, founding, identification of instruction specific real world objects, scanning of said identified real world object(s) and receiving of associated virtual objects/virtual money, wherein rules and settings 3015 comprises finish game within pre-set duration 3011, daily allowed pre-set number of instruction or task messages sending 3012 and get message associated task done within pre-set duration 3013 and then user can save and execute or apply rules and settings 3014. So user can play with each mutually connected user with mutually decided rules and settings with each mutually connected user. User can view score 3008 and share score 3009.

In an embodiment user can select Team option 3025 and create and manage one or more teams. In the intention to become administrator of particular team, user can tap or click on "create team" button 3027 and provide team name e.g. "Super NYC" 3028 and invite other team administrator 3030 (e.g. "Team "Photo King" (Admin: Adriana) Accepted Invitation") or accept invitation of other team administrator 3032 with the intention to challenge said team. After that both team or each participated team can invite team members by selecting one or more contacts, groups or other searched or matched users of network (e.g. 3040, 3042, 3044 and 3045) from list of contacts, groups and other users of network 3046 and sending invitation to each team members 3050. Team administrators can mutually decide rules and settings 3052 to be applied to both teams, wherein rules and settings comprises finish game within pre-set duration 3070, daily allowed pre-set number of instruction or task messages sending by each team to other team 3071 and get message associated task done within pre-set duration 3072, number of players in each team 3073, number of matches 3075, allowed number of times request or instruction or task message changes 3077, allowed number of times retry 3078. In an embodiment while creating team some validation may apply, wherein validation comprises no more than pre-set number of players, no same member in both team, at least 2 members in each team. After creating team and deciding and applying rules team administrators can finalize and save team and associated rules and settings 3051. In an embodiment administrator of team can remove team 3080. In an embodiment administrator of team can remove one or more team members from team 3082. In an embodiment user can view and accept invitation of particular team administrator 3081 with the intention to participate in said team. In an embodiment any team member can remove themselves from particular team 3083. In an embodiment team members and based on mutual permission, contacts or other users of network can view scores 3053. In an embodiment team administrator or as per mutual decision team administrators can view or publish or share team information, associated updated scores, status, statistics, analytics, logged activities 3060 to feeds, timelines, and one or more contacts, groups, networks, external social networks, websites, applications, web services, and one or more types of digital destinations. In an embodiment if tie between two teams then pre-set number of (e.g. 5) more attempts for each team. If again tie between two teams then each team gets 1 attempt up-to 1 team fails. In an embodiment provide pre-set particular number of points or virtual money for acceptance of instruction. In an embodiment deduct pre-set particular number of points or virtual money for rejection or rejection after allowing retry of instruction. In an embodiment provide pre-set particular number of points or virtual money for finishing particular number of the task of the assign task. In an embodiment assign more than one task by sending a message 2709. In an embodiment user can view detail profile of contact user e.g. "Lily"2725 before sending message 2709 to said contact, so user can properly customize or prepare instruction or task 2709.

Server module 160 receives and stores invitations, accepted or rejected invitations, information about mutually connected players, information about created teams and associated participated members, scores, rules, preferences, settings, updates, logged activities, actins, events, transaction, status, statistics, and updated scores.

Figure 31:
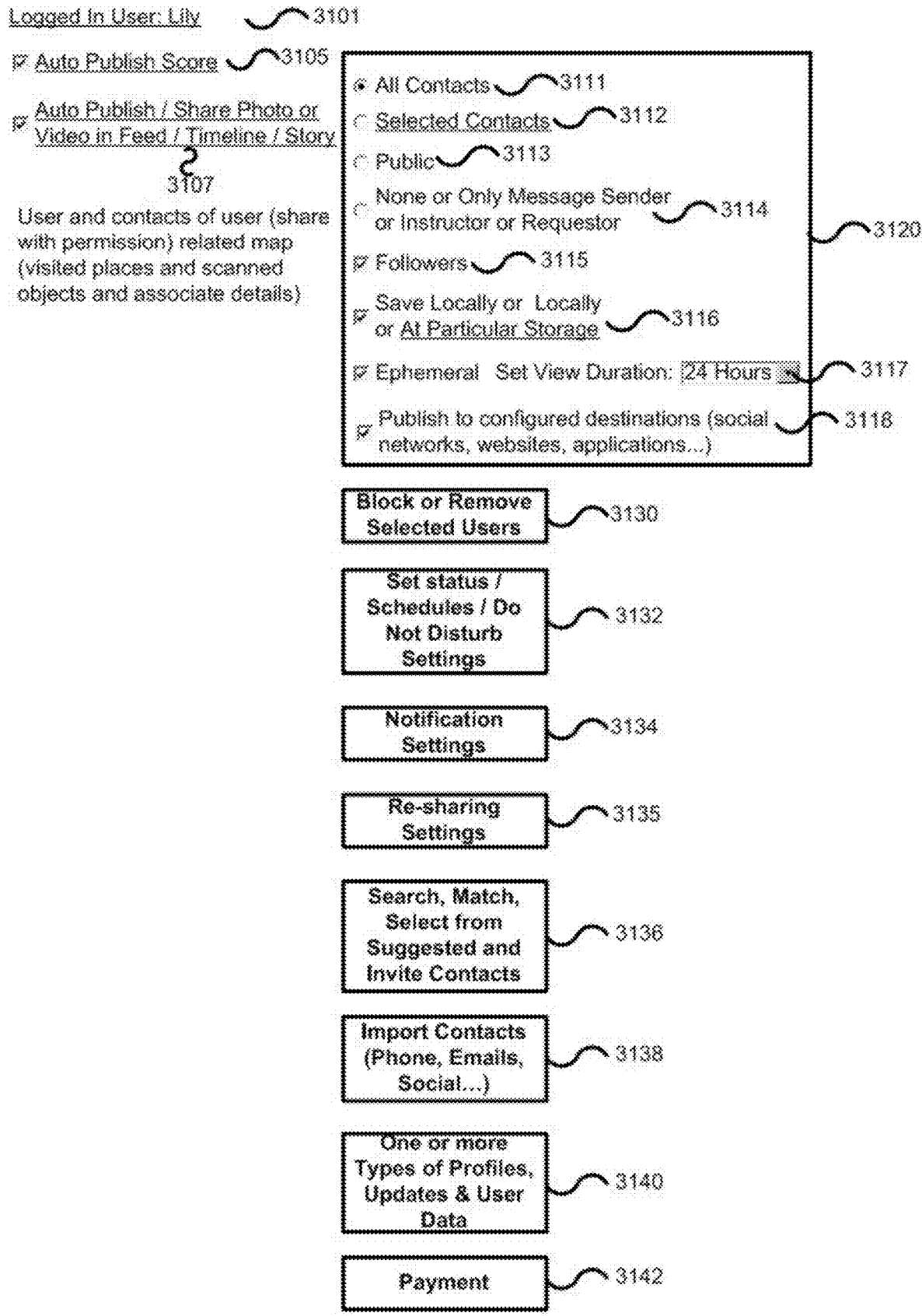
FIG. 31 illustrates example Graphical User interface (GUI) enabling user to select, set, apply and update one or more types of privacy settings, preferences, and rules and configure and consume one or more types of services.

FIG. 31 illustrates example Graphical User Interface (GUI) 280 for enabling user to pre-set allowing to automatically publish or share or send or update scores 805 and automatically publish or share or send or update each or selected instruction or task message(s) and instruction or task message associated one or more types of content or media including one or more photos or videos, associated updated scores, number and types of views, number and types of reactions, logged one or more types of activities, actions, reactions including number of views, likes, types of emoticons, comments, shares 3107 to all 3111 or selected one or more contacts 3112 or public 3113 or None or do not publish or send to anybody or send only to message sender 3114, followers 3115, enabling to publish to said content to one or more social networks, search engines, websites, webpages, applications, web services, one or more selected users on external website's timeline or feed or profile, send via one or more communication channels, mediums and modes including email, phone, VOIP, SMS, Instant messenger, tweets and posts 3118, save locally or at particular storage 3116, and pre-set view duration for enabling receiving and viewing user to view said published content only for said pre-set view duration 3117.

In an embodiment enabling user to block or remove selected contacts or users 3130. In an embodiment enabling user to set status including online, offline, busy, not available and provide availability or non-availability one or more schedules and apply "Do Not Disturb" settings, rules and policies including allow to send instruction or task message only to selected contacts or users, availability or non-availability one or more schedules, ON or OFF "Do Not Disturb" 3132. In an embodiment enabling user to provide or set or update one or more types of notification settings, wherein notification settings may include play selected named and type of notification tones and vibration type while receiving of instruction or task message, while receiving of instruction or task message associated status, while receiving instruction specific virtual objects by identifying and scanning real world object by instruction receiver, while sending of instruction or task message specific or related status, type of reactions 3134. In an embodiment enabling user to allow or not allow one or more selected contacts or users or type of users to reshape user related, shared, published, generated contents, messages, shared media, status, and scores 3135. Server module 160 receives stores and applies said one or more types of privacy settings related to each user of network. In an embodiment enabling user to search and match one or more contacts or users of network, view profile of searched or matched or suggested users of network and send invitations or accept invitation of other contacts or other users of network 3136. In an embodiment enabling user to invite phone contacts via SMS or invite email contacts via emails or invite social network contacts or connections via sending posts or messages to one or more social networks, applications and websites and inviting them to download and install application and connect with user to play games including send and receive and accept or reject instructions or tasks, create teams, invite contacts and participate in team, and view feeds including shared contents, status, reactions and scores 3138. In an embodiment enabling user to provide one or more types of profile information, updates, updated status, checked in places, current location, interests, participated or participating events, conducted transaction details, liked activates, products, services, entities, and people, related keywords, hashtags, import, search and invite contacts 3140. In an embodiment user is configured to provide one or more types of payment information 3142.

In an embodiment in Team mode of play, team members and administrator can collaboratively 330 ("Collaborative/Team") prepare instruction or task message 309 and can send to one or more target recipients or teams or selected member of selected team. In an embodiment administrator of team can assign received message associated task including search, locate, identify and scan ort take photo of real world object. In an embodiment enabling administrator of team or member of team to accept or reject message associated instructed task.

In an embodiment score may calculated based on how fast search, identify and scan instruction or task specific real world object(s. In an embodiment if instructed task finish then enabling to ask other task (task assigner user must have to provide task within particular duration e.g. within 10 minutes) and determine winner uses or team based on who finish more tasks within particular duration (e.g. 1 week). In an embodiment enabling user to search one or more team based on name, rank, score range, location, category, profile field and invite them and challenge them.

Figure 32:
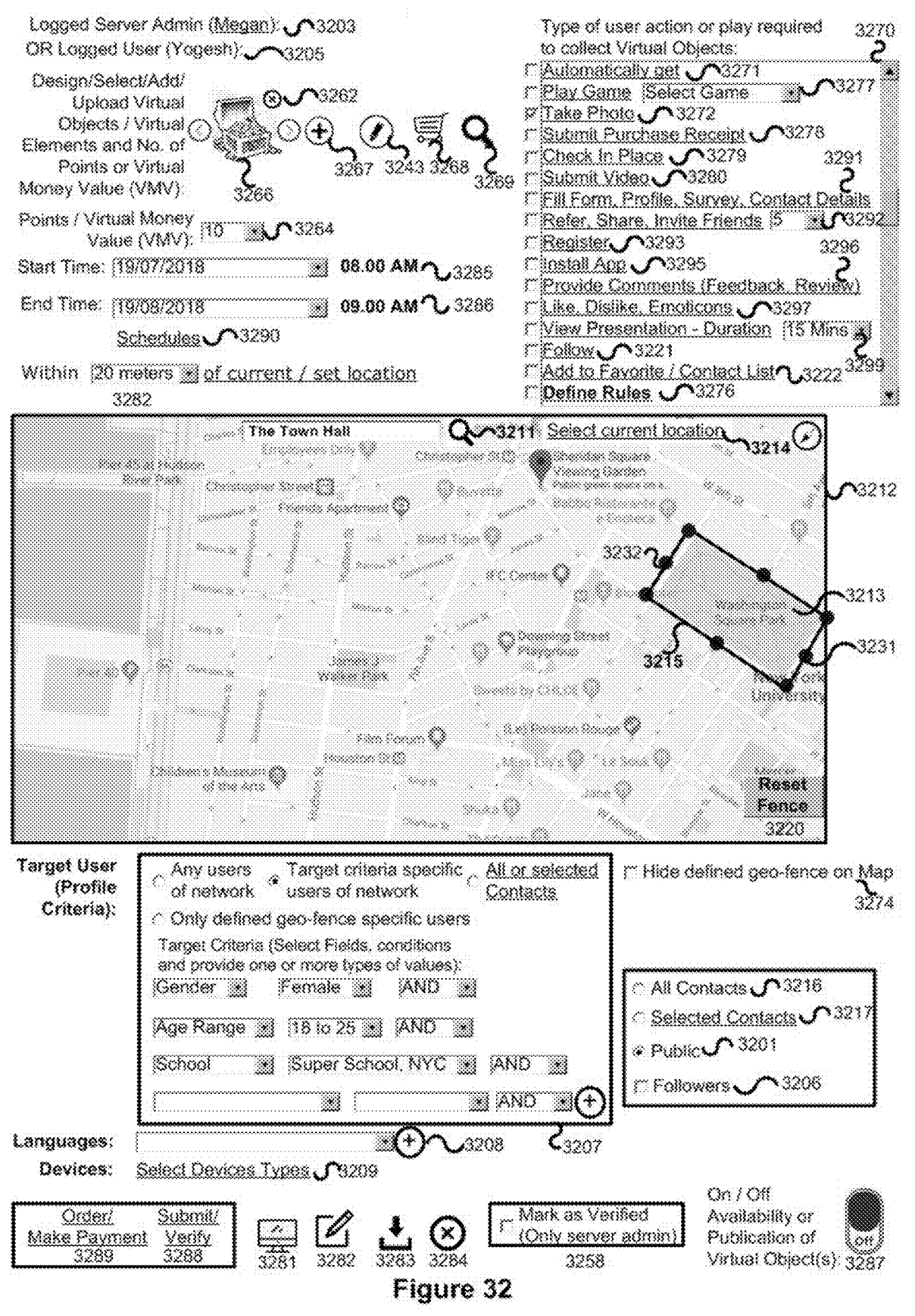

FIG. 32 illustrates example Graphical User Interface (GUI) 290 for enabling user 305 or server administrator 303 to search particular location or place on map based on search query or one or more keywords 3211 or select particular place or location 3213 on map 3212 or visit place 3213 and get or identify Global Positioning System (GPS) coordinates, longitude, latitude, altitude one or more location points (e.g. 3231/3232) of particular location or place 3213 to identify points of geo-fence boundary and based on said identified points define geo-fence boundary surround particular place on map in the real world, define or draw on map geo-fence boundaries 3215 surround particular location or place 3213 on map of real world, set distance of the location of the real world location or place and the player or user, wherein the virtual object is displayed or provided to the player or user or add to user's collection or store to user's account in response to the client device being within said set distance of the location of the real world or within said pre-defined geo-fence boundary. In another embodiment, other sensors may be used to detect a geolocation of the mobile device 200. For example, a WiFi sensor or Bluetooth sensor or Beacons including iBeacons or other accurate indoor or outdoor location determination and identification technologies can be used to determine the geolocation of the mobile device 200.

In an embodiment user 3205 or server 3203 administrator can capture or record or select and provide one or more photos or videos related to said pre-defined real world geofence, provide or select and associate one or more types or categories or sub-categories or taxonomy, provided physical address related to said pre-defined real world geofence, so users or players of network can physically reach or visit said pre-define geofence place or location or use map directions & route and step by step or guided directions to physically reach at said pre-defined real world geofence, provide details or description or structured details of said pre-defined real world geofence, select or add one or more new fields and provide each added field specific one or more types of values or data or one or more types of contents or media. In an embodiment limit users of network or exemplary user 3205 to provide one or more types of information. For example in case of limiting providing of information, after providing of information by exemplary user of network 3205, exemplary user of network 3205 is enable to save said information as draft for later editing or submission 3288 or edit already drafted or cancel or discard or remove said provided or drafted information or submit to server module 183 of server 110 for verification, validation, moderation, editing, providing or applying other settings and making available for all or authorized users of network. In an embodiment enable or authorize only server administrator 3203 to provide said one or more types of information.

In an embodiment enabling or authorizing server administrator 3203 or in another embodiment enabling user of network 3205 to provide, select 3267, import, search 3269, purchase 3268, design 3243, edit, update, upgrade, add 3267 and upload one or more types of one or more virtual objects or virtual elements or virtual characters 3266 and provide or select and associate custom or user defined number of or particular amount of or value of virtual money or virtual currency or points or numbers 3264 or use pre-set or pre-defined or pre-associated by server, number of or particular amount of or value of virtual money or virtual currency or points or numbers 3264 for particular category or type of said pre-defined real world geofence.

In an embodiment enabling or authorizing server administrator 3203 or in another embodiment enabling user of network 3205 to define or customize or configure geo-fence boundary 3215 or draw on map (e.g. 3212) geo-fence boundary (e.g. 3215) surround real world particular place (e.g. garden, Zoo, park, museum, public place, place of interest, tourist place, forest, mountain, pond, river, sea, island, land, mall, sky, public places, art gallery, museum, home, building and like).

In an embodiment enable or authorizing server administrator 3203 or in another embodiment enabling user of network 3205 to define or set whether virtual object(s) and associated virtual money display or show or present anywhere within predefined geo-fence boundary 3215 of real world, so when user or player enters in to said defines geo-fence boundary 3215, then without scanning any real world object within said geofence boundary, displaying or presenting virtual objects 3266 and/or associated virtual money 3264 to said user or player who entered or dwell in said pre-defined geo-fence of real world and enable said user or player to get said displayed one or more virtual objects 3266 and/or associated virtual money 3264 or get said virtual objects 3266 and/or associated virtual money 3264 by conducting one or more pre-set activities, actions or call-to actions 3270 or based on deciphering of pre-defined clue 3270. In an embodiment enabling or authorizing server administrator 3203 or in another embodiment enabling user of network 3205 to hide 3274 said details and location about said pre-defined geo-fence 3215 of the real world for one or more types of authorized users of network for enabling them to identify or view and collect or get said pre-defined geo-fence 3215 of the real world associated virtual object 3266 based on guess, or display based on luck or random or lottery or based on deciphering clue or tips or hints.

In an embodiment enabling or authorizing server administrator 3203 or in another embodiment enabling user of network 3205 to define or set or apply one or more schedules 3290 of availability of said pre-defined geo-fence 3215 of the real world associated virtual objects 3266 and/or associated virtual currency 3264 including start date and time 3285 and end date and time 3286 of availability of said virtual objects 3266 within said pre-defined geo-fence 3215 of the real world.

In an embodiment enabling or authorizing server administrator 3203 or in another embodiment enabling user of network 3205 to apply or select or define one or more types of user actions, activities, fulfill rules, play games or mini games, call-to-actions to make requirement or necessary or mandatory for users of network to conduct or do said defined one or more types of activities, actions, call to actions or fulfill associated rules or play mini game to collect or get displayed virtual objects and associated virtual money in the event of user of network entered in to said pre-defined geo-fence 3215 of the real world, wherein one or more types of user actions and activities comprise need to play pre-set game 3277, need to take one or more photos 3272 or videos 3280 of any or particular type or named real world object related to said pre-defined geo-fence 3215 of the real world e.g. particular type of animal, named sculpture or art, item, tree, flower, bird, product, electrified board, logo, brand name, and food item, submit ticket or purchase receipt 3278, need to check in place 3279 within said pre-defined geo-fence 3215 of the real world, fill form 3291 including feedback, comments and reviews, user's one or more types of profile or details, survey form, need to provide contact details, need to refer 3292 said pre-defined geo-fence 3215 of the real world associated one or more places, arts, event, products, exhibition, type of tickets and shows to particular number of friends or contacts of user, need to share 3292 details or photo or video of said pre-defined geo-fence 3215 of the real world and associated one or more places, arts, event, products, exhibition, type of tickets and shows, invite friends 3292 to visit said pre-defined geo-fence 3215 of the real world and associated one or more places, arts, event, products, exhibition, and shows, register 3293 with web site of said pre-defined geo-fence 3215 of the real world and associated one or more places, events, products, exhibitions, and shows, install application 395 of said pre-defined geo-fence 3215 of the real world and associated one or more places, event, products, need to take one or more types of reactions including like, dislike, provide one or more types of emoticons 3297 on said pre-defined geo-fence 3215 of the real world and associated one or more places, arts, event, products, exhibition, type of tickets and shows, need to view particular duration of presentation of said pre-defined geo-fence 3215 of the real world and associated one or more places, arts, event, products, exhibition, type of tickets and shows 3929, follow 3221 said pre-defined geo-fence 3215 of the real world and associated one or more places, related personas, arts, event, products, exhibition, and shows, need to add to favorite or contact list 3222 said pre-defined geo-fence 3215 of the real world and associated one or more places, arts, event, products, exhibition, type of tickets and shows or conduct one or more types of actions as per defined rules 3276 or to-do as per defined one or more types of rules 3276.

In an embodiment in the event of selection of automatically get option 3271, user of network who entered into or stayed or dwell for particular pre-set duration in said pre-defined geo-fence 3215 of the real world and associated one or more places, event, exhibition, and shows will automatically get associated virtual object 3266 and/or associated virtual money 3264. In an embodiment in the event of selection of play mini games option and selection of type of game 3277, user of network who entered into or stayed or dwell for particular pre-set duration in said pre-defined geo-fence 3215 of the real world and associated one or more places, event, exhibition, and shows will need to play said set or selected mini game to get or collect or capture associated virtual object 3266 and/or associated virtual money 3264. In an embodiment enabling or authorizing server administrator 3203 or in another embodiment enabling user of network 3205 to take photo of user with said pre-defined geo-fence 3215 of the real world and associated one or more places, arts, event, products, exhibition, and shows and submit to sever module 184 of server 110 and in the event of matching submitted photo associated Exchangeable image file format (EXIF) data associated captured photo date and time plus additional duration for submitting photo (which must be within provided or pre-set maximum duration to submit captured photo) with server's current date and time, provided or add or store associated virtual object 3266 and/or associated virtual money 3264 to user's collection of virtual objects and virtual money or virtual currency or user's account.

Figure 35:
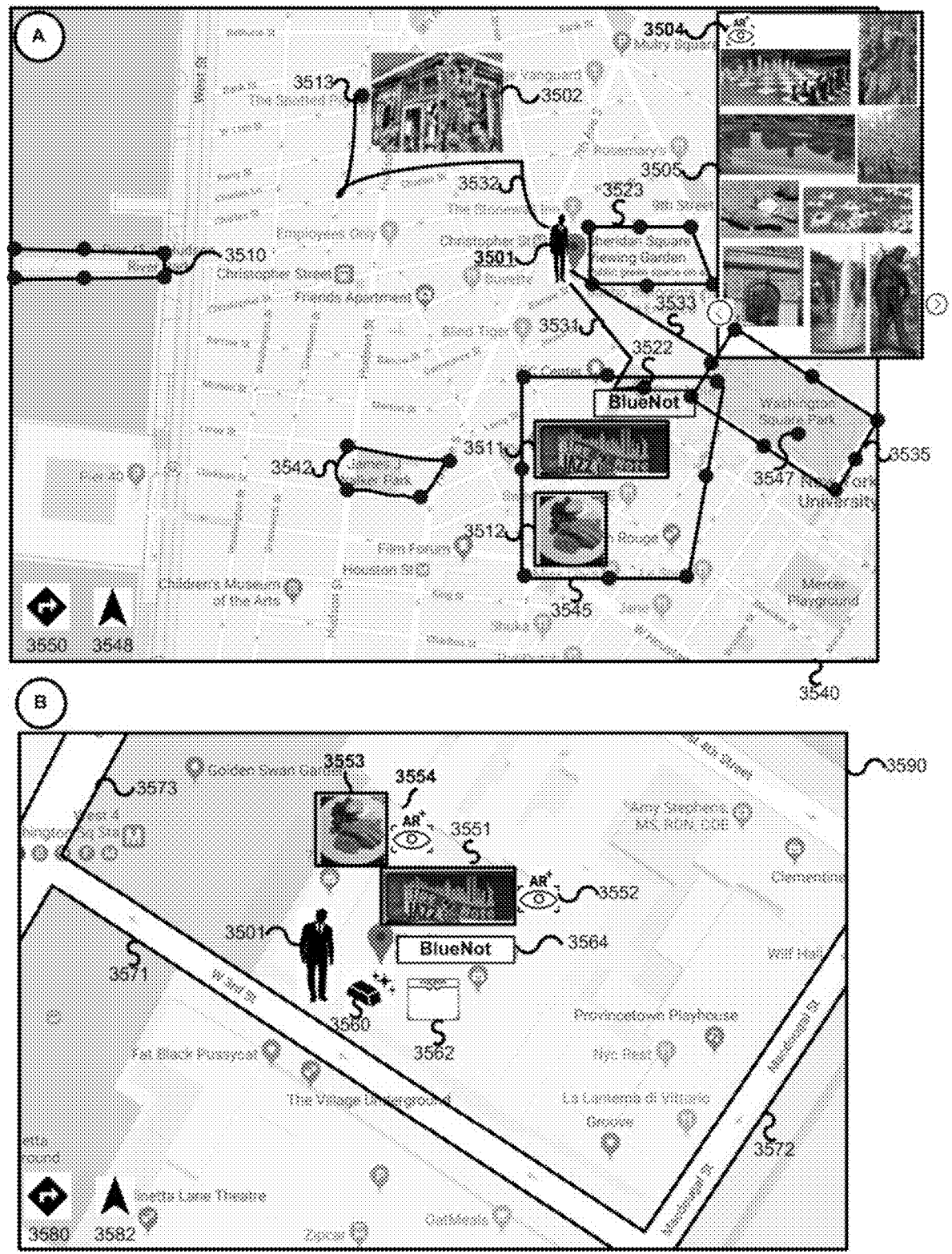
FIGS. 35-36 illustrates example Graphical User interface (GUI) enabling user to view virtual objects when user enters in to said pre-defined geofence boundary or stay for pre-set duration within said pre-defined geofence boundary.
Figure 36:
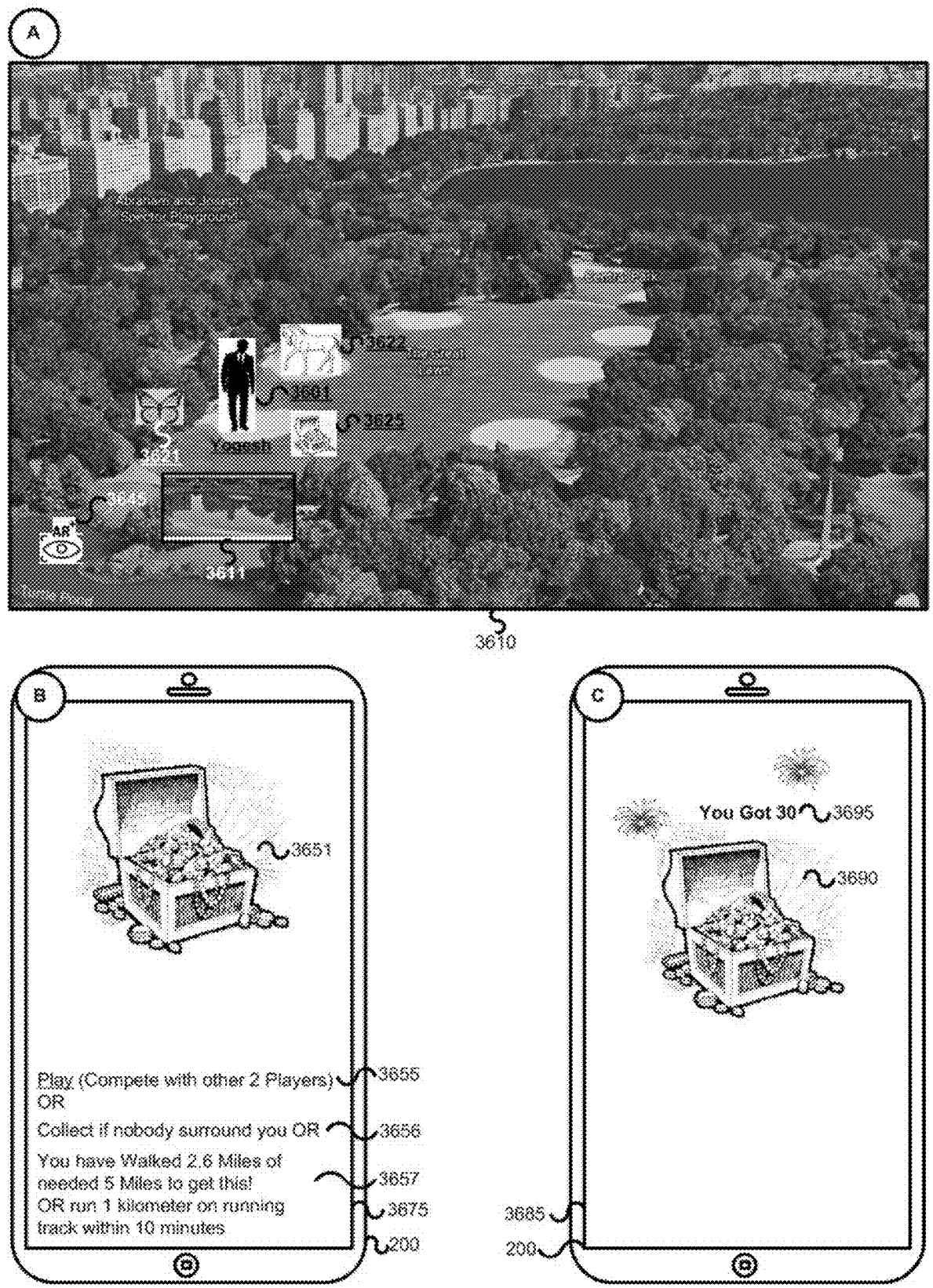

In an embodiment user can suggests one or more geo-fence boundaries related to the real world and provides associated details which server module 183 receives and verifies and makes available for other users of network (discuss in detail in FIGS. 35-36). In an embodiment in the event of commercial geo-fence boundary (mall, shop, restaurant, hotel, theatre, commercial complex, offices, company, building, place) or if advertiser or sponsor wants to publish virtual objects related to real world object including product, service, food item, place of business, board name, showcase display item or product, art, sculpture, design, person in-shop and logo or brand or name, then advertiser or sponsor can make payment 3289 and in an embodiment in the event of user of network, user need to submit said provided information to server module 183 for processing, moderation, verification, validation, applying needed settings and after successfully validation and verification making them available for other users of network.

In an embodiment in the event of submitting 3288 said information by user to sever for processing, moderation, verification, validation, applying needed settings, server module 183 received said information from user and enables sever administrator 3203 to review said information and after successfully reviewing, moderation, verification, validation, applying needed settings, server administrator mark said information as verified information 3258.

In an embodiment enabling server administrator 3203 or in another embodiment enabling user of network 3205 to preview said information, test applied settings, virtual objects, geo-fence boundary, schedule, and actions 3281, enabling to save as draft or edit already exists or saved information 3282, save current information 3283 or cancel or discard or remove provided information 3284.

In an embodiment enabling server module 183 or server administrator to suggest or provide or display number of points or amount of virtual money for user selection based on object type, location or place, associated type of actions, paid or sponsored or free, type of user who provided information, schedules or duration of publication, geo-fence boundary.

In an embodiment server admin can apply or set one or more types of required actions to collect or get one or more virtual objects 3265 from said pre-defined geo-fence boundary 3215.

In an embodiment enabling or authorizing server administrator 3203 or in another embodiment enabling user of network 3205 to adds information about one or more pre-defined geo-fence boundaries 3215 of real world, provide one or more types of settings, preferences, clue, tips, virtual objects, schedules, required actions for users or players of network to collect said virtual objects when user enters into or stays for pre-set duration in said pre-defined geo-fence boundary 3215.

In an embodiment advertiser or sponsor can provides associated target criteria 3207 including add, include or exclude or filter one or more languages 3208, schedule of showing of advertisement or virtual object including start date 3285, end date 3286 and showing advertisements all the time or particular time, time range at particular date or day 3290, select targeted device type(s) 3209 including mobile devices, personal computer, wearable device, tablets, android device and/or iOS devices etc., define target user's profile type or characteristics or modeling of target users including any users of network or target criteria specific users of network including one or more types of one or more profile fields including gender, age or age range, education, qualification, home or work locations, related entities including organization or school or college or company name(s) and Boolean operators and any combination thereof 3207.

In an embodiment advertiser or sponsor or user can allow to access said virtual objects related to pre-defined one or more geo-fence boundaries of the real world to one or more identified users, contacts, followers, past and/or present customers, prospective customers, particular defined type of users of network 3207 or all users of network who entered into or stays for pre-set duration within/in/at said pre-defined one or more geo-fence boundaries of the real world.

In an embodiment advertiser or sponsor or user can start or pause or turn ON or Off 3287 availability of or publication of virtual objects associated with said pre-defined one or more geo-fence boundaries of the real world for authorized users who entered into or stays for pre-set duration within/in/at said pre-defined one or more geo-fence boundaries of the real world.

In an embodiment server module 183 receives information related to pre-defined geo-fence boundary including associated virtual objects, settings, preferences, publishing or disabling or target criteria, user actions and rules. In an embodiment in the event of submitting said information about said pre-defined geo-fence boundary 3215, server module 183 receives said information and stores to server database 115 and verifies photos, videos, name, address, details, location information including place, geo-fence boundary, virtual objects, associated virtual money, text, data and metadata, applied settings, schedules, one or more required actions. After successfully verification, server administrator makes available said information on map or other one or more types of Graphical User Interface (GUIs) for users of network (Discuss in detail in FIGS. 35-36.

Figure 34:
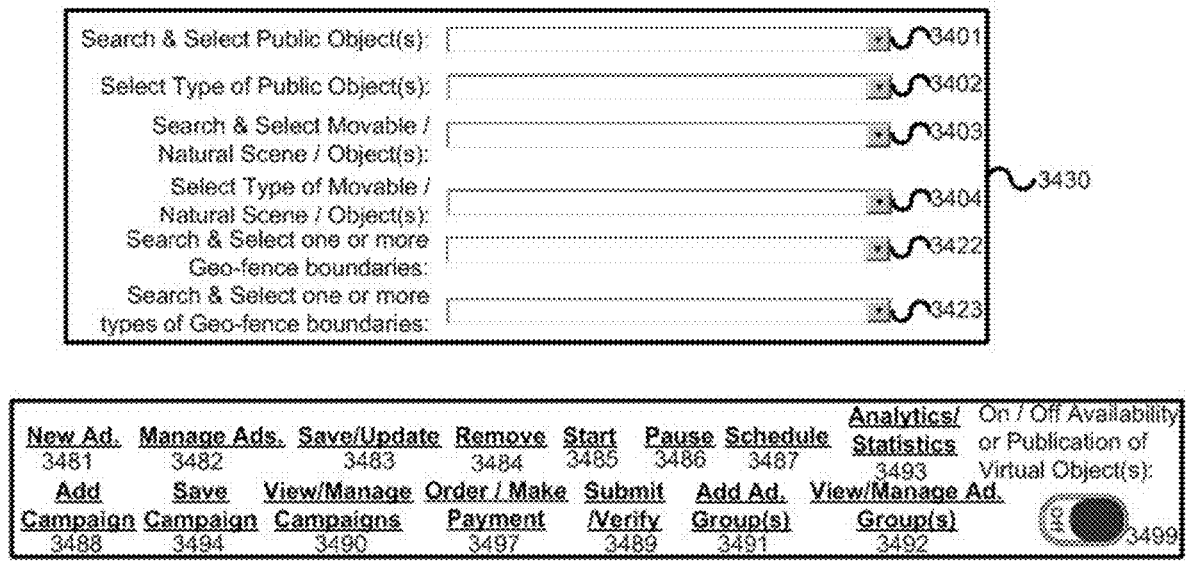

FIGS. 33-34 illustrates user interface(s) 290 for in an embodiment enabling sponsor or advertiser or publisher user 3305 to create account including provide user and entity details 3301 (name, age, gender & other profile information, entity name & address, email, contact information), login information (e.g. user identity or email address, password), billing information & payment information (if paid) or free for general user, authorized publisher and server admin. In an embodiment after creating account, server or system verifies sponsor or advertiser or publisher or user's account(s) or type of account and associated roles, rules, privacy, rights & privileges and policies and active user's account to enable account holder to create and manage one or more advertisement campaigns, advertisement groups, advertisements and associate virtual objects, details about pre-defined geo-fence boundary 3344 draw or defined on map 3345 including photos or videos, target criteria, schedules, associate user actions, geo-fence, preferences and other settings. In an embodiment enabling sponsor or advertiser to create one or more advertisement campaigns 3303 or enabling user to create one or more virtual objects publications 3304, campaign or publication comprises a set of advertisement groups (virtual objects 3366, virtual objects associated geo-fence boundary 3344 or draw or defined geo-fence boundary 3344 associated virtual objects 3366, details of geo-fence boundary, advertisements, user actions) that share a budget 3315, advertisement model type 3316, location targeting 3318, type of user profile or defined characteristics of user for targeting users of network 3347, schedules of targeting 3310/3311/3331, languages targeting 3318, device(s) type(s) targeting 3319, campaign types and other settings, campaign settings let advertiser control where and when their advertisements (publications of virtual objects) appear and how much they want to spend and campaigns are often used to organize categories of products or services or brands that advertiser offer, Advertiser enable to provide campaign or publication name 3304, provide icon or logo or image 3307, provide details 3306, search 3342 or select 3346 location or place of business on map or directly provide or input or select location or place of business including Global Positioning System (GPS) coordinates, longitude, latitude and define or draw on map 3345 geo-fence boundary 3344 surround one or more locations or place of business 3251 or searched or selected one or more locations or place or types of locations or places, add photo or video associated or related with of geo-fence boundary 3344 or object or product or service or brand (for example capture or record or select and add photo or video of food item or menu item), provide object name, provide object type or category, provide address of place of business or object or place where object(s) is/are physically available for purchase or view, Global Positioning System (GPS) coordinates, longitude, latitude describing accurate or exact location of place of business, price of object, one or more types of additional structured details by creating, selecting and adding one or more fields and providing each added field specific details or one or more types of data or media or content, object details, provide, select 3367, import, search 3369, purchase 3368, design 3343, edit, update, upgrade, add 3367 and upload one or more types of one or more virtual objects or virtual elements or virtual characters 3366 and provide or select and associate custom or user defined number of or particular amount of or value of virtual money or virtual currency or points or numbers 3345 or use pre-set or pre-defined or pre-associated by server, number of or particular amount of or value of virtual money or virtual currency or points or numbers 3345 for particular category or type of real world geo-fence boundary.

In an embodiment enable or authorizing server administrator 3303 or in another embodiment enabling user of network 3305 to define or set whether virtual object(s) and associated virtual money display or show or present anywhere within predefined geo-fence boundary 3315 of real world, so when user or player enters in to said defines geo-fence boundary 3315, then without scanning any real world object within said geofence boundary, displaying or presenting virtual objects 3366 and/or associated virtual money 3364 to said user or player who entered or dwell in said pre-defined geo-fence of real world and enable said user or player to get said displayed one or more virtual objects 3366 and/or associated virtual money 3364 or get said virtual objects 3366 and/or associated virtual money 3364 by conducting one or more pre-set activities, actions or call-to actions 3370 or based on deciphering of pre-defined clue 3370. In an embodiment enabling or authorizing server administrator 3303 or in another embodiment enabling user of network 3305 to hide 3374 said details and location about said pre-defined geo-fence 3315 of the real world for one or more types of authorized users of network for enabling them to identify or view and collect or get said pre-defined geo-fence 3315 of the real world associated virtual object 3366 based on guess, or display based on luck or random or lottery or based on deciphering clue or tips or hints.

In an embodiment enabling or authorizing server administrator 3303 or in another embodiment enabling user of network 3305 to apply or select or define one or more types of user actions, activities, fulfill rules, play games or mini games, call-to-actions 3370 to make requirement or necessary or mandatory for users of network to conduct or do said defined one or more types of activities, actions, call to actions or fulfill associated rules or play mini game 3370 to collect or get displayed virtual objects 3366 and associated virtual money 3364 in the event of user of network entered in to said pre-defined geo-fence 3215 of the real world, wherein one or more types of user actions and activities comprise need to play pre-set game 3377, need to take one or more photos 3372 or videos 3380 of any or particular type or named real world object related to said pre-defined geo-fence 3315 of the real world e.g. particular food item or real world object e.g. food item with displayed virtual object, submit purchase receipt 3378, need to check in place 3379 related to sponsor's business place, fill form 3391 including feedback, comments, user's one or more types of profile or details, survey form, need to provide contact details, need to refer 3392 product or service of sponsor's business to particular number of friends or contacts of user, need to share 3392 details or photo or video of product or service of sponsor's business, invite friends 3392 to visit place of sponsor's business, register 3393 with web site of sponsor's business, install application 3395 of sponsor's business, provide comments or feedback or reviews 3396 of products or services of sponsor's business, need to take one or more types of reactions including like, dislike, provide one or more types of emoticons 3397, need to view particular duration of presentation of products and services or business of sponsor 3399, follow 3321 business of sponsor including shop, company, product, service, need to add to favorite or contact list 3322 or conduct one or more types of actions as per defined rules 3376 or to-do as per defined one or more types of rules 3376.

In an embodiment in the event of selection of automatically get option 3371, user of network who entered into or stayed or dwell for particular pre-set duration in said pre-defined geo-fence 3215 of the real world and associated one or more shops, point of interests, event, show, and exhibition will automatically get associated virtual object 3366 and/or associated virtual money 3364. In an embodiment in the event of selection of play mini games option and selection of type of game 3377, user of network who entered into or stayed or dwell for particular pre-set duration in said pre-defined geo-fence 3215 of the real world and associated one or more shops, point of interests, event, show, and exhibition will need to play said set or selected mini game to get or collect or capture said pre-defined geo-fence 3344 associated virtual object 3366 and/or associated virtual money 3345. In an embodiment enabling user or customer or prospective customer, who visiting place of business of sponsor, to take photo of user with products associated with place of business and submit to sever module 184 of server 110 and in the event of matching submitted photo associated Exchangeable image file format (EXIF) data associated captured photo date and time plus additional duration for submitting photo (which must be within provided or pre-set maximum duration to submit captured photo) with server's current date and time, provided or add or store pre-defined geo-fence boundary 3344 associated virtual object 3366 and/or associated virtual money 3345 to user's collection of virtual objects and virtual money or virtual currency or user's account.

In an embodiment enabling sponsor or advertiser or user 3305 to search 3342 one or more locations or places of business on a map 3345, select current location 3346, define or customize or configure geo-fence boundary 344 or draw on map 3344 geo-fence boundary 3345 surround real world place of business 3251.

In an embodiment enabling user 3305 to define or set or apply one or more schedules 3310 of availability of said pre-defined geo-fence boundary 3344 associated virtual objects 3366 and/or associated virtual currency 3345 including start date and time 3310 and end date and time 3311 within said pre-defined geo-fence 3344 of the real world.

Advertiser or sponsor user 3305 can select locations or places 3251, provide address, provide geolocation information (e.g., coordinates including latitude, longitude, aptitude) or search or select location(s) or place(s) from/on map 3342 or select or define geo-fence boundaries 3344 or define types and characteristics of location or query specific locations or places based on structured query language (SQL), natural query and wizard interface 3324/3325, enable to enter (input, auto-fill up, suggested list) location to target or include or exclude location(s), for example user adds locations, remove all added, remove selected or find nearby and add, use advance search to provide location criteria, conditions, rules, boundaries, query specific locations or places (For example SQL query: "Select Places where Place Type='GUCCI' or Natural Query" "all GUCCI shops of world") and set number of meters 3320 geo-fence boundary surround said selected one or more places. Advertiser can create separate advertisement campaigns to run advertisements in different locations or using different budgets. Advertiser can provide budget for particular duration including daily maximum spending budget of advertisement 3315, daily budget is the amount that advertiser set for each campaign to indicate how much, on average, advertiser's willing to spend per day, advertisement model including pay per getting or selectin or capturing or wining virtual object by users or customers or visitors of said pre-defined geo-fence boundary 3344 related to business place for getting associated virtual objects, wherein virtual objects associated with geo-fence boundary 3344 defined and provided by provided by sponsor or advertiser or user 3305.

In an embodiment advertiser or sponsor or user 3305 can search and select one or more target real world objects 3401 each associated with particular location or place or one or more types of target real world objects 3402 scattered at different locations or search and select one or more movable target real world objects 3403 (e.g. elephant at Yellowstone national park) or natural scene each associated with particular location or one or more types of movable target real world objects 3404 (e.g. animal) or natural scene scattered at different locations or search and select one or more geo-fence boundaries 3422 or search and select one or more types of geo-fence boundaries 3423 for displaying virtual objects (e.g. 3366) related to advertisement when users enters into or dwells for pre-set duration in said pre-defined geo-fence boundary 3344.

Advertiser can provides associated target criteria including add, include or exclude or filter one or more languages 3318, schedule of showing of advertisement including start date 3310, end date 3311 and showing advertisements all the time or particular time, time range at particular date or day 3331, select targeted device type(s) 3319 including mobile devices, personal computer, wearable device, tablets, android device and/or iOS devices etc., define target user's profile type or characteristics or modeling of target users including any users of network or target criteria specific users of network including one or more types of one or more profile fields including gender, age or age range, education, qualification, home or work locations, related entities including organization or school or college or company name(s) and Boolean operators and any combination thereof 3347. After creating and providing information and settings related to created campaign, user or publisher or advertiser can save campaign 3483 at server database 115 of server 100 via server module 183 and/or local storage medium of user device 200, so user can access, update, start 3485, pause 3486, stop or remove or cancel 3484, view and manage 3490 one or more created campaigns and associate information and settings including one or more advertisement groups 3492, and advertisements 3482 and can access started one or more campaigns, advertisement groups and advertisement associated or generated analytics and statistics 3493.

In an embodiment user 3305 can make order and payment 3497 and submit said provided information to server module 183 for processing, moderation, verification, validation, applying needed settings and after successfully validation and verification making them available for other users of network.

In an embodiment in the event of submitting 3489 said information by user to sever for processing, moderation, verification, validation, applying needed settings, server module 183 received said information from user and enables sever administrator to review said information and after successfully reviewing, moderation, verification, validation, applying needed settings, server administrator mark said information as verified information.

In an embodiment in the event of submitting of said information, server module 183 receives said information and stores to server database 115 and verifies said pre-defined geo-fence boundary 3344 associated one or more photos, videos, name, object address, details, location including place, geo-fence boundary, associated virtual money, text, data and metadata, applied settings, schedules, one or more required actions. After successfully verification, server administrator makes available said information on map or other one or more types of Graphical User Interface (GUIs) for users of network (Discuss in detail in FIGS. 35-36).

In an embodiment advertiser or sponsor or user 3305 can create new 3488 or save 3494 or manage 3490 one or more advertisement campaigns and can add new advertisement group 3491 or manage existing advertisement groups 3492. In an embodiment advertiser or sponsor or user 3305 can create new advertisement (publish or displaying virtual object to users when user or player or customer or prospective customer visits place of advertiser and enter into advertiser defined one or more geo-fence boundaries. In an embodiment advertiser or sponsor or user 3305 can save or update 3483 or remove 3484 or manage 3482 created or drafted or published or started advertisement(s) or publication of virtual objects. In an embodiment advertiser or sponsor or user 3305 can starts 3485 or pause 3486 already verified advertisements. In an embodiment advertiser or sponsor or user 3305 can schedule publishing of advertisement or virtual objects 3487. In an embodiment advertiser or sponsor or user 3305 can view advertisement campaign, advertisement groups and advertisements related statistics and analytics including number of user viewed details about said pre-defined geo-fence boundary 3344, number of users, number of users gets said pre-defined geo-fence boundary 3344 associated virtual objects.

In an embodiment advertiser or sponsor or user can start or pause or turn ON or Off 3499 availability of or publication of virtual objects associated with said pre-defined one or more geo-fence boundaries of the real world for authorized users who entered into or stays for pre-set duration within/in/at said pre-defined one or more geo-fence boundaries of the real world.

Geofences are used to define virtual perimeters. The system can control whether object crossed geofence border (either "in" or "out"). All these events are logged, so user can obtain geofence reports and receive alerts.

There are three basic types of geofences available: Circle—geographical area with a given center and the shape of a circle with a minimum radius of 20 meters (radius and center of the circle are defined by user) 3320. Polygon—area bounded by an arbitrary polygon with any number of vertices (user can draw any type of geofence 3344 on map 3345). Route—allows creating a virtual perimeter between two (or more) points 3571/3573/3572. In an embodiment certain locations or area on map 3345 not allowed for defining geo-fence boundary on map or not displaying virtual objects within said identified area (e.g. roads—3571/3573/3572) including roads, waters, risky areas for user's safety while visiting places of geo-fence boundary and collecting or getting associated virtual objects. It is used in order to ensure that user doesn't require entering or dwelling into risky area like route of roads, and if it does, an alarm can be set to inform the interested party.

User can draw a geofence on the map: Circle—move a circle with a mouse, having pressed the center of the circle. To change the size of the circle pulls the point on the edge of the circle. Polygon—initially has a form of the correct pentagon, which can be easily and randomly changed. To add new vertices user need to pull the mouse over the center of one of the polygon's sides. To delete a vertex just e.g. double-click on it. Route—user need to choose start and end points, the system will automatically build a route between them. If user wants to add more points on the route, drag the route with the mouse. Next, determine the size of the vicinity.

User can specify the name of the geofence and save it. Geofence created by user can be edited or deleted. To mark a location of interest, user specifies its latitude and longitude. To adjust the proximity for the location, user adds a radius. The latitude, longitude, and radius define a geofence, creating a circular area, or fence, around the location of interest. For each geofence, user can ask Location Services to send user entrance and exit events, or user can specify duration within the geofence area to wait, or dwell, before triggering an event. In an embodiment system automatically identifies risky or hazardous roads and physical structure or infrastructure and prevents displaying of virtual objects on/surround/near/at said types of places or area or locations. In an embodiment system can use both Beacons & Geofencing campaigns using geofences and beacons either separately or in conjunction with one another.

FIG. 35 illustrates user interface 290 wherein user can view maps of real or physical world and can view associated pre-defined objects related to particular places or locations (discussed in detail in FIGS. 3-6 e.g. public place object or particular product related particular business place) and in the event of click on photo or video or icon or name or place name of pre-defined object, displaying associated information (discussed in detail in FIGS. 8-9). Map also shows pre-defined geo-fence boundaries (discussed in detail in FIGS. 32-34) and in the event of click on particular pre-defined geo-fence boundary, displaying associated information.

For example in the event of click or tap on pre-defined geofence boundary 3535 by user 3501, user 3501 can view pre-defined information about said pre-defined geofence boundary 3535 and can tap on direction icon 3550 or step by step guided direction icon 3548 to view route 3533 and direction or step by step guided direction to reach at pre-defined geofence boundary 3535. In an embodiment after physically reaching and entering into said pre-defined geofence boundary 3535, user is notify about entering into said pre-defined geofence boundary 3535 by server module 184 and in the event of clicking or tapping on notification or opening application, in an embodiment displaying 3D virtual world map interface 3610 (FIG. 36)/291 to said user 3501, so it will saves user device's battery power consumption. In an embodiment the game having virtual world geography that correspondences the real world geography, as a result, as the player or virtual avatar of player 3601 continuously moves about or navigates in a range of coordinates in the real world. The player also continuously moves about in a range of coordinates in the real world digital map or virtual world. In an embodiment in the event of exiting from said pre-defined geofence boundary 3535, notify user 3501 about exiting from said pre-defined geofence boundary 3535 and instruct user 3501 to close application or automatically close virtual world map user interface 3610 by sever module 184 to save battery power consumption of user device 200. In the event of entering into said pre-defined geofence boundary 3535 or after staying or dwelling into said pre-defined geofence boundary 3535 for pre-set duration, displaying, by the server module 184, one or more types of virtual objects 3621/3622/3623/3624 to user 3501 surround user device's 200 current location (e.g. "Central Park, NYC") which parallels to virtual world's 3610 location. In an embodiment the game having a virtual world geography 3610 that correspondences the real world geography, as a result, as the player or user 3601 continuously moves about or navigates in a range of coordinates in the real world, the player 3601 also continuously moves about in a range of coordinates in the real world map or virtual world 3610. Server module 184 accessing pre-defined geo-fence 3535 in real world and associated virtual objects 3621/3622/3623/3624 and responsive to the client device 200 of user 3601 being within a pre-defined boundary of geofence 3535 in the real world or within predefined radius surround particular place 3535 in the real world or set distance of the location of particular place in the real world, display or provide, by the server module 184, one or more virtual objects 3621/3622/3623/3624 and associated data including virtual money to the client device 200 and automatically storing, by the server module 184, user surround one or more virtual objects 3621/3622/3623/3624 or storing, by the server module 184, user selected one or more virtual objects 3621/3622/3623/3624 or user needs to select particular virtual object 3621/3622/3623/3624 and require to conduct one or more activities, actions, transactions or playing of displayed particular mini game 3270 associated with said displayed one or more or group of virtual objects 3621/3622/3623/3624. For example in the event of tapping or clicking on displayed virtual object 3625, displaying user interface 3675 wherein user is displayed with said selected virtual object 3651 and associated rules and required actions 3655/3656/3657 to capture or win or get or collect or add to collection of virtual object or acquire said selected virtual object 3651, for instance for getting or collecting or winning virtual object 3651 user require to play particular type of mini game with other users or players surround user or player 3601 who has claimed said virtual object 3651 or as per rule if nobody surround user or player 3601 in virtual world 3610, then user can collect virtual object 3651 by tapping on virtual object 3651 or automatically gets virtual object 3651 or user needs to walk for particular distance or walk for particular distance within particular duration or user need to run particular distance within particular duration 3657. In the event of fulfilling said required activities or actions e.g. in the event of player 3601 won with other two players or completed 5 miles walk then user gets and disabling to user said virtual object 3695 and associated virtual money on user interface 3685 or notifying user or player 3601 about wining or getting of said virtual object by displaying associated virtual money 3695 and virtual object 3690 to user or player 3601.

In an embodiment server module 184 displays one or more types of virtual objects at particular pre-defined geo-fence boundary based on user surround type of location or place (e.g. garden or zoo) and associated keywords (e.g. if garden then flower, tree, bird and if zoo then animal) or type of real world objects (e.g. water, tree, bird, animal, forest, mountain) or geofence or place associated information including weather, current date & time, environment (rain, fog, snow, cold, heat, sunrise, sunset) or current information about place provided by users of network, user preferences, type of subscriptions (paid, free, sponsored), current level, accompanied contacts or users of network, number of users of network, advertised virtual objects, number of virtual objects allowed to display for all or particular user, number of virtual objects currently remaining for all or particular user within user's current location associated geo-fence, area of geo-fence, current total number of users entered and stay within said geo-fence boundary, user profile data including age, gender, interest, income range, home and work location (local or tourist or foreigner), education, skills, position, virtual objects associated rules and required actions, authorized to access or display or view virtual objects or not, schedules of availability of virtual objects, number of steps walk within said geofence boundary, duration of stay within said geofence boundary, currently collected or win or get or acquire number of virtual objects and amount of virtual money within said geofence boundary, rank within users who currently collected or win or get or acquire number of virtual objects and amount of virtual money within said geofence boundary, virtual object published by contacts of user, view or display duration of virtual object, number of users visited said pre-denied geofence boundary within particular duration, number of users successfully collected number of virtual objects within particular duration, per user total or particular type of or available within or at all or particular geofence or place allowed number of virtual objects, visible route surround user's avatar in virtual world (i.e. display virtual objects in virtual world as per walking by player in real world route and as per change of route of visibility of route display additional virtual objects in virtual world of player 3601.

In an embodiment the game having a virtual world geography that correspondences the real world geography, as a result, as the player continuously moves about or navigates in a range of coordinates in the real world, the player or avatar of player 3601 also continuously moves about in a range of coordinates in the real world map or virtual world. In an embodiment display movable virtual objects anywhere in real world or within particular pre-defined geo-fence boundary, wherein like bird flying or like animal or human running or fish swimming, likewise virtual objects surround user within particular pre-defined geo-fence boundary may slow or fast walks, runs, fly, swim and to get or capture said movable virtual object, user or player need to walk fast, run behind said slow or fast walking or running or flying or swimming virtual object(s). For instance, displaying particular type of virtual animal running within virtual world of user which is correspond to real world geography, so user or player also need to running fast in real world to capture said running animal in virtual world. In an embodiment user or player may need to conduct one or more types of activities, actions, reactions, participations, transactions, follow rules, and play mini games to capture said movable virtual objects. For example provide virtual feed item to virtual bird or animal, so speed of virtual bird or animal may decreases, so user may catch virtual bird by throwing virtual net or catching animal by employing cage.

In an another example, in the event of click or tap on pre-defined geofence boundary 3545 by user 3501, user 3501 can view pre-defined information about said pre-defined geofence boundary 3545 and can tap on direction icon 3550 or step by step guided direction icon 3548 to view route 3531 and direction or step by step guided direction to reach at pre-defined geofence boundary 3545. In an embodiment after physically reaching and entering into said pre-defined geofence boundary 3545, notifying user 3501 about entering into said pre-defined geofence boundary 3545 by server module 184 and in the event of clicking or tapping on notification or opening application, in an embodiment displaying a 2D virtual world map interface 3590 (291) to said user 3501, so it will saves user device's battery power consumption. In an embodiment the game having virtual world geography 3590 that correspondences the real world geography, as a result, as the player or virtual avatar of player 3501 continuously moves about or navigates in a range of coordinates in the real world. The player also continuously moves about in a range of coordinates in the real world digital map or virtual world. In an embodiment in the event of exiting from said pre-defined geofence boundary 3545, notify user 3501 about exiting from said pre-defined geofence boundary 3545 and instruct user 3401 to close application or automatically close virtual world map user interface 3590 by sever module 184 to save battery power consumption of user device 200. In the event of entering into said pre-defined geofence boundary 3545 or after staying or dwelling into said pre-defined geofence boundary 3545 for pre-set duration, displaying, by the server module 184, one or more types of virtual objects 3560/3562 to user or player 3501 surround user device's 200 current location (e.g. "Blue Note" 3522) which parallels to virtual world's 3590 location. In an embodiment the game having a virtual world geography 3590 that correspondences the real world geography, as a result, as the player or user 3501 continuously moves about or navigates in a range of coordinates in the real world, the player 3501 also continuously moves about in a range of coordinates in the real world map or virtual world 3590. Server module 184 accessing pre-defined geo-fence 3545 in real world and associated virtual objects 3560/3562 and responsive to the client device 200 of user 3501 being within a pre-defined boundary of geofence 3545 in the real world or within predefined radius surround particular place 3545 in the real world or set distance of the location of particular place in the real world, display or provide, by the server module 184, one or more virtual objects 3560/3562 and associated data including virtual money to the client device 200 and automatically storing, by the server module 184, user surround one or more virtual objects 3560/3562 or storing, by the server module 184, user selected one or more virtual objects 3560/3562 or user needs to select particular virtual object 3560/3562 and require to conduct one or more activities, actions, transactions or playing of displayed particular mini game associated with said displayed one or more or group of virtual objects 3560/3562 (For example FIGS. 36 (B) and (C)).

In an embodiment in the event of clicking or tapping on particular location or place 3547 or geofence boundary 3535, displaying information about related or associated pre-defined real world objects 3505 available for user for augmented reality scanning (display with sign 3504) for getting or wining or capturing scanned real world object associated virtual object(s) and/or particular amount of virtual money.

In an embodiment the game data stored in the game database 115 may comprises data associated with the virtual world in the location-based game including imagery data used to render the virtual world on a display device, geographic coordinates of locations in the virtual world, etc. (Google MAP™ API for games may employ), data associated with players of the location-based game including player profile, level, virtual objects, virtual money, current player positions in the virtual world/real world, player power, settings, privacy settings, preferences, team information, data associated with game, data associated with virtual objects in the virtual world (e.g. positions of virtual objects, types of virtual objects, game rules and required actions associated with virtual objects, corresponding actual world position information for virtual objects, context of virtual objects, data associated with real world objects, positions linked to virtual world objects, location of real world objects, description of real world objects, real world objects related virtual objects, status and data associated with player's interactions including current positions, player movement, and any other data used, related to, or obtained during implementation of the location-based game. The game data stored in the game database 115 can be populated.

In an embodiment providing a game, comprising: hosting, at a game server 110, a game, the game having a virtual world geography 3590/3610/3701/3730 that correspondences the real world geography, as a result, as the player 3501/3601/3705/3725 continuously moves about or navigates in a range of coordinates in the real world, the player also continuously moves about in a range of coordinates in the real world map (in combination with or having virtual objects) or virtual world 3590/3610/3701/3730; accessing pre-defined geo-fence 3545 in real world and associated virtual objects (e.g. 3560/3562/3710/3715/3720/3725); and responsive to the client device 200 being within a pre-defined boundary of geofence 3545 in the real world, display or provide, by the game server 110, one or more types of one or more virtual objects and associated data including virtual money (e.g. 3560/3562/3710/3715/3720/3725) to the client device 200; store 115, by the game server 110, one or more virtual objects and associated data including virtual money (e.g. 3560/3562/3710/3715/3720/3725) provided to the client device 200 in a virtual object and virtual money collection (discuss in detail in FIGS. 22-26) associated with the client device 200.

In an embodiment receiving, by the game server 110, a plurality of requests from a plurality of advertisers or sponsors (e.g. "Blue Note" 3564), each of the plurality of requests requesting that a virtual object or virtual element (e.g. 3560/3562/3710/3715/3720/3725) associated with the request be included at a geofence boundary 3545 in the virtual world 3590 corresponding to a geofence boundary 3545 of a business 3522/3564 in the real world, the business associated with an advertiser or sponsor 3522/3564 that provided the request to the game server 110 from the plurality of advertisers or sponsors; selecting, by the game server 110, at least one request from the plurality of requests; responsive to selecting the at least one request, modifying, by the game server 110, game data to include the virtual object or virtual element (e.g. 3560/3562/3710/3715/3720/3725) associated with the at least one request in the game at the geofence boundary 3545 in the virtual world 3590 requested by the at least one request; providing, by the game server 110, the modified game data to a client device 200 of a player 3501/3601/3705/3725.

In an embodiment providing a game, comprising: hosting, at a game server 110, a game, the game having a virtual world geography 3590/3610/3701/3730 that correspondences the real world geography, as a result, as the player 3501/3601/3705/3725 continuously moves about or navigates in a range of coordinates in the real world, the player also continuously moves about in a range of coordinates in the real world map (in combination with or having virtual objects) or virtual world 3590/3610/3701/3730; receiving, by the game server 110, a plurality of requests from a plurality of sponsors, each of the plurality of requests requesting that a virtual object or virtual element 1208 associated with the request be included at a location 3522/3564 in the virtual world 3590/3610 corresponding to a location 3522/3564 of a business (e.g. "Blue Note" 3564) in the real world, the business associated with a sponsor that provided the request to the game server 110 from the plurality of sponsors; selecting, by the game server, at least one request from the plurality of requests; responsive to selecting the at least one request, modifying, by the game server, game data to include the virtual element associated with the at least one request in the game at the location 3522/3564 in the virtual world 3590/3610 3590/3610 requested by the at least one request; providing, by the game server 110, the modified gate data to a client device 200 of a player 3501/3601/3705/3725; and responsive to the client device 200 being within a predefined geofence boundary 3545 or a set distance of the location of the business 3522/3564 in the real world of the at least one request, in an embodiment user can view information associated predefined real world object 3551/3553/3611/3751/3753 about said business location 3522/3564 or geofence boundary 3545 surround said business location 3522/3564 and in the event of tapping or clicking on augmented reality button (e.g. 3754/3554)/3552/3645/3752 receiving, by the game server 110 augmented reality scanning or scanned data or raw photo or captured photograph 3707, identifying or recognizing, by the game server module 153 of server 110, an object 3721 in the photograph or scanned data 3707 and based on the identified object 3721 satisfying the object criteria 3722 associated with the virtual object 3708 in the stored data 115, display or provide, by the game server 110 (server module 153), the virtual object 3798 and associated data including virtual money 3709 to the client device 200; store 115, by the game server 110, virtual objects 3708 and associated data including virtual money 3709 provided to the client device 200 in a virtual object and virtual money collection associated with the client device 200.

In an embodiment virtual object use in virtual world. In an embodiment virtual object comprises a one or more types of power in game, virtual item, virtual element, virtual reward, virtual money, virtual currency or other suitable virtual goods including geo-filter. In an embodiment the virtual object is provided to the user or the player in response to the client device being within a pre-defined geofence boundary or within a pre-defined geofence boundary surrounds the location of the business of sponsor. In an embodiment the virtual object is provided to the user or the player in response to the client device being within a pre-defined geofence boundary or within a pre-defined geofence boundary surround the location of the business of sponsor and the player or the user making a purchase of an object or product or service at the business of the sponsor. In an embodiment the virtual object is redeemable in the real world. In an embodiment the virtual object is a coupon, a redeemable point, a gift, a sample, an offer, cash back, discount, or voucher redeemable in the real world.

Figure 37:
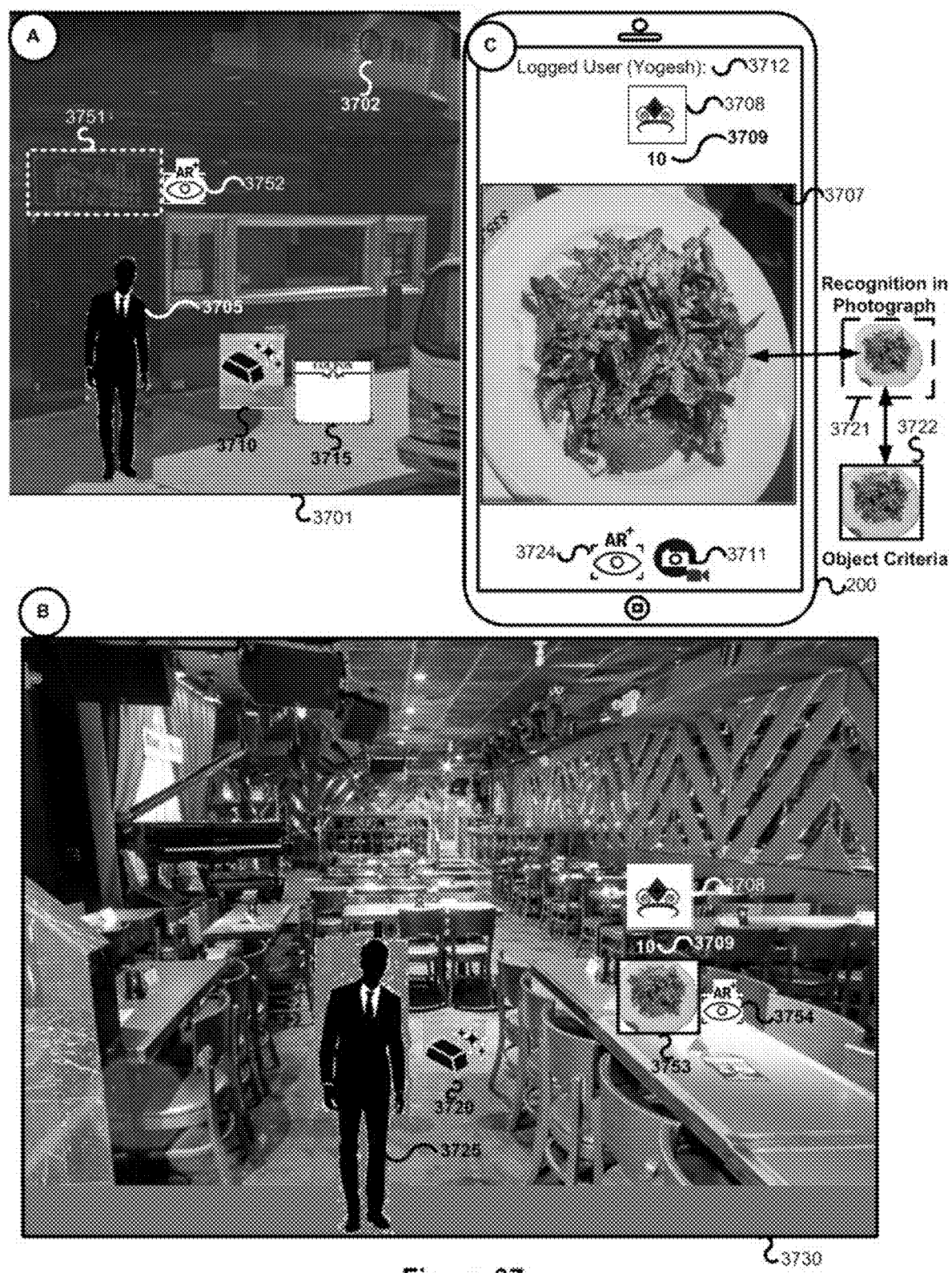
FIG. 37 illustrate displaying 3D map of real world outdoor and indoor view for enabling real world player's virtual avatar to visits near shop or restaurant or place of business, wherein 3D real world map also contains virtual objects. In an embodiment FIG. 37 illustrate virtual world geography that corresponds to real world geography and which displays virtual objects which may use in virtual world and/or may redeemable in real world. Real world player can select, get, win, capture, acquire, claim, add to user's collection of virtual objects and play mini game to capture said displayed virtual objects, virtual money and virtual rewards including voucher, redeemable points, coupons, offers, gift, sample, cash backs, and discount which may redeemable in real world.

FIG. 37 illustrate displaying 3D map of real world outdoor 3701 and indoor 3730 view for enabling real world player's virtual avatar 3705/3725 to visits or enter into pre-define geofence boundary of particular place (e.g. shop or restaurant or place of business) 3702, wherein 3D real world map 3701/3730 also contains and display virtual objects 3710/3715/3720 (provided or define by sponsor or users of network or server administrator) based on one or more types of user associated and user related data and matching one or more types of user data including current or nearby location, user profile with sponsor's criteria and rules including user or player 3705/3725 requires to play one or more types of mini game or purchase products. In an embodiment FIG. 37 illustrate virtual world geography that corresponds to real world geography and which displays virtual objects 3710/3715/3720 which may use in virtual world and/or may redeemable in real world. Real world player can select, get, win, capture, acquire, claim, add to user's collection of virtual objects and play mini game to capture said displayed one or more types of one or more virtual objects, virtual money and virtual rewards including voucher, redeemable points, coupons, offers, gift, sample, cash backs, and discount 3710/3715/3720 which may redeemable in real world.

FIG. 38 illustrates examples, in an embodiment identifying particular accurate points of location of real world product (e.g. 3881/3882), item, object, art, food item, painting 3811 based on beacon or iBeacon 3810 (or e.g. 3808/3809) and precise and fast location detection technology like UWB RTLS (Ultra-wideband) 3810. The iBeacon technology, being used widely with smartphone apps that deliver location specific content automatically to the user indoors or outdoors. Beacons are great as most devices have a bluetooth receiver and can communicate with beacons. Beacons can facilitate only one-way communication. That is, beacons can only transmit signals to user or player's 3812 smartphones 200 and receive signals from them. Beacons 3810 (e.g. 3808/3809) signals can only trigger an action if a mobile app 3830 is installed if Bluetooth is turned on and if the phone is connected to the internet (in most cases). When smartphones 200 receive a beacon 3810 (e.g. 3808/3809) signal, the app 3830/3801 reacts to the signal. For example—if deploy 3 beacons (e.g. 3810) at 3 different sections (e.g. art 3811) in museum or e.g. product (e.g. 3881/3882) in shop, each hard coded with a different message. Now, depending on the location of the user or player 3812 (e.g. near to art in a museum 3811 or particular product 3882 in shop 3801), the beacon 3810 (e.g. 3808) that is closest to player 3820 (the distance is approximated based on the signal strength of the beacon) will push a notification to the user's 3812 smartphone 200, and based on that server module 184 displays said identified beacon 3810 (or e.g. 3808/3809) associated identified real world object 3811 (e.g. 3881/3882) associated or relevant or contextual or determined or identified virtual object(s) 3822 (e.g. 3802/3807) and/or asking him to take the necessary action to get said displayed virtual object 3822 (e.g. 3802/3807) and store to collection of virtual objects of user 3820 (e.g. ask or instruct to play mini game). Smartphone apps 3830/3801 can detect the beacon 3810 (e.g. 3808/3809) signal and estimate the proximity of the beacon 3810 (e.g. 3808/3809) and trigger actions automatically; like presenting location specific content (e.g. virtual object 3822 (e.g. 3802/3807)). If for more precision of the indoor location systems requires than other technology like UWB RTLS (Ultra-wideband) may employ or use in e.g. shop, for certain situations. For example, an art museum with relevant or associated virtual object for each painting, using beacons for displaying the virtual object when the user or player stand right in front of the painting (e.g. within 1 meter or more based on accuracy of beacon). In an embodiment the game having a virtual world geography 3830 that correspondences the real world geography 3825, as a result, as the player or virtual avatar 3820 of real world player 3812 continuously moves about or navigates in a range of coordinates in the real world (e.g. in museum). The real world 3812 player also continuously moves about in a range of coordinates in the real world digital map or virtual world 3830.

FIG. 39 illustrates, user interface for selecting, updating, applying one or more types of settings, preferences, privacy settings including application's home related settings 3905 like set home screen of application as augmented reality scanning application or feature 3901, map interface (displaying real world place or location specific real world objects associated details 3902, Feed or timeline 3904 (viewing shared or received one or more types of contents including photos, videos, scores, status, updates, posts, messages and like), notifications 3903 (view various types of notifications containing suggested or nearby places or real world objects for notifying or alerting user to scan said one or more real world object or scene and get associated or displayed one or more types of virtual objects, and instructions from connected users, server administrators or automatically from sever, sponsors and users of network.

User may select, apply, set and update notification 3920 related settings including receive notifications from all or selected friends or contacts 3910, all or selected team 3911, automatically from server 3912, server administrator(s) 3913, Preferences specific users of network 3914, Preferences specific sponsors 3915, wherein notification type may comprise receive notification when user is near to particular location or place or real world object or particular pre-defined geofence boundary 3921, suggested real world objects or particular pre-defined geofence boundaries or locations or places of real world objects 3922, receive notification when user receives instruction from contacts or team members or server administrator or users of network or sponsors 3923, in the event of triggering of or identification or recognition of one or more types of activities, actions, interactions, connections, behaviours, trending, status, transactions in real world, automatically send notification regarding associated virtual objects 3924, receive notification related to particular one or more selected locations or places or ranges surround current location or geofence boundary 3924, particular selected named or type of real world objects 3926, event specific or location or geofence related to event 3927, notify when enter into any pre-defined geofence 3928, notify day to day (as per schedules) 3929, notify when virtual objects not available surround user or selected places 3930, notify when receives new posts 3985, notify when receives new reactions on user's posts 3986, notify when receive all or selected type(s) of digital activities related virtual objects or receive virtual objects automatically 3987, notify when advance to next level 3988, Notify when displaying connections with real world interacted, transacted, related entities in virtual world or real world equivalent virtual world (in terms of geography) 3990.

In an embodiment user may set, update and apply "Do Not Disturb" policies wherein user can turn ON or Off receiving of notifications or receive only selected type specific notifications or notifications receive only from selected contacts, apply vibration or ring tone type, schedule receiving of notifications 2938.

User may select, set, update and apply map settings 3950 including automatically add and show interacted entity on map 3951, show real world objects and geofence boundaries 3952, show map of objects in 3D or 2D mode 3953.

User may select, set, update and apply Digital Spectacle Settings 3960 including notify about nearby real world objects or scenes or real-time updated scenes 3961, auto scan when user views real world objects 3962, notify when enter into pre-any defined geofence 3963, auto scan when user views virtual objects within geofence 3964

User may select, set, update and apply Augmented Reality Recognition Settings 3980 including need to tap on Augmented Reality Button 3981, View in camera to auto start augmented reality scanning 3982.

User may select, set, update and apply other settings including auto capture photo or record video while scanning real world objects and display to user for review and sharing 3983 and Auto log scanning of real world objects and associated required actions, transactions, reactions related information and display to user for review and sharing 3984

Figure 40:
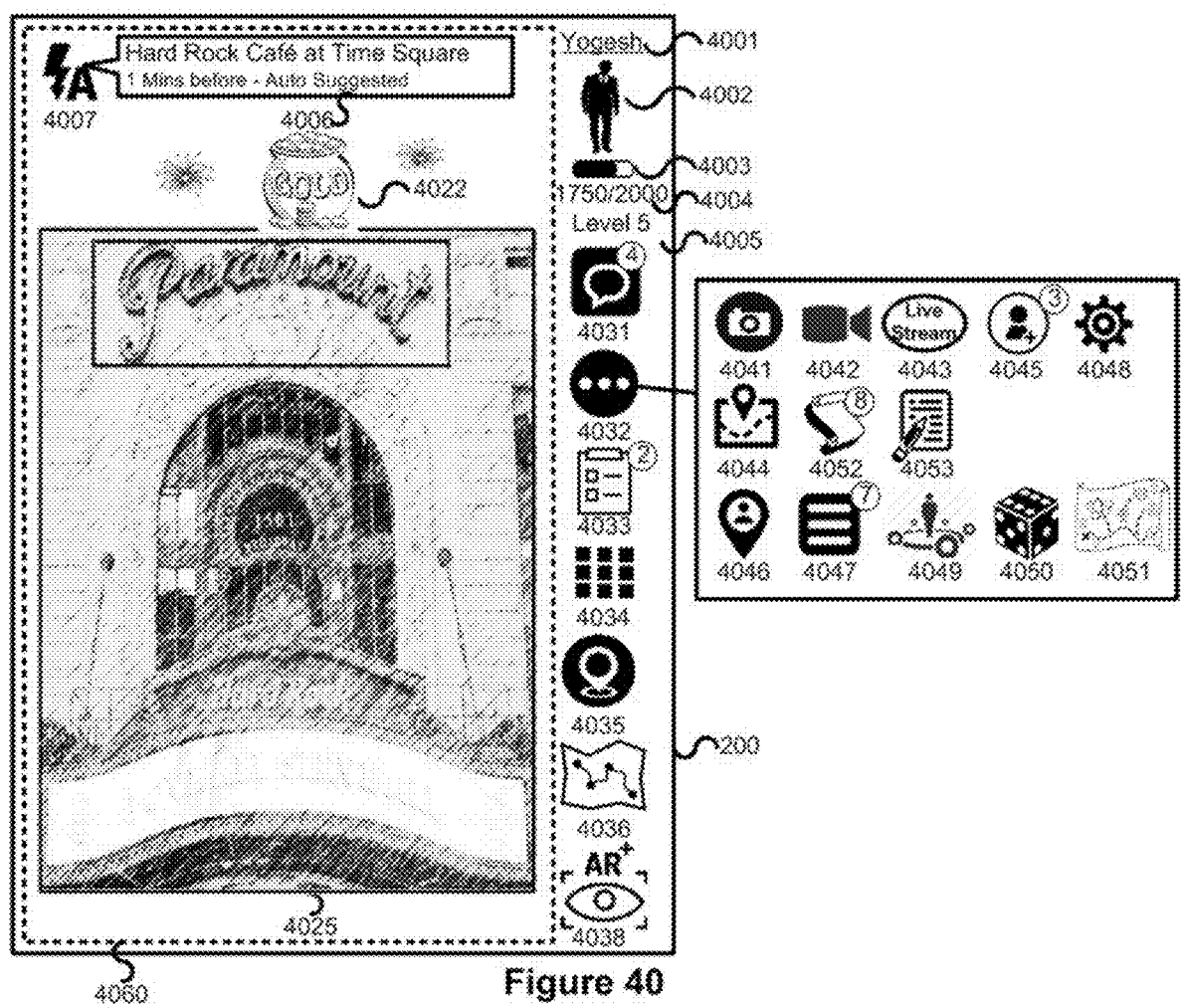
FIG. 40 illustrates example Graphical User interface (GUI), displaying exemplary home screen which facilitates accessing of all features of game, notifications, map, feed, activity feed applications.

FIG. 40 illustrates example Graphical User Interface (GUI) for home 4005 of client application installed in user device 200 which connected with server 110 and sever database 115 which enables user to access various types of features including access various types of notifications (discuss in detail in FIGS. 3-7 15 and 3920) 4031 and currently received notifications 4006 from particular source 4007, define and submit for verification real world objects (discuss in detail in FIGS. 3-7) 4053, search, view details of real world objects or places of real world objects and details of associated real world objects on map 4036 (by default shows current location surround real world objects and places of real world objects (discuss in detail in FIGS. 8(B) and 9(B)), view nearby places related real world objects 4049, conduct augmented reality scanning by viewing 4025 in camera 4060 real world object 4025 or clicking or tapping on camera application associated "Augmented Reality Scanning" button or icon 4038 to get, win, collect and capture displayed or associated virtual objects 4022 (discuss in detail in FIGS. 8(A) and 9(A)) and 10-14), view geofence boundary on map 4035 (discuss in detail in FIGS. 35-37) to view associated location information (discuss in detail in FIG. 35(A)) for visiting or entering in geofence boundary (indoor—FIG. 37 (B) and outdoor—FIGS. 35 (B), 36 (A), 37 (A)) and get, win, collect and capture displayed virtual objects within said entered geofence boundary, view accurate location of real world object associated virtual object or view real world object recognized type associated contextual virtual object(s) in virtual world having corresponding real world geography (discuss in detail in FIG. 38), view, access and manage collections of various types of virtual objects, virtual money and virtual rewards 4034 (discuss in detail in FIGS. 22-26), define geofence boundary and associated virtual objects 4044 (discuss in detail in FIGS. 32-34), view, manage, access, send and receive instructions or tasks 4033 (discuss in detail in FIGS. 27-31), view logs of real world as well as digital activities 4052 (discuss in detail in FIGS. 19-21), take photo 4041 or record video 4042 or live streaming of video 4043 for submitting type of activity specific one or more photos or videos and in the event of successful verification by server, receive associated virtual objects, virtual money and virtual rewards (discuss in detail in FIG. 16), take photo or record video with real world objects or places of real world objects or real world of objects with one or more users and publish or share with contacts of user and user's feed or timeline (discuss in detail in FIG. 42), take photo or record video and submit for augmented reality scanning, view user published and published by contacts or connections of users' published or shared posts, photos, videos, messages, status, scores, activity logs and updates 4047 (discuss in detail in FIG. 42), search, view profile, select and invite one or more contacts, users of network, team members 4045, select, set, update and apply one or more types of privacy settings, preferences and various types of settings (discuss in detail in FIG. 39), view in-place details about real world objects (visible or hidden (clue or tips base)) 4046, view surprise or feeling lucky specific real world objects or win virtual objects based on play mini game, lottery, solve puzzle or clue 4050, view visual map of real world connections, interactions, relations, and transactions and logged real world activities 4051 in virtual world and/or virtual world having corresponding real world geography (discuss in detail in FIGS. 17-18). User can also view player or user name or nick name 4001, pre-defined custom avatar of user or player 4002, user's current levels 4003, number of points or amount of value of virtual objects and virtual money 4004 received by user or player 4001. User can view detail profile of user (discuss in detail in FIG. 41).

In an embodiment user's device will vibrate to alert user when one or more objects in real world and associated one or more virtual objects is/are nearby. If user doesn't see any objects associated virtual objects nearby, user can take a walk to find or identify objects in pre-defined geofence boundary in real world and associated virtual objects or find or identify and scan and tray to get associated virtual objects. User can guess places and objects and try to scan guessed objects in real world to capture or get associated virtual objects by employing augmented reality scanning. If user found uncommon animals (e.g. elephant), birds (e.g. Peacock) then user can use augmented reality scanning to capture or get associated virtual objects. In the case of local specific common animals and birds, users will not able to get virtual objects. Based on user's home address, in foreign country common animals and birds are treat as special for user for pre-set number of days, so user will able to scan and get preset number of virtual objects (per type).

In an embodiment identified and pre-defined objects in real world and associated virtual objects located in user's area are displayed in the Nearby objects in real world and associated virtual objects section in the bottom right of the screen in Map View. Virtual objects already in user's collections will show in different color. When user encounter virtual objects use may have pre-set duration to scan and capture certain types of virtual objects and/or due to limited number of availability of certain types of virtual objects within particular duration at particular place, user needs to scan and capture virtual objects before non-availability of virtual objects or user need to reach before another user reach and scans and capture virtual objects. In an embodiment per type of animal, bird etc. per day one time scanning allowed to get them. If scanning by group members or in group then more points or virtual money value may provide to each group user.

Figure 41:
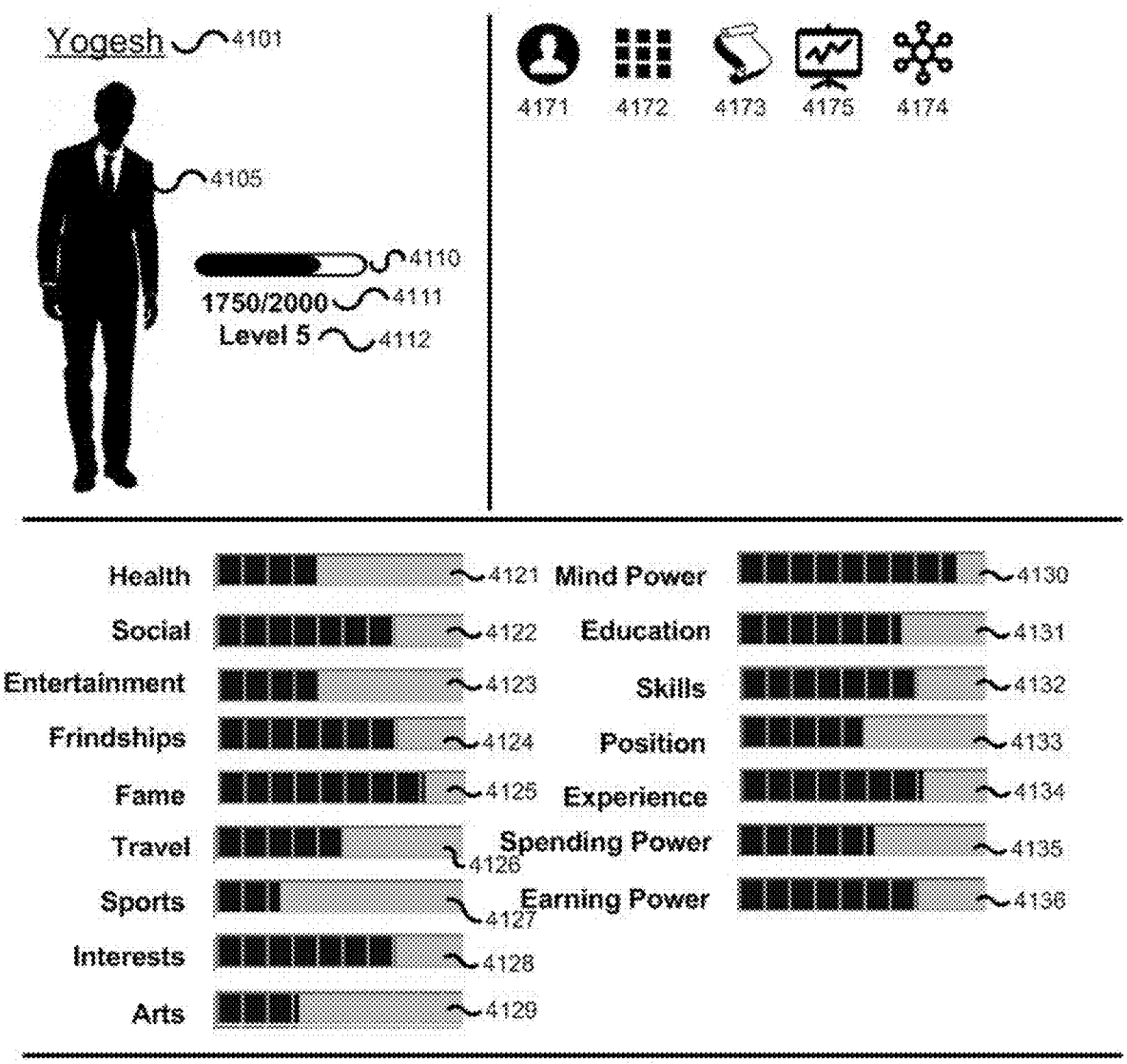
FIG. 41 illustrates example Graphical User interface (GUI) displaying user profile, status, levels, number of or amount of virtual money or virtual currency, number and types of virtual objects, score, various types of statistics.

FIG. 41 illustrates example Graphical User Interface (GUI) for enabling user to view user's updated details including current particular number of level 4112, associate number of points 4111, indicator 4110. User interface may also shows user's virtual customized avatar 4105 which display in virtual world or virtual world having corresponding real world geography. User interface may also show user's name, nick name 4101, detail profile link 4101 to view various types of user related data.

Based on received health related information from user including submitted health activity type related photos or videos like yoga (identify based on object recognition), joining of yoga class or gym (identify based on location or place of class or gym), eating of particular types of foods within particular duration or getting particular types of nutrition within particular duration, walking of particular number of steps within particular duration (identify based on sensors of user device), submitting of various types of health reports (recognize or identify based on object recognition and optical character recognition (OCR)), server module 188 calculates scores based on health related activity type specific points or virtual money or virtual objects associated value and display scores to user on indictor 4121.

Based on received social activities related information including traveled or visited places or attending of events or festival events with one or more contacts, relatives, friends and families, received virtual objects and virtual money value when one or more contacts accompanied with user, sever module 188 calculates scores based on monitored and tracked social types of activities and display scores to user on indictor 4122.

Based on received entertainment activities related information including viewing particular movie, television serials or types of programs for particular duration, participating or attending one or more types of events including drama, shows, plays, parties, and like, art related including identifying one or more types of arts know by user including singing, acting, playing particular music instrument, dancing, painting and received virtual objects and virtual money value based on entertainment types of activities, sever module 188 calculates scores based on monitored and tracked said entertainment types of activities and display scores to user on indictor 4123.

Based on number of connections in social network, visiting places or geofence boundary with one or more contacts, participating with events with contacts, server module 188, calculates scores and display scores to user on indictor 4124.

Based on identifying, monitoring and tracking numbers of followers, contacts, connections, interacted entities in real world, numbers of sharing, publishing, posts and associated one or more types of and number of reactions including number of likes, number of comments, number of shares and based on received virtual objects and virtual money from conducting of digital activities (digital activities including number of posts, sharing, publications, types of or number of reactions, online transactions), server module 188, calculates scores and display scores to user on indictor 4125.

Based on identifying, monitoring and tracking numbers of visited places, geofence boundaries, point of interests and locations and received virtual objects and virtual money from said visited places, geofence boundaries, point of interests and locations, server module 188, calculates scores and display scores to user on indictor 4126, wherein travel related activities includes visiting of particular types and number of places, point of interests within particular duration and/or associated money spending, number of miles walking during travel, conducted type of activities including elephant or camel or horse riding, balloon, water sports, visiting of museum, gardens, zoo, beaches, rivers, sanctuary, forts, forests, mountains, tracking, art gallery, amusement park, water park.

Based on identifying, monitoring and tracking sports related activities like duration spends on particular types of sports, associate awards, medals, certificates, and received virtual objects and virtual money from submitting user' sports related video and received virtual objects and virtual money from sports related places and real world objects, server module 188, calculates scores and display scores to user on indictor 4127.

Based on identifying, monitoring and tracking education related activities like qualifying college degrees, get highest score in particular exam (locally, all over school or college, pre-define real world area, interstate or statewide, nationalwide, international), passing or getting score in particular type of exams, and associated awards, medals, certificates, and received virtual objects and virtual money from submitting certificates, mark sheets, award and education related documents and video and received virtual objects and virtual money from education related places and real world objects, server module 188, calculates scores and display scores to user on indictor 4131.

Based on identifying, monitoring and tracking work related activities like particular type of promotion, particular type of skills, particular type of or number of years of experience, real world salary range, granted patents in real world, and received virtual objects and virtual money from word related or submitting certificates, award and related documents and video and received virtual objects and virtual money from work related places and real world objects, server module 188, calculates scores and display scores to user on indictor.

Based on identifying earning of money within particular duration, server module 188, calculates scores and display scores to user on indictor 4136.

Based on identifying, monitoring and tracking money spending related activities like using, buying, subscribing particular names or types or number of brands, products, services, accessories, In an embodiment based on monitoring, tracking, identifying, recognizing, detecting, analyzing, processing, logging and storing, by the server module 188, as the player conducting of or providing of information about or automatically logging of user's or player's one or more types of activities, actions, participations in particular events at particular place, providing of status, visiting or interact with one or more types of locations or places, interacted with one or more types of entities, contacts, conducting one or more types of transactions with one or more types of entities, conducting one or more types of digital activities, actions, senses, behaviours, interactions, status, reactions, call-to-actions, transactions, sharing, communications, collaborations, connections in the real world and/or digital world including websites, applications and current total value of received virtual objects, the server module 1188, updates various types or categories of activity level and display to user on associated indicator.

In an embodiment user 4101 can view and manage users' one or more types of profile 4171 including general, social, professional, business, health and one or more types of activities profile. In an embodiment user 4101 can view user's collection of virtual objects, virtual money and virtual rewards 4172. In an embodiment user 4101 can view and manage users' logged real world and digital activities, actions, participations, transactions 4173. In an embodiment user 4101 can view and manage user related statistics and analytics including number of places or geofence boundaries visited, number of miles walking, number of and types of and amount of virtual objects and virtual money received by user, types of and number of activities did by user and transactions conducted by user, score of played games, number of instruction received, number of instruction send, number of notifications received from server, sponsors, contacts of user and users of network, number of photos and/or videos submitted for verifying various types of activities related to user and receiving virtual objects, virtual money and virtual rewards, number of, names of and types of interacted, transacted, connected, followed and related to user, number of and types of digital activities, actions, transactions, status and level of user and associated points or amount of virtual money acquired, collected, win, purchase, capture and received by user, number of photos, videos and posts shared by user.

Figure 42:
FIG. 42 illustrates example Graphical User interface (GUI) displaying feed items or one or more types of published contents or media or posts from one or more sources including connected users, followers, members of team, user specific auto matched sources, and preferences specific sources.

FIG. 42 illustrates example Feed Graphical User Interface (GUI) 281 wherein server module 161 generates feed item or news feed or feed post based on shared or posted or published or send photo or video of real world objects or photo or video of user or one or more contacts of user with real world objects, task or instruction messages associated received one or more types of virtual objects, virtual money, virtual power, virtual goods and associated contents or media including photo or video, associated metadata, reactions, and scores and serves to authorized or related or requested viewing users or feed or timeline, wherein feed items or feed posts comprises user's own 4205 and other users' including connected users, current location or checked in place specific, logged preferences specific users' 4225 shared, published and posted one or more types of contents or media task or instruction messages associated received one or more types of virtual objects, virtual money, virtual power, virtual goods and associated contents or media including photo or video, associated metadata, reactions, scores, analytics and statistics. In an embodiment user can provide one or more types of reactions including like, provide comment on and take one or more types of actions including share displayed posts or one or more types of contents or media including task or instruction messages associated received one or more types of virtual objects, virtual money, virtual power, virtual goods and associated contents or media including photo or video. In an embodiment user can view scores, statistics including total number of tasks accepted and total number of accepted tasks fulfilled, total number of likes, comments, shares, views, points and scores 4251, total number of tasks assigned, total number of assigned tasks specific received media and associated, likes, comments, shares, views, points and scores 4252. In an embodiment user can view from post detail scores 4255. In an embodiment posting user can mention accessible user names and associated link, who help user in conducting of said assigned tasks. In an embodiment enabling user to search and match 4202 feed items or feed posts or one or more type of contents published or share or send by user's contacts, participated or administrated team members, groups, networks, followed sources and users of network who shared or published posts or one or more type of contents or media including photos, videos associated task message, metadata, scores, reactions, statistics. In an embodiment enabling user to sort 4261 and filter 4260 displayed feed items or feed posts or one or more type of contents published or shares or send to user by user's contacts, groups, participated or administrated team members, networks, followed sources and users of network who shared or published posts or one or more type of contents or media including photos, videos associated task message, metadata, scores, reactions, statistics, wherein sort or filter types comprises sort or filter as per received date & time or ranges of received date & time, one or more sources or contact names or team names or group names or followed source, one or more locations or places or define radius surround current or particular location, highest to lowest views, scores and type of reactions, highest posts from sources, keywords found in instruction or tasks messages, keywords matched with recognized objects in photo or video (series of images) related keywords, keywords matched with metadata associated with posts or displayed one or more types of contents or media, integrated media with task message or part of message or image, ephemeral content only, type of media or content including photo or video, user's own published or posted or sent contents or media or posts and any combination thereof. In an embodiment user can view and manage user's contacts and connections and search, select and invite users of network for connecting with them or accept received invitation of other users of network for connecting with them.

Figure 43:
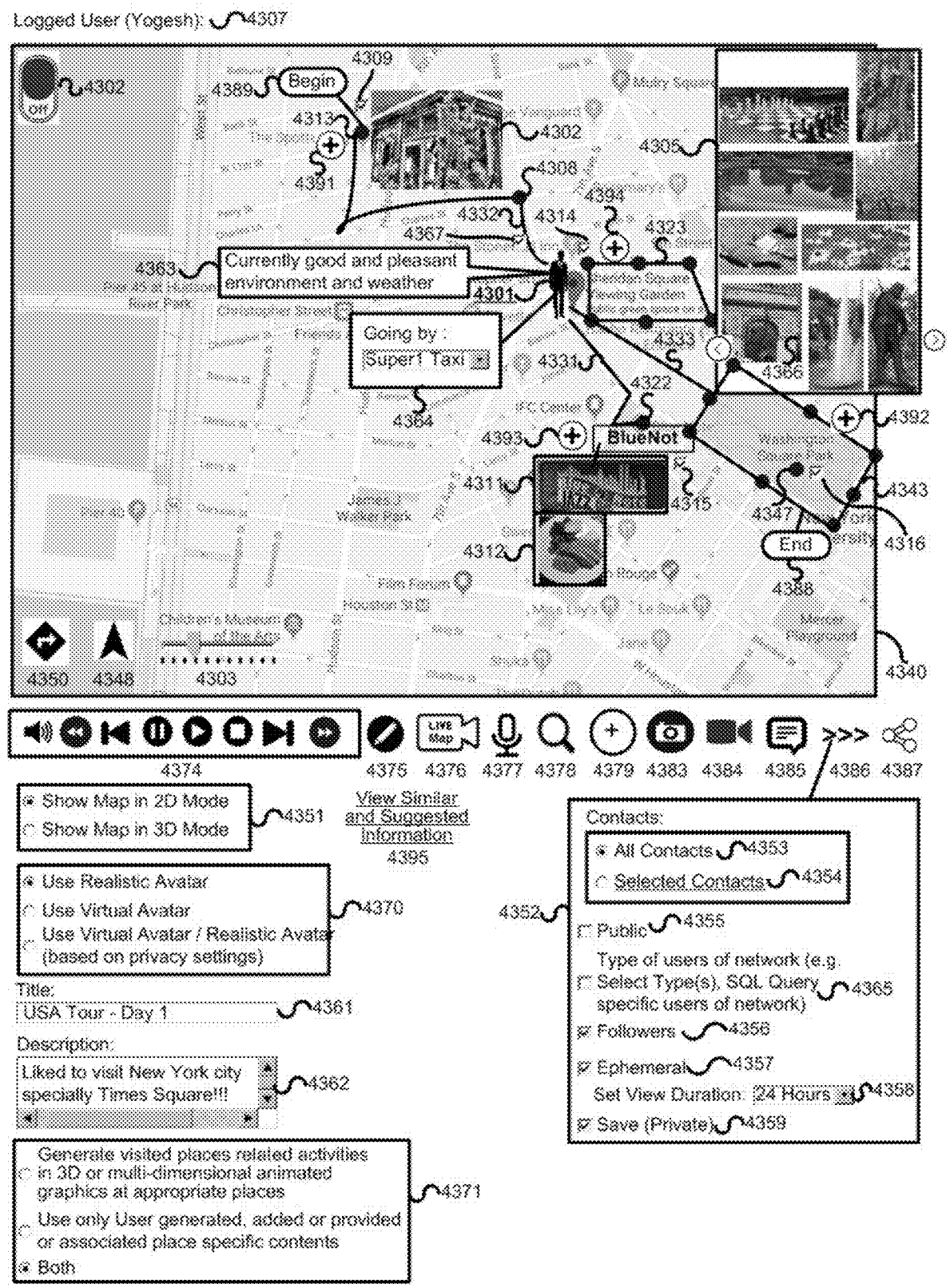
FIG. 43 illustrates example Graphical User interface (GUI) showing map story interface for enabling user to create, view monitored or tracked, edit, provide one or more types of contents, update, manage, test, publish or live publish and share map story or story on map or story with map or feed or feed items including story associated with one or more places, locations, point of interests, between visited places.

FIG. 43 illustrates example Graphical User interface (GUI) showing story on map interface 282. In the event of turning "ON" or starting of recording of story 4302 by user, instructing server module 190 to mark current location of user 4307 device 200 as starting point of story or visual story or story with/on/within/overlay on/integrated with map and start monitoring, tracking, recording, receiving, processing, logging and storing of user 4307 device's 200 current location and information about each visited route or place by user 4307 up-to turning "OFF" 4302 said monitoring, tracking, recording of story instruction from user 4307, wherein information about each visited route or place comprises monitoring, tracking, recording, receiving, processing, logging and storing each visited routes and place or location or location co-ordinates associated Global Positioning System (GPS) coordinates, longitude, latitude, altitude, date and time and information related to associated with visited location or place or Global Positioning System (GPS) coordinates, user provided contents and data including one or more photos, videos, live video, structured contents (structured contents may provide via fields and associated one or more types of values, data and contents or forms or dynamically presented forms), voice, images, links or web addresses, text, animations, 3D contents, multimedia, emoticons, stickers, emoji, place information provided by user and/or suggest by server and add or edited by user. After starting of monitoring, tracking, recording, receiving, processing, logging and storing of information about each visited route or place or location point or Global Positioning System (GPS) coordinates including longitude, latitude, altitude of user 4307 device 200, server module 190 mark and show 4389 starting point of location or Global Positioning System (GPS) coordinates 4313 and starts monitoring, tracking, recording, notifying information about nearby or current places, receiving, processing, logging and storing user 4307 device's 200 current location and information about each visited route or place (e.g. places 4302/4323/4347/4322 and routes 4332/4331/4333) by user 4307. For example server module 190 notifies user information about current place 4313 to user 4307 (e.g. "Take photo or video or selfie with outside of place". In an embodiment user can view said received notification and can tap on notification and capture one or more photos or record videos and add 4391 or associated said captured photo or recorded video 4302 and one or more types of content including text or comments to/with said place 4313. In an embodiment server can suggest one or more types of information to user based on user profile, user related one or more types of data, place information including place name, place details, place related information shared by other users of network, data or information including menu item, product, service, movie name and details (e.g. price), opening and closing hours, comments, reviews and ratings, ticket price and like related to place provided by external sources including owner of place or place of business. After taking photo 4302 or providing one or more types of contents from starting place 4302, in the event of moving from said place 4302 to another place by walking or running or by one or more types of vehicles or means of transportation (e.g. car, cab, taxi, rickshaw, boat, cycle, flight, horse cab, train, bus), server module 190 monitors, tracks, logs routes 4332 from starting place 4313 or location co-ordinates 4313 to place 4323 based on monitored and tracked location of user 4307 device 200. In an embodiment based on type of means of transportation server module 190 use movable icon or image or sticker or emoji or emoticon with user's avatar or virtual character or realistic character (2D or 3D) on map that correspondences the real world geography, as a result, as the user 4307 continuously moves about or navigates in a range of coordinates in the real world based on monitoring and tracking current location of the client device 200, the user 4307 also continuously moves about in a range of coordinates in the real world map 4340 or virtual world 4340. In an embodiment user can capture one or more photos 4383, record one or more videos 4384 and provide or add or associate one or more types of contents including voice (commentary and/or music and/or voice file) 4377, text 4385, search 4378 and select or add 4379 one or more other types of contents like emoticons, stickers, geo-filter, emoji, web address or links, location information, select from list with any location point 4313 or route 4332 or Global Positioning System (GPS) co-ordinates 4308 or visited place 4313 or current place 4301 (in transit like in-bus, in-boat, in-cab, in-train, in-flight) or any visited place on map. In an embodiment user is enabled to edit 4375 one or more types of contents on map or added by user or associate with any location point 4313 or route 4332 or Global Positioning System (GPS) co-ordinates 4308 or visited place 4313 or current place 4301. In an embodiment user can provide title to story on/with/overlay on map or provide one or more types of details 4362 and structured data by using forms or provided field specific values or data. In an embodiment user can provide text 4363 or voice 4377 or video 4384 commentary with or without music any time with any location point 4313 or route 4332 or Global Positioning System (GPS) co-ordinates 4308 or visited place 4313 or current place 4301. In an embodiment server module 190 dynamically determines and generates and presents to user form or structured form for enabling user to provide structured details or data or one or more types of contents 4364, where dynamically determines based on type of currently visited place, user profile or one or more types of user related or associated data, speed of user's movement based on speed change or updates of monitored or tracked user device's current location, provided structured details, provided or associated one or more types of contents with location point 4313 or route 4332 or Global Positioning System (GPS) co-ordinates 4308 or geofence 4323 or visited place 4313 or current place 4301, stays at place for particular duration, purchasing of products or services or tickets (server module 190 determines product or service based on submitted purchase receipt, linking with vendor or seller's system or database), accompanied users or persons or contacts and associated type of relationships, current date and time and associated event information, place associated details and one or more types of data or contents and reactions, type and details of user's activity, participations in particular event, conducting of particular transaction and status (provided by user e.g. eating particular food item, viewing particular movie or show or television program, reading particular book, listening particular song). In an embodiment user can use map directions 4350 and step by step direction guide 4348 to visit from current place 4323 to another place 4347/4343. In an embodiment server module 190 send various types of notifications to user including notify user about view information or suggested contents related to or about current place or route or nearby or user surround places or entered geofence associated places, persons, products, brands, and services, notify user about point of interests for suggesting user to take photos or record videos or provide one or more types of contents or structured data or details. In an embodiment server module 190 identifies user accompanied one or more users or contact's identity and associated details based on matching monitored or tracked current location of user device with current location of user device of other users of network or contacts. In an embodiment enable user to conduct augmented reality scanning or taking of one or more photos or videos and in the event of receiving of said photo or video or detection of conducting of augmented reality scanning by server module 190, server module 190 recognizes objects in received photo or video or raw photo or scanned data and identifies and stores associated keywords with location or place or location co-ordinates where user conducted and submitted augmented scanning or taking a photo or video. In an embodiment user is enable to record voice and edit with particular location point 4313 or route 4332 or Global Positioning System (GPS) co-ordinates 4308 or geofence 4323 or visited place 4313 or current place 4301. In an embodiment after receiving above discussed plurality types of data, server module 190 generates visual story or story on/in/with/overlay on map, wherein generated map comprise displaying user's avatar or realistic character or virtual character at first place 4313 and displaying or automatically playing or automatically showing associated one or more types of contents including photos and videos in sequences or story format and then displaying that user's avatar or realistic character or virtual character moving from first place 4313 to next place or second place 4323 route 4332 based on pre-defined settings including display movement speed and then displaying or automatically playing or automatically showing or presenting second place 4323 associated one or more types of contents including photos and videos 4305 in sequences or story format. In an embodiment in the event of turn "OFF" 4302 by user 4307, display "end" sign 4388 on map at user selected place or current particular location or place where user taps or clicks on "OFF" button or control 4302 and instructing server module 190 to end recording of particular named or current story 4361 and generates story with map based on said monitored, tracked, logged, processed, updated and stored data and presents to user for preview, test, edit, update and share said generated story with map. In an embodiment after generating of story based on said monitored, tracked, logged, processed, updated and stored data, server modules displays said generated story with map to user and enabling user to edit story including add, edit, remove one or more types of contents including photos, videos, text, web addresses or links, music, voice, images, emoji, comments, reactions, provide one or more types of settings including speed 4303 of movement of user's avatar or realistic or virtual character, provided additional structured details, select all 4553 or one or more contacts 4554, followers 4556 or make said story on map or story with map as public 4555 for making them searchable or viewable or accessible for all users of network and/or one or more types of destinations including one or more websites, applications, web services, webpages, social networks, one or more users of external social networks 4587 whom user wants to share, make said story on/with map as ephemeral 4557 and provide, select, set, update and apply view duration 4358 for enabling receiving or viewing user of said shared story on map or story with map to view or play said shared story on map or story with map within said pre-set view duration 4358 or for said pre-set view duration 4358. In an embodiment user can view story in 2D map format 4340 or 3D map format (discuss in detail in FIG. 45). In an embodiment user is enabled to view 4340, play, pause, stop, go-to start, go-to end, rewind, forward, fast forward 4374 and can directly click on particular place 4313 or content item 4302 (e.g. phot or video or text) and view, play from or jump to start, from particular point or duration or location or place 4374 to preview and update one or more types of contents including routes and directions 4332, one or more photos, videos, live video, structured contents (structured contents may provide via fields and associated one or more types of values, data and contents or forms or dynamically presented forms), voice, images, links or web addresses, text, animations, 3D contents, multimedia, emoticons, stickers, emoji, place. In an embodiment user or admin user can view, access, edit and updates combined stories of one or more accompanied users. In an embodiment user can provide pause duration at appropriate places in said story on map or story with map. In an embodiment user can allow receiving or viewing user(s) 4352 of said story on map or story with map 4340 to view said story on map or story with map in 2D format 4340 or 3D format—in the event of clicking or tapping on this option, displaying to user 3D virtual world 4505 (outside of place view) or 4506 (inside place view when user enter) or 4530 (inside place activity (e.g. eating of [Pizza]) view in the form of captured or recorded or associated or added or shared photos or videos) or 4601 (inside place activity (e.g. eating of [Pizza]) in the form of dynamically generated 3D animation or simulation) (discuss in detail in FIGS. 45-46) 4351. In an embodiment user can click on particular place or pre-defined geofence boundary or location co-ordinates or anywhere on map and can view associated similar or contextual or suggested information and can select, edit, update and add or associate with said particular place 4313 or pre-defined geofence boundary 4343 or location co-ordinates 4308 or selected location point 4308 on map 4340. In an embodiment enable user to turn on 4376 or share live story on map or story with map with all 4353 or one or more selected contacts 4354, followers 4356, type of users of network including selected one or more types or presences specific or one or more criteria and boolean operator specific users of network (for example gender And age range And particular named school) or Structured Query Language (SQL) Query specific users of network 4365, save or make it private view or access only 4359, and make as public for viewable for all users of network 4355 and make as ephemeral i.e. allow viewers to view said story up-to user turn off live story on map 4376. In an embodiment user can select 4309/4314/4315/4316/4367 and include or exclude one or more visited places 4313 or sub-places 4366, pre-defined geofence boundaries 4323/4343, particular location co-ordinates or location point 4308, and routes 4332 in story on map or story with map or visual story 4340 for sharing 4352 with one or more contacts or others users of network. In an embodiment user can user use realistic avatar or virtual avatar or as per privacy settings use both 4370 while recording, so user can share story with user's realistic avatar with one or more selected contacts or user can share story with virtual avatar with followers or types of criteria specific users of network. In an embodiment user can instruct server module 190 or set or apply settings instructing to generate visited places related activities in 3D or multi-dimensional animated graphics at appropriate places or instruct to use only user generated, or user added or provided or associated place specific contents or instruct to use both options 4371.

Figure 45:
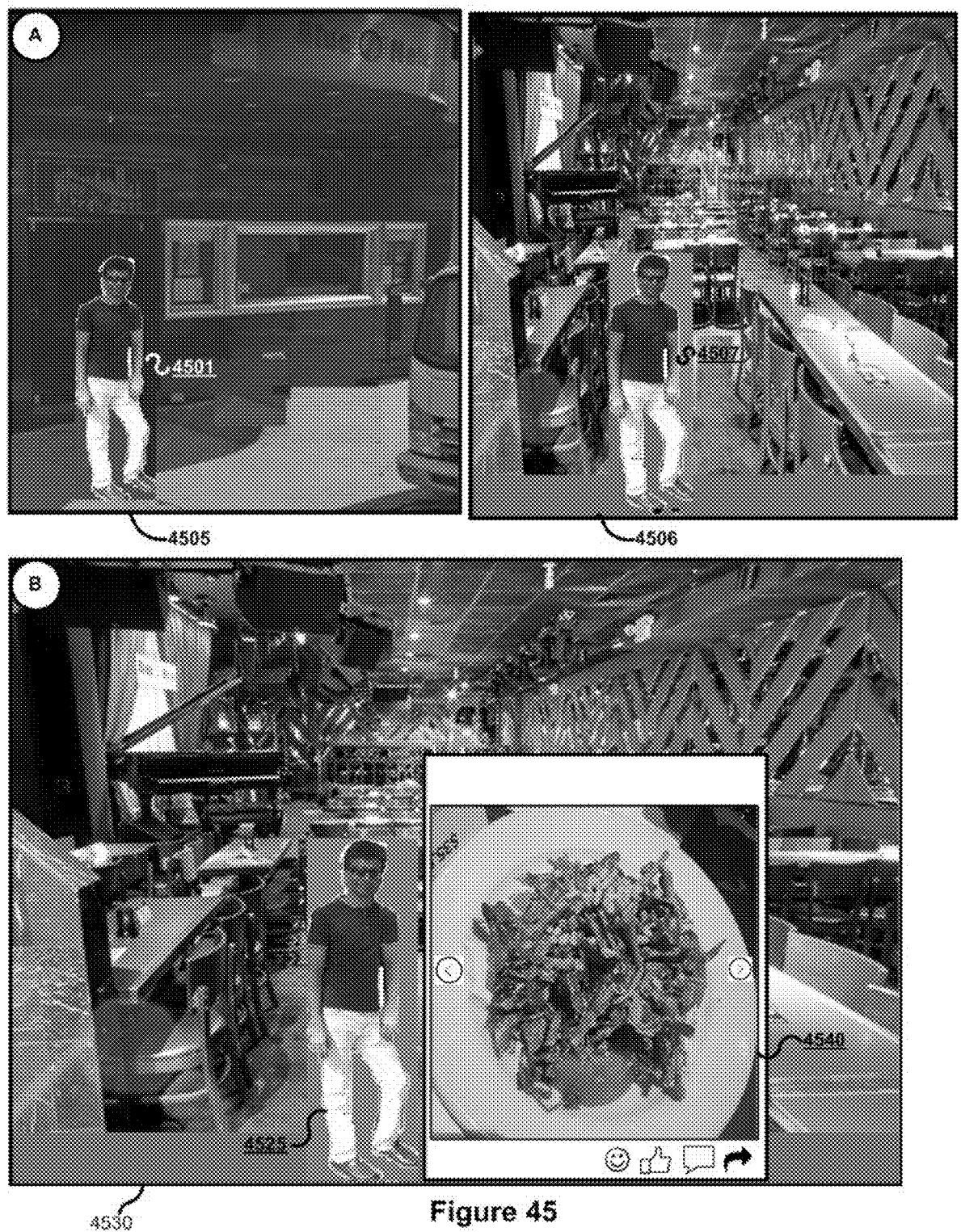
Figure 46:

In an embodiment FIG. 45 (A) illustrates example 3D real world map or 3D virtual world having geography correspond to real world geography or 3D Graphical User interface (GUI), wherein hosting, at a server, a 3D virtual world geography 4505 or 3D real world map interface 4505 that correspondences the real world geography, as a result, as the user 4501 continuously moves about or navigates in a range of coordinates in the real world based on monitoring and tracking current location of the client device 200, the user 4501 also continuously moves about in a range of coordinates in the 3D real world map 4505 or 3D virtual world user interface 4505 and server module 190 records said movement or location co-ordinates and based on received above discussed data, generates 3D visual realistic story (displaying real world user's activities in virtual world which is sufficiently similar to real world). In an embodiment when user 4507 enters into particular place (indoor) then based on 360-degree imagery with 3D Street View technology, displaying in story that user enter into particular place or step inside place. In an embodiment creating user's realistic 3D animated avatar 4501/4507 based on one or more photos and/or videos and/or one or more types of data and metadata by employing techniques (For example Loom.ai) or 3D modeling of user's realistic 3D animated avatar 4501/4507. In an embodiment server module 190 records when user reaches from the first place to the second place by walking or running, or by one or more types of means of transportation including cab or taxi, rickshaw, car, bike, scooter or scotty, bus, train, boat, flight, cruise, horse cab, cycle. Based on means of transportation and realistic 3D animated avatar, server module 190 generates and displays realistic animation or simulation (e.g. 3D game having realistic characters moving in virtual world) wherein user's realistic 3D animated avatar is moving or transporting in particular type of means of transportation from the first place to the second place on the 3D real world map (e.g. server module 190 may employ e.g. Google Map API for games including 360 street view). For example when user 4301 starts walking from [Sheridan Square Garden] 4323 to [Blue Note] 4322 via route 4331 then based on monitored and tracked user device's location and 360-degree imagery with 3D Street View technology and user's realistic 3D animated and movable avatar, server module 190 starts recording of user's real world movement from [Sheridan Square Garden] 4323 to [Blue Note] 4322 via route 4331 in 3D format 4505 which viewing user can view as per speed settings. Server module 190 identifies starting point based on user instruction or marking of particular location or place as starting point and user device's current location. Server module 190 identifies each visited place based on staying or dwelling of user for particular duration at particular identified place or point of interest or pre-defined geofence boundary (wherein identified place does not considered when user is walking, running, travelling by one or more types of one or more means of transportation or vehicles, location co-ordinates having no identified place). Server module 190, records transportation of user from the starting point of location to the first identified place via particular identified route, movement from outside of the first identified place 4505, enter into the first identified place 4506, conduct one or more types of activities in/at/inside the first identified place 4506 then server module 190 records transportation of user from the first identified place to the second identified place via particular identified route, movement from outside of the second identified place, enter into the second identified place, conduct one or more types of activities (including eating particular food, viewing movie, via shop, visit shop, purchase particular product, itinerary, walking inside mall, visiting art gallery, visiting and viewing museum, reading book, shopping, wandering at beach, visit tourist place) in/at second identified place then transportation of user (via walking, running, cab, bus, train, flight, cycle) from the second identified place to the third identified place via particular identified route and like. Server module 193 records story in various pre-defined parts. For example server module 190 records from the first place to the second place or from starting point to the first place then outside the first place in response to the client device being within a set distance of the first place, then record one or more types of activities in the first place, then record transportation of user from the first place to the second place, wherein recording of each part is/are based on received one or more types of data (discussed in FIG. 43).

For example after reaching at [Blue Note] 4322 via route 4331, in response to the client device being within a set distance of the [Blue Note] 4322, recording, by the server module 190, that user 4301 is walking and reaching at [Blue Note] 4322 and display on virtual world with a geography that parallels at least a portion of the geography of the real world such that a user 4501 can navigate the virtual world 4505 by moving to different geographic locations in the real world and then when user 4301 enters into [Blue Note] 4322 then display inside 360 degree 3D view and then recording, by the server module 190, one or more types of user conducted activities, actions, participations in events, conducting of one or more types of transactions. For example recording by the server module 190, ordering of particular menu item [e.g. Pizza], eating [Pizza], make payment for [Pizza], submitting of receipt via scanning or taking of photo of purchase receipt of [Pizza], taking of photograph or recording of video (e.g. one or more selfie, with food, with restaurant and like) by user 4301 and providing one or more types of reactions by user 4301 including liking of [Pizza], providing of review and ratings.

Figure 44:
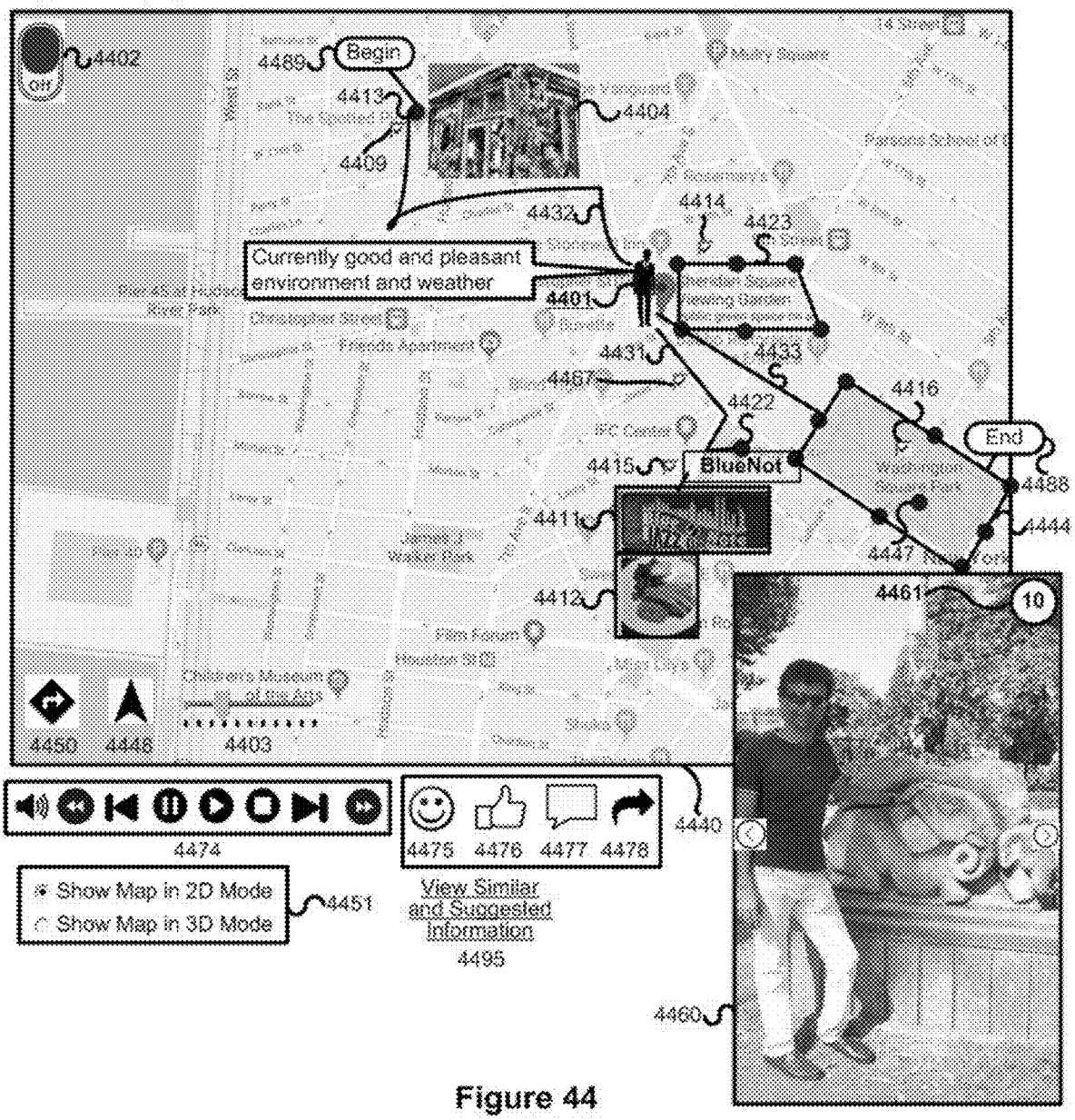
FIG. 44-46 illustrates example 2D or 3D or multi-dimensional Graphical User interface (GUI) displaying of one or more types of map story or story on map or story with map related to or shared by one or more contacts or users of network for enabling user to view, play, pause, stop, view as per user device's current location, go-to start, go-to end, rewind, forward, fast forward, directly click on particular place or content item (e.g. phot or video or text) and view, play from or jump to start, from particular point or duration or location or place, provide one or more types of reactions, view routes and directions, view place associated or shared one or more types of contents including one or more photos, videos, live video, structured contents (structured contents may provide via fields and associated one or more types of values, data and contents or forms or dynamically presented forms), voice, images, links or web addresses, text, animations, 3D contents, multimedia, emoticons, stickers, emoji, place information provided by publisher or sharing user and/or server. In an embodiment user can view combined stories of one or more selected users who shared stories related to similar places.

FIG. 44 illustrates example 2D real world map or 2D virtual world having geography corresponding to real world geography or 2D Graphical User interface (GUI) displaying of one or more types of map story or story on map or story with map 4440 related to or shared by one or more contacts or users of network 4307 with user or viewing user 4407 for enabling user 4407 to view, play, pause, stop, go-to start place 4489, go-to end place 4488, rewind (go back), forward (go to next visited place or route or location or location co-ordinates or pre-defined geofence), make slow playing of story or fast forward 4474 story on map or story with map 4440, view as per user 4407 device's current location, enable to directly click on particular place 4489 or route 4431 or pre-defined geofence 4444 or content item 4411 (e.g. phot or video or text) and view, play from or jump to particular place or location or route or geofence or start from particular point or duration of story, provide one or more types of reactions to one or more places, routes, associated one or more types of consents including photo, video, posts, message, voice or cometary or comments, wherein reactions comprises like 4476, dislike 4476, provide one or more types of emoticons or stickers or expressions or emoji 4475, provide comments 4477, provide ratings, live or real-time chat 4477 with sharing user or other one or more viewers of said story on map or story with map 4440 and share with one or more selected contacts and/or users or network and/or one or more types of destinations including one or more external websites and applications, view routes and directions 4450 and step by step guided directions 4448, view place associated or shared one or more types of contents including one or more photos, videos, live video, structured contents (structured contents may provide via fields and associated one or more types of values, data and contents or forms or dynamically presented forms), voice, images, links or web addresses, text, animations, 3D contents, multimedia, emoticons, stickers, emoji, place information provided by publisher or sharing user 4307 and/or server 110. In an embodiment user can view combined stories of one or more selected users who shared stories related to similar places. In an embodiment in the event of playing or starting particular story on map or with map, display or start or automatically start play said generated or presented story 4440, wherein present on a display indicia of a set of content items available for viewing; present on the display a first content item 4460 of the set of content items for a first view period of time 4461/4358 defined by a timer 4461, wherein the first content item 4460 is hide when the first view period of time expires 4461/4358; receive from a touch controller a haptic contact signal indicative of a gesture applied to the display 4460 during the first view period of time 446; wherein the content presentation controller hides the first content item 4460 in response to the haptic contact signal and proceeds to present on the display a second content item of the set of content items for a second view period of time defined by the timer, wherein the content item controller hides the second content item upon the expiration of the second view period of time; wherein the second content item is hides when the touch controller receives another haptic contact signal indicative of another gesture applied to the display during the second view period of time; and wherein the content presentation controller initiates the timer upon the display of the first content item and the display of the second content item. In an embodiment user can turn ON or OFF 4402 live or real-time updated view of updated story on map or updated story with map 4440. In an embodiment user can view story in 2D format 4440 or 3D format (discuss in detail in FIG. 45). In an embodiment user can view combined view similar types of (related to particular place) story of one or more users of network 4495 or view suggested information related to particular place 4495. In an embodiment user can view full or selective part of story by selecting 4409/4414/4415/4416/4467 and including or excluding one or more visited places 4413 or sub-places 4466, pre-defined geofence boundaries 4423/4443, particular location co-ordinates or location point 4408, and routes 4432 for viewing story on map or story with map or visual story 4440.

In an embodiment enabling receiving or viewing user(s) 4407 to view said story in 2D map format or 3D format—in the event of clicking or tapping on this option, displaying to user 3D virtual world 4505 (outside of place view) or 4506 (inside place view when user enter) or 4530 (inside place activity (e.g. eating of [Pizza]) view in the form of captured or recorded or associated or added or shared photos or videos) or 4601 (inside place activity (e.g. eating of [Pizza]) in the form of dynamically generated 3D animation or simulation) (discuss in detail in FIGS. 45-46) 4451.

FIG. 45 illustrates example 3D real world map or 3D virtual world having geography correspond to real world geography or 3D Graphical User interface (GUI) wherein hosting, at a server, a 3D virtual world geography 4505 or 3D real world map interface 4505 that correspondences the real world geography, as a result, as the user 4501 continuously moves about or navigates in a range of coordinates in the real world based on monitoring and tracking current location of the client device 200, the user 4501 also continuously moves about in a range of coordinates in the 3D real world map 4505 or 3D virtual world user interface 4505 wherein user can view story in 3D real world format 4505/4506. In an embodiment showing user's realistic 3D animated avatar 4501/4507 based on one or more photos and/or videos and/or one or more types of data and metadata by employing techniques (e.g. Loom.ai) or 3D modeling of user's realistic 3D animated avatar 4501/4507. In an embodiment in the event of playing story, displaying in 3D format or in animation or simulation format that user is reaching in 3D virtual world from the first place to the second place by walking or running, or by using or employing one or more types of means of transportation including cab or taxi, rickshaw, car, bike, scooter or scotty, bus, train, boat, flight, cruise, horse cab, cycle. Based on means of transportation and realistic 3D animated avatar, server module 190 generates and displays realistic animation or simulation wherein user's realistic 3D animated avatar is moving or transporting in particular type of means of transportation from the first place to the second place on the 3D real world map (e.g. server module 190 may employ Google Map API for games including street view). For example when user 4301 starts walking from [Sheridan Square Garden] 4323 to [Blue Note] 4322 via route 4331 then based on monitored and tracked user device's location and 360-degree imagery with 3D Street View technology and user's realistic 3D animated and movable avatar, server module 190 displaying in virtual world 4501, user's real world movement from [Sheridan Square Garden] 4323 to [Blue Note] 4322 via route 4331 in 3D format which viewing user can view as per speed settings. Server module 190 identifies starting point based on user instruction or marking of particular location or place as starting point and user device's current location then Server module 190 identifies each visited place based on stay of user at particular identified place or point of interest or pre-defined geofence boundary for particular duration (wherein identified place not include when user is walking, running, travelling by one or more types of one or more means of transportation or vehicles, location co-ordinates having no identified place). Server module 190, displays in virtual world said recorded transportation of user from the starting point of location to the first identified place via particular identified route, movement from outside of the first identified place 4505, enter into the first identified place 4506, conduct one or more types of activities (e.g. eating particular type of food) in/at first identified place 4525 in the form of presenting one or more photos or videos shared by user and/or other users of network and/or related to said place or in 3D format or 3D animated format based on identified or determined types of conducted activities by user. Then displaying by the server module 190, transportation of user from the first identified place to the second identified place via particular identified route, movement from outside of the second identified place, entering into the second identified place, conducting one or more types of activities (including eating particular food, viewing movie, via shop, visit shop, purchase particular product, itinerary, walking inside mall, visiting art gallery, visiting and viewing museum, reading book, shopping, wandering at beach, visit tourist place) in/at second identified place then transportation of user (via walking, running, cab, bus, train, flight, cycle) from the second identified place to the third identified place via particular identified route and like. Server module 193 displays recorded story in various pre-defined parts. For example load and display story from the first place to the second place or from starting point to the first place then outside the first place, then display one or more types of conducted activities in/at/inside the first place, then disabling transportation of user 501 from the first place to the second place, wherein displaying record each part is/are based on received one or more types of data (discussed in FIG. 43).

For example displaying in the 3D virtual world 4505, by the server module 190, that user 4501 reaching outside or near to [Blue Note] 4322 via route 4331 and then display 4506 that user 4507 enters into [Blue Note] 4322 and then displaying that user 4525 conducted or conducting of one or more types of activities, actions, participations in events, conducting of one or more types of transactions 4540 in/at/inside said place in the form of photos or videos 4540 at that place taken and shared by user and/or based on identified type of activity (e.g. eating of Pizza), identified accompanied one or more contacts or users of network, or received from user 4301 indication that user 4507 ordered particular menu item [e.g. Pizza] and ate [Pizza], made payment for [Pizza] based on submitted scanned or photo of receipt, shared one or more photographs or recorded of videos (e.g. one or more selfie, with food, with restaurant and like), provided one or more types of reactions including liking of [Pizza], providing of review and ratings, server module 190 and based on monitored and tracked user device's location and 360-degree imagery with 3D Street View technology and user's realistic 3D animated and movable avatar, generates and displaying in virtual world 4601, said generated 3D animation or 3D simulation showing that user [Yogesh] 4605 and particular identified accompanied user [Amita] 4610 both enters into, walks into, ordering, serving by waiter, eating [Pizza], talking regarding pizza, making of payment with or without voice and/or editing and/or text and/or associate one or more types of overlay information inside particular place [Blue Note] in 3D format or 3D animation format 401 which sufficiently look and feels like viewing in realistic or real world or in video. In an embodiment viewing user can view virtual tour inside said particular place. Likewise based on type of activities and received or identified plurality types of data server module 190 can display 3D animation or 3D simulation showing that user or one or more accompanied users playing, walking, running, viewing, seating, discussing, travelling, wandering in mall, viewing products in shop, purchasing particular one or more products, providing one or more types of expressions liking particular product(s), talking about particular product(s), reading, listening, asking, enquiring, questioning, reviewing details, swimming, providing various types of expressions including smiling, crying, joy, trust, anticipation, disgust, sadness, happiness, fear, anger, surprise, travelling via one or more means of transportation (car, cab, taxi, bus, train, flight, boat, cruise, cycle, walking, running), drinking (e.g. drinking coffee), viewing cloths or view wearer clothes for test, doing or done or viewing makeups or hairstyle, going to temple or worshiping god, participate in festival, visiting or wandering at beach, waiting, instructing, guiding, purchase ticket, viewing movie or play, playing at garden, working at office, participate in meeting, viewing particular program in television at home, staying at hotel, sleeping, doing yoga or exercise at gym, taking medicine, visiting hospital, doing dance, singing song, playing music instrument, riding horse, elephant, camel or emu, flying in balloon, visiting zoo or park or amusement park, playing water sports, attending conference, event, birthday or anniversary of other type of party, studying at school or college or class, learning dance, sports and like.

In an embodiment enabling user to search stories or visual stories on/with/overly on/inside/in map based on one or more types of users of network including users in family members, in contacts, in contacts of contacts, expert, sponsored, criteria or filter or advance search options or structured query language (SQL) specific users of network wherein filters or criteria comprises income range of user, level of money spending including minimum, medium, luxury, super luxury, gender, users who traveled with single or with identified family members or friends or contacts, stories started and end at particular place or location, home location, language, one or more types of profile fields, one or more types of activities conducted, habit of food, visited place(s), age ranges, date & time ranges, one or more keywords, categories, types, criteria, filters and any combination thereof.

Figure 47:
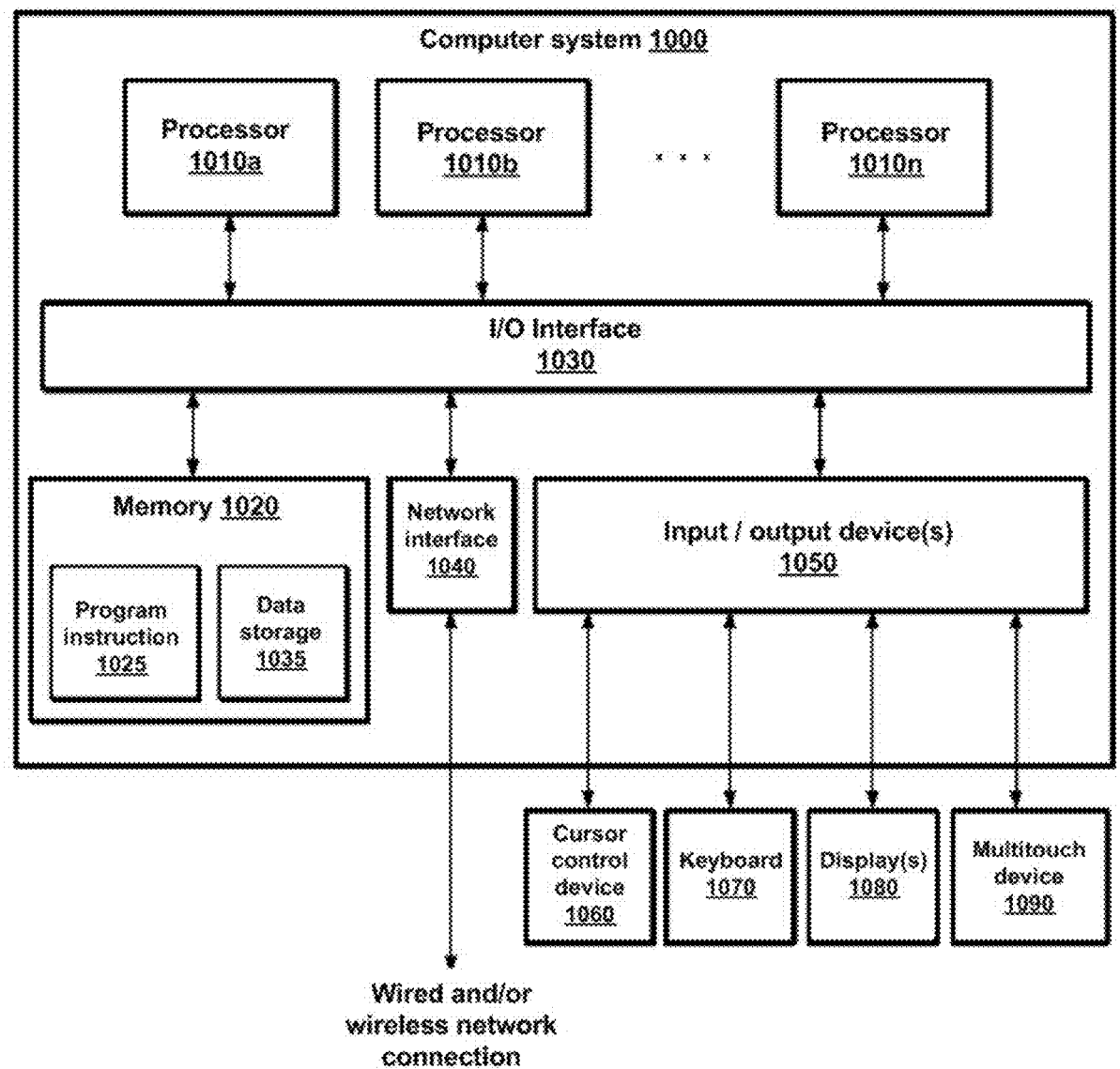
FIG. 47 is a block diagram that illustrates a mobile computing device upon which embodiments described herein may be implemented.

Various components of embodiments of methods as illustrated and described in the accompanying description may be executed on one or more computer systems, which may interact with various other devices. One such computer system is illustrated by FIG. 47. In different embodiments, computer system 1000 may be any of various types of devices, including, but not limited to, a personal computer system, desktop computer, laptop, notebook, or notebook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, multitouch device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods as illustrated and described in the accompanying description may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those for methods as illustrated and described in the accompanying description, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired and/or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired and/or wireless connection, such as over network interface 1040.

As shown in FIG. 47, memory 1020 may include program instructions 1025, configured to implement embodiments of methods as illustrated and described in the accompanying description, and data storage 1035, comprising various data accessible by program instructions 1025. In one embodiment, program instruction 1025 may include software elements of methods as illustrated and described in the accompanying description. Data storage 1035 may include data that may be used in embodiments. In other embodiments, other or different software elements and/or data may be included.

Those skilled in the art will appreciate that computer system 1000 is merely illustrative and is not intended to limit the scope of methods as illustrated and described in the accompanying description. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

In an embodiment a program is written as a series of human understandable computer instructions that can be read by a compiler and linker, and translated into machine code so that a computer can understand and run it. A program is a list of instructions written in a programming language that is used to control the behavior of a machine, often a computer (in this case it is known as a computer program). A programming language's surface form is known as its syntax. Most programming languages are purely textual; they use sequences of text including words, numbers, and punctuation, much like written natural languages. On the other hand, there are some programming languages which are more graphical in nature, using visual relationships between symbols to specify a program. In computer science, the syntax of a computer language is the set of rules that defines the combinations of symbols that are considered to be a correctly structured document or fragment in that language. This applies both to programming languages, where the document represents source code, and markup languages, where the document represents data. The syntax of a language defines its surface form. Text-based computer languages are based on sequences of characters, while visual programming languages are based on the spatial layout and connections between symbols (which may be textual or graphical or flowchart(s)). Documents that are syntactically invalid are said to have a syntax error. Syntax—the form—is contrasted with semantics—the meaning. In processing computer languages, semantic processing generally comes after syntactic processing, but in some cases semantic processing is necessary for complete syntactic analysis, and these are done together or concurrently. In a compiler, the syntactic analysis comprises the frontend, while semantic analysis comprises the backend (and middle end, if this phase is distinguished). There are millions of possible combinations, sequences, ordering, permutations & formations of inputs, interpretations, and outputs or outcomes of set of instructions of standardized or specialized or generalized or structured or functional or object oriented programming language(s).

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols.

Furthermore, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. Additionally, although the foregoing embodiments have been described in the context of a social network website, it will apparent to one of ordinary skill in the art that the invention may be used with any social network service, even if it is not provided through a website. Any system that provides social networking functionality can be used in accordance with the present invention even if it relies, for example, on e-mail, instant messaging or any other form of peer-to-peer communications, or any other technique for communicating between users. Systems used to provide social networking functionality include a distributed computing system, client-side code modules or plug-ins, client-server architecture, a peer-to peer communication system or other systems. The invention is thus not limited to any particular type of communication system, network, protocol, format or application.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method. Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

I claims:

1. A method implemented by a server including at least one processor and comprising:
    a) storing data specifying an association between the real world object associated virtual object, wherein the association utilizes geolocation or place or geofence information and the object criteria;
    b) detect that a client device of the server has conducted scanning or augmented reality (AR) scanning or taken a photograph or provided a raw photo or scanned data from particular real world object geolocation;
    c) identifying or recognizing an object in the photograph or scanned data; and based on the identified object satisfying within a defined geographic area surrounding the identified geolocation or the identified geolocation associated place or geofence associated object criteria in the stored data, displaying or providing the associated virtual object including virtual money to the client device.

2. The method of claim 1, wherein store virtual objects and associated data including virtual money provided to the client device in a virtual object and virtual money collection associated with the client device.

3. The method of claim 1, wherein displaying or storing the virtual object and associated virtual money to the client device based on validating location of augmented reality scanning or taking a photograph of real world object by sufficiently matching location of augmented reality scanning or taking a photograph of real world object with pre-defined or stored location of real world object.

4. The method of claim 1, wherein displaying or storing the virtual object and associated virtual money to the client device in the event of sufficiently matching of date and time of augmented reality scanning or taking a photograph of real world object with server's current date and time, wherein date and time retrieved from exchangeable image file format (EXIF) data associated with said scanned data or a photograph or a raw photo.

5. The method of claim 1, wherein notifying or displaying the information about a real world object to the user or player in response to the client device being within a set distance of the location of the real world object.

6. The method of claim 1, wherein the virtual object is provided to the user or player in response to the user or the player making a purchase of an object or product or service at the business of the sponsor and submitting and validating digital receipt or scanned receipt to the server.

7. The method of claim 1, wherein displaying or storing the virtual object and associated virtual money to the client device after conducting of one or more types of required activities, actions, call-to-actions, participation, playing of game, fulfillment of task, wherein one or more types of activities, actions, call-to-actions, participation comprise select virtual object, play displayed mini game, take instructed photo and provide photo, record instructed video and submit video, purchase one or more products or services and submit receipt of purchased one or more products or services of business of sponsor, check in place of business of sponsor, provide one or more types of requested or instructed details, refer or share products or services of business of sponsor, invite particular number of friends or contacts to join with business of sponsor, provide one or more types of requested or instructed reactions, view one or more types of details, presentation, demonstration, video of products or services of business of sponsor or business of sponsor, add to favorite or add to contact list or follow or connect with products or services of business of sponsor or business of sponsor.

8. A system comprising: a processor; and a memory coupled to the processor, the memory including instructions which, when executed by the processor, cause the system to:
  a) store data specifying an association between the real world object associated virtual object, wherein the association utilizes geolocation or place or geofence information and the object criteria;
  b) detect that a client device of the server has conducted scanning or augmented reality (AR) scanning or taken a photograph or provided a raw photo or scanned data from particular real world object location;
  c) identify or recognize an object in the photograph or scanned data; and based on the identified object satisfying within a defined geographic area surrounding the identified geolocation or the identified geolocation associated place or geofence associated object criteria in the stored data, display or provide the associated virtual object including virtual money to the client device.

9. The system of claim 8, wherein store virtual objects and associated data including virtual money provided to the client device in a virtual object and virtual money collection associated with the client device.

10. The system of claim 8, wherein displaying or storing the virtual object and associated virtual money to the client device based on validating location of augmented reality scanning or taking a photograph of real world object by sufficiently matching location of augmented reality scanning or taking a photograph of real world object with pre-defined or stored location of real world object.

11. The system of claim 8, wherein displaying or storing the virtual object and associated virtual money to the client device in the event of sufficiently matching of date and time of augmented reality scanning or taking a photograph of real world object with server's current date and time, wherein date and time retrieved from exchangeable image file format (EXIF) data associated with said scanned data or a photograph or a raw photo.

12. The system of claim 8, wherein notifying or displaying the information about a real world object to the user or player in response to the client device being within a set distance of the location of the real world object.

13. The system of claim 8, wherein the virtual object is provided to the user or player in response to the user or the player making a purchase of an object or product or service at the business of the sponsor and submitting and validating digital receipt or scanned receipt to the server.

14. The system of claim 8, wherein displaying or storing the virtual object and associated virtual money to the client device after conducting of one or more types of required activities, actions, call-to-actions, participation, playing of game, fulfillment of task, wherein one or more types of activities, actions, call-to-actions, participation comprise select virtual object, play displayed mini game, take instructed photo and provide photo, record instructed video and submit video, purchase one or more products or services and submit receipt of purchased one or more products or services of business of sponsor, check in place of business of sponsor, provide one or more types of requested or instructed details, refer or share products or services of business of sponsor, invite particular number of friends or contacts to join with business of sponsor, provide one or more types of requested or instructed reactions, view one or more types of details, presentation, demonstration, video of products or services of business of sponsor or business of sponsor, add to favorite or add to contact list or follow or connect with products or services of business of sponsor or business of sponsor.

15. A computer-implemented method of providing a game, comprising:
  a) hosting, at a game server, a game, the game having a virtual world geography that correspondences the real world geography, as a result, as the player continuously moves about or navigates in a range of coordinates in the real world, the player also continuously moves about in a range of coordinates in the real world map or virtual world;
  b) storing data specifying an association between the real world object associated virtual object, wherein the association utilizes geolocation or place or geofence information and the object criteria;
  c) responsive to the client device being within a predefined geofence boundary or a set distance of the geolocation of the business in the real world, notifying or displaying the information about one or more types of one or more real world objects to the user or player;
  d) detect that a client device of the server has conducted scanning or augmented reality (AR) scanning or taken a photograph or provided a raw photo or scanned data from particular real world object geolocation;
  e) identifying or recognizing an object in the photograph or scanned data; and based on the identified object satisfying within a defined geographic area surrounding the identified geolocation or the identified geolocation associated place or geofence associated object criteria in the stored data, displaying or providing the associated virtual object including virtual money to the client device.

16. The computer-implemented method of claim 15, wherein receiving, by the game server, a plurality of requests from a plurality of sponsors, each of the plurality of requests requesting that a virtual element associated with the request be included at a location in the virtual world corresponding to a location of a business in the real world, the business associated with a sponsor that provided the request to the game server from the plurality of sponsors; selecting, by the game server, at least one request from the plurality of requests; responsive to selecting the at least one request, modifying, by the game server, game data to include the virtual element associated with the at least one request in the game at the location in the virtual world requested by the at least one request; providing, by the game server, the modified gate data to a client device of a player.

17. The computer-implemented method of claim 15, wherein storing, by the game server, virtual objects and associated data including virtual money provided to the client device in a virtual object and virtual money collection associated with the client device.

18. The computer-implemented method of claim 15, wherein virtual object comprises a one or more types of power in game, virtual item, virtual element, virtual reward, virtual money, virtual currency or other suitable virtual goods including geo-filter, wherein the virtual object is a coupon, a redeemable point, a gift, a sample, an offer, cash back, discount, or voucher redeemable in the real world.

19. The computer-implemented method of claim 15, wherein the virtual object is provided to the user or the player in response to the player or the user making a purchase of an object or product or service at the business of the sponsor.

20. The computer-implemented method of claim 15, wherein displaying or storing the virtual object and associated virtual money to the client device after conducting of one or more types of required activities, actions, call-to-actions, participation, playing of game, fulfillment of task, wherein one or more types of activities, actions, call-to-actions, participation comprise select virtual object, play displayed mini game, take instructed photo and provide photo, record instructed video and submit video, purchase one or more products or services and submit receipt of purchased one or more products or services of business of sponsor, check in place of business of sponsor, provide one or more types of requested or instructed details, refer or share products or services of business of sponsor, invite particular number of friends or contacts to join with business of sponsor, provide one or more types of requested or instructed reactions, view one or more types of details, presentation, demonstration, video of products or services of business of sponsor or business of sponsor, add to favorite or add to contact list or follow or connect with products or services of business of sponsor or business of sponsor.

\* \* \* \* \*